United States Patent
Bishop et al.

(10) Patent No.: US 12,404,176 B2
(45) Date of Patent: Sep. 2, 2025

(54) SCALABLE SYNTHESIS OF PERIMORPHIC CARBONS

(71) Applicant: DICKINSON CORPORATION, Novato, CA (US)

(72) Inventors: Matthew Bishop, Novato, CA (US); David Brill, Novato, CA (US); Christopher Carstens, Woodside, CA (US); Abhay Thomas, Mill Valley, CA (US); Andrew Westle, Novato, CA (US)

(73) Assignee: DICKINSON CORPORATION, Novato, CA (US)

( * ) Notice: Subject to any disclaimer, the term of this patent is extended or adjusted under 35 U.S.C. 154(b) by 0 days.

(21) Appl. No.: 18/119,014

(22) Filed: Mar. 8, 2023

(65) Prior Publication Data

US 2024/0034631 A1  Feb. 1, 2024

Related U.S. Application Data

(63) Continuation of application No. PCT/US2021/049195, filed on Sep. 7, 2021.

(60) Provisional application No. 63/075,918, filed on Sep. 9, 2020.

(51) Int. Cl.
*C01B 32/186* (2017.01)

(52) U.S. Cl.
CPC ........ *C01B 32/186* (2017.08); *C01P 2002/01* (2013.01); *C01P 2002/30* (2013.01); *C01P 2002/82* (2013.01)

(58) Field of Classification Search
CPC .............. C01B 32/186; C01P 2002/01; C01P 2002/30; C01P 2002/82

USPC ........................................... 423/414
See application file for complete search history.

(56) References Cited

U.S. PATENT DOCUMENTS

| 4,832,870 A | 5/1989 | Clough et al. |
| 5,908,715 A | 6/1999 | Liu et al. |
| 6,811,881 B1 | 11/2004 | Clough |
| 7,419,650 B2 | 9/2008 | Pierard et al. |

(Continued)

FOREIGN PATENT DOCUMENTS

| CN | 101304945 A | 11/2008 |
| CN | 101679605 A | 3/2010 |

(Continued)

OTHER PUBLICATIONS

Ferrari, Andrea C., and John Robertson. "Interpretation of Raman spectra of disordered and amorphous carbon." Physical review B 61.20 (2000): 14095.

(Continued)

*Primary Examiner* — Anita Nassiri-Motlagh
(74) *Attorney, Agent, or Firm* — Calfee, Halter & Griswold LLP

(57) ABSTRACT

The present disclosure is directed to the scalable synthesis of carbonaceous perimorphic materials, including carbonaceous perimorphic frameworks, on recyclable templates, and using recyclable process liquids. The present disclosure also demonstrates novel perimorphic architectures. In particular, perimorphic frameworks comprising synthetic anthracitic networks are demonstrated. Using these methods, three-dimensional architectures constructed from graphenic carbon can be scalably produced.

20 Claims, 132 Drawing Sheets

(56) References Cited

U.S. PATENT DOCUMENTS

| | | |
|---|---|---|
| 7,718,156 B2 | 5/2010 | Zhang et al. |
| 7,794,683 B1 | 9/2010 | Forohar et al. |
| 7,935,276 B2 | 5/2011 | Zhou et al. |
| 8,828,533 B2 | 9/2014 | Dai et al. |
| 10,214,424 B2 | 2/2019 | Xu |
| 10,711,783 B2 | 7/2020 | Monet |
| 10,717,843 B2 | 7/2020 | Bishop et al. |
| 11,926,528 B2 | 3/2024 | Bishop et al. |
| 2004/0004212 A1 | 1/2004 | Crespi et al. |
| 2008/0275150 A1 | 11/2008 | Miller et al. |
| 2009/0136816 A1 | 5/2009 | Kang et al. |
| 2009/0220767 A1 | 9/2009 | Schlogl et al. |
| 2009/0294729 A1 | 12/2009 | Harada et al. |
| 2010/0178399 A1 | 7/2010 | Square et al. |
| 2011/0278506 A1 | 11/2011 | Toyokawa |
| 2012/0027681 A1 | 2/2012 | Jung et al. |
| 2012/0241688 A1 | 9/2012 | Hara et al. |
| 2013/0181676 A1 | 7/2013 | Kourtakis et al. |
| 2013/0214875 A1 | 8/2013 | Duncan et al. |
| 2014/0141224 A1 | 5/2014 | Pasquali et al. |
| 2014/0275597 A1 | 9/2014 | Zhang et al. |
| 2014/0286852 A1 | 9/2014 | Nicholas et al. |
| 2014/0313636 A1 | 10/2014 | Tour et al. |
| 2015/0067707 A1 | 3/2015 | Chin et al. |
| 2016/0027934 A1 | 1/2016 | Noyes |
| 2016/0096334 A1 | 4/2016 | Sander et al. |
| 2016/0236177 A1 | 8/2016 | Backov et al. |
| 2017/0008769 A1 | 1/2017 | Otter et al. |
| 2017/0029819 A1 | 2/2017 | Mitter et al. |
| 2018/0105422 A1 | 4/2018 | Yu et al. |
| 2018/0223073 A1* | 8/2018 | Bishop ................ C09D 11/037 |
| 2018/0312406 A1 | 11/2018 | Siedle |
| 2020/0013104 A1 | 1/2020 | Yamauchi et al. |
| 2020/0131040 A1 | 4/2020 | Bishop et al. |
| 2020/0346934 A1* | 11/2020 | Thomas ................ C01B 32/194 |
| 2021/0171353 A1 | 6/2021 | Gulas et al. |
| 2021/0214520 A1* | 7/2021 | Bishop ................ C09D 11/037 |

FOREIGN PATENT DOCUMENTS

| | | |
|---|---|---|
| CN | 101687646 A | 3/2010 |
| CN | 103086365 A | 5/2013 |
| CN | 103395767 A | 11/2013 |
| CN | 103482611 A | 1/2014 |
| CN | 103855413 A | 6/2014 |
| CN | 104269543 A | 1/2015 |
| CN | 104961119 A | 10/2015 |
| CN | 109734081 A | 5/2019 |
| CN | 111278768 A | 6/2020 |
| EP | 3312225 A1 | 6/2016 |
| FR | 1087068 A | 2/1955 |
| JP | S63264812 A | 11/1988 |
| JP | 2006335596 A | 12/2006 |
| JP | 2008535763 A | 9/2008 |
| JP | 2009007216 A | 1/2009 |
| JP | 2009132607 A | 6/2009 |
| JP | 2009538363 A | 11/2009 |
| JP | 2010007061 A | 1/2010 |
| JP | 2010007067 A | 1/2010 |
| JP | 2010208887 A | 9/2010 |
| JP | 2011525468 A | 9/2011 |
| JP | 2012201689 A | 10/2012 |
| JP | 2013166849 A | 8/2013 |
| JP | 2020509147 A | 3/2023 |
| KR | 20150020156 A | 2/2015 |
| NZ | 338047 A | 8/2001 |
| WO | 2006108683 A1 | 10/2006 |
| WO | 2007143237 A2 | 12/2007 |
| WO | 2009149540 A1 | 12/2009 |
| WO | 2012174040 A1 | 12/2012 |
| WO | 2014026194 A1 | 2/2014 |
| WO | 2016208170 A1 | 12/2016 |
| WO | 2018136810 A1 | 7/2018 |
| WO | 2018170241 A1 | 9/2018 |
| WO | 2019083986 | 5/2019 |
| WO | 2019149540 A1 | 8/2019 |
| WO | 2020004674 A1 | 1/2020 |
| WO | 2021257566 A1 | 12/2021 |

OTHER PUBLICATIONS

Robertson AW, Bachmatiuk A, Wu YA, Schaffel F, Rellinghaus B, Büchner B, Rümmeli MH, Warner JH. "Atomic structure of interconnected few-layer graphene domains." ACS nano. Aug. 5, 2011;5(8):6610-8.

Chung, De-Hua, Ta-Hui Lin, and Shuhn-Shyurng Hou. "Flame synthesis of carbon nano-onions enhanced by acoustic modulation." Nanotechnology 21.43 (2010): 435604.

Pawan, et al. "A simple "nano-templating" method using zeolite Y toward the formation of carbon schwarzites." Frontiers in Materials 6 (2019): 104.

Cui, Chaojie, et al. "Highly electroconductive mesoporous graphene nanofibers and their capacitance performance at 4 V." Journal of the American Chemical Society 136.6 (2014): 2256-2259.

Misra, Abha, et al. "Hexagonal diamond synthesis on h-GaN strained films." Applied physics letters 89.7 (2006).

Nestler, Klaus, et al. "Thermogravimetric and Raman spectroscopic investigations on different coals in comparison to dispersed anthracite found in permineralized tree fern Psaronius sp." Journal of Molecular Structure 661 (2003): 357-362.

Reilly, Peter TA, and William B. Whitten. "The role of free radical condensates in the production of carbon nanotubes during the hydrocarbon CVD process." Carbon 44.9 (2006): 1653-1660.

Zhao, Jin, et al. "Synthesis of large-scale undoped and nitrogen-doped amorphous graphene on MgO substrate by chemical vapor deposition." Journal of Materials Chemistry 22.37 (2012): 19679-19683.

Li, Xing-ao, et al. "Chemical vapor deposition of amorphous graphene on ZnO film." Synthetic Metals 174 (2013): 50-53.

Huang, Mingyuan, et al. "Raman spectroscopy of graphene under uniaxial stress: Phonon softening and determination of the crystallographic orientation.".

Liu, DeHan, et al. "Sample maturation calculated using Raman spectroscopic parameters for solid organics: Methodology and geological applications." Chinese Science Bulletin 58.11 (2013): 1285-1298.

Sun, Yanqiu, et al. "Structural dislocations in anthracite." The Journal of Physical Chemistry Letters 2.20 (2011): 2521-2524.

Llu "Graphene-like nanoribbons periodically embedded with four- and eight-membered rings." Nature Comm, 8:14924, pp. 1-7 (Year:2017).

Bo Jin et al., "Inorganic Salt Technology," China Industry Press, pp. 153-157, Aug. 1965.

Chandra Kishore S et al: "Direct synthesis of solid and hollow carbon nanospheres over NaCl crystals using acetylene by chemical vapour deposition", Applied Surface Science, Elsevier, Amsterdam , NL, vol. 400, Dec. 14, 2016 (Dec. 14, 2016), pp. 90-96, XP029898989, ISSN: 0169-4332, DOI: 10.1016/J.APSUSC.2016.12.104.

He et al: "A practical method for the production of hollow carbon onion particles", Journal of Alloys and Compounds, Elsevier Sequoia, Lausanne, CH, vol. 425, No. 1-2, Nov. 3, 2006 (Nov. 3, 2006), pp. 329-333, XP00584 7594, ISSN: 0925-8388, DOI: 10.1016/J.JALLCOM.2006.01.031.

Chien Chun-Hsiung et al: "Synthesis of carbon hollow spheres and particles from CCl4and Mo", Materials Letters, vol. 62, No. 8 , pp. 1176-1178, XP029141217, ISSN: 0167-577X, DOI: 10.1016/J.MATLET.2007.08.027.

Nishihara H et al: "A possible buckybowl-like structure of zeolite templated carbon", Carbon, Elsevier Oxford, GB, vol. 47, No. 5, Apr. 1, 2009 (Apr. 1, 2009), pp. 1220-1230, XP025971099, ISSN: 0008-6223, DOI: 10.1016/J.CARBON.2008.12.040.

Office Action from Japanese Application No. 2023121698 dated Jul. 24, 2024.

Office Action from Canadian Application No. 3,079,947 dated Oct. 28, 2024.

Office Action from Chinese Application No. 201880069707.4 dated Dec. 5, 2022.

(56) References Cited

OTHER PUBLICATIONS

Office Action from European Application No. 18821140.2 dated Jan. 30, 2023.
Office Action from European Application No. 18871140.2 dated Jan. 20, 2022.
Office Action from Indian Application No. 202047021556 dated Dec. 17, 2020.
Office Action from Japanese Application No. 2020543477 dated Aug. 29, 2022.
Office Action from Chinese Application No. 201880024901 dated Aug. 31, 2022.
Office Action from Japanese Patent Application No. 2019550644 dated Sep. 26, 2022.
Office Action from Japanese Patent Application No. 2023115215 dated Jun. 19, 2024.
Office Action from Australian Patent Application No. 2021293887 dated Oct. 25, 2023.
Examination Report from European U.S. Appl. No. 21/826,674 dated Feb. 5, 2024.
Ariga, "Nanoarchitectonics for Mesoporous Materials", Bulletin of the Chemical Society of Japan, vol. 85, No. 1, 1-32, Jan. 2012.
Dittanet, Preerapan, "Fracture Behavior of Silica Nanoparticle Filled Epoxy Resisn" (2011). Theses and Dissertations. Paper 1034.
Garlof, Svenja, "Electro-mechanical piezoresistive properties of three dimensionally interconnected carbon aerogel (Aerographite)-epoxy composites", Composites Science and Technology 134 (2016) 226-233.
Son, In Hyuk, "Silicon carbide-free graphene growth on silicon for lithium-ion battery with high volumetric energy density", Nature Communications, Jun. 25, 2015.
"xGnp Graphene nanoplatelets—Grade C", XGSciences, 2 pages.
Hodkiewica, Joe, "Characterizing Graphene with Raman Spectroscopy", Thermo Scientific, Application Note: 51946, 2010.
Garlof, Svenja, "3D carbon networks and their polymer composites: Fabrication and electromechanical investigations of neat Aerographite and Aerographite-based PNCs under compressive load", Carbon 111, Sep. 20, 2016, pp. 103-112.
Guo, Chun Xian, "A self-assembled hierarchical nanostructure comprising carbon spheres and graphene nanosheets for enhanced supercapacitor preformance", Energy & Enviromental Science, 2011, pp. 4504-0407.
Mecklenburg, Matthias, "Aerographite: Ultra Lightweight, Flexible Nanowall, Carbon Microtube Material with Outstanding Mechanical Performance", Advanced Materials, 2012, 24, 3486-3490.
Mortazavi, Bohayra, "Amorphized graphene: A stiff material with low thermal conductivity", Carbon 103, 2016, pp. 318-326.
Castillejos, Eva, "An Efficient Strategy to Drive Nanoparticles into Carbon Nanotubes and the Remarkable Effect of Confinement on Their Catalytic Performance", Angewandte Chemie, 2009, 48, 2529-2533.
Lee, Ki Rak, "Electrochemical oxygen reduction on nitrogen doped graphene sheets in acid media" Electrochemistry Communications 12, 2010, pp. 1052-1055.
Gojny, Florian H., "Functionalisation effect on the thermo-mechanical behaviour of multi-wall carbon nantube/epoxy-composites", Composites Science and Technology 64, 2004, pp. 2303-2308.
Cheng, Quian "Graphene and carbon nanotube composite electrodes for supercapacitors with ultra-high energy density", Phys. Chem. Chem Phys., 2011, 13, pp. 17615-17624.
Tuan, Dinh Van, "Insulating behavior of an amorphous graphene membrane", Physical Review B86, 121408(R), 2012.
Carpenter, Corinne, "Mechanical properties of irradiated single-layer graphene", Appl. Phys. Lett. 103, 013102, 2013.
Choi, Young-Kuk, "Processing and characterization of epoxy nanocomposites reinforced by cup-stacked carbon nanotubes", Polymer 46, 2005, pp. 11489-11498.
Vilian, A.T. Ezhil, "Pt-Au bimetallic nanoparticles decorated on reduced graphene oxide as an excellent electrocatalysts for methanol oxidation", Synthetic metals 219, 2016, pp. 52-59.
Cheng, Hui-Ming, "Shortened double-walled carbon nanotubes by high-energy ball milling", International Journal of Nanotechnology, Jan. 2007.
Wang, Guoxiu, "Sn/graphene nanocomposite with 3D architecture for enhanced reversible lithium storage in lithium ion batteries", Journal of Materials Chemistry, 2009, 19, pp. 8378-8384.
Wagner, Daniel Hanoch, "Stress-Induced Fragmentation of Multi-Walled Carbon Nanotubes in a Polymer Matrix", Applied Physics Letters, Jan. 1998.
Da Silveira, et al., "Functionalized Cellular Carbon-MgO Composites: From Interface Processing to Thermal Shock Resistant Low-Carbon MgO-C Refractories," Advanced Engineering Materials, DOI: 10.1002/adem.201300052, vol. 16, No. 3, XP055467219, pp. 301-308, (Oct. 17, 2013).
Da Silveira, et al.,. "Reinforced Cellular Carbon Matrix-MgO Composites for High Temperatures Applications: Microstructural Aspects and Colloidal Processing," Advanced Engineering Materials, DOI: 10.1002/adem.201100028, vol. 13, No. 11, XP055467221, pp. 982-989, (May 27, 2011).
International Search Report and Written Opinion of the International Searching Authority, or the Declaration for International Application No. PCT/US2018/014549 dated Jul. 6, 2018.
Negishi et al., " Layer-by-Layer Growth of Graphene Layers on Graphene Substrates by Chemical Vapor Deposition," Thin Solid Films, vol. 519 (2011), pp. 6447-6452.
An et al. "Polypyrolle/Carbon aerogel composite materials for supercapacitator", Journal of Power Sources, vol. 195, No. 19, Oct. 1, 2010, pp. 6964-6969.
"Chemical vapor infiltration", Wikipedia, 2020, p. 1-5, https://en.wikipedia.org/wiki/windexphp? title=Chemical_vapor_infiltration &oldid=944760299.
Farbos et al. "Nanoscale Structure and texture of highly anisotropic pyrocarbons revisited with transmission electron microscopy, image processing, neutron diffraction and atomistic modeling", Carbon, vol. 80, Sep. 4, 2014, p. 472-489.
Hsieh et al., Mechanical properties and toughness of carbon aerogel/ epoxy polymer composites, Springer Science +Business Media, vol. 50, pp. 3258-3266, 2015.
Huang et al.. , Thickness of graphene and single-wall carbon nanotubes, The American Physical Society, vol. B, No. 74, pp. 245413-1-245413-9, 2006.
International Search Report and Written Opinion from PCT/US2018/ 057082 dated Dec. 31, 2018.
International Search Report and Written Opinion from PCT/US2021/ 37435 dated Sep. 28, 2021.
Office Action from Indian Application No. 201947033290 dated Mar. 23, 2021.
Office action from Indian Application No. 201947041276 dated Mar. 24, 2021.
Office Action from Japanese Application No. 2019-560047 dated Dec. 21, 2021.
Office action from Japanese Application No. 2019-550644 dated Dec. 21, 2021.
Office Action from Chinese Application No. 201880019586.2 dated Sep. 1, 2021.
Search Report from European Application No. 18871140.2 dated Jun. 21, 2021.
Zhang et al. "Mussel-Inspired Polydopamine Coated Hollow Carbon Microspheres, a Novel Versatile Filler for Fabrication of High Performance Syntactic Foams", ACS Applied Materials & Interfaces, vol. 6, No. 21, Oct. 15, 2014, pp. 18644-18652.
Davydov et al., Preparation of a Platelike Carbon Nanomaterial Using MgO As a Template; Neorganicheskie Materialy, 2012, vol. 48, No. 3, pp. 297-301.
Oberlin, "Pyrocarbons," Carbon vol. 40, No. 7, Nov. 2001, p. 7-24.
Fetisova O.Yu., Synthesis and Properties of Porous Carbon Materials from Natural Graphites and Anthracites, Dissertation for the Candidate Degree in Chemistry, Krasnoyarsk, 2012 (D3).
Ruffieux et al., On-Surface Synthesis of Graphene Nanoribbons with Zigzag Edge Topology, Nature, pp. 489-493, vol. 531, Mar. 24, 2016.
Office Action from Australian Patent Application No. 2021344831 dated Apr. 10, 2025.

(56) References Cited

OTHER PUBLICATIONS

Office Action from Korean Patent Application No. 1020237001670 Mar. 26, 2025.
Office Action from Japanese Patent Application No. 2023115215 dated Mar. 3, 2025.
Office Action from Indian Patent Application No. 202317002398 dated Mar. 18, 2025.
Office Action from Indian Patent Application No. 202317047095 dated Apr. 3, 2025.

* cited by examiner

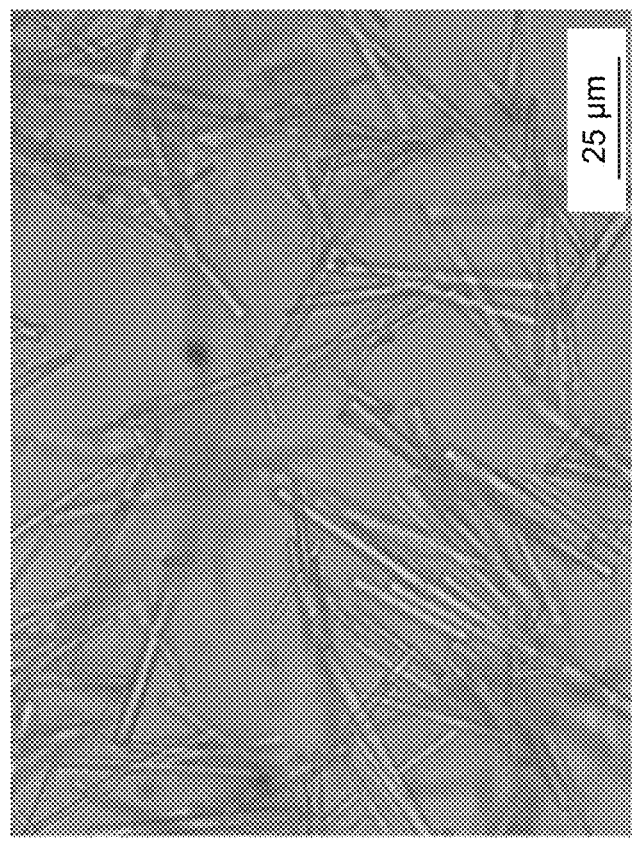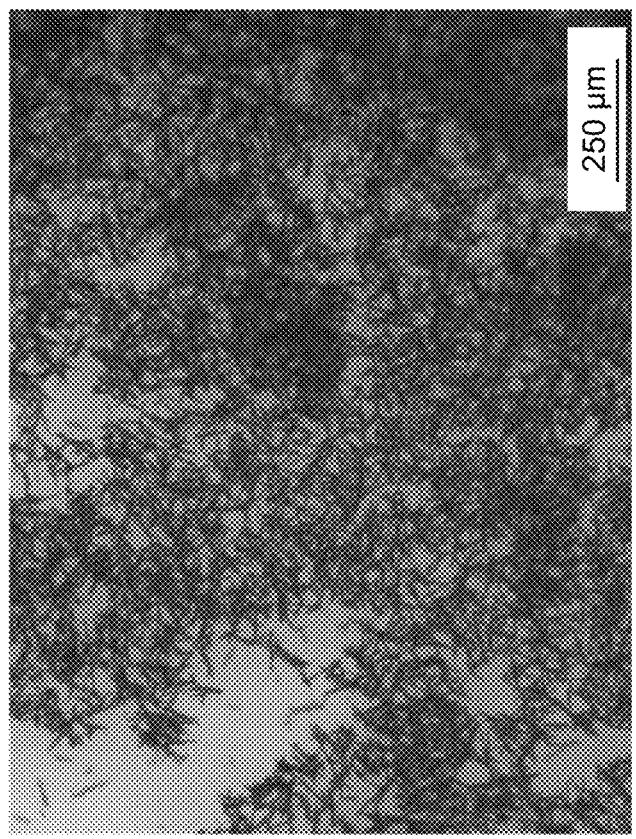
FIG. 28

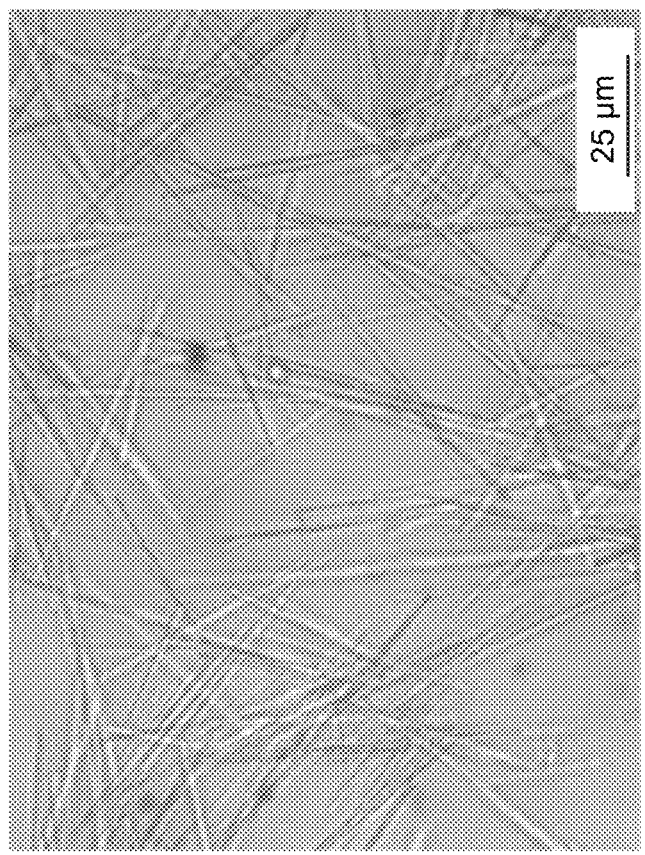
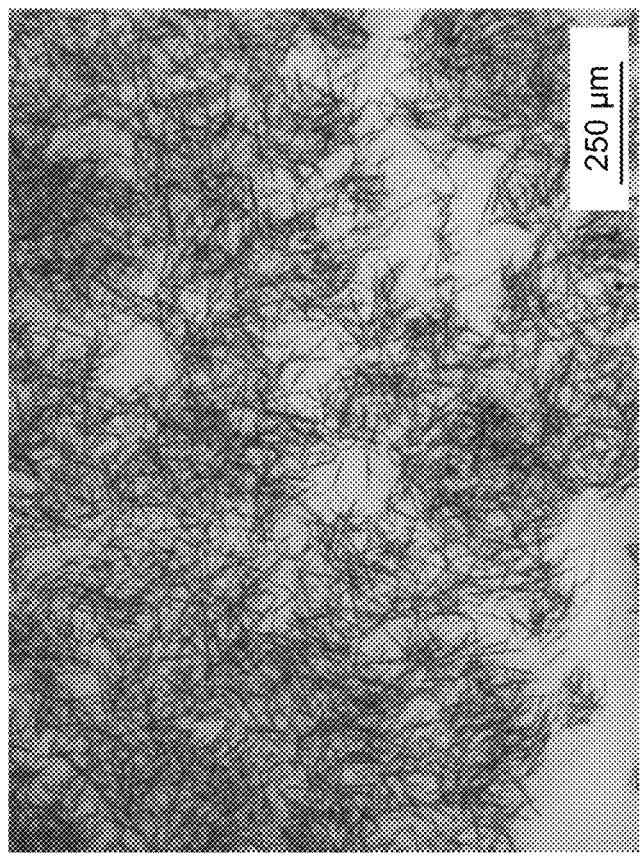
FIG. 29

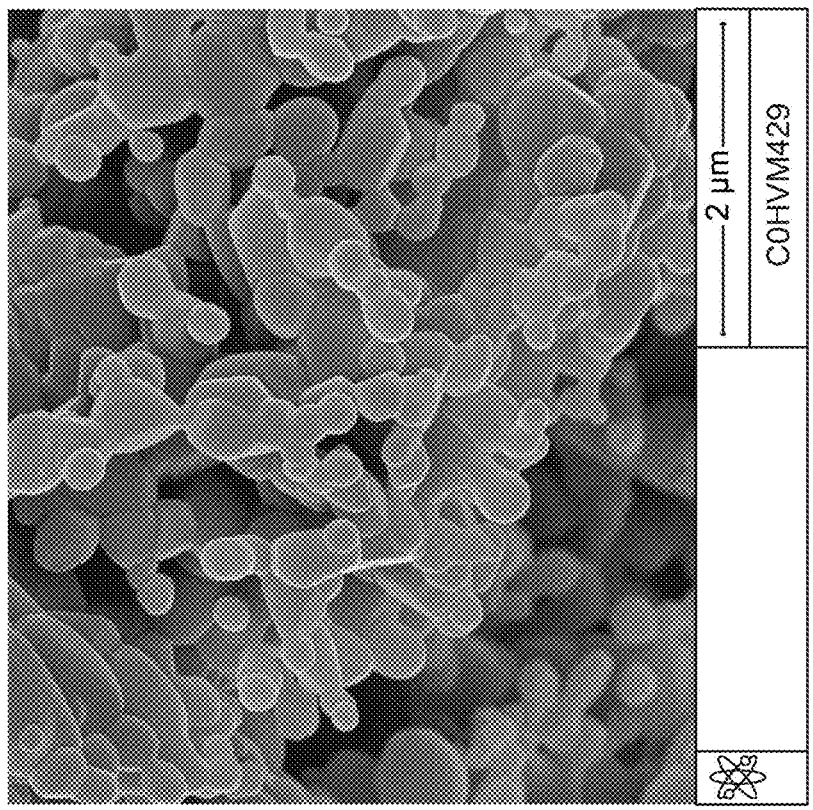
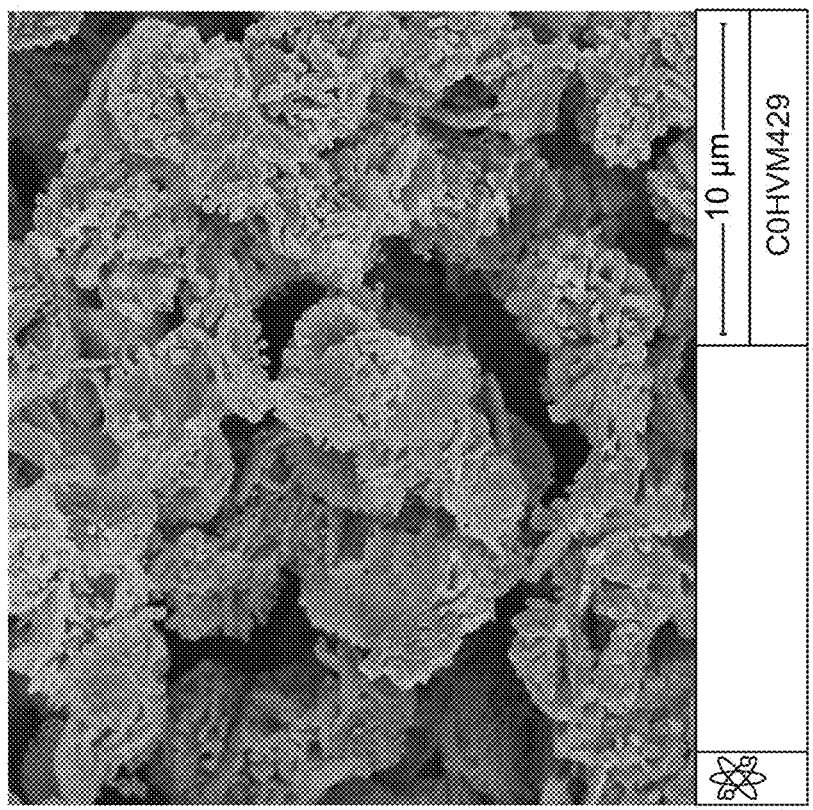
FIG. 35

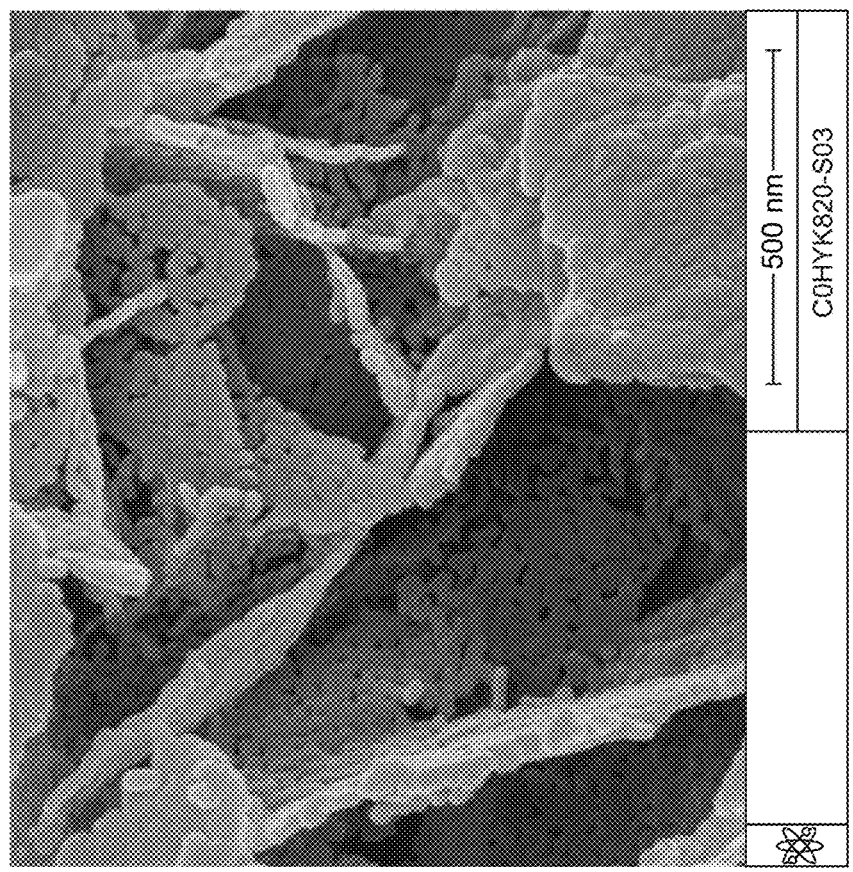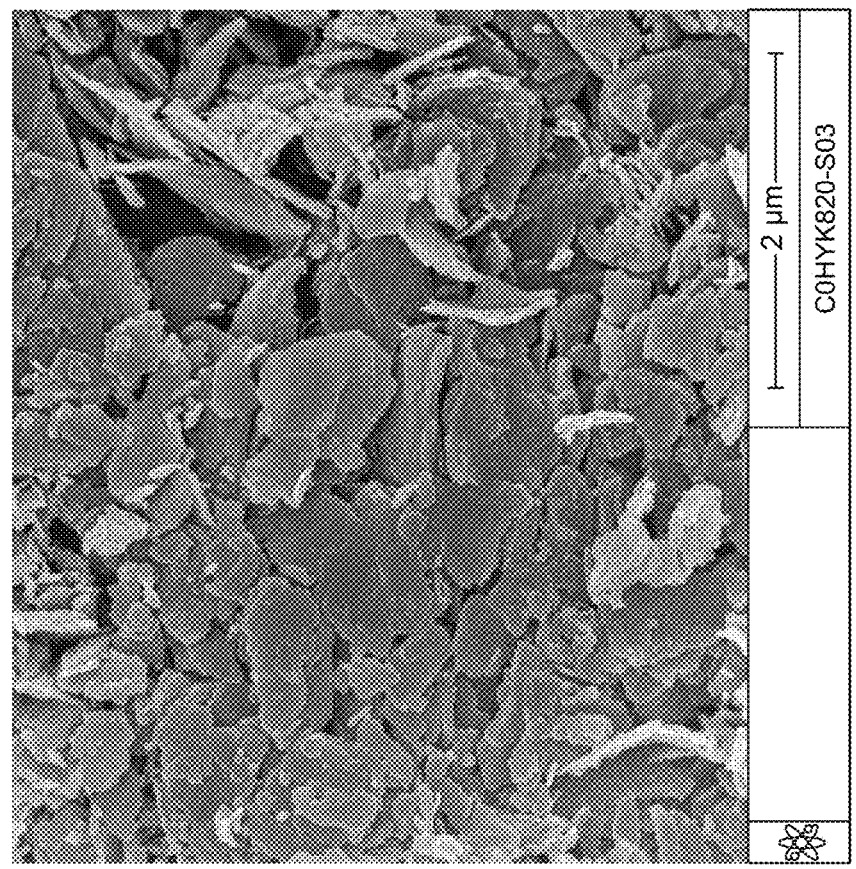
FIG. 42

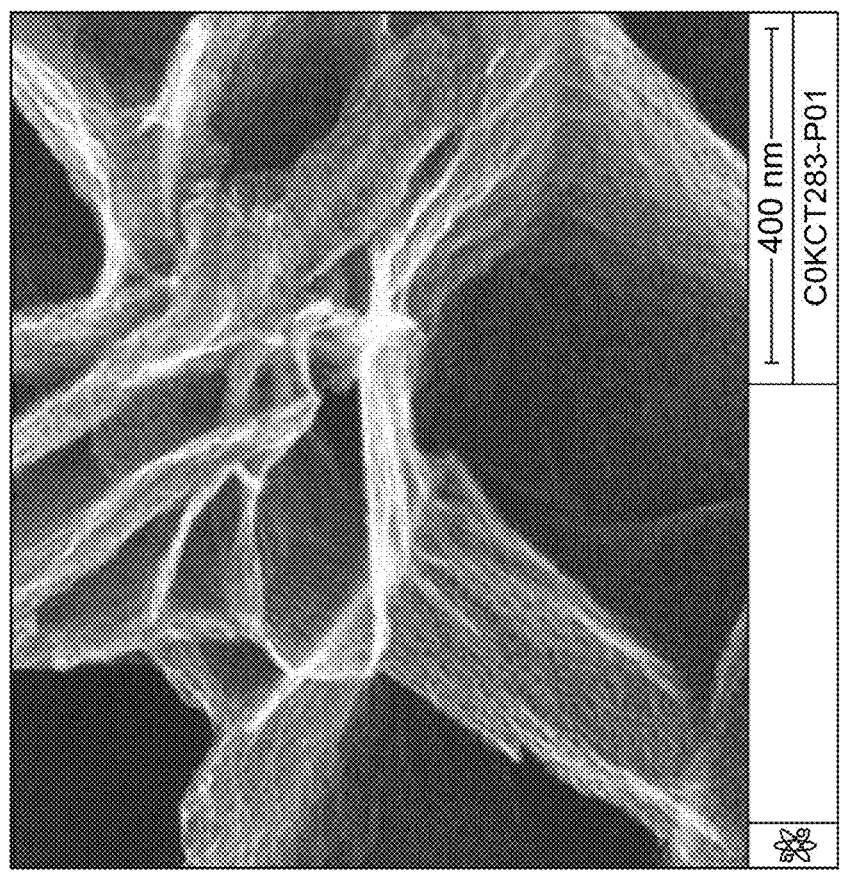
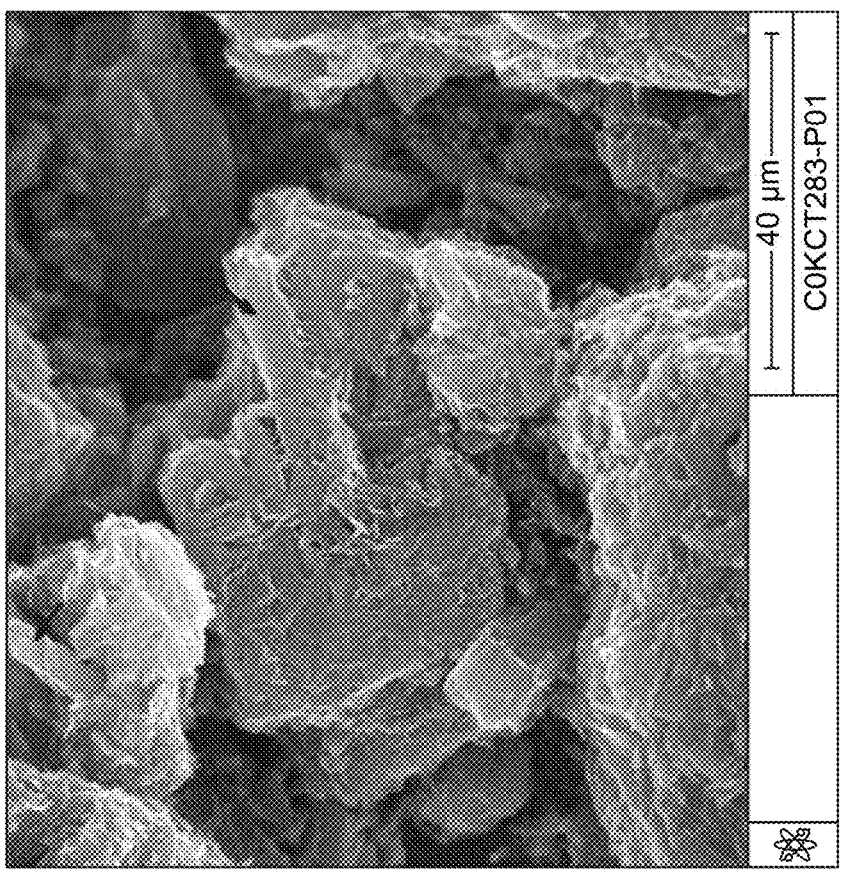
FIG. 51

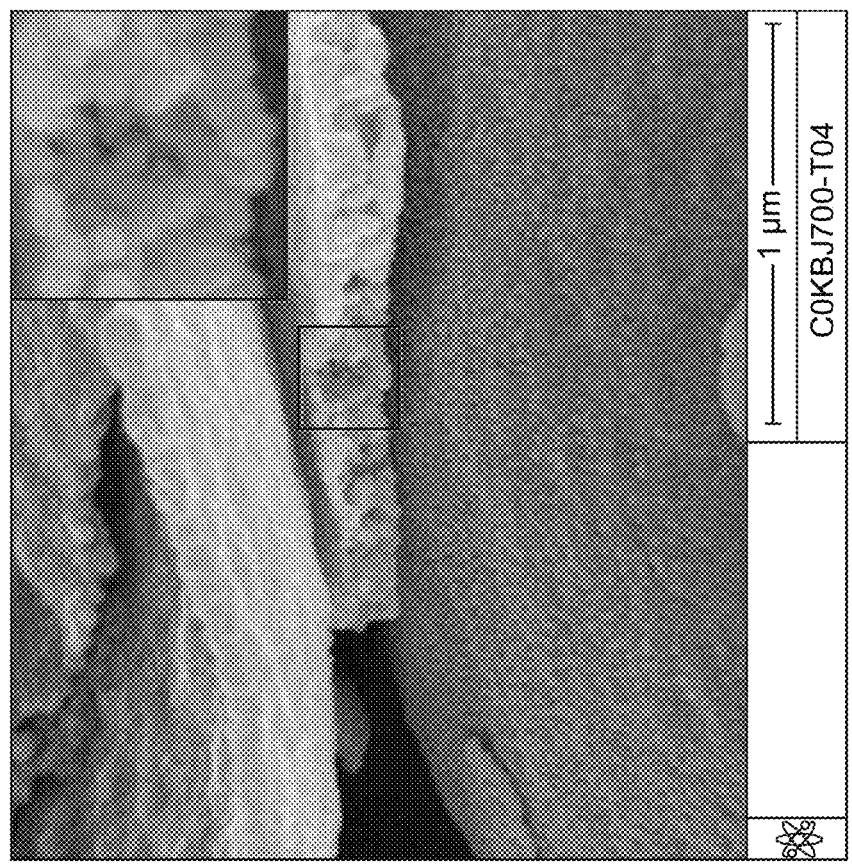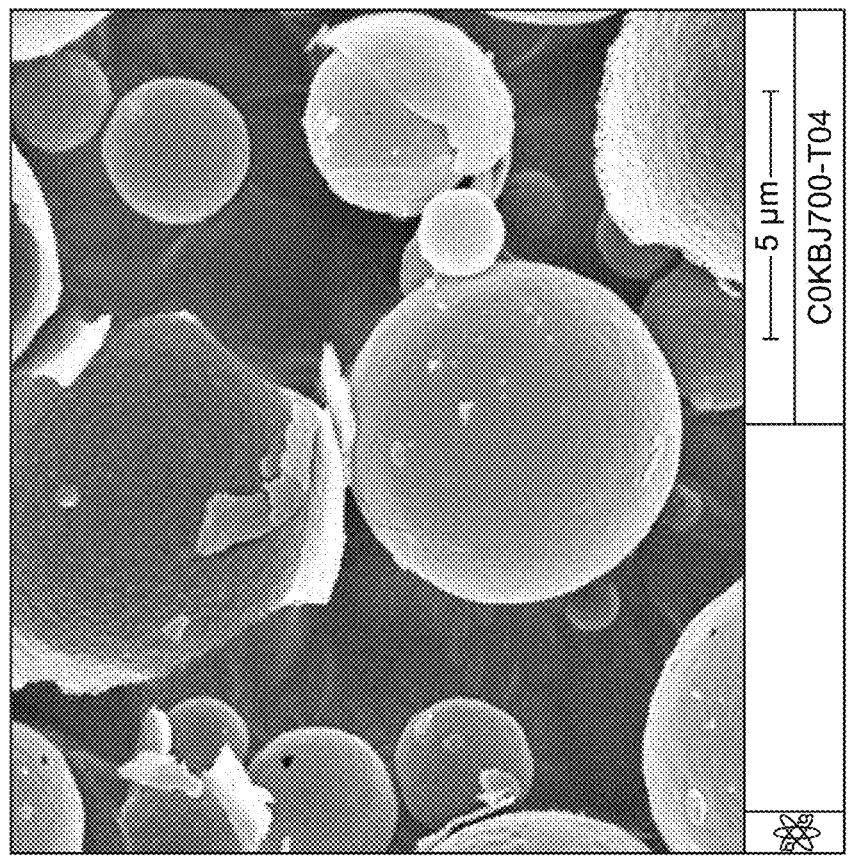
FIG. 54

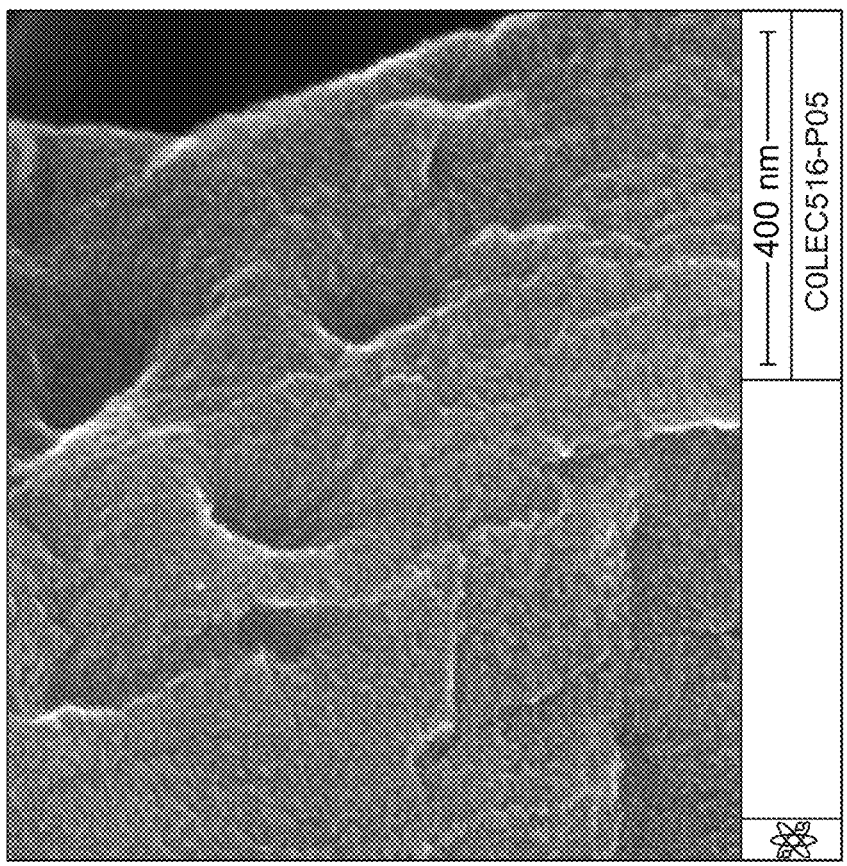
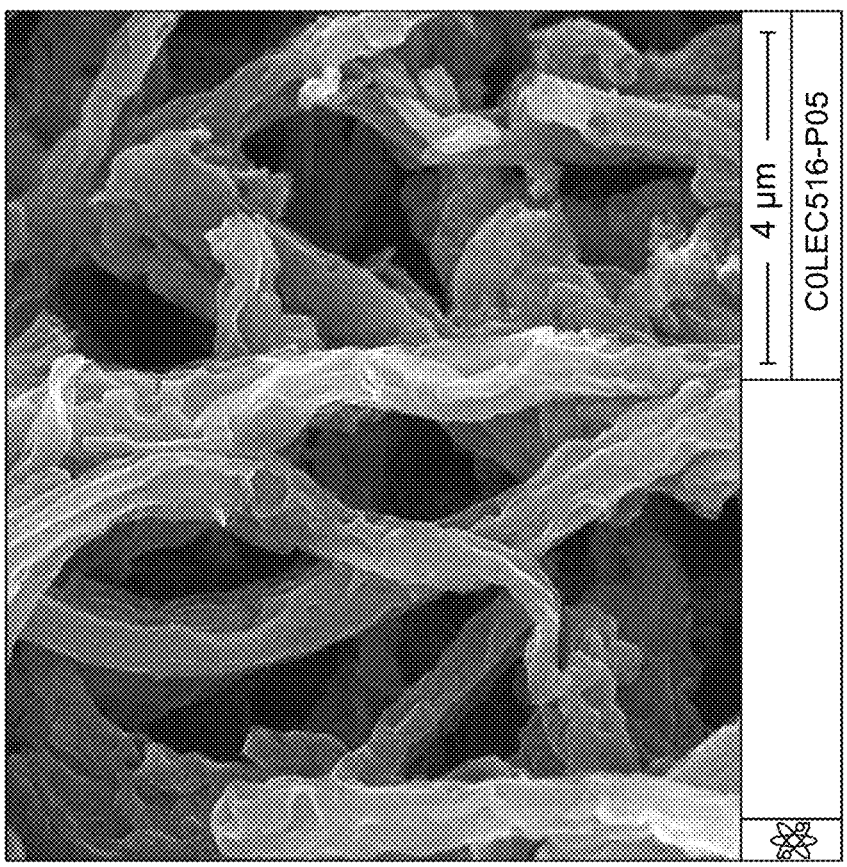
FIG. 70

| Template Precursor Material | Template Material | Perimorphic Composite Material | Perimorphic Material |
|---|---|---|---|
| $H_1$ | $H_1T_1$ | - | - |
| $H_1$ | $H_1T_2$ | - | - |
| $H_2$ | $H_2T_1$ | - | - |
| $H_4$ | $H_4T_1$ | - | - |
| $H_5$ | $H_5T_1$ | - | - |
| $H_6$ | $H_6T_1$ | $H_6T_1P_4$ | $P_4$ |
| $H_6$ | $H_6T_1$ | $H_6T_1P_7$ | $P_7$ |
| $H_6$ | $H_6T_1$ | $H_6T_1P_8$ | $P_8$ |
| $H_6$ | $H_6T_1$ | $H_6T_1P_9$ | $P_9$ |
| $H_6$ | $H_6T_1$ | $H_6T_1P_{10}$ | $P_{10}$ |
| $L_1$ | - | - | - |
| $L_2$ | $L_2T_1$ | - | - |
| $L_3$ | $L_3T_1$ | $L_3T_1P_{11}$ | $P_{11}$ |
| $L_3$ | $L_3T_2$ | $L_3T_2P_{12}$ | $P_{12}$ |
| $M_1$ | $M_1T_1$ | - | - |
| $M_1$ | $M_1T_2$ | - | - |
| $M_1$ | $M_1T_3$ | - | - |
| $M_1$ | $M_1T_4$ | - | - |
| $M_2$ | - | - | - |
| $M_3$ | $M_3T_1$ | $M_3T_1P_1$ | $P_1$ |
| $M_3$ | $M_3T_1$ | $M_3T_1P_2$ | $P_2$ |
| $M_3$ | $M_3T_1$ | $M_3T_1P_3$ | $P_3$ |
| $M_3$ | $M_3T_2$ | $M_3T_2P_5$ | $P_5$ |
| $M_3$ | $M_3T_3$ | $M_3T_3P_{23}$ | $P_{23}$ |
| $M_4$ | $M_4T_1$ | $M_4T_1P_{19}$ | $P_{19}$ |
| $M_4$ | $M_4T_2$ | - | - |
| $M_5$ | $M_5T_1$ | $M_5T_1P_{20}$ | $P_{20}$ |
| $M_5$ | $M_5T_2$ | - | - |

| | | | |
|---|---|---|---|
| $A_1$ | $A_1T_1$ | $A_1T_1P_{13}$ | $P_{13}$ |
| $A_1$ | $A_1T_1$ | $A_1T_1P_{14}$ | $P_{14}$ |
| $A_2$ | - | - | - |
| $A_3$ | $A_3T_1$ | - | - |
| $C_1$ | $C_1T_1$ | $C_1T_1P_{15}$ | $P_{15}$ |
| $E_1$ | $E_1T_1$ | $E_1T_1P_{16}$ | $P_{16}$ |
| $N_1$ | $N_1T_1$ | - | - |
| $N_1$ | $N_1T_2$ | - | - |
| $N_1$ | $N_1T_3$ | $N_1T_3P_6$ | $P_6$ |
| $N_2$ | $N_2T_1$ | $N_2T_1P_{21}$ | $P_{21}$ |
| $N_2$ | $N_2T_2$ | - | - |
| $N_2$ | $N_2T_3$ | - | - |
| $N_2$ | $N_2T_4$ | - | - |
| $N_2$ | $N_2T_5$ | - | - |
| $N_2$ | $N_2T_6$ | $N_2T_6P_{22}$ | $P_{22}$ |
| $N_3$ | - | - | - |
| $Li_1$ | $Li_1T_1$ | $Li_1T_1P_{18}$ | $P_{18}$ |
| $Ca_1$ | $Ca_1T_1$ | $Ca_1T_1P_{17}$ | $P_{17}$ |

FIG. 74B

|  | Lansfordite | Nesquehonite | Hydromagnesite | Magnesite |
|---|---|---|---|---|
| Raman Peak Position[†] ($cm^{-1}$) | 1083 | 1116 | 1094 | 1100 |
| Theoretical mass loss (%) | 76.9 | 70.9 | 56.9 | 52.2 |

[†]Raman characterization conducted as described in Section III

FIG. 75

| Template Material | Template Precursor Material | Na Molality of Solution Stock† (mol/kg) | Furnace Scheme†† | Treatment Temp. (°C) | BET Surface Area‡ (m²/g) | BJH Pore Volume‡ (cm³/g) | Template Space (%) | Porosity (%) |
|---|---|---|---|---|---|---|---|---|
| $M_3T_1$ | $M_3$ | - | D | 1050 | 24.1 | 0.169 | 62.2% | 37.8% |
| $M_4T_1$ | $M_4$ | $2.2 \cdot 10^{-3}$ | D | 1050 | 16.7 | 0.137 | 67.1% | 32.9% |
| $M_5T_1$ | $M_5$ | $1.9 \cdot 10^{-1}$ | D | 1050 | 10.4 | 0.083 | 77.1% | 22.9% |
| $M_3T_2$ | $M_3$ | - | D | 900 | 56.6 | 0.309 | 47.5% | 52.5% |
| $M_4T_2$ | $M_4$ | $2.2 \cdot 10^{-3}$ | D | 900 | 52.2 | 0.299 | 48.3% | 51.7% |
| $M_5T_2$ | $M_5$ | $1.9 \cdot 10^{-1}$ | D | 900 | 12.3 | 0.078 | 78.2% | 21.8% |

Notes:
† The Na concentration of the brine from which precursor particles were crystallized
‡ Refer to Section III for description of gas adsorption analysis techniques
†† Refer to Section III for description of equipment schemes

FIG. 76

| Template Material | Template Precursor Material | Furnace Scheme†† | Treatment Temp. (°C) | Treatment Atmosphere | BET Surface Area‡ (m²/g) | BJH Pore Volume‡ (cm³/g) | Template Space (%) | Porosity (%) |
|---|---|---|---|---|---|---|---|---|
| N₂T₁ | N₂ | A | 1000 | Ar + H₂O(g) | 13.3 | 0.084 | 76.9% | 23.1% |
| N₂T₂ | N₂ | A | 1000 | Ar | 32.7 | 0.111 | 71.5% | 28.5% |

Notes:
‡ Refer to Section III for description of gas adsorption analysis techniques
†† Refer to Section III for description of equipment schemes

FIG. 77

| Template Material | Template Precursor Material | Furnace Scheme | Segment 1 | | | Segment 2 | | | Carrier Gas Type | Flow (sccm) |
|---|---|---|---|---|---|---|---|---|---|---|
| | | | Heating Rate (°C/min) | Set temp. (°C) | Isotherm duration (min) | Heating rate (°C/min) | Set temp. (°C) | Isotherm duration (min) | | |
| $N_2T_3$ | $N_2$ | B | 5 | 640 | 120 | - | - | - | Ar | 1271 |
| $N_2T_4$ | $N_2$ | B | 20 | 640 | 120 | - | - | - | Ar | 1271 |
| $N_2T_5$ | $N_2$ | B | 20 | 350 | 0[††] | 5 | 640 | 120 | Ar | 1271 |
| $N_2T_6$ | $N_2$ | B | 5 | 640 | 120 | - | - | - | $CO_2$ | 815 |

Notes:
[†] Refer to Section III for description of equipment schemes
[††] This segment did not include an isotherm.

FIG. 78

| Template Material | Template Precursor Material | Furnace Scheme | Segment 1 | | | Segment 2 | | | Segment 3 | | | Carrier Gas Type | Flow (sccm) |
|---|---|---|---|---|---|---|---|---|---|---|---|---|---|
| | | | Heating rate (°C/min) | Set temp. (°C) | Isotherm duration (min) | Heating rate (°C/min) | Set temp. (°C) | Isotherm duration (min) | Heating rate (°C/min) | Set temp. (°C) | Isotherm duration (min) | | |
| $N_1T_1$ | $N_1$ | E | 10 | 1000 | 0 | - | - | - | - | - | - | Ar | 100 |
| $N_1T_2$ | $N_1$ | E | 10 | 1200 | 10 | - | - | - | - | - | - | Ar | 100 |
| $N_1T_3$ | $N_1$ | B | Max‡ | 460 | 0 | - | - | - | - | - | - | Ar | 1271 |
| $N_2T_1$ | $N_2$ | A | 5 | 450 | 60 | - | - | - | - | - | - | Ar + $H_2O$ | 2360 |
| $N_2T_2$ | $N_2$ | A | 5 | 450 | 60 | 5 | 500 | 60 | 5 | 1000 | 60 | Ar | 2360 |
| $N_2T_3$ | $N_2$ | B | 5 | 640 | 120 | 5 | 500 | 60 | 5 | 1000 | 60 | Ar | 1271 |
| $N_2T_4$ | $N_2$ | B | 20 | 640 | 120 | - | - | - | - | - | - | Ar | 1271 |
| $N_2T_5$ | $N_2$ | B | 20 | 350 | 0 | 5 | 640 | 120 | - | - | - | Ar | 1271 |
| $N_2T_6$ | $N_2$ | B | 5 | 640 | 120 | - | - | - | - | - | - | $CO_2$ | 815 |
| $H_1T_1$ | $H_1$ | E | 10 | 1000 | 0 | - | - | - | - | - | - | Ar | 100 |
| $H_1T_2$ | $H_1$ | E | 10 | 1200 | 10 | - | - | - | - | - | - | Ar | 100 |
| $H_2T_1$ | $H_2$ | B | 20 | 1050 | 120 | - | - | - | - | - | - | Ar | 2000 |
| $H_4T_1$ | $H_4$ | B | 20 | 1050 | 20 | - | - | - | - | - | - | Ar | 2000 |
| $H_5T_1$ | $H_5$ | B | 20 | 1050 | 20 | - | - | - | - | - | - | Ar | 2000 |
| $H_6T_1$ | $H_6$ | D | 5 | 750 | 60 | - | - | - | - | - | - | Air† | N/A† |
| $M_1T_1$ | $M_1$ | E | 50 | 1050 | 1 | - | - | - | - | - | - | Ar | 100 |
| $M_1T_2$ | $M_1$ | B | 20 | 1050 | 240 | - | - | - | - | - | - | Ar | 2360 |

| | | | | | | | | | | | | |
|---|---|---|---|---|---|---|---|---|---|---|---|---|
| M₁T₃ | M₁ | E | 50 | 1200 | 1 | - | - | - | - | - | Ar | 100 |
| M₁T₄ | M₁ | B | 20 | 1200 | 240 | - | - | - | - | - | Ar | 2000 |
| M₃T₁ | M₃ | D | 5 | 580 | 60 | 5 | 1050 | 180 | - | - | Air[‡] | N/A[†] |
| M₃T₂ | M₃ | D | 5 | 580 | 60 | 5 | 900 | 60 | - | - | Air[‡] | N/A[†] |
| M₃T₃ | M₃ | D | 5 | 580 | 810 | 5 | 1050 | 60 | - | - | Air[‡] | N/A[†] |
| M₄T₁ | M₄ | D | 5 | 580 | 60 | 5 | 1050 | 60 | - | - | Air[‡] | N/A[†] |
| M₄T₂ | M₄ | D | 5 | 580 | 60 | 5 | 900 | 60 | - | - | Air[‡] | N/A[†] |
| M₅T₁ | M₅ | D | 5 | 580 | 60 | 5 | 1050 | 180 | - | - | Air[‡] | N/A[†] |
| M₅T₂ | M₅ | D | 5 | 580 | 60 | 5 | 900 | 60 | - | - | Air[‡] | N/A[†] |
| L₂T₁ | L₂ | B | 20 | 640 | 120 | - | - | - | - | - | Ar | 1220 |
| L₃T₁ | L₃ | B | 20 | 640 | 120 | - | - | - | - | - | Ar | 1220 |
| L₃T₂ | L₃ | B | Flash[‡‡] | 540 | 30 | - | - | - | - | - | CO₂ | 815 |
| A₁T₁ | A₁ | B | 20 | 100 | 60 | 20 | 500 | 60 | - | 640 | 180 | Ar | 1271 |
| A₃T₁ | A₃ | B | 20 | 200 | 1 | 5 | 500 | 1 | 20 | 900 | 15 | N₂ | 2408 |
| C₁T₁ | C₁ | D | 5 | 650 | 180 | - | - | - | - | - | Air[‡] | N/A[†] |
| E₁T₁ | E₁ | B | Max[‡] | 580 | N/A[††] | - | - | - | - | - | Ar | 1102 |
| Ca₁T₁ | Ca₁ | C | Max[‡] | 1050 | N/A[††] | - | - | - | - | - | Ar | 1102 |
| Li₁T₁ | Li₁ | C | Max[‡] | 580 | N/A[††] | - | - | - | - | - | Ar | 1271 |

[†] "Max" denotes that the furnace was heated at the maximum power setting.
[‡] "Flash" denotes that the sample was introduced into a preheated furnace.
[‡‡] The procedure was performed in a forced air recirculation oven with no active gas flow.
[††] This segment did not include an isotherm.

FIG. 79B

| Perimorphic Material | Perimorphic Composite Material | Template Material | Furnace Scheme | Primary Replication Stage | | | |
|---|---|---|---|---|---|---|---|
| | | | | Heating rate (°C/min) | Set temp. (°C) | Isotherm duration (min) | Reactive Gas |
| $P_1$ | $M_3T_1P_1$ | $M_3T_1$ | A | Max‡ | 640 | 960 | $C_3H_6$ |
| $P_2$ | $M_3T_1P_2$ | $M_3T_1$ | A | Max‡ | 580 | 2400 | $C_3H_6$ |
| $P_3$ | $M_3T_1P_3$ | $M_3T_1$ | A | Max‡ | 540 | 1950 | $C_3H_6$ |
| $P_4$ | $H_6T_1P_4$ | $H_6T_1$ | B | Max‡ | 580 | 60 | $C_2H_2$ |
| $P_5$ | $M_3T_2P_5$ | $M_3T_2$ | B | Max‡ | 1050 | 150 | $CH_4$ |
| $P_6$ | $N_1T_3P_6$ | $N_1T_3$ | B | N/A††† | 460 | 180 | $C_2H_2$ |
| $P_7$ | $H_6T_1P_7$ | $H_6T_1$ | B | Max‡ | 700 | 30 | $C_3H_6$ |
| $P_8$ | $H_6T_1P_8$ | $H_6T_1$ | B | Max‡ | 700 | 30 | $C_3H_6$ |
| $P_9$ | $H_6T_1P_9$ | $H_6T_1$ | B | Max‡ | 580 | 180 | $C_3H_6$ |
| $P_{10}$ | $H_6T_1P_{10}$ | $H_6T_1$ | B | Max‡ | 580 | 180 | $C_3H_6$ |
| $P_{11}$ | $L_3T_2P_{11}$ | $L_3T_2$ | B | 20 | 540 | 30 | $C_2H_2$ |
| $P_{12}$ | $L_3T_2P_{12}$ | $L_3T_2$ | B | 20 | 540 | 30 | $C_2H_2$ |
| $P_{13}$ | $A_1T_1P_{13}$ | $A_1T_1$ | A | 20 | 580 | 240 | $C_3H_6$ |
| $P_{14}$ | $A_1T_1P_{14}$ | $A_1T_1$ | A | 20 | 580 | 240 | $C_3H_6$ |
| $P_{15}$ | $C_1T_1P_{15}$ | $C_1T_1$ | B | Max‡ | 580 | 180 | $C_3H_6$ |
| $P_{16}$ | $E_1T_1P_{16}$ | $E_1T_1$ | B | N/A††† | 580 | 120 | $C_3H_6$ |
| $P_{17}$ | $Ca_1T_1P_{17}$ | $Ca_1T_1$ | C | N/A††† | 1050 | 15 | $CH_4$ |
| $P_{18}$ | $Li_1T_1P_{18}$ | $Li_1T_1$ | C | N/A††† | 580 | 870 | $C_3H_6$ |
| $P_{19}$ | $M_4T_1P_{19}$ | $M_4T_1$ | B | Max‡ | 640 | 180 | $C_3H_6$ |
| $P_{20}$ | $M_5T_1P_{20}$ | $M_5T_1$ | B | Max‡ | 640 | 180 | $C_3H_6$ |
| $P_{21}$ | $N_2T_1P_{21}$ | $N_2T_1$ | A | 20 | 540 | 8 | $C_2H_2$ |
| $P_{22}$ | $N_2T_6P_{22}$ | $N_2T_6$ | B | 20 | 540 | 4.5 | $C_2H_2$ |
| $P_{23}$ | $M_3T_3P_{23}$ | $M_3T_3$ | A | 20 | 580 | 1800 | $C_3H_6$ |

Notes:

††† The Replication Stage procedure occurred directly upon completion of the Template Stage procedure and at the same temperature. Therefore, the furnace was already at temperature and did not require heating.

‡ "Max" denotes that the furnace was heated at the maximum power setting.

‡‡ "Flash" denotes that the sample was introduced into a preheated furnace.

FIG. 80A

| Procedure - Segment 1 | | | Primary Replication Stage Procedure | | | | |
|---|---|---|---|---|---|---|---|
| Reactive Gas Flow (sccm) | Carrier Gas | Carrier Gas Flow (sccm) | Heating rate (°C/min) | Set temp. (°C) | Isotherm duration (min) | Reactive Gas | Reactive Gas Flow (sccm) |
| 127 | $CO_2$ | 1220 | - | - | - | - | - |
| 127 | $CO_2$ | 1220 | - | - | - | - | - |
| 127 | $CO_2$ | 1220 | - | - | - | - | - |
| 276 | $CO_2$ | 1220 | - | - | - | - | - |
| 27 | Ar | 2000 | Max‡ | 1050 | 90 | $CH_4$ | 54 |
| 42 | Ar | 1271 | - | - | - | - | - |
| 1274 | Ar | 2000 | - | - | - | - | - |
| 1274 | Ar | 2000 | flash | 1050 | 5 | - | - |
| 1274 | Ar | 2000 | - | - | - | - | - |
| 1274 | Ar | 2000 | Max‡ | 1050 | 60 | - | - |
| 812 | $CO_2$ | 815 | - | - | - | - | - |
| 812 | $CO_2$ | 815 | 20 | 1050 | 30 | - | - |
| 127 | $CO_2$ | 1220 | 20 | 580 | 240 | $C_3H_6$ | 127 |
| 127 | $CO_2$ | 1220 | 20 | 580 | 240 | $C_3H_6$ | 127 |
| 127 | $CO_2$ | 1220 | - | - | - | - | - |
| 1147 | Ar | 1102 | - | - | - | - | - |
| 2027 | Ar | 1102 | - | - | - | - | - |
| 208 | Ar | 1271 | - | - | - | - | - |
| 255 | $CO_2$ | 1220 | Max‡ | 1050 | 30 | - | - |
| 255 | $CO_2$ | 1220 | Max‡ | 1050 | 30 | - | - |
| 815 | $CO_2$ | 812 | 20 | 540 | 8 | $C_2H_2$ | 815 |
| 815 | $CO_2$ | 812 | - | - | - | - | - |
| 127 | $CO_2$ | 1220 | Max‡ | 1050 | 30 | - | - |

FIG. 80B

| - Segment 2 | | Annealing Segment | | | | | Secondary Replication Stage Procedure (If Applicable) |
|---|---|---|---|---|---|---|---|
| Carrier Gas | Carrier Gas Flow (sccm) | Heating rate (°C/min) | Set temp. (°C) | Isotherm duration (min) | CR†† Type | CR†† Flow (sscm) | |
| - | - | - | - | - | - | - | N/A |
| - | - | - | - | - | - | - | N/A |
| - | - | - | - | - | - | - | N/A |
| - | - | - | - | - | - | - | N/A |
| Ar | 2000 | - | - | - | - | - | N/A |
| - | - | - | - | - | - | - | N/A |
| - | - | - | - | - | - | - | N/A |
| Ar | 4000 | - | - | - | - | - | N/A |
| - | - | - | - | - | - | - | N/A |
| Ar | 4000 | - | - | - | - | - | N/A |
| - | - | - | - | - | - | - | N/A |
| Ar | 2000 | - | - | - | - | - | N/A |
| CO$_2$ | 127 | - | - | - | - | - | N/A |
| CO$_2$ | 127 | max | 1050 | 30 | Ar | 1271 | N/A |
| - | - | - | - | - | - | - | N/A |
| - | - | - | - | - | - | - | N/A |
| - | - | - | - | - | - | - | N/A |
| - | - | - | - | - | - | - | N/A |
| Ar | 2000 | - | - | - | - | - | N/A |
| Ar | 2000 | - | - | - | - | - | N/A |
| CO$_2$ | 812 | max | 1050 | 30 | Ar | 1271 | N/A |
| - | - | - | - | - | - | - | N/A |
| Ar | 2000 | - | - | - | - | - | N/A |

FIG. 80C

| Perimorphic Material | Replication Stage | | | Yield (%) | Raman laser power (mW) | $I_D/I_G$†† |
|---|---|---|---|---|---|---|
| | CVD Temp. (°C) | Total Growth Time (min) | HC† Type | | | |
| $P_1$ | 640 | 960 | $C_3H_6$ | 18.3% | 5.0 | 0.92 |
| $P_2$ | 580 | 2400 | $C_3H_6$ | 17.1% | 5.0 | 0.86 |
| $P_3$ | 540 | 1950 | $C_3H_6$ | 15.8% | 5.0 | 0.80 |
| $P_4$ | 580 | 60 | $C_2H_2$ | 19.0% | 0.5 | 0.89 |
| $P_5$ | 1050 | 240 | $CH_4$ | 21.6% | 5.0 | 1.29 |
| $P_6$ | 460 | 180 | $C_2H_2$ | 29.9% | 0.5 | 0.80 |
| $P_7$ | 700 | 30 | $C_3H_6$ | 9.7% | 5.0 | 0.88 |
| $P_8$ | 700, 1050‡ | 30, 5‡ | $C_3H_6$ | 9.7% | 5.0 | 0.83 |
| $P_9$ | 580 | 180 | $C_3H_6$ | 7.7% | 5.0 | 0.97 |
| $P_{10}$ | 580, 1050‡ | 180, 60‡ | $C_3H_6$ | 8.4% | 5.0 | 0.99 |
| $P_{11}$ | 540 | 30 | $C_2H_2$ | 28.4% | 0.5 | 0.85 |
| $P_{12}$ | 540, 1050‡ | 30, 30‡ | $C_2H_2$ | 9.2% | 0.5 | 0.99 |
| $P_{13}$ | 580 | 480 | $C_3H_6$ | 19.3% | 5.0 | 0.80 |
| $P_{14}$ | 580, 1050‡ | 480, 30‡ | $C_3H_6$ | - | 5.0 | 0.99 |
| $P_{15}$ | 580 | 180 | $C_3H_6$ | 11.8% | 0.5 | 0.78 |
| $P_{16}$ | 580 | 120 | $C_3H_6$ | 5.7% | 2.0 | 0.88 |
| $P_{17}$ | 1050 | 15 | $CH_4$ | 7.5% | 2.0 | 1.24 |
| $P_{18}$ | 580 | 870 | $C_3H_6$ | 1.9% | 0.5 | 0.80 |
| $P_{19}$ | 640, 1050‡ | 180 | $C_3H_6$ | 8.0% | 2.0 | 0.96 |
| $P_{20}$ | 640, 1050‡ | 180 | $C_3H_6$ | 3.8% | 0.5 | 0.94 |
| $P_{21}$ | 540, 1050‡ | 16 | $C_2H_2$ | 1.9% | 0.5 | 0.99 |
| $P_{22}$ | 540 | 4.5 | $C_2H_2$ | 9.8% | 2.0 | 0.93 |
| $P_{23}$ | 580, 1050‡ | 1800 | $C_3H_6$ | 14.4% | 5.0 | 1.01 |

Notes:
† Hydrocarbon gas
†† $I_D/I_G$ is a Raman metric indicating a ratio of $I_D$ to $I_G$ peak height
††† $I_{Tr}/I_G$ is a Raman metric indicating a ratio of $I_{Tr}$ to $I_G$ peak height
\* Raman peak position of the D and G bands
\*\* Defined as the spread between the G Peak position and the D Peak position

FIG. 81A

| $I_{Tr}/I_G$††† | G Peak Position* (cm⁻¹) | D Peak Position* (cm⁻¹) | Interpeak Interval** (cm⁻¹) |
|---|---|---|---|
| 0.46 | 1592.0 | 1337.4 | 254.6 |
| 0.43 | 1593.0 | 1330.7 | 262.3 |
| 0.38 | 1596.6 | 1328.6 | 268.0 |
| 0.29 | 1603.3 | 1324.5 | 278.8 |
| 0.17 | 1580.6 | 1337.4 | 243.2 |
| 0.32 | 1601.6 | 1332.7 | 268.9 |
| 0.55 | 1593.6 | 1334.3 | 259.3 |
| 0.64 | 1590.7 | 1350.9 | 239.8 |
| 0.52 | 1592.7 | 1328.5 | 264.2 |
| 0.63 | 1592.7 | 1346.8 | 245.9 |
| 0.25 | 1609.1 | 1331.8 | 277.3 |
| 0.49 | 1603.0 | 1352.8 | 250.2 |
| 0.42 | 1593.6 | 1327.5 | 266.1 |
| 0.58 | 1593.0 | 1349.8 | 243.2 |
| 0.40 | 1605.4 | 1343.3 | 262.1 |
| 0.57 | 1584.3 | 1336.0 | 248.3 |
| 0.45 | 1592.5 | 1340.6 | 251.9 |
| 0.35 | 1602.1 | 1341.0 | 261.2 |
| 0.47 | 1591.3 | 1367.4 | 223.9 |
| 0.64 | 1591.8 | 1360.0 | 231.8 |
| 0.57 | 1598.3 | 1353.6 | 244.7 |
| 0.53 | 1597.8 | 1324.9 | 272.9 |
| 0.54 | 1589.5 | 1347.0 | 242.5 |

‡ The Replication Stage procedures utilized to make these exemplary perimorphic materials involved a growth segment and an annealing segment hence there are two temperatures and times associated with these perimorphic materials.

FIG. 81B

SCALABLE SYNTHESIS OF PERIMORPHIC CARBONS

CROSS-REFERENCE TO RELATED APPLICATIONS

This application claims priority to U.S. Provisional Patent Application No. 63/075,918 entitled "SCALABLE SYNTHESIS OF PERIMORPHIC CARBONS" and filed on Sep. 9, 2020, the entire contents of which is herein incorporated by reference. The following applications are hereby incorporated by reference in their entirety for all purposes: U.S. Provisional Patent Application 63/075,918 (the '918 application); U.S. Provisional Patent Application 63/121,308 (the '308 application); U.S. Utility application Ser. No. 16/758,580 (the '580 APPLICATION); U.S. Utility application Ser. No. 16/493,473 (the '473 application); PCT/US17/17537 (the '17537 Application); PCT/US21/37435 (the "37435 application); and U.S. Pat. No. 10,717,843 B2 (the '843B2 patent).

FIELD OF DISCLOSURE

This disclosure relates to a method for the scalable production of carbonaceous perimorphic materials. More particularly, this disclosure relates to a low-cost, waste-reducing method for producing carbonaceous perimorphic materials wherein process materials may be recycled.

BACKGROUND

Compared to bulk materials, nanostructured materials may possess superior properties. Three-dimensional, ordered architectures constructed from nanostructured building blocks may facilitate the realization of these superior properties in bulk forms of the materials. These "architected" materials may be produced by synthesizing and arranging nanoscopic or microscopic building blocks into fine assemblies. In particular, porous materials with architected pore structures are appealing due to their low density, high specific surface area, and potential mechanical properties.

There are existing methods for producing three-dimensional, porous assemblies from nanostructured building blocks Making three-dimensional aerogels may involve dispersing nanostructured particles in a liquid matrix. At sufficient concentrations, the nanoparticles may self-assemble into a gel-like network that may become the basis for an aerogel. For example, three-dimensional aerogels constructed from carbon or silica can be formed by lyophilizing a self-assembled hydrogel. However, undirected self-assembly techniques can create disordered architectures with microscopic pores. While these aerogels may possess impressively low densities, their disorder and pore size render them unsuitable for many applications.

Theoretical models point toward the need for porous architectures with controllable compactness and order. Buehler's group, for instance, imposed a high level of compactness—i.e. pore size reduction—when modeling the mechanical properties of a theoretical gyroid constructed from continuous monolayer graphene. When the quasi-compartmentalized spaces within the gyroidal architecture were sufficiently small, the framework's predicted mechanical properties were superior in respect to certain steels. This may be attributable to the compactness and order of the architecture.

To impart order, directed synthesis techniques have been used. One way to direct synthesis involves utilizing another structure as a sacrificial template, such that a desired three-dimensional morphology is imparted to the templated structure. Then the template is removed. This approach is essentially geomimetic; natural "incrustation pseudomorphs," also known as "perimorphs," are formed via mineralization around a sacrificial scaffold that is later dissolved. For this reason, we describe templated materials herein as perimorphs, and describe them as perimorphic. In some templating techniques, porous templates are required. The pores are filled and replicated by the perimorphic material; these techniques have been described as "negative replication." In other templating techniques, the perimorphic material does not fill the template's pores, but instead just covers its surfaces, analogous to papier-mâché being applied conformally over a form. These techniques are herein described as "surface replication."

Template-directed deposition techniques, such as chemical vapor deposition ("CVD") can conformally replicate a template's surface. CVD decomposes a vapor-phase reactant at elevated temperatures; for this reason, the template compounds for use in concert with CVD procedures tend to be thermally stable metal oxides. Template-directed CVD is commonly used to synthesize graphenic carbon, which possesses a two-dimensional molecular geometry that lends itself well to fine application. The nucleation of graphenic lattices can be catalyzed by metal oxide surface defects. Subsequent extraction of the templates can leave behind porous frameworks comprising a thin, nanostructured wall. These are herein described as "perimorphic frameworks," or simply as "frameworks."

Compared to other compounds with lesser thermal stability, metal oxides have the drawback of being insoluble or only minimally soluble. For this reason, they are generally reacted with strong acids to form soluble salts that can then be extracted into solution. A notable exception to this is the use of cubic NaCl templates, which have been used in the template-directed CVD synthesis of hollow carbon cubes. The NaCl crystals were easily extracted via dissolution in water. For lower-temperature template-directed methods, such as liquid-phase coatings, a much broader range of template compounds with better solubilities may be employed.

Another important factor in surface replication is whether or not the template is porous. Replicating the surface of a nonporous template results creates a hollow perimorphic framework. Shi has demonstrated cubic frameworks synthesized on nonporous NaCl cube templates. Tian has demonstrated inorganic frameworks with tube-like and cube-like morphologies synthesized on nonporous magnesium carbonate rod-like and cube-like templates. The hollow frameworks created by templating with nonporous templates may be regular in morphology but are typically macroporous and lack compactness. Additionally, nonporous templates of appreciable size have little surface area to replicate, meaning that surface replication techniques produce little perimorphic mass in relation to the template mass consumed.

By contrast, surface replication of a porous template can be used to create perimorphic frameworks that are ordered and more compact than aerogels or frameworks synthesized on nonporous templates. Cui describes a template-directed CVD procedure employing porous magnesium oxide (MgO) templates derived from magnesium carbonate precursor crystals to synthesize mesoporous graphene fibers. Each mesoporous fiber comprised a perimorphic framework with a labyrinthine pore structure inherited from the template's porous architecture of conjoined, nanocrystalline subunits. Workers have generated porous metal oxide templates derived from metal hydroxide or metal carbonate precursors.

The use of surface replication techniques on porous, metal oxide templates currently represents a powerful means of synthesizing three-dimensional, porous architectures constructed from nanostructured building blocks. However, industrial-scale processes employing porous metal oxide templates remain uniquely challenging due to the voluminous inputs and outputs in relation to the product yielded. While product yields associated with these porous templates may be higher than those associated with nonporous, lower surface area templates, they can still be low.

Cui's work on mesoporous graphene fibers affords an example. Even though the porous MgO templates employed possessed a relatively high surface area of 36 $m^2g^{-1}$ and 10-30 nm mesopores—features that should increase the product yield—the MgO consumed was still over 30× more massive than the perimorphic product yielded. The MgO templates were subsequently dissolved in 1 mol/L aqueous hydrochloric acid (HCl), resulting in another 50× increase in mass. Excluding any rinsing, this synthesis process would generate 3 orders of magnitude (OOM) more dilute magnesium chloride ($MgCl_2$) liquid waste than perimorphic product. Even if fuming HCl were used, the aqueous waste stream would remain 2 OOM more massive than the perimorphic product before rinsing, and the concentrated $MgCl_2$ brine waste might then necessitate treatment and further inputs. Also, more intensive rinsing of the perimorphic product would be required, generating more dilute waste.

Rinsing of perimorphic frameworks with high specific porosity can be problematic when producing these materials at industrial scale. To illustrate, we note that even after filtration, the water mass retained within the pores of a perimorphic product like Cui's graphene nanofibers might easily exceed the template mass by 2 OOM. This is due to the high specific porosity of the latter. Assuming a 2 OOM difference, even a 0.1% weight concentration of $MgCl_2$ in the retained water might, upon drying, leave behind a residual $MgCl_2$ mass equivalent to roughly 10% of the perimorphic mass. This impurity level may render the perimorphic product unacceptable for many applications, including the electrochemical applications for which carbon frameworks (produced with high purity at laboratory-scale) have been shown to excel.

Again, it is noted that rinsing and purification problems would be even worse in relation to the perimorphic frameworks produced via surface replication on nonporous templates (given their hollow, typically macroporous interiors). However, they are still problematic for frameworks produced on porous templates, and for these frameworks to be highly industrially useful, they should be producible with reasonable purity levels at industrial scale. To achieve this purity using aqueous rinsing can generate far more rinseate than conventional materials, exacerbating the aforementioned problems of voluminous inputs and outputs.

Some of these challenges might be addressed by recycling the templates and the process liquids employed to extract them from the perimorphic material. This could decrease the inputs and outputs related to template synthesis and removal. Recycling templates involves harvesting the template compound by extracting its ions from the encapsulating perimorphic phase, then reconstituting the template to a desired chemical and morphological specification from the stock of harvested ions. Recycling the process liquids employed means reusing some substantial fraction of the process liquids without requiring energy-intensive distillation.

Recycled templates or template-like materials have been demonstrated. Of particular note, Tian demonstrated the recycling of nonporous, crystalline metal carbonate templates. This procedure involved: (i) liquid-phase application of an inorganic compound to the surface of a magnesium carbonate template; (ii) dissolving the magnesium carbonate templates in carbonic acid to form a dilute, metastable magnesium bicarbonate ($Mg(HCO_3)_2$) solution; and (iii) using an ethanol antisolvent to destabilize the metastable bicarbonate solution and to precipitate new magnesium carbonate crystals. In another work, Tian utilized a similar approach to recycle porous MgO adsorbent materials that were derived from thermally decomposing magnesium carbonate precursor crystals. Similar porous MgO materials constitute a template for the synthesis of perimorphic frameworks. This recycling procedure involved: (i) dissolving a porous MgO material in carbonic acid to form a dilute, metastable $Mg(HCO_3)_2$ solution; (ii) using an ethanol antisolvent to destabilize the bicarbonate solution and precipitate magnesium carbonate crystals; and (iii) thermally decomposing the magnesium carbonate crystals to reconstitute a porous MgO adsorbent material. It was noted in this latter procedure that the ethanol was used to accelerate precipitation and also to control the morphology of the precipitated magnesium carbonate; this was presumably the case in both of Tian's procedures. It was further noted that without the solvent the precipitate was agglomerated and irregular in morphology.

Tien indicated that while the template compound could be recycled without the antisolvent, the template—inclusive of its chemical and morphological specifications—could not be. While the template or template-like materials were ultimately recycled in both of these approaches, using an antisolvent not only requires a large input of solvent, but also generates a dilute solvent waste stream that could not be reused cyclically without distillation. While the template was recycled, the solvent waste generated may be arguably worse than a brine waste. Hence, the problem with liquid waste could be exacerbated by this approach.

SUMMARY

It would be desirable to produce carbonaceous perimorphic materials using an approach that recycled both the template and the process liquids. This approach would reduce the required material inputs and outputs, reducing cost and waste. The templates could be extracted from an encapsulating phase of the carbonaceous perimorphic material and then be reconstituted to a desired chemical and morphological specification. It would be especially desirable to develop a method for recycling metal oxide templates or metal oxide-containing templates (including Group I and II metal oxides such as MgO) without consuming strong acids or solvents. This has not been demonstrated in the prior art.

It would also be desirable to produce carbonaceous perimorphic materials using a method that conserved a substantial fraction of the process liquids utilized in extraction and precipitation. Such a method would reduce the liquids consumed and wasted. It would be especially desirable to conserve process liquids without requiring large-scale distillation of miscible liquids.

It would also be desirable to produce carbonaceous perimorphic materials using a method that avoided the retention of large masses of water inside their porous architectures.

This would eliminate the need for excessive rinsing of the templated carbonaceous products and avoid the generation of large volumes of dilute liquid filtrates. It would also improve the purity of the templated carbonaceous products.

Additionally, it would be desirable to develop carbonaceous perimorphic materials with novel architectural features. This might include novel particle geometries, sizes, and aspect ratios that have not yet been synthesized, as well as rationally designed, tunable pore structures. In particular, it would be desirable to develop carbonaceous perimorphic frameworks with regular, equiaxed particle geometries using a method that incorporated template recycling. It would also be desirable to develop carbonaceous perimorphic frameworks with hierarchical-equiaxed particle geometries using a method that incorporated template recycling.

It would also be desirable to synthesize carbonaceous perimorphic materials like those described in the '308 application, the '580 Application, the '473 Application, the '37435 application, and the '843B2 patent using recycled templates.

The present disclosure demonstrates an industrially scalable method for synthesizing carbonaceous perimorphic materials. The General Method is described according to 4 stages (the Precursor Stage, the Template Stage, the Replication Stage, and the Separation Stage), which incorporate a Template Cycle, wherein a portion of a template material is conserved for reuse, and a Liquid Cycle, wherein a portion of a process liquid is conserved for reuse. While there are many potential variants of the General Method, a notable variant is the Preferred Method, in which magnesium carbonate template precursors are precipitated using solventless precipitation techniques and MgO templates are utilized to make carbon perimorphic frameworks. The Preferred Method also incorporates a Gas Cycle, wherein a portion of a $CO_2$ process gas is conserved for reuse.

The method disclosed herein can be used in conjunction with various industrial separation techniques. Techniques that may be especially useful in separating hydrophobic carbonaceous perimorphic products from stock solutions include froth-flotation and liquid-liquid separations. Therefore, it is anticipated that the method disclosed herein may be augmented to include the use of known industrial separation techniques.

The present disclosure also demonstrates novel perimorphic material architectures and variants of the novel method that may be used to make them. In particular, equiaxed carbonaceous perimorphic frameworks and hierarchical-equiaxed carbonaceous perimorphic frameworks are demonstrated.

It is an object of this invention to improve the scalability and economics of producing carbonaceous perimorphic frameworks by providing a means of recycling template materials and process liquids. It is also an object of this invention to provide a means of minimizing waste-streams generated by template recycling. In particular, it is an object of this invention to provide a scalable means of creating three-dimensional, controllably compact architectures constructed from graphenic carbon.

It is another object of this invention to broaden the repertoire of templated morphologies that can be synthesized and to provide techniques for controlling architectural features. This may allow template materials to be designed rationally based on the requirements of a specific application.

BRIEF DESCRIPTION OF FIGURES

FIG. 27A is an SEM micrograph of $M_3$-type precursor particles. FIG. 27B is an SEM micrograph of Ma-type precursor particles. FIG. 27C is an SEM micrograph of $M_5$-type precursor particles.

FIG. 28 includes optical micrographs of template precursor particles ($N_2$) comprising nesquehonite particles with elongated superstructures. This precursor material was derived from an aqueous $Mg(HCO_3)_2$ stock solution, which was used first to precipitate lansfordite. The lansfordite was then recrystallized into nesquehonite.

FIG. 29 includes optical micrographs of template precursor particles ($N_3$) comprising nesquehonite particles with elongated superstructures. This precursor material was derived from an aqueous $Mg(HCO_3)_2$ stock solution, which was used first to precipitate lansfordite. The lansfordite was then recrystallized into nesquehonite in the presence of a sodium dodecyl sulfate which is a surfactant.

FIG. 30A is a micrograph of nesquehonite particles precipitated without surfactant. FIG. 30B is a micrograph of nesquehonite particles precipitated in the presence of sodium dodecyl sulfate surfactant.

FIG. 35 includes SEM micrographs of porous MgO template particles ($H_1T_2$) made from $H_1$ template precursor particles. The precursors' hierarchical-equiaxed superstructure has been mostly lost due to sintering.

FIG. 42 includes SEM micrographs of porous MgO template particles ($H_6T_1$) made from $H_6$ template precursor particles. The template particles have inherited the precursors' elongated superstructure.

FIG. 51 includes SEM micrographs of carbon perimorphic frameworks made on porous MgO template particles ($L_2T_1$). The frameworks comprise both elongated and thin features due to uncontrolled, localized recrystallization during the Template Stage. The elongated and thin features are indicated by arrows.

FIG. 53A shows the typical superstructure associated with the PC structures.

FIG. 54 includes SEM micrographs of porous MgO template particles ($A_1T_1$) made from $A_1$ template particles. The magnified inset of the right-hand micrograph demonstrates the porous substructure of the shell of the hollow-spherical particles.

FIG. 70 includes SEM micrographs of carbon perimorphic frameworks generated from elongated template particles ($N_2T_8$). These carbon frameworks showed damage and fraying.

FIG. 74A is a section of a table of the samples discussed in this disclosure. The table is arranged to show the progression of the materials through the stages of the General Method. FIG. 74B is another section of the table shown in FIG. 74A.

FIG. 75 is a table of the Raman peak positions derived from the average Raman spectra and the theoretical TGA mass loss for the hydrated magnesium carbonate template precursors.

FIG. 76 is a table summarizing $N_2$ adsorption analysis of the template particles of Na-doped magnesite template precursors. The table shows the template materials, the template precursor materials used to generated the template materials, the molality of the stock solution used to generate the template precursor materials, and the furnace schemes and temperatures used to convert the template precursor materials into template materials. The template materials' Brunauer-Emmett-Teller (BET) surface area, BJH pore volume, template space (%), and template porosity (%) are shown.

FIG. 77 is a table summarizing the $N_2$ adsorption analysis of the template materials generated from $N_2$ template precursor materials with and without the use of $H_2O$ during the heat treatment. The table shows the template materials, the template precursor materials used to generated the template materials, the furnace schemes and temperatures used to convert the template precursor materials into template materials, and the treatment atmospheres. The template materials' BET surface area, BJH pore volume, template space (%), and template porosity (%) are shown.

FIG. 78 is a table summarizing the exemplary Template Stage procedures and materials used to understand peapod formation during thermal decomposition of template precursor particles in Ar and $CO_2$ atmospheres.

FIG. 79A is a section of a table summarizing the Template Stage treatment protocols used to generate all the templates used as templates in the Replication Stage examples. The table lists the template precursor, the furnace scheme, the temperature-time-gas conditions use for each segment. FIG. 79B is another section of the table shown in FIG. 79A.

FIG. 80A is a section of a table summarizing the CVD synthesis protocols used to generate all the PC materials used as the Replication Stage examples. The table lists the templates, the furnace scheme, the temperature-time-gas conditions use for each segment. FIG. 80B is another section of the table shown in FIG. 80A. FIG. 80C is another section of the table shown in FIGS. 80A-80B.

FIG. 81A is a section of a table summarizing the Raman data of the carbon frameworks along with the relevant CVD parameters for all the Replication Stage carbons. The CVD parameters include the temperature-gas type-yield for each Replication Stage carbon. The Raman data includes laser power used along with $I_D/I_G$–$I_{T'}/I_G$ peak intensity ratios, G and D peak positions and G-D peak wavenumber spread. FIG. 81B is another section of the table shown in FIG. 81A.

DETAILED DESCRIPTION

Figure 1:
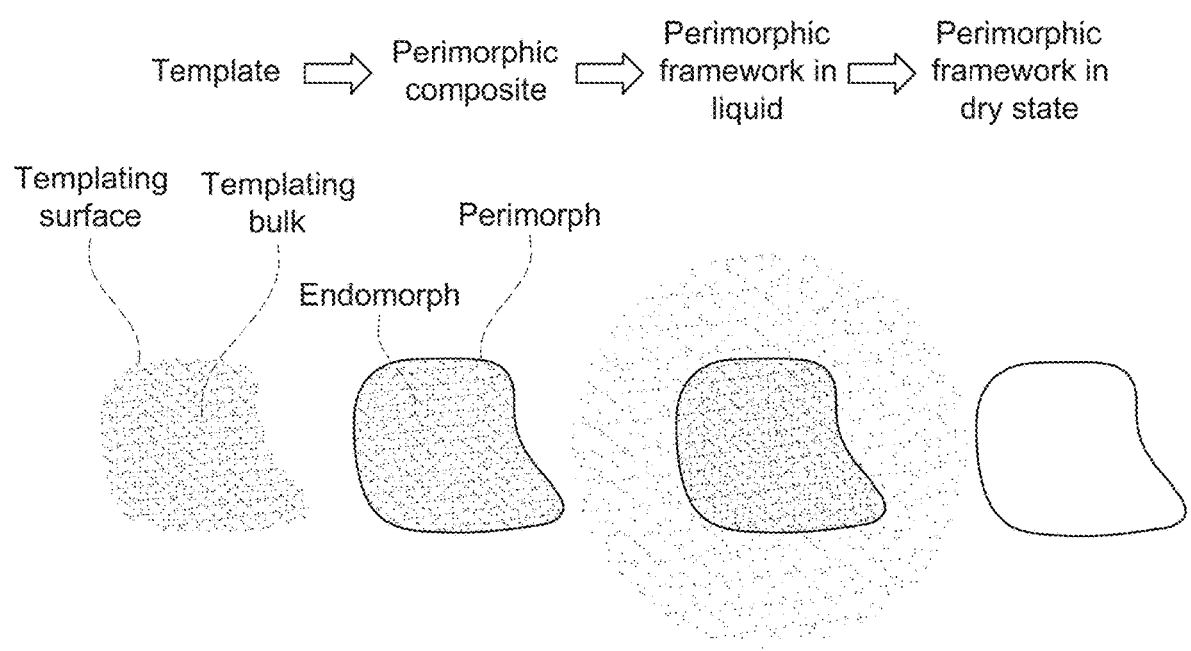
FIG. 1 is a cross-sectional diagram illustrating surface replication and the formation of a perimorphic framework.

The Detailed Description begins with initial section of "Terms and Concepts" that provides language and concepts for describing and understanding the invention. Subsequent sections are organized according to the following four stages of the method: the "Precursor Stage," the "Template Stage," the "Replication Stage," and the "Separation Stage." A number of exemplary procedures and materials pertaining to each of the 4 stages are demonstrated. Many potential variants of each stage might be readily conceived by those knowledgeable in the art and combined to form numerous variants without deviating from the method.

The Detailed Description is organized according to the following sections:
I. Terms and Concepts
II. Description of the General Method and Variants
III. Furnace Schemes, Analytical Techniques and Material Naming
IV. Precursor Stage—Examples
V. Template Stage—Examples
VI. Replication Stage—Examples
VII. Separation Stage—Examples
VIII. Perimorphic Framework Examples

I. Terms and Concepts

A "template," as defined herein, is a potentially sacrificial structure that imparts a desired morphology to another material formed in or on it. Of relevance for surface replication techniques are the template's surface (i.e. the "templating surface"), which is positively replicated, and its bulk phase (i.e. the "templating bulk"), which is negatively replicated. The template may also perform other roles, such as catalyzing the formation of the perimorphic material. A "templated" structure is one that replicates some feature of the template.

A "perimorph" or "perimorphic" material is a material formed in or on a solid-state or "hard" template material.

"Surface replication," as defined herein, comprises a templating technique in which a template's surface is used to direct the formation of a thin, perimorphic wall of adsorbed material, the wall substantially encapsulating and replicating the templating surface upon which it is formed. Subsequently, upon being displaced, the templating bulk is replicated, in negative, by an endocellular space within the perimorphic wall. Surface replication creates a perimorphic framework with a templated pore-and-wall architecture.

A "perimorphic framework" (or "framework"), as defined herein, is the nanostructured perimorph formed during surface replication. A perimorphic framework comprises a nanostructured "perimorphic wall" (or "wall") that may range from less than 1 nm to 100 nm in thickness but is preferably between 0.6 nm and 5 nm. Insomuch as it substantially encapsulates and replicates the templating surface, the perimorphic wall can be described as "conformal." Perimorphic frameworks may be made with diverse architectures, ranging from simple, hollow architectures formed on nonporous templates to labyrinthine architectures formed on porous templates. They may also comprise different chemical compositions. A typical framework may be constructed from carbon and may be referred to as a "carbon perimorphic framework."

An "endomorph," as defined herein, comprises a template as it exists within a substantially encapsulating perimorphic phase. Therefore, after the perimorphic phase has been formed around it, the template may be described as an endomorph, or as "endomorphic."

A "perimorphic composite," or "PC" material, as defined herein, is a composite structure comprising an endomorph and a perimorph. A PC material may be denoted x@y, where x is the perimorphic element or compound and y is the endomorphic element or compound. For example, a PC structure comprising a carbon perimorph on an MgO endomorph might be denoted C@MgO.

The term "positive" is used herein to describe a space that is occupied by a solid mass. The space occupied by the endomorph (i.e. the "endomorphic space") in a perimorphic composite is an example of positive space. A nonporous template comprises only positive space. Exempting the space occupied by its thin wall, a perimorphic framework comprises no positive space.

The term "negative" is used herein to describe a space that is unoccupied by a solid or liquid mass. A negative space may be empty, gas-filled, or liquid-filled. The pores inside an unimpregnated, porous template comprise negative space. A porous template comprises both positive and negative space. Exempting the space occupied by its thin wall, a perimorphic framework comprises only negative space.

The term "cellular" is used herein to describe the pore-and-wall morphology associated with perimorphic frameworks. A "cell" or "cellular subunit" comprises a specified endocellular pore and region of the perimorphic wall around the pore.

The term "endocellular" is used herein to describe a negative space in a perimorphic framework that is formed by the displacement of the endomorph from the perimorphic composite. Like the endomorph whence it derives, the endocellular space is substantially encapsulated by the perimorphic wall.

The term "exocellular" is used herein to describe a negative space in a perimorphic framework that is inherited from the pore space of the perimorphic composite, which is in turn inherited from the pore space of a porous template. We note that an exocellular space, despite the "exo-" prefix, may be located substantially inside a perimorphic framework.

A perimorphic framework's endocellular and exocellular spaces are substantially separated by the perimorphic wall. However, the ability to displace the endomorph from the template composite implies that the wall is somewhere open or an incomplete barrier, since a perfectly encapsulated endomorph could not be displaced. Therefore, while a perimorph is herein described as substantially encapsulating a templating surface, the encapsulation may nevertheless be incomplete or subject to breach.

The term "native" is used herein to describe the morphological state of a perimorphic structure in the perimorphic composite. A "native" feature comprises a feature that is substantially in its native state, and we may refer to a structure as "natively" possessing some feature (e.g. a perimorphic wall that is natively 1 nm thick). After displacement of the endomorph from the perimorphic composite, the perimorph may either substantially retain its native characteristics, or it may be altered.

The term "non-native" is used herein to describe a morphological state of a perimorphic structure that is substantially altered from its native morphological state (i.e. its original state in the perimorphic composite). This alteration may occur at the substructural or superstructural levels. For example, during evaporative drying of an internal liquid, a perimorphic wall may be pulled inward by the liquid, collapsing a portion of the endocellular space. A framework's deformation into a non-native, collapsed morphology may be reversible—i.e. the framework may be able to substantially recover its native morphology.

The term "labyrinth" or "labyrinthine" is used herein to describe a network of interconnected pores in a template or a perimorphic framework. A labyrinth may be endocellular or exocellular. A perimorphic framework formed on a porous template may natively comprise endocellular and exocellular labyrinths; therefore, a framework formed on porous templates may be described as a "labyrinthine framework." The endocellular and exocellular labyrinths of a labyrinthine framework, while not overlapping, may be interwoven. Labyrinthine frameworks comprise a preferred class of perimorphic frameworks.

A "template precursor," or "precursor," as defined herein, is a material from which a template is derived via some treatment that may comprise decomposition, grain growth, and sintering. A template may retain a pseudomorphic resemblance to the template precursor; therefore, engineering the precursor may offer a way to engineer the template. The precursor is formed within a process liquid and is derived from a stock solution.

The term "superstructure" is herein defined as the overall size and geometry of a porous template or perimorphic framework. A perimorphic framework's superstructure may be inherited from the morphology of the template precursor. The superstructure of a perimorphic framework is important because the overall size and geometry of a framework will influence its properties, including how it interacts with other particles. Some superstructures may facilitate the drying of a wet paste of perimorphic frameworks into a fine powder, whereas other superstructures may cause a wet paste to dry into macroscopic granules, which may require subsequent grinding. Superstructures may comprise the following shapes:

"Equiaxed," herein defined as a shape that is similar in size (less than 5× difference in size) along its major axis, intermediate axis, and minor axis.

"Elongated," herein defined as a shape that is significantly larger (5× up to 50×) in size along its major axis than along its intermediate and minor axes.

"Thin," herein defined as a shape that is more than 5× larger along its major axis and intermediate axis than it is along its minor axis.

"Hierarchical," herein defined as an equiaxed or elongated shape with thin features.

The term "substructure" is herein defined as the localized morphology—i.e. the internal architecture—of a porous template or perimorphic framework. Certain porous templates or perimorphic frameworks have a substructure comprising repeating, conjoined substructural units, or "subunits." Different substructures may be characterized by subunits of different shapes, sizes, and spacings from one another.

The term "noncellular" is used herein to describe a negative space inside that is not considered herein to be templated, nor to be part of a perimorphic framework, but that is nevertheless substantially surrounded by and located within a framework. Noncellular space is not templated space because it does not correspond strictly to a template's positive space, negative space, or surface, and it is only present when surface replication is not able to occur on some portion—typically an inaccessible interior region—of a templating surface.

Noncellular space may be desirable for density reduction in certain applications and may be engineered using a combination of rational template engineering and diffusion-limited synthesis techniques. In particular, large template precursors may be used to create large templates, which with minimal sintering may combine long diffusion pathways with small pores. Rational design of the surface replication parameters may also help. For instance, during CVD, low concentrations of the carbonaceous vapor may be more easily scavenged by reactive sites and prevented from penetrating throughout the porous substructure of the porous template.

Another way density reduction can be achieved is via the use of porous template precursor materials. This results in an exocellular internal porosity that is preferable to noncellular space because it is more engineerable and does not require diffusion constraints. Porous template precursors may be made with the use of blowants (e.g. hollow microspheres produced during spray-drying) or via the use of sacrificial materials when making the template precursors (e.g. synthesizing the template precursor around sacrificial micelles or polymers).

The concept of "compactness" herein relates to the area of perimorphic wall contained within a given volume of a perimorphic framework—i.e. a volumetric surface area. A framework with a more compact substructure will possess a finer, denser arrangement of perimorphic wall within a given volume, whereas a framework with a less compact substructure will possess a coarser, more spatially diffuse arrangement of perimorphic wall within a given volume. Porous templates, and the labyrinthine frameworks formed on them, may be engineered to have different levels of compactness. Compactness comprises a measure of a framework's mesoscale crosslinking—i.e. crosslinking not at the molecular scale, but at a higher scale, where crosslinking is derived from the topology of the templating surface.

A perimorphic framework's compactness and pore phases may be modulated by engineering the template's positive and negative spaces. For example, a porous MgO structure produced by decomposing a magnesium carbonate precursor has a positive space comprising a network of conjoined, MgO crystallites. Its negative space comprises a porous network running between the MgO crystallites and throughout the structure. It is well-known that the crystallites may grow at elevated temperatures, coarsening the grain structure. The same process may also lead to growth and coarsening of the pores. This coarsening of the positive and negative spaces will reduce the porous MgO template's surface area, and therefore reduce the compactness of a perimorphic framework formed on the template. At the same time that the template is coarsening, it will be densifying, and its densification will reduce the amount of exocellular space in a perimorphic framework formed on the template.

The coarseness of a template may be important for many reasons. For example, enlarging a template's pores and reducing its surface area may permit faster, deeper diffusion of a reactive vapor throughout the template's pores during CVD. The perimorphic walls synthesized in such processes may be more uniform in thickness if adequate diffusion kinetics can be achieved.

A perimorphic framework's compactness and pore phases may also be modulated by selecting different template precursors. Different precursors will have different fractions of labile mass. A template's negative space will depend on how much of the template precursor's starting mass is lost during its decomposition. Calcining template precursors that contain large fractions of labile species—for instance, highly hydrated salts—may result in porous templates with high specific porosity that are more open to diffusive flows during CVD. Such templates may also be desired if more exocellular space is desired in the perimorphic framework.

The term "recycled" is used herein to describe process materials being utilized in a given step of the production process that have previously been utilized for that step. Since practical losses of process materials (e.g. process liquid losses from evaporation or filtration) during production of a perimorphic product may occur, virgin process materials may be used to replenish these losses, and a "recycled" process material may partially comprise virgin material.

"Process materials," as defined herein, comprise potentially recyclable non-perimorphic materials utilized to generate perimorphic materials. Process materials may comprise process liquids, process gases, extractants, template precursor materials, and template materials.

A "stock solution," as defined herein, comprises solvated cations and anions and a process liquid, the solvated ions being hosted by the process liquid (which may be referred to in this context as the "host"). A stock solution is formed in the Separation Stage. A precursor is derived from a stock solution through one or more precipitation, dissolution, or decomposition reactions.

A "process liquid," as defined herein, is a feedstock of either liquid water ("process water") or solvent ("process solvent") utilized in the Precursor Stage and the Separation Stage. The process liquid may play a number of different roles in these stages. In the Precursor Stage, the formation of a template precursor is hosted by the process liquid, and the precursor may incorporate the process liquid into its crystal—for instance, a hydrous salt may be formed in process water and incorporate some of the process water into its crystal structure. In the Separation Stage, an extractant is hosted by the process liquid, and the solvated ions produced by reactions between the template, process liquid, and extractant are hosted by the process liquid. The process liquid may be involved in the production of the extractant and may itself react with the template during the Separation Stage.

A "residual liquid," as defined herein, is a portion of process liquid, which may or may not host solvated ions, that remains unseparated from a solid (e.g. a precursor or a perimorphic product) upon separation of the solid from the main portion of the process liquid. Residual liquid may be contained within a perimorphic product or wetted to its surface. Residual liquid may comprise a very small fraction of the overall process liquid. A solid's retention of residual liquid may require further separation if a dry solid is desired.

An "extractant," as defined herein, comprises an acid hosted by a process liquid, the two phases together comprising an "extractant solution." The extractant may be present in the extractant solution in very dilute concentrations. In some cases, the extractant may be produced from (and within) the process liquid. For example, a carbonic acid ($H_2CO_3$) extractant may be produced from (and within) a process water, according to the reaction $H_2O_{(l)} + CO_{2(aq)} \rightarrow H_2CO_{3(aq)}$.

"Endomorphic extraction," as defined herein, comprises the selective removal of a portion of an endomorph from a perimorphic composite. Endomorphic extraction comprises a reaction between an endomorph and an extractant solution that produces solvated ions that are exfiltrated from the surrounding perimorph, resulting in concurrent displacement of the endomorph, consumption of the extractant from the extractant solution, and generation of a stock solution. Generally, the removal of substantially all of an endomorph's mass is desired. Occasionally, the partial removal of an endomorph's mass may be desired, or only partial removal of an endomorph's mass may be achievable.

"Perimorphic separation," as defined herein, comprises the separation of a perimorphic product after endomorphic extraction from non-perimorphic, conserved process materials. Conserved, non-perimorphic phases may comprise process liquid, stock solution, and precipitates of the stock solution. Perimorphic separation may comprise many different industrial separation techniques, (e.g. filtration, centrifugation, froth flotation, solvent-based separations, etc.).

A "solventless precipitation," as defined herein, comprises the precipitation of a template precursor in the Precursor Stage, wherein the precipitation is substantially driven by a solution destabilization mechanism that does not require the introduction of a miscible antisolvent into the process liquid. As a first example of a solventless precipitation technique, a stock solution may be spray-dried. As a second example of a solventless precipitation technique, a metastable metal bicarbonate stock solution may be depressurized to reduce $CO_2$ solubility, causing $CO_2$ gas to be released and a metal carbonate to be precipitated. We note that the term "solventless precipitation" does not imply the absolute absence of a miscible liquid or solvent during precipitation, but rather indicates that precipitation is not principally driven by mixing a miscible liquid into the stock solution. One scenario that could be envisioned is a miscible liquid mixed with the process liquid that remains at substantially the same concentration throughout the Liquid Cycle.

"Shuttling," as defined herein, comprises an endomorphic extraction technique that may be used during the Separation Stage, wherein, concurrently: (i) an extractant is generated via reaction of a process gas with a process liquid; (ii) an endomorph is reacted with the extractant solution; (iii) the extractant is consumed; (iv) the solvated ions in the stock solution are exfiltrated from a perimorph, and (v) precipitate is formed from the stock solution outside of the perimorph. For example, shuttling may comprise, concurrently: (i) forming $H_2CO_3$ extractant dissolving $CO_2$ into process water, (ii) reacting an MgO endomorph with the $H_2CO_3$ extractant solution; (iii) consuming $H_2CO_3$; (iv) forming $Mg^{2+}$ and $(HCO_3)^-$ ions that are exfiltrated from a perimorph, and (v) precipitating magnesium carbonate in the surrounding process water.

"$MgCO_3 \cdot xH_2O$" is herein used to describe a magnesium carbonate. It may comprise any hydrous or anhydrous magnesium carbonate, as well as basic magnesium carbonates such as hydromagnesite.

A "Template Cycle," as defined herein, comprises a cyclical loop in which a template is constituted, utilized, and reconstituted.

A "Liquid Cycle," as defined herein, comprises a cyclical loop in which a process liquid is utilized for liquid-phase extraction of the endomorph and liquid-phase formation of the precursor.

A "Gas Cycle," as defined herein, comprises a cyclical loop in which a process gas is dissolved into a process liquid to create an extractant solution, then subsequently released and recaptured. The release may be associated with the formation of either a template precursor or a template.

The "yield" of a perimorphic material, or of a procedure used to make the perimorphic material, is defined herein as the perimorphic mass divided by the sum of the endomorphic and perimorphic masses. The yield can be used to understand how much template material is required to create a given amount of perimorphic material.

FIG. 1 is a cross-sectional diagram that illustrates surface replication. The first structure in the sequence represents a simple, nonporous template, comprising a templating bulk and templating surface. The second structure in the sequence represents a PC structure comprising an endomorph and perimorph. This composite is formed by application of a conformal perimorphic wall on the templating surface. The third structure in the sequence comprises a perimorphic framework in a liquid. This represents the framework after displacement of the endomorph via liquid-phase extraction. The fourth structure in the sequence represents the framework in its native state after drying. The perimorphic framework's wall substantially replicates the templating surface and its pore substantially replicates the templating bulk.

Figure 2:
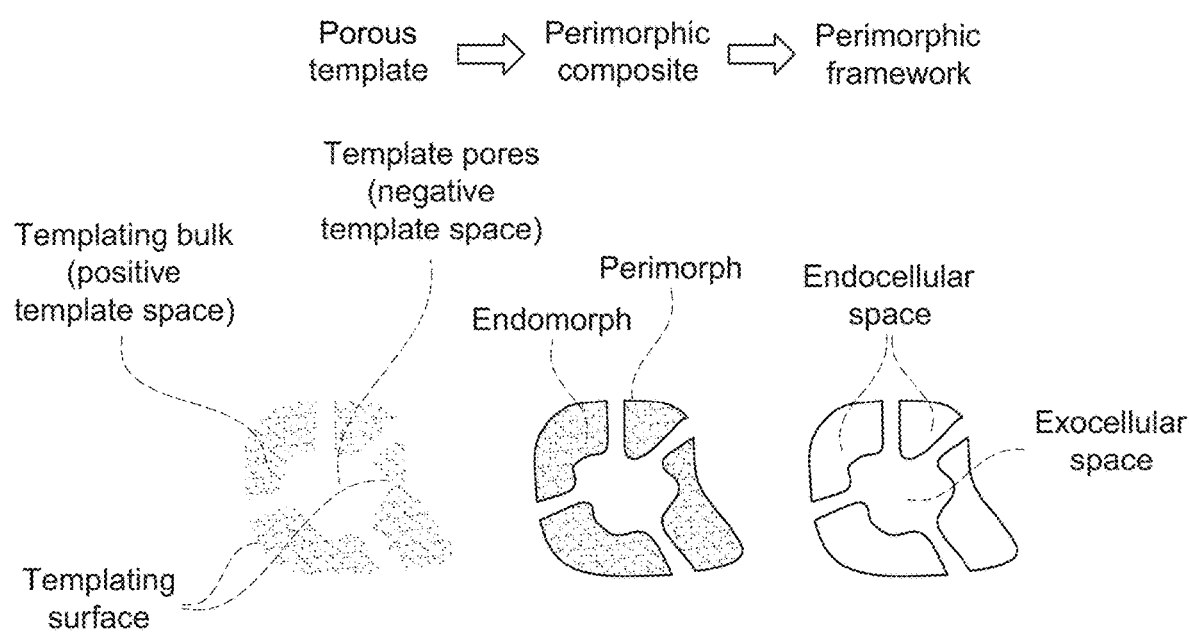
FIG. 2 is a cross-sectional diagram illustrating the formation of a perimorphic framework using a porous template.

FIG. 2 is a cross-sectional diagram that illustrates the formation of a perimorphic framework using a porous template. The first structure in the sequence represents a template with several pores leading to a central pore. The entire pore space is unoccupied by a solid or liquid mass and comprises a negative space. The second structure in the sequence represents a PC structure comprising an endomorph and perimorph. This composite is formed by application of a conformal perimorph on the templating surface. The PC structure comprises a positive space associated with the endomorph and a negative space associated with the pores of the porous template. The third structure in the sequence represents a perimorphic framework formed by displacement of the endomorph. The framework comprises a negative, endocellular space, corresponding to the PC structure's endomorph, and a negative, exocellular space, corresponding to the PC structure's pores. The endocellular and exocellular spaces are both located inside the perimorphic framework.

Figure 3:
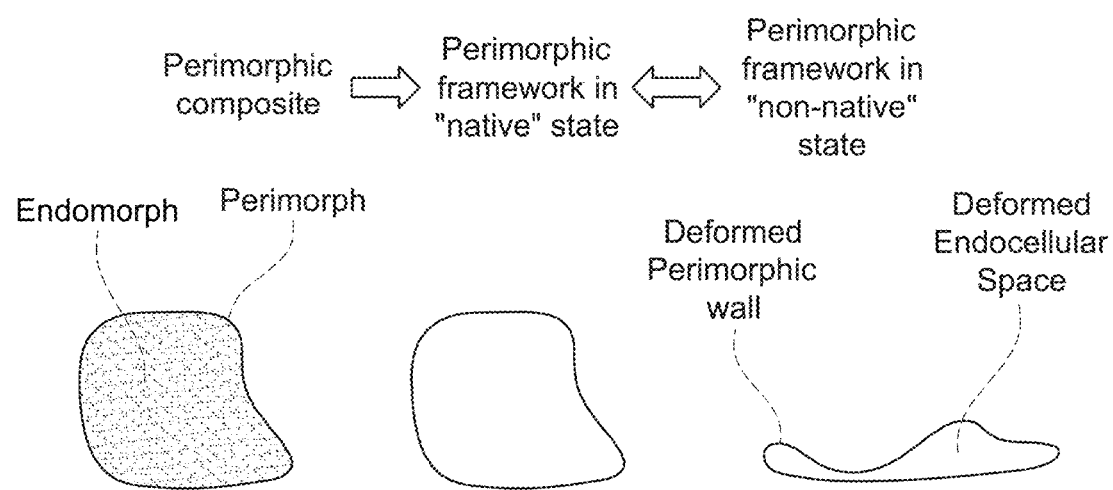
FIG. 3 is a cross-sectional diagram illustrating the difference between a perimorphic framework in native and non-native morphological states.

FIG. 3 is a cross-sectional diagram that illustrates the difference between a perimorphic framework in native and non-native morphological states. The first structure in the sequence represents a PC structure comprising an endomorph and perimorph. The morphology of the perimorph in the PC structure represents its native morphology. The second structure in the sequence represents a perimorphic framework formed by displacement of the endomorph. Its morphology is substantially unaltered from its original morphology in the PC structure, and therefore it is in its native state. The third structure in the sequence represents a perimorphic framework that has been deformed and collapsed. In this non-native state, the wall no longer represents a replica of the templating surface, nor does the endocellular space represent a negative replica of the endomorph. If elastically deformed, the framework might be reversibly deformed back into its native morphology.

Figure 4A:
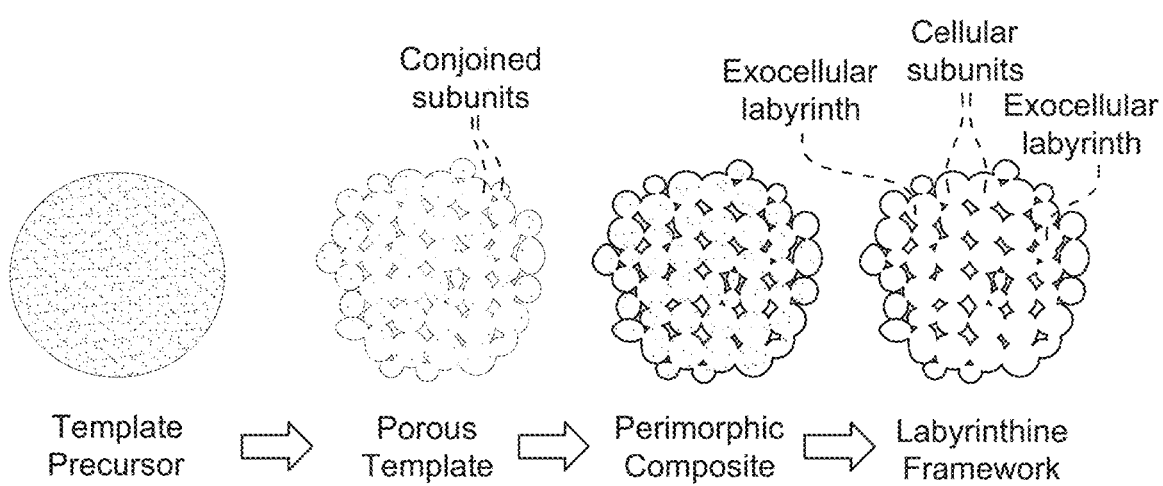
FIG. 4A is a cross-sectional diagram illustrating the synthesis of a labyrinthine framework.

FIG. 4A is a cross-sectional diagram that illustrates the synthesis of a labyrinthine framework. From left to right, the first structure in the sequence represents a template precursor. The second structure represents a porous template. The porous template comprises a labyrinth of connected template pores (although their connectedness is not represented in cross-section). The surface of this porous structure directs the formation of the perimorph. The third structure in the sequence represents a PC structure comprising an endomorph and perimorph. The labyrinth of template pores in the template is inherited by the PC structure. The fourth structure in the sequence represents a labyrinthine framework formed by displacement of the endomorph. The framework natively comprises an endocellular labyrinth, mirroring the template's positive space, as well as an exocellular labyrinth, mirroring its negative space. The endocellular and exocellular labyrinths, while not overlapping, are interwoven throughout the framework's volume.

Figure 4B:
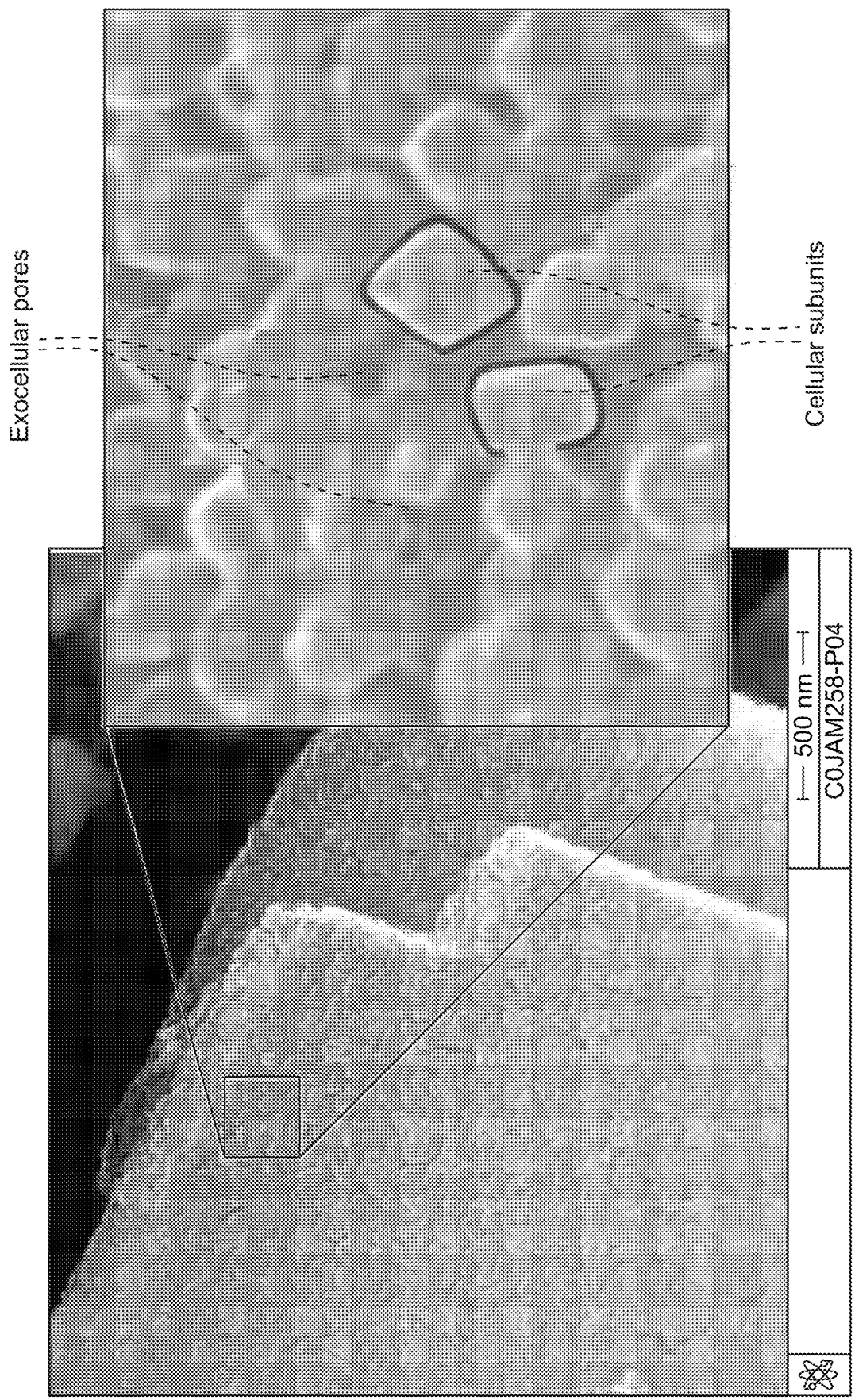
FIG. 4B is an SEM micrograph of a labyrinthine framework.

FIG. 4B is an SEM micrograph of a labyrinthine carbon framework synthesized on a porous MgO template. The endomorph has been displaced and the framework has retained its native morphology. From the main image, we can discern that the framework comprises a rhombohedral superstructure. This superstructure is inherited from a rhombohedral magnesite precursor. From the magnified inset, we can discern the cellular substructure of conjoined cellular subunits. Two such subunits are outlined and labeled in the magnified inset. Each cellular subunit comprises an endocellular pore and an encapsulating portion of the perimorphic wall. We can also discern exocellular pores in the magnified inset, and two such pores are labeled. Exocellular labyrinths traverse the interior of the framework, interwoven with the endocellular labyrinth.

Figure 5A:
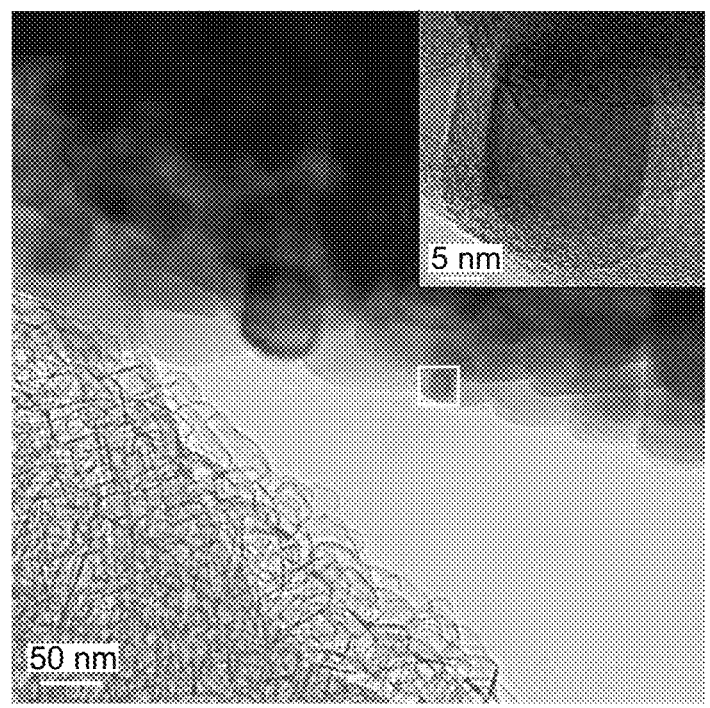
FIG. 5A is a TEM micrograph of (at the top) a PC particle, comprising a layered carbonaceous perimorphic phase and an MgO endomorphic phase, and (at the bottom) the perimorphic framework after endomorphic extraction.
Figure 5B:
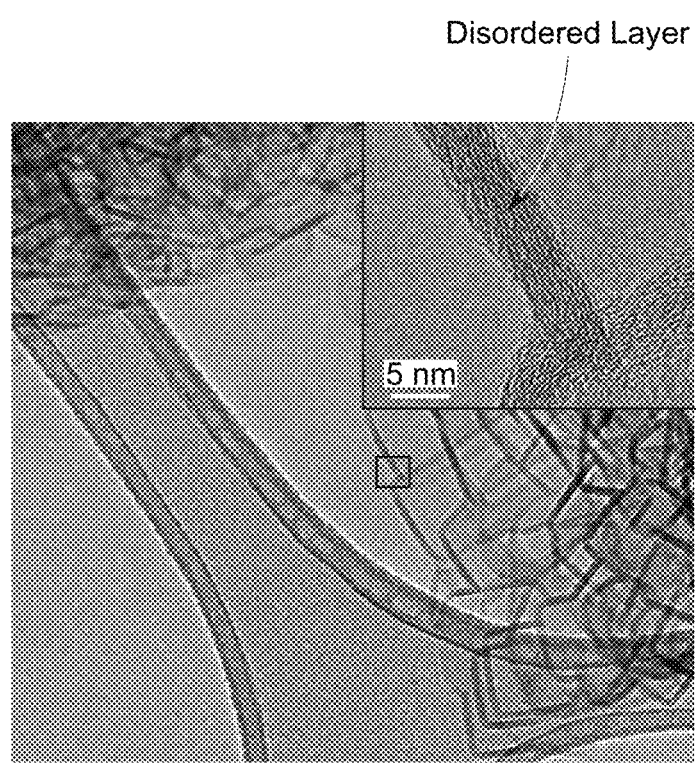
FIG. 5B is a HRTEM micrograph showing the disordered, nematically aligned graphenic layers of a synthetic anthracitic network comprising a section of the perimorphic wall.

FIG. 5A is a TEM micrograph of (at the top) a PC particle, comprising a graphenic perimorphic phase and an MgO endomorphic phase, and (at the bottom) a graphenic perimorphic framework after endomorphic extraction. FIG. 5B is a HRTEM micrograph showing the disordered, nematically aligned graphenic layers comprising a section of the perimorphic wall.

Figure 6:
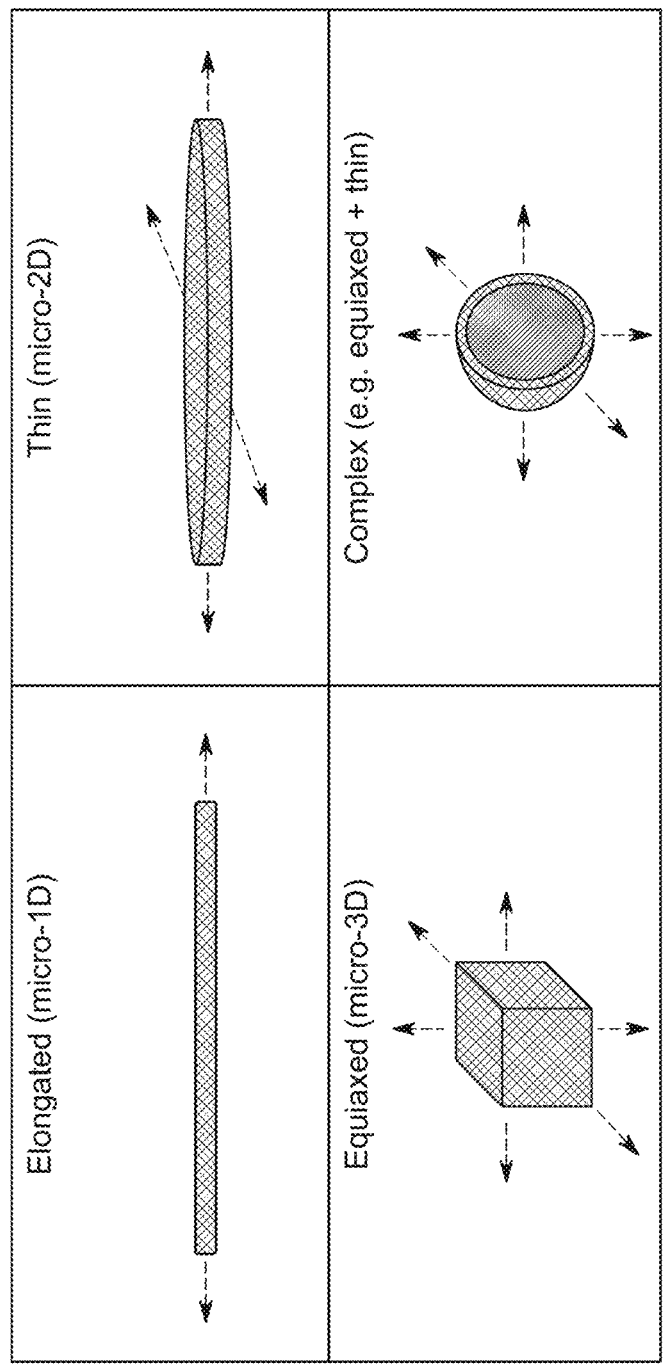
FIG. 6 is a cross-sectional diagram illustrating different types of superstructural shapes that may be formed. The crosshatching represents the cellular substructure at a smaller scale.

FIG. 6 is a cross-sectional diagram that illustrates the four categories of superstructural shapes: elongated, thin, equiaxed, and hierarchical-equiaxed. The crosshatching represents the smaller-scale cellular substructure present throughout the superstructure. The exemplary "hierarchical-equiaxed" superstructure shown in FIG. 6 is a hollow sphere with a thin shell.

Figure 7A:
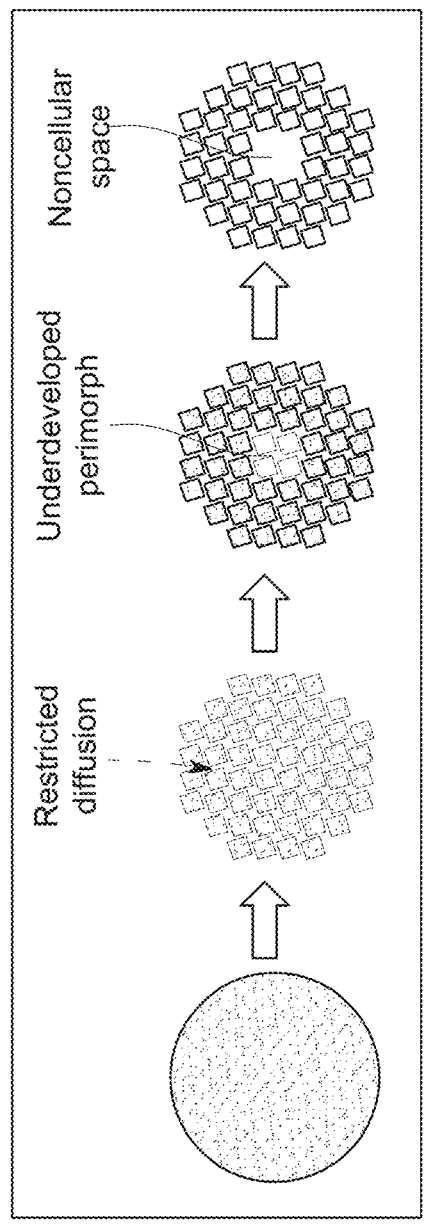
FIG. 7A is a cross-sectional diagram illustrating the formation of a labyrinthine framework under restricted and unrestricted diffusion conditions.
Figure 7B:
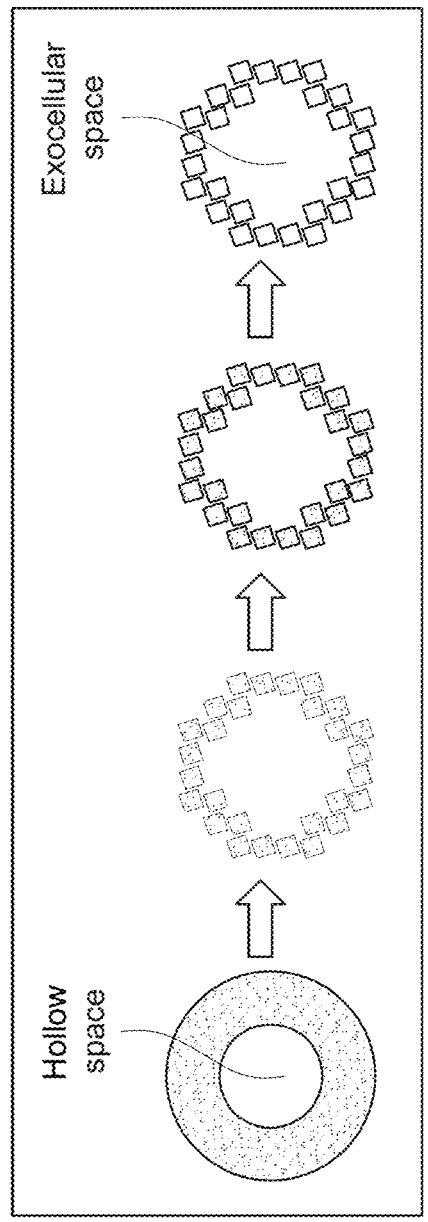
FIG. 7B is a cross-sectional diagram illustrating the creation of a density-reducing exocellular space within a perimorphic framework via a porous template precursor material having an internal cavity.
Figure 7C:
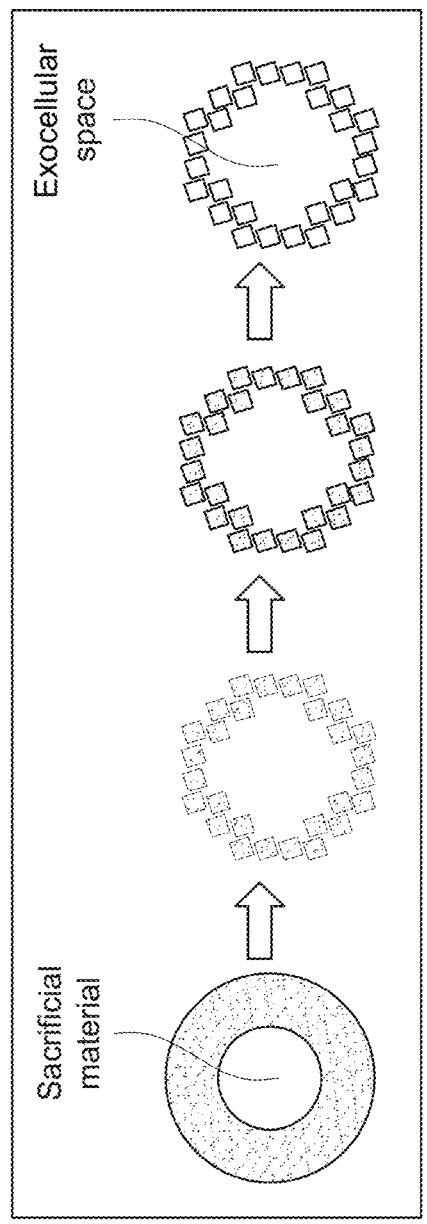
FIG. 7C is a cross-sectional diagram illustrating the creation of a density-reducing exocellular space within a perimorphic framework via a porous template precursor material formed around a sacrificial material that is subsequently removed.

FIGS. 7A-7C illustrate how density reduction of a perimorphic framework can be achieved via hierarchical pore engineering. This is a cross-sectional representation, so the template subunits, while appearing disconnected, are connected. FIG. 7A illustrates the creation of a density-reducing noncellular space within a perimorphic framework via a diffusion-limited surface replication procedure. In this case, the template precursor can be nonporous. Diffusion limitations may prevent the uniform distribution of an adsorbate material throughout the porous substructure. This may favor the creation of a perimorphic wall with some gradient of thickness and completeness, and in some instances, this may even result in a hollow, noncellular space inside the perimorphic framework, as illustrated in FIG. 7A. FIG. 7B illustrates the creation of a density-reducing exocellular space within a perimorphic framework via a porous template precursor material created around a trapped region of gas. This may occur due to the effects of an internal blowant or due to formation around a bubble. FIG. 7C illustrates the creation of a density-reducing exocellular space within a perimorphic framework via a porous template precursor material created around a sacrificial material that is subsequently removed.

Figure 8:
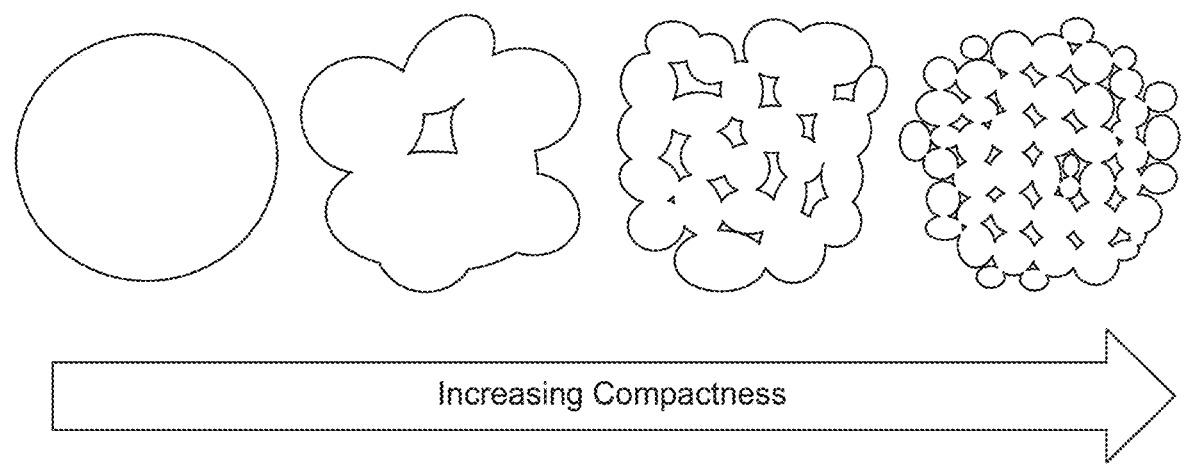
FIG. 8 is a cross-sectional diagram that depicts four perimorphic frameworks with similar overall volumes but varying compactness.

FIG. 8 is a cross-sectional diagram that illustrates three labyrinthine frameworks with different substructures. The substructure represented on the left of the diagram is the least compact of the three. Its volume is similar to the volume of the others, but it contains less perimorphic area within this volume. The substructure represented in the center of the diagram is somewhat more compact than the left-hand substructure, because its volume contains more perimorphic area. The substructure represented on the right of the diagram is the most compact—its volume, though similar to the volume of the other two substructures, contains the most perimorphic area. This diagram demonstrates that a perimorphic framework's compactness is imparted by the volume-specific surface area of the porous template—i.e. the total amount of internal and external surface area per unit of template volume, where the template volume includes the template's positive and negative spaces.

Figure 9:
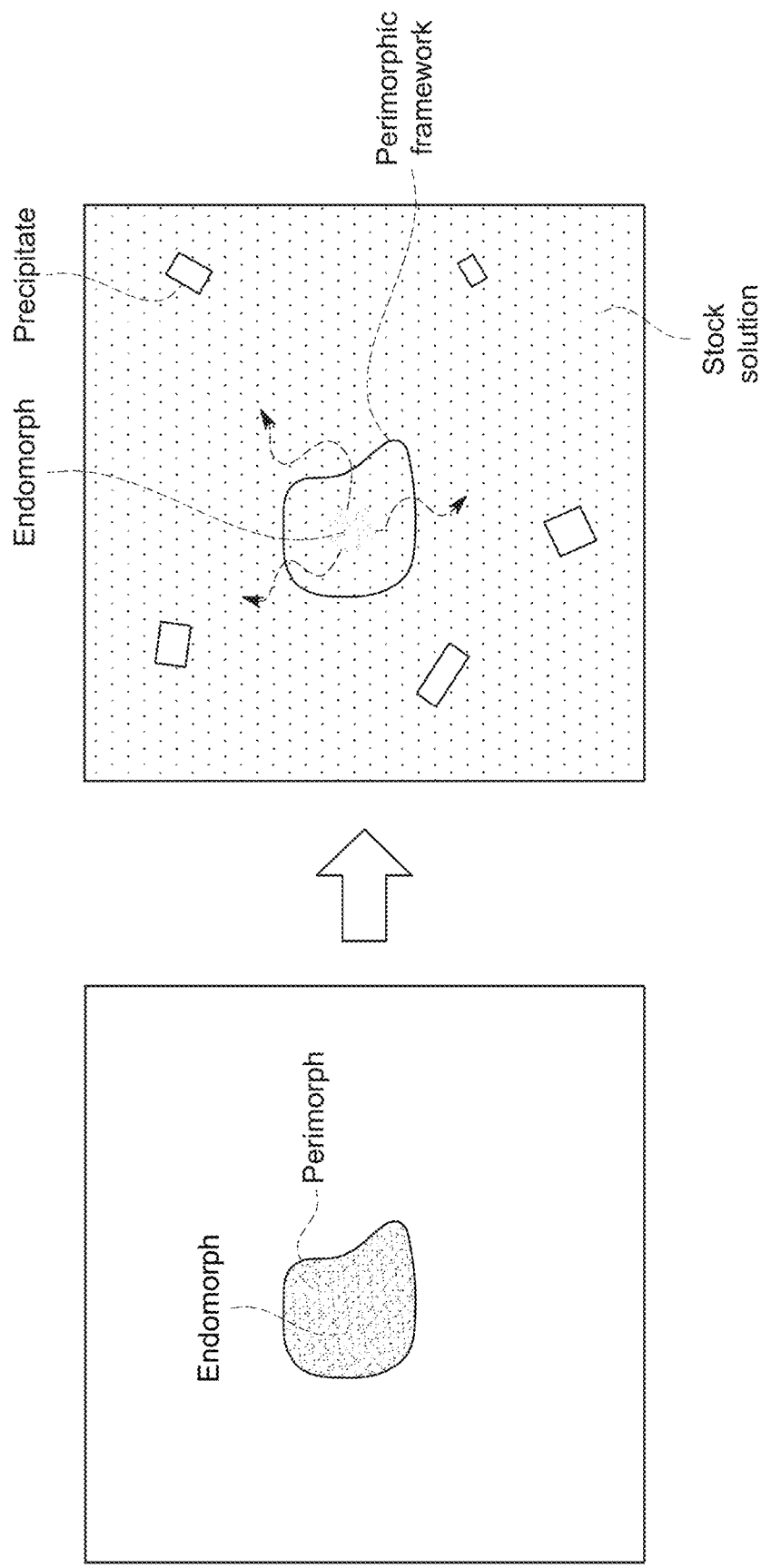
FIG. 9 is an illustration of a shuttling technique, wherein dissolution of an endomorph, generation of a stock solution, and precipitation from the stock solution outside of the perimorphic framework are shown to be happening concurrently.

FIG. 9 is a cross-sectional diagram that illustrates shuttling. The first frame in the sequence represents a PC material immersed in an extractant solution. The second frame in the sequence represents a perimorphic framework containing an incompletely extracted endomorph. The endomorph's reaction with the extractant solution is ongoing in this second frame. The solvated ions formed from this reaction are being diffusively exfiltrated from the perimorphic framework, as indicated by the arrows, and are being precipitated in the surrounding process liquid. In other cords, the endomorphic mass is being "shuttled" out of the perimorph in the form of solvated ions, a portion of which are then re-precipitated outside the framework. We note that the precipitate and the endomorph may not comprise the same compound.

II. Description of the General Method and Variants

The "General Method" is the most basic form of the method. It comprises a method for synthesizing a perimorphic product wherein substantial portions of the template material and the process liquid are conserved and may be reused. As such, the General Method may be performed cyclically. All variants of the method disclosed in the present disclosure comprise some variant of the General Method.

The General Method comprises a series of steps that is herein presented, for ease of description, in 4 stages (i.e. the Precursor Stage, Template Stage, Replication Stage, and Separation Stage). Each stage is defined according to one or more steps, as described below:
  Precursor Stage: A precursor material is derived from a stock solution via solventless precipitation. A portion of the process liquid is conserved.
  Template Stage: The precursor material formed in the Precursor Stage is treated in one or more procedures to form a template material.
  Replication Stage: An adsorbate material is adsorbed to the templating surface of the template to form a PC material.
  Separation Stage: Endomorphic extraction and perimorphic separation are performed. Endomorphic extraction produces a stock solution. Perimorphic separation separates the perimorphic product from conserved process materials.

In practice, each step within these stages may itself comprise multiple, subsidiary steps. Additionally, each of the steps may occur concurrently with steps from another stage, such that in practice different stages may overlap in chronology. This can especially be expected in variants employing one-pot techniques. As a hypothetical example of this, a stock solution might be continuously sprayed alongside an adsorbate material into a furnace. In this hypothetical furnace, precursor particles might be precipitated from the stock solution, template particles might be formed by heating of the precursor particles, and perimorphic material might be adsorbed to the template particles continuously and concurrently. This would correspond to steps assigned herein to the Precursor Stage, Template Stage, and Replication Stage, respectively.

Similarly, it is anticipated that in practice, many variants of the General Method may incorporate the steps described in the 4 Stages in different sequences. Also, in some variants, a step assigned by definition to one of the four stages herein might instead occur in a different stage. Such variants are anticipated herein and do not deviate from the inventive method, which is only presented herein as a discrete sequence of 4 stages for the sake of describing the overall cycle.

Ancillary processing steps (e.g. rinsing, drying, blending, condensing, spraying, agitating, etc.) may also be incorporated into the method at each stage. As a hypothetical example of this, a Replication Stage might involve coating a template material with a perimorphic material via a liquid-phase adsorption procedure, then filtering, rinsing and drying the resulting PC material. The incorporation of these processing steps in many variants will be obvious to those skilled in the art and, as such, they are not enumerated herein.

Figure 10:
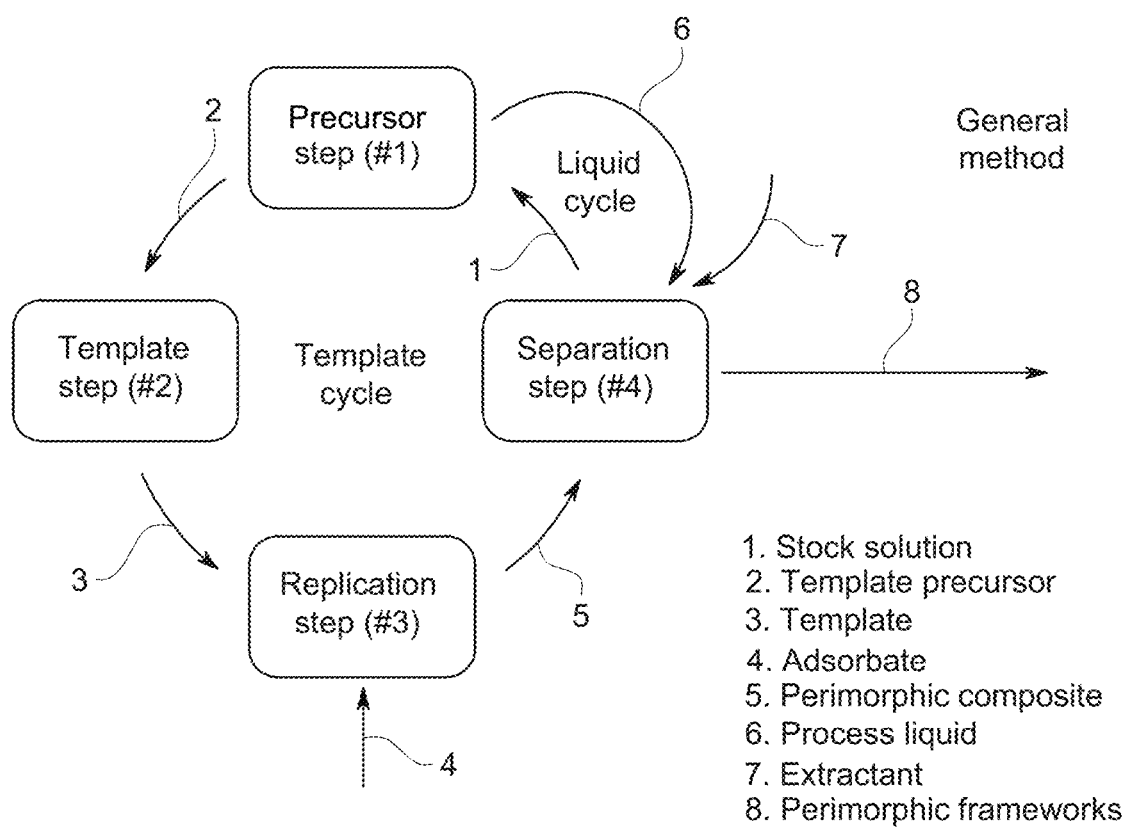
FIG. 10 is an illustration of the General Method. The Template Cycle and Liquid Cycle are labeled.

The inputs and outputs of the General Method are illustrated in FIG. 10. The General Method comprises a Template Cycle, by which a template material may be conserved and reused, and a Liquid Cycle, by which a process liquid may be conserved and reused.

Variants of the General Method

The following discussion enumerates a number of ways in which the General Method may be variously implemented. The omission of variants from this discussion should not be interpreted as limiting, since an exhaustive list of ways in which the General Method may be implemented is not practical.

The General Method is intended to offer a means for cyclical production of perimorphic products while conserving process materials. In each cycle of the General Method, some portion of the process materials utilized are conserved and reused. In some variants, substantially all of the process materials utilized may be conserved and reused. In other variants, a portion of the process materials may be lost. One hypothetical example of this would be evaporative losses of process liquids from open tanks or wet filters.

In some variants of the General Method, process steps may correspond to batch processes. In other variants, process steps may correspond to continuous processes.

In some variants of the General Method, the solventless precipitation may comprise at least one of the following techniques: heating or cooling the stock solution to change the solubility of a solute in the stock solution; volatilizing a dissolved gas within the stock solution; depressurizing the stock solution; atomization of the stock solution; spray-drying the stock solution or spray pyrolysis.

In some variants of the General Method, a precursor structure may comprise at least one of the following: an elongated, thin, equiaxed, or hierarchical-equiaxed superstructure; an elongated superstructure with a length-to-diameter ratio greater than 200:1; an elongated superstructure with a length-to-diameter ratio between 50:1 and 200:1; a spheroidal or spherical superstructure; a hollow superstructure; a fragmentary superstructure comprising fragments of some other parent superstructure; a curved, fragmentary superstructure comprising fragments of a hollow superstructure.

In some variants of the General Method, a precursor structure may be precipitated around one or more other sacrificial structures, which may be present as inclusions in the precursor structure after its precipitation. In some variants, these inclusions in the precursor structure may be subsequently removed, resulting in voids.

In some variants of the General Method, a precursor structure may measure less than 1 µm along its major axis. In some variants, the precursor may measure between 1 µm and 100 µm along its major axis. In some variants, the precursor may measure between 100 µm and 1,000 µm along its major axis.

In some variants of the General Method, the precursor material may comprise at least one of the following: a hydrate; a metal bicarbonate or carbonate; a Group I or Group II metal bicarbonate or carbonate; a mixture of salts. In some variants, the precursor may comprise $MgCO_3 \cdot xH_2O$ in the form of at least one of: hexahydrate, lansfordite, nesquehonite, hydromagnesite, dypingite, magnesite, nanocrystalline or non-crystalline $MgCO_3 \cdot xH_2O$.

In some variants of the General Method, the stock solution may comprise at least one of the following: metal cations and oxyanions; an aqueous metal bicarbonate solution; a Group I or Group II metal bicarbonate; an organic salt; $Mg(HCO_3)_2$. In some variants, the stock solution may comprise at least one of a dissolved gas, acid, and base. In some variants, the stock solution may be metastable.

In some variants of the General Method, the process liquid conserved in the Precursor Stage may comprise a distillate. In some variants, the distillate may be formed by condensing the process liquid vapor formed during spray-drying or spray-pyrolysis. In some variants, a process liquid conserved in the Precursor Stage may host solvated ions, the process liquid and ions together comprising a mother liquor.

In some variants of the General Method, the treatment performed on a precursor material in the Template Stage may comprise at least one of the following: decomposing the precursor; partially or locally decomposing the precursor; decomposing the precursor surface; thermal decomposition; and oxidizing an organic phase present within a precursor structure. In some variants, the treatment may comprise flash-drying, spray-drying, spray pyrolysis, vacuum drying, rapid heating, slow heating, sublimation. In some variants, a vapor released during the treatment may be conserved. In some variants, the vapor released may comprise at least one of $CO_2$ and $H_2O$. In some variants, treatment may comprise at least one of: coarsening the grain structure of the precursor or a decomposition product of the precursor; exposing to a reactive vapor; exposing to water vapor; sintering; sintering with the assistance of dopants.

In some variants of the General Method, a template material may comprise at least one of the following: a metal carbonate, a metal oxide, a Group I or II metal oxide, a transition metal, and MgO. In some variants, a template structure may comprise at least one of the following: macropores, mesopores, hierarchical porosity, subunits larger than 100 nm, subunits between 20 nm and 100 nm, and subunits between 1 nm and 20 nm.

In some variants of the General Method, a template structure may comprise at least one of the following: an elongated, thin, equiaxed, or hierarchical-equiaxed superstructure; an elongated superstructure with a length-to-diameter ratio greater than 200:1; an elongated superstructure with a length-to-diameter ratio between 50:1 and 200:1; a spheroidal or spherical superstructure; a hollow superstructure; a fragmentary superstructure comprising fragments of some other parent superstructure; and a curved, fragmentary superstructure comprising fragments of a hollow superstructure.

In some variants of the General Method, adsorbing the perimorphic material to the templating surface may comprise at least one of the following: a coating technique, physical vapor deposition, and chemical vapor deposition. In some variants, the coating technique may comprise coating a liquid or solid organic coating onto the templating surface, then forming a derivative carbon coating from the parent coating. In some variants, deposition may comprise pyrolytic decomposition of a vapor-phase organic compound at a temperature between 350° C. and 950° C. In some variants, a perimorphic carbon may be annealed after being adsorbed to the templating surface.

In some variants of the General Method, endomorphic extraction may utilize an extractant solution comprising a weak acid as an extractant. In some variants, an extractant solution may be formed by dissolving a process gas in process water. In some variants, the extractant solution may be an aqueous solution of $H_2CO_3$ formed by dissolving liquid or gaseous $CO_2$ in process water. In some variants, endomorphic extraction may comprise a shuttling technique. In some variants, endomorphic extraction may be performed under conditions of elevated pressure or temperature.

In some variants of the General Method, the perimorphic separation may comprise at least one of decantation, hydrocyclones, settling, sedimentation, flotation, froth flotation, centrifugal separation, filtration, and liquid-liquid extraction. In some variants, the perimorphic separation may separate the perimorphic product from substantially all of the process liquid. In some variants, the perimorphic product may retain a residual portion of the process liquid. In some variants, the perimorphic product may be naturally buoyant due to its retention of internal gas. In some variants, the perimorphic product's internal gas may be expanded by reducing pressure of the surrounding process liquid, increasing the buoyancy of the perimorphic product and causing flotation. In some variants, a portion of the perimorphic product's internal gas may be exfiltrated by reducing pressure of the surrounding process liquid, followed by re-pressurizing the surround process liquid, such that hydrostatic pressure causes the process liquid to infiltrate the perimorphic product.

In some variants of the General Method, the perimorphic framework may comprise at least one of a carbonaceous material, a pyrolytic carbon, an anthracitic network of carbon, an $sp^x$ network of carbon, and a helicoidal network of carbon.

In some variants of the General Method, under 532 nm excitation, the carbonaceous perimorphic framework may comprise at least one of a Raman spectral $I_D/I_G$ ratio of between 4.0 and 1.5; a Raman spectral $I_D/I_G$ ratio between 1.5 and 1.0; a Raman spectral $I_D/I_G$ ratio between 1.0 and 0.1; a Raman spectral $I_{T'}/I_G$ ratio between 0.0 and 0.1; a Raman spectral $I_{T'}/I_G$ ratio between 0.1 and 0.5; a Raman spectral $I_{T'}/I_G$ ratio between 0.5 and 1.0; a Raman spectral $I_{2D}/I_G$ ratio between 0 and 0.15; a Raman spectral $I_{2D}/I_G$ ratio between 0.15 and 0.3; and a Raman spectral $I_{2D}/I_G$ ratio between 0.30 and 2.0.

In some variants of the General Method, under 532 nm excitation, the carbonaceous perimorphic framework may comprise at least one of an unfitted Raman spectral D peak positioned between 1345 and 1375 $cm^{-1}$; an unfitted Raman spectral D peak positioned between 1332 and 1345 $cm^{-1}$; an unfitted Raman spectral D peak positioned between 1300 and 1332 $cm^{-1}$; an unfitted Raman spectral G peak positioned between 1520 $cm^{-1}$ and 1585 $cm^{-1}$; an unfitted Raman spectral G peak positioned between 1585 $cm^{-1}$ and 1600 $cm^{-1}$; and an unfitted Raman spectral G peak positioned between 1600 $cm^{-1}$ and 1615 $cm^{-1}$.

In some variants of the General Method, the perimorphic product may comprise a perimorphic framework. In some variants, the perimorphic framework may comprise at least one of a native morphology, a non-native morphology, internal gas, a hydrophobic surface, a hydrophilic surface, mesopores, one or more macropores, hierarchical porosity.

In some variants of the General Method, the perimorphic framework may measure less than 1 µm along its major axis. In some variants, the perimorphic framework may measure between 1 µm and 100 µm along its major axis. In some variants, the perimorphic framework may measure between 100 µm and 1,000 µm along its major axis. In some variants, the perimorphic framework may comprise an elongated, thin, equiaxed, or hierarchical-equiaxed superstructure. In some variants, an elongated perimorphic framework may comprise a length-to-diameter ratio between 50:1 and 200:1. In some variants, the perimorphic framework's equiaxed superstructure may be spheroidal or spherical. In some variants, the perimorphic framework's equiaxed superstructure may be hollow. In some variants, the perimorphic framework may comprise fragments of a hollow shell. In some variants, the perimorphic framework may comprise a noncellular space.

In some variants of the General method, the perimorphic framework may comprise a BET surface area of 1,500 to 3,000 m$^2$/g. In some variants, the perimorphic framework may comprise a BET surface area of to 1,500 m$^2$/g.

In some variants of the General Method, the perimorphic product may be subjected to further treatment after perimorphic separation. In some variants, the further treatment after perimorphic separation may comprise at least one of flash-drying, spray-drying, spray-pyrolysis, decomposition, chemical reaction, annealing, and chemical functionalization.

In some variants of the General Method, the Liquid Cycle may also incorporate the recapture and conservation of process liquid released (possibly in vapor phase) during the Template Stage, although this is not reflected as an output in FIG. 10. It is not reflected because in most (but not all) of the variants of the General Method envisioned, the quantity of process liquid conserved during the Template Stage would be significantly smaller than the quantity of process liquid conserved in the Precursor Stage.

Figure 11:
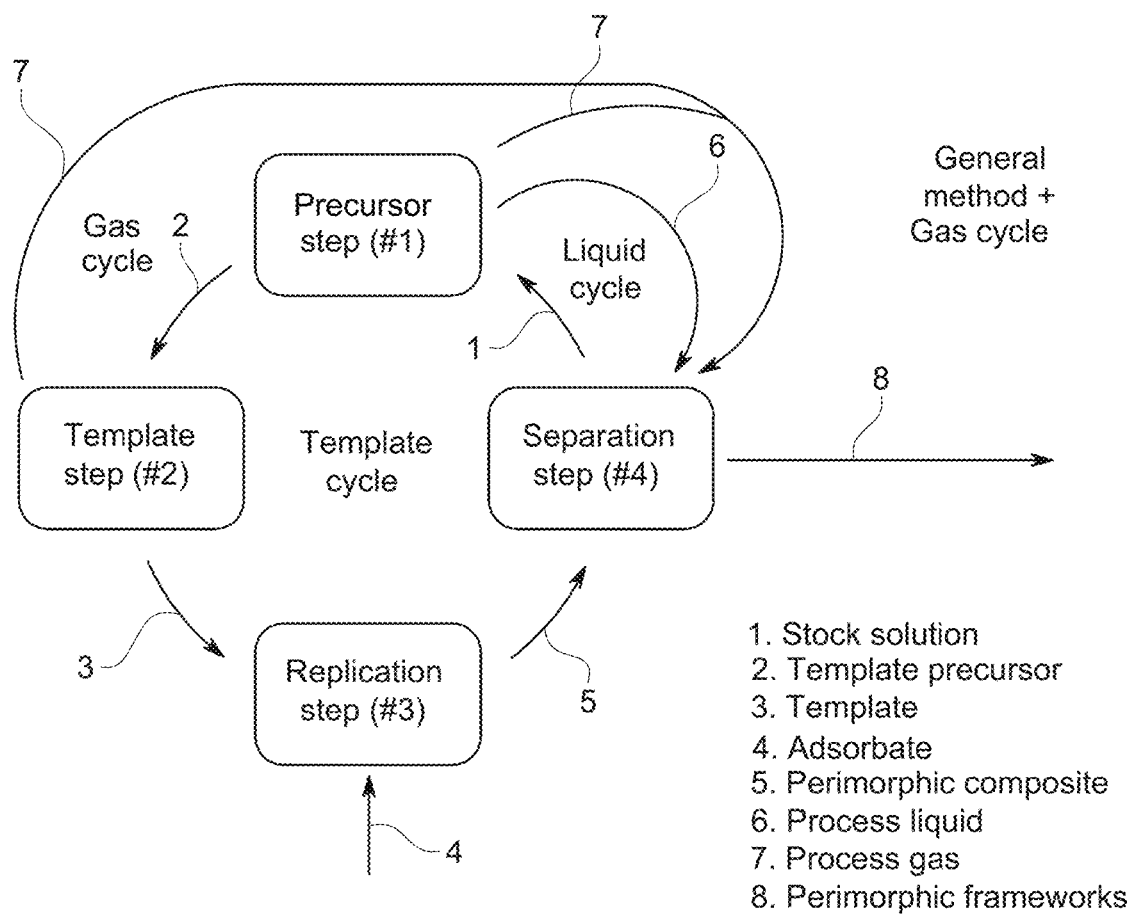
FIG. 11 is an illustration of the General Method with a Gas Cycle. A process gas is utilized to generate the extractant in the Separation Stage and is recaptured during the Precursor Stage and/or Template Stage.

In some variants of the General Method, a Gas Cycle may be incorporated into the method. The inputs and outputs of the General Method with a Gas Cycle are illustrated in FIG. 11. In a Gas Cycle, a process gas is released during the Precursor Stage and/or the Template Stage. This released gas is conserved. Then, during the Separation Stage, the conserved process gas may be dissolved into conserved process liquid in order to generate an extractant solution.

Figure 12:
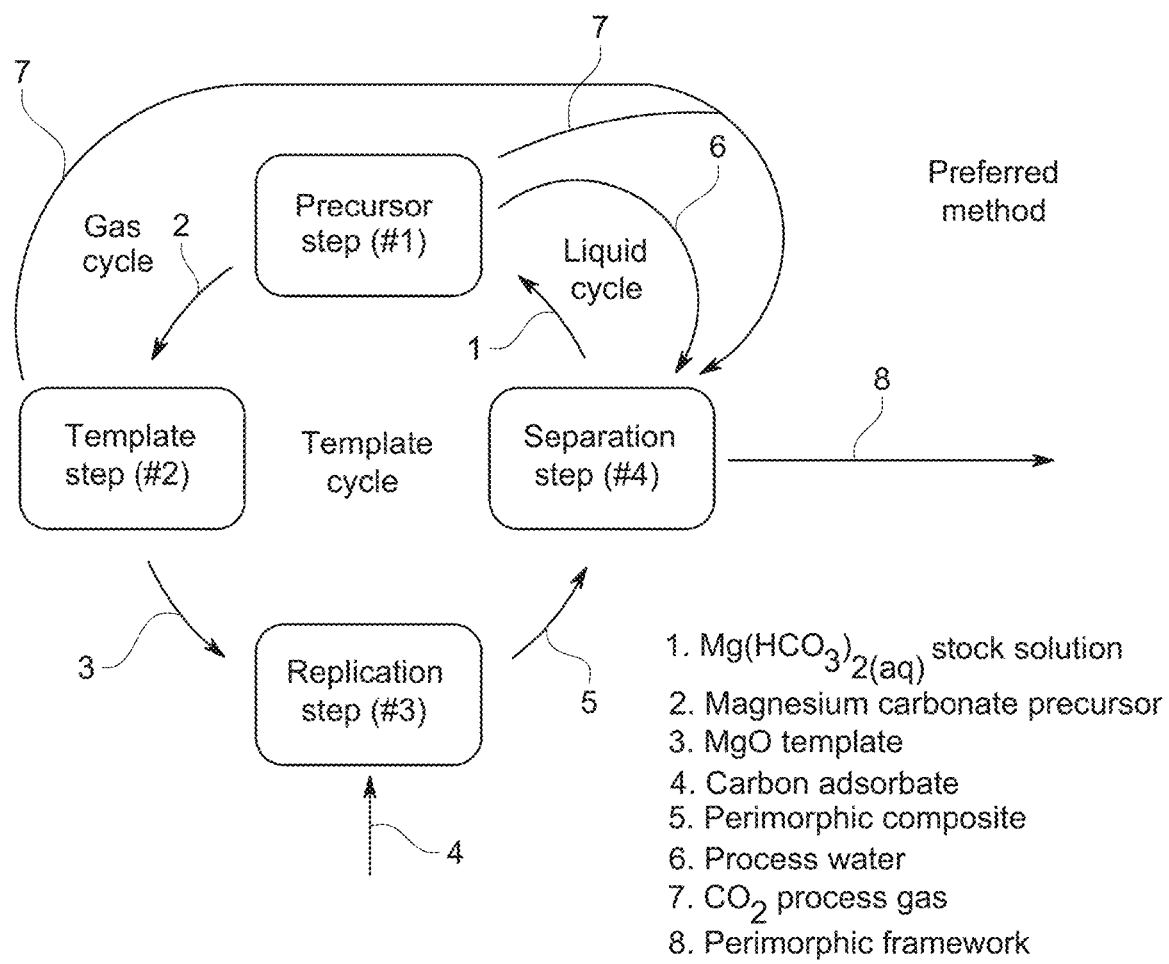
FIG. 12. is an illustration of the Preferred Method. In the Preferred Method, the stock solution comprises $Mg(HCO_3)_2$ solution, the template precursor comprises magnesium carbonate, the template comprises MgO, and the perimorphic material is carbonaceous.

The Preferred Method, described below, comprises variants of the General Method in which a MgCO$_3$·xH$_2$O template precursor material is derived from an aqueous Mg(HCO$_3$)$_2$ stock solution and a portion of the CO$_2$ process gas is conserved via a Gas Cycle. The inputs and outputs of the Preferred Method are shown in FIG. 12. The Preferred Method comprises:

Precursor Stage: MgCO$_3$·xH$_2$O precursor material is derived from an aqueous Mg(HCO$_3$)$_2$ stock solution, wherein the derivation comprises a solventless precipitation of MgCO$_3$·xH$_2$O and an emission of CO$_2$ process gas. A portion of released CO$_2$ process gas is conserved. The MgCO$_3$·xH$_2$O precursor material and process water are separated. Process water is conserved.

Template Stage: The MgCO$_3$·xH$_2$O precursor material formed in the Precursor Stage is thermally decomposed in one or more procedures to form a porous MgO template material. Released CO$_2$ process gas may be conserved.

Replication Stage: An organic or carbonaceous perimorphic material is adsorbed to the templating surface of the porous MgO template to form a PC material.

Separation Stage: Conserved CO$_2$ process gas is dissolved into conserved process water to form an aqueous H$_2$CO$_3$ extractant solution. Endomorphic extraction comprises a reaction between endomorphic MgO and the aqueous H$_2$CO$_3$ extractant solution, generating an aqueous Mg(HCO$_3$)$_2$ stock solution. Perimorphic separation may comprise techniques that displace process water from the perimorphic product, minimizing residual process water. Froth flotation, liquid-liquid separation, or other techniques that separate the carbon perimorphic based on hydrophobicity may be used.

Certain variants of the Preferred Method may employ pressure modulations in order to form concentrated stock solutions and improve precipitation processes. Concentrated stock solutions may be associated with many benefits, including superior precipitation kinetics, reduced process water volumes, smaller vessels, and improved energy efficiency. Two exemplary ways that this can be done are illustrated in FIGS. 13A-13B and described below.

Figure 13A:
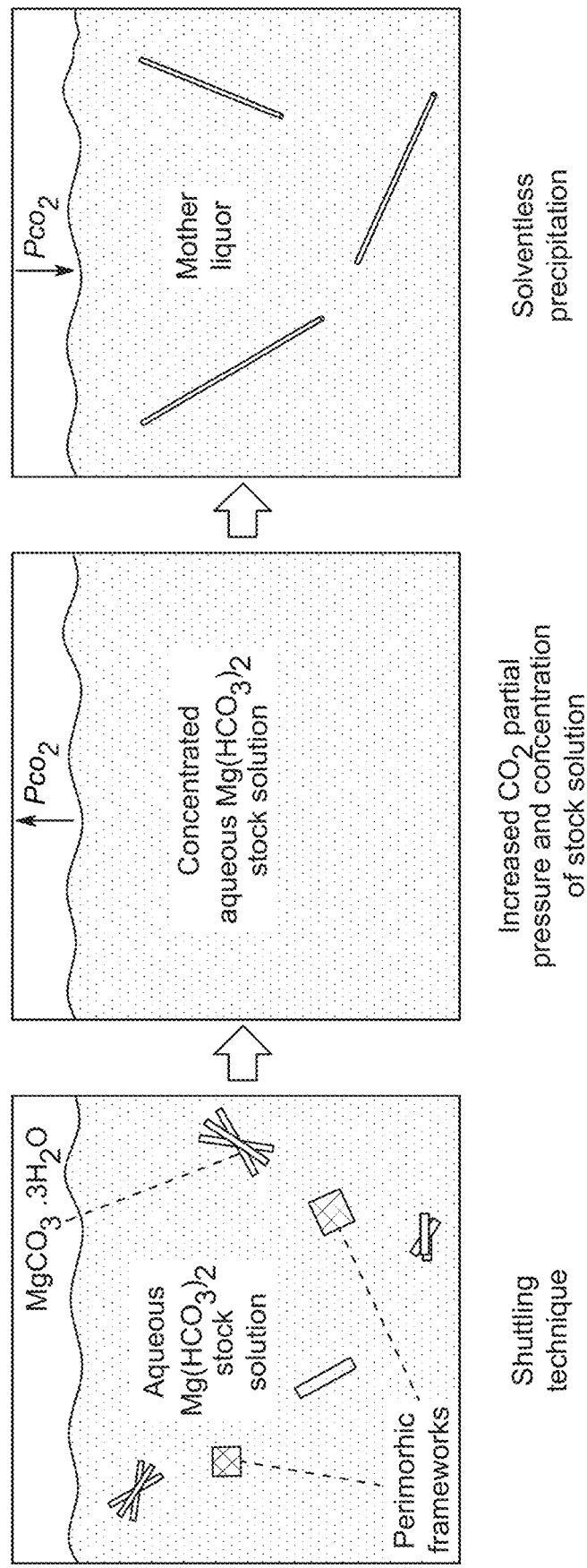
FIG. 13A is an illustration of a sequence incorporating shuttling, concentration of a stock solution via increased $CO_2$ pressure, and solventless precipitation via reducing $CO_2$ pressure.
Figure 13B:
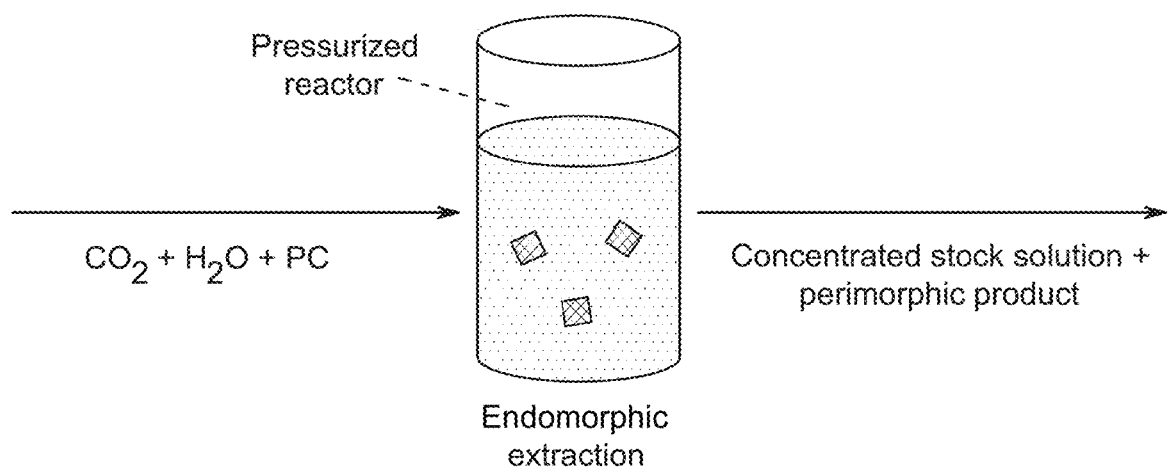
FIG. 13B is an illustration of the use of a pressurized reactor being utilized to obtain endomorphic extraction and the formation of a concentrated $Mg(HCO_3)_2$ stock solution.

In the first frame of FIG. 13A, a shuttling technique has been used to obtain endomorphic extraction. The shuttling technique results in a mixture comprising aqueous Mg(HCO$_3$)$_2$ stock solution, perimorphic framework(s), and the MgCO$_3$·xH$_2$O precipitate. This precipitate is represented in the first frame of FIG. 13A as a mixture of nesquehonite rods and acicular nesquehonite agglomerates. Next, the perimorphic product is separated from the other process liquids and solids. Following this, the MgCO$_3$·xH$_2$O precipitate is dissolved by increasing the CO$_2$ pressure, which increases the concentration of dissolved CO$_2$, H$_2$CO$_3$ and HCO$_3^-$, forming a concentrated stock solution, as shown in the second frame of FIG. 13A. Finally, as shown in the third frame, the MgCO$_3$·xH$_2$O precursor may be rapidly nucleated and precipitated from the concentrated stock solution by reducing the CO$_2$ pressure (and optionally the total pressure).

Another way that a concentrated stock solution may be obtained is by performing the endomorphic extraction in a pressurized reactor. A schematic showing this is illustrated in FIG. 13B. Similar to the procedure illustrated in FIG. 13A, the procedure illustrated in FIG. 13B employs increased CO$_2$ pressure to increase the concentration of dissolved CO$_2$, H$_2$CO$_3$ and HCO$_3^-$. In FIG. 13B, PC material, CO$_2$, and H$_2$O (possibly an aqueous Mg(HCO$_3$)$_2$ mother liquor) are fed into a pressurized reactor. Endomorphic extraction and the formation of a concentrated stock solution occur within the pressurized reactor. The mixture of the perimorphic product and concentrated stock solution is discharged from the pressurized reactor, where perimorphic separation can then occur. Separation may be beneficially accomplished using a liquid-liquid separation that eliminates rinsing requirements. The MgCO$_3$·xH$_2$O precursor may be rapidly nucleated and precipitated from the concentrated stock solution by reducing the CO$_2$ pressure (and optionally the total pressure).

III. Furnace Schemes, Analytical Techniques and Material Naming

In the course of describing procedures to generate the exemplary materials described in the subsequent sections, certain furnace schemes have been detailed. These schemes may be used for the exemplary Template Stage procedures detailed in Section V and for the exemplary Replication Stage procedures detailed in Section VI.

Scheme A: In Scheme A, a Thermcraft tube furnace modified to be a rotary furnace may be employed with a quartz tube. The furnace has a clam shell design with a cylindrical heating chamber of 160 mm diameter and 610 mm heated length. The furnace has a wattage of 6800 W with a maximum operating temperature of 1100° C. The quartz tube may be a 60 mm OD quartz tube containing an expanded middle section of 130 mm OD tube (the "belly") positioned within the furnace's heating zone. The tube may be rotated. Quartz baffles inside the belly may facilitate agitation of the a powder sample during rotation. The furnace may be kept level (i.e. not tilted). The template powder sample may be placed inside the belly in the heating zone, with ceramic blocks inserted outside the belly on each side of the furnace's heating zone. Glass wool may be used to fix the position of the ceramic blocks.

For exemplary procedures performed using Scheme A, a material sample may be placed inside the belly, such that it agitated within the reactor. Loose fitting ceramic blocks located outside the belly section on each side of the furnace's heating zone allowing for gas flow and powder containment. Packed glass wool may be used to affix the position of the ceramic blocks while acting as a gas permeable layer. The ends of the tube may be fitted with two stainless-steel flanges to allow for gas to flow for the system.

Scheme B: An MTI rotary tube furnace with a quartz tube may be used. The furnace has a clam shell design with a cylindrical heated chamber having dimensions of 120 mm diameter and 440 mm heated length. The furnace has a wattage of 2500 W with a maximum operating temperature of 1150° C. The quartz tube may be 60 mm in OD. The tube may be substantially level. For exemplary procedures performed using Scheme B, a material sample may be placed within a ceramic boat. This may then be placed inside the quartz tube within the heating zone prior to the initialization of heating. Loose fitting ceramic blocks located outside the furnace's heating zone allow for gas flow. Packed glass wool may be used to affix the position of the ceramic blocks while acting as a gas permeable layer. The ends of the tube may be fitted with two stainless-steel flanges.

Scheme C: A Lindberg Blue-M tube furnace with a quartz tube may be used. The quartz tube may be 150 mm in OD. The furnace has a clam shell design with a cylindrical heated chamber having dimensions of 190 mm diameter and 890 mm heated length. The furnace has a wattage of 11,200 W with a maximum operating temperature of 1200° C. The tube may be substantially level. For exemplary procedures performed using Scheme C, a sample may be placed within a ceramic boat. This may then be placed inside the quartz tube within the heating zone prior to the initialization of heating. Loose fitting ceramic blocks located outside the furnace's heating zone allow for gas flow. The ends of the tube may be fitted with two aluminum flanges to allow for gas flow through the system.

Scheme D: A Vulcan 3-550 Muffle furnace may be used. The furnace has a rectangular heated chamber having dimensions of 190 mm×240 mm×228 mm. The furnace has a wattage of 1440 W with a maximum operating temperature of 1100° C. For exemplary procedures performed using Scheme D, a material sample may be placed within a ceramic boat. This may then be placed inside the muffle furnace prior to the initialization of heating.

Scheme E: A TA Instruments Q600 TGA/DSC may be used. For exemplary procedures performed using Scheme E, a 90 μL alumina pan may be used to hold a material sample.

Gas flow may be 100 sccm of a specified gas unless otherwise noted. The heating rate may be mentioned in the exemplary procedures where Scheme E is used.

A number of analytical techniques were utilized to characterize the procedures and materials presented herein. These are detailed below.

Solution concentrations were measured using electrolytic conductivity ("conductivity"). The conductivity is a measured response of a solution's electrical conductance. The electrical response of a solution may be correlated to the concentration of ions dissolved in the solution, and as ions in solution are precipitated, the conductivity value decreases. An analog to this measurement is total dissolved solids ("TDS") which relates the conductivity measurement to a referenced ion concentration (typically potassium chloride), dependent on the salt compound dissolved.

Thermogravimetric analysis (TGA) was used to analyze the thermal stability and composition of materials. All TGA characterization was performed on a TA Instruments Q600 TGA/DSC. A 90 μL alumina pan was used to hold the sample during TGA analysis. All analytical TGA procedures were performed at 20° C. per min unless otherwise mentioned. Either air or Ar(Ar) was used as the carrier gas during analytical TGA procedures unless otherwise mentioned.

Raman spectroscopy was performed using a ThermoFisher DXR Raman microscope equipped with a 532 nm excitation laser. For each sample analyzed, 16 point spectra were generated using measurements taken over a 4×4 point rectangular grid with point-to-point intervals of 5 μm. The 16 point spectra were then averaged to create an average spectrum. The Raman peak intensity ratios and Raman peak positions reported for each sample all derive from the sample's average spectrum. No profile fitting software was utilized, so the reported peak intensity ratios and peak positions relate to the unfitted peaks pertaining to the overall Raman profile.

Gas adsorption measurements were made using a Micromeritics Tristar II Plus. Nitrogen adsorption was measured at a temperature of 77 K across a range of pressure (p) values, where $$\frac{p}{p^0} = 0.009 \text{ up to } \frac{p}{p^0} = 0.05.$$

Increments of pressure ranged from $$0.005 < \frac{p}{p^0} < 0.30.$$

Micromeritics MicroActive software was used to calculate the BET specific surface area derived from the BET monolayer capacity assuming the cross-sectional area $\sigma_m$ (N$_2$, 77 K)=0.162 nm$^2$. Samples were preconditioned by degassing with continuously flowing dry nitrogen gas at 100° C. prior to analysis.

The pore size distribution (PSD) and cumulative volume of pores is another technique that may be performed from gas adsorption data to lend insight into the sintering behavior of particles. The data was collected by a Micromeritics Tristar II Plus, measuring nitrogen adsorption and desorption at 77 K between pressures of $$0.009 < \frac{p}{p^0} < 0.99,$$

with increments ranging from $$\frac{p}{p^0} = 0.009 \text{ up to } \frac{p}{p^0} = 0.05.$$

Samples were preconditioned by degassing with continuously flowing dry nitrogen gas at 100° C. prior to analysis.

Micromeritics MicroActive software was used to calculate adsorption-desorption PSD and cumulative volume of pores by applying the Barrett, Joyner and Halenda (BJH) method. This method provides a comparative assessment of mesopore size distributions for gas adsorption data. For all BJH data, the Faas correction and Harkins and Jura thickness curve may be applied. The cumulative volume of pores, $V_{PORE}$ (cm³/g), may be measured for both adsorption and desorption portions of the isotherm.

There are a number of exemplary materials described in the present disclosure. To aid in identification and tracking of these exemplary materials, a material naming system has been adopted and is described below. All names of exemplary materials are bolded; $N_2$ herein describes an exemplary material, while $N_2$ refers to nitrogen gas.

Exemplary types of template precursor materials are denoted $S_x$, where S designates the first one or two letters of the template precursor material (i.e. N for nesquehonite, L for lansfordite, Li for lithium carbonate, C for magnesium citrate, A for amorphous/non-crystalline $MgCO_3 \cdot xH_2O$, H for hydromagnesite, M for magnesite, E for epsomite, and Ca for calcium carbonate) and where x designates different types of the precursor compound (e.g. $H_1$ and $H_2$ designate two different types of hydromagnesite precursors).

Exemplary types of template materials are named in the format $S_xT_y$. The $S_x$ name component designates the precursor type that was utilized to create the template type $S_xT_y$, and the $T_y$ name component designates a specific treatment that was utilized to create the template type $S_xT_y$. For example, $N_1T_1$ and $N_1T_2$ indicate two different template types formed from two different treatments on the precursor type $N_1$. We note that while the full $S_xT_y$ name denotes a specific template type, the $T_y$ name component by itself is only specific with respect to a given $S_x$ precursor type. For example, the treatments utilized to make the template types $N_1T_1$ and $N_2T_1$ were different, despite these template types sharing the same $T_1$ name component.

Exemplary types of PC materials are named in the format $S_xT_yP_z$, where the $S_xT_y$ name component designates the template type and the $P_z$ name component designates a specific type of carbon perimorph. For example, $M_3T_1P_1$ and $M_3T_1P_2$ indicate two different PC materials formed from the same $M_3T_1$ template material. The $P_z$ name component within the $S_xT_yP_z$ name is unique—i.e. each $P_z$ name component specifies a unique type of perimorph, irrespective of the $S_xT_y$ template type utilized to make the perimorph.

Exemplary types of perimorphic frameworks (i.e. the porous perimorphic product resulting from endomorphic extraction) are named in the format $P_z$, where the $P_z$ name component is not prefaced with an $S_xT_y$ template type. The $P_z$ name component utilized to name a framework type matches the $P_z$ name component of the $S_xT_yP_z$ PC material type from which the framework type was derived.

The exemplary types of template precursor materials, template materials, perimorphic composite materials, and perimorphic materials in this disclosure are enumerated in the table in FIGS. 74A-74B. The table is arranged to show the progression of the materials synthesized, starting from the template precursor material. While not every exemplary material was tracked through all four stages, it is understood that any of the exemplary materials might be, if desired. The table also follows the material naming system described above.

IV. Precursor Stage—Examples

This Section details the generation of exemplary template precursor materials at small scales using exemplary procedures. As such, these procedures comprise partial implementations of the General Method. It should be therefore understood that these procedures must be coupled with other procedures in a full implementation of the General Method. Additionally, it should be understood that these procedures are merely demonstrative of analogous, larger-scale procedures that would be used for industrial-scale manufacturing.

Various techniques may be utilized in the precipitation of precursor materials. For example, the stock solution may be heated to evaporate the process liquid, causing the stock solution to become supersaturated and to precipitate a precursor material. This may be combined with techniques to control the shape and size of the precipitated template precursor particles. For example, the stock solution may be spray-dried to create discrete spheres or hollow spheres. Other techniques may be utilized that will be obvious to those skilled in the art.

Example $N_1$: In an exemplary Precursor Stage procedure, an elongated nesquehonite ($MgCO_3 \cdot 3H_2O$) template precursor material may be derived from a stock solution of aqueous $Mg(HCO_3)_2$.

To demonstrate this derivation at a small scale, a representative stock solution may first be prepared. This stock solution represents the stock solution that might be generated during the Separation Stage of a full implementation of the General Method. For this example, a representative aqueous $Mg(HCO_3)_2$ stock solution may be generated using water, $CO_2$ gas, and MgO.

First, a 0.24 mol kg$^{-1}$ Mg mixture comprising deionized water and Akrochem Elastomag 170, a commercial magnesium oxide (MgO) product, may be made. This mixture may be carbonated in a circulation tank with a sparge tube bubbling $CO_2$ to generate carbonic acid. The $CO_2$ bubbling may be discontinued after the MgO is completely dissolved to form the stock solution. The stock solution may be approximately 14.5° C.

Next, air bubbling may be initiated through a sparge tube through the stock solution in the circulation tank at an approximate flow rate of 12 scfm$_{air}$. This bubbling may cause precipitation of nesquehonite particles and an associated emission of $CO_2$ process gas. Bubbling and circulation may be continued until the conductivity of the solution stabilizes. At this point, the aqueous mixture of nesquehonite particles may be filtered, separating the particles from the aqueous $Mg(HCO_3)_2$ filtrate. This filtrate comprises a mother liquor and substantially all of the process water. In a full implementation of the General Method, the separated process water may be conserved for reuse, as shown in FIG. 12. Additionally, in a full implementation of the General Method, the emitted $CO_2$ process gas may also be conserved for reuse using conventional techniques.

Figure 14:
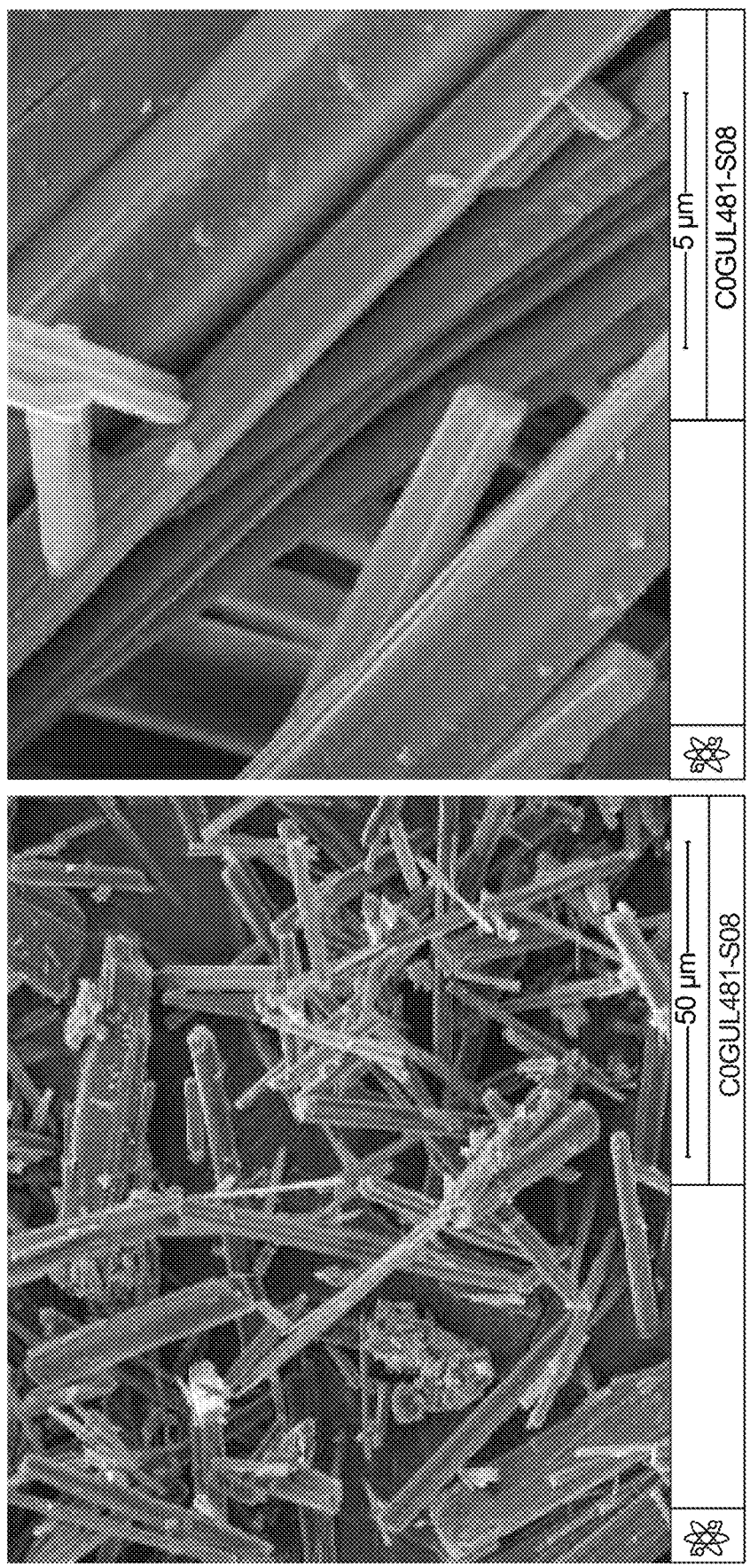
FIG. 14 includes SEM micrographs of template precursor particles ($N_1$) comprising nesquehonite particles with elongated superstructures derived from an aqueous $Mg(HCO_3)_2$ stock solution.

Nesquehonite template precursor particles of the type generated by this procedure may be identified herein as $N_1$ and may be seen in the SEM micrograph in FIG. 14. The template precursor may be confirmed as nesquehonite via the elongated morphology and TGA mass loss of 70.4%, which is in good agreement with the expected nesquehonite mass loss of 70.9%, as shown in the table in FIG. 75.

Aside from the presence of some minor debris, the crystals have smooth, thin surfaces. The elongated morphology of these crystals may be valuable. In applications requiring interlocking particles, such as filtration membranes, an elongated morphology may be useful. In applications requiring the assembly of a percolative network, such as for electron transport, elongated particles may achieve percolation with fewer particles than more equiaxed particle morphologies. In applications requiring mechanical reinforcement, elongated particles may provide superior tensile properties.

Example $H_1$: In another exemplary Precursor Stage procedure, a hierarchical-equiaxed hydromagnesite ($Mg_5(CO3)_4(OH)_2 \cdot 4H_2O$) template precursor material may be derived from a stock solution of aqueous $Mg(HCO_3)_2$.

To demonstrate this derivation at a small scale, a representative stock solution may first be prepared. This stock solution represents the stock solution that might be generated in the Separation Stage of a full implementation of the General Method. For this example, an aqueous $Mg(HCO_3)_2$ stock solution with an approximate molality of 0.14 mol $kg^{-1}$ Mg (aq) may first be prepared as the representative stock solution.

Next, the stock solution may be placed in a 1 L Buchi rotary evaporator vessel, which may then be rotated at 280 RPM in a 100° C. water bath. Crystallization may be allowed to proceed until most of the Mg ions have been precipitated as hydromagnesite precursor particles. Associated with this precipitation, $CO_2$ process gas may be emitted. In a full implementation of the General Method, the $CO_2$ process gas released during precipitation may be conserved using conventional techniques.

The resulting hydromagnesite mixture may then be filtered to separate the solids from the aqueous $Mg(HCO_3)_2$ filtrate. This filtrate comprises a mother liquor and substantially all of the process water. In a full implementation of the General Method, the separated mother liquor may be conserved for reuse.

Figure 15:
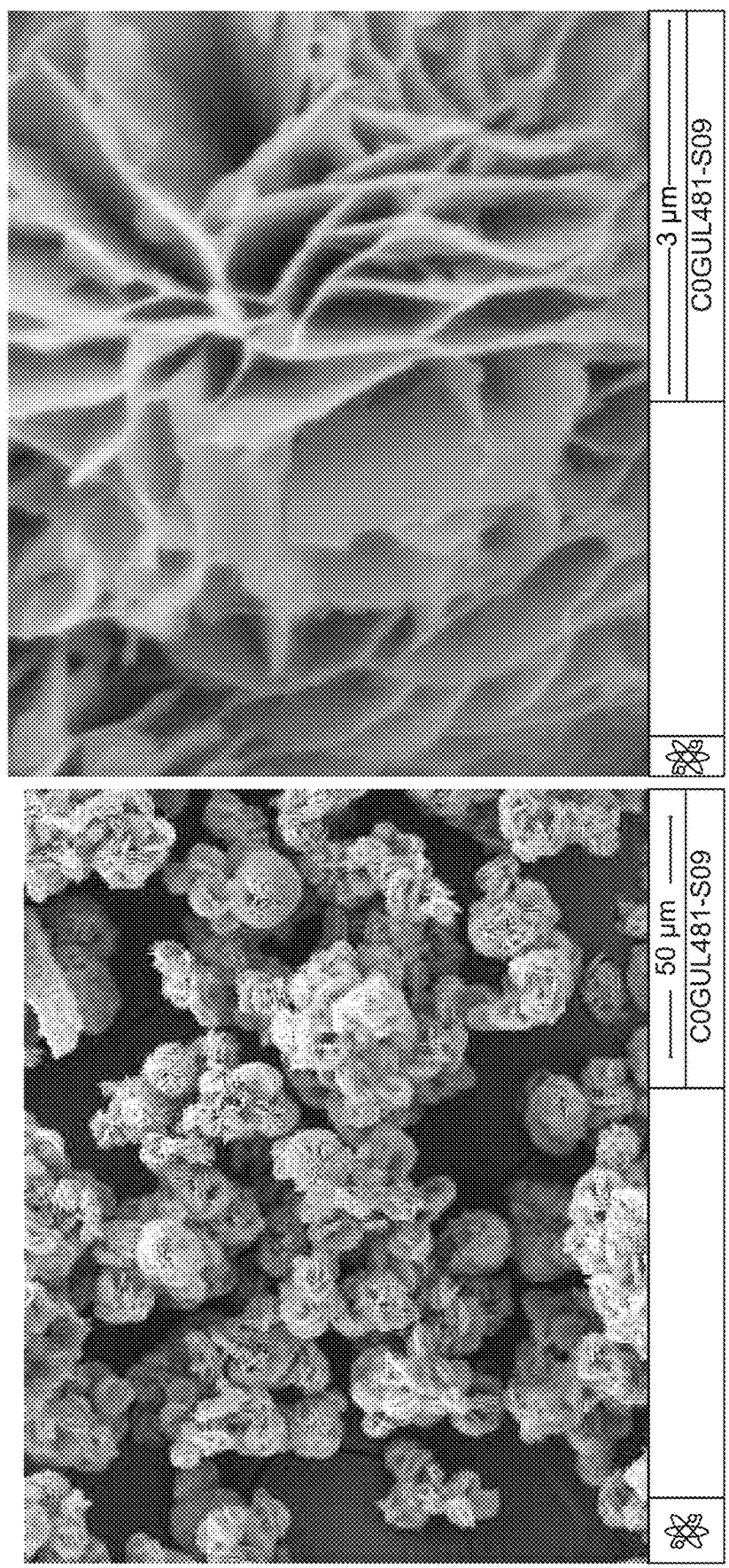
FIG. 15 includes SEM micrographs of template precursor particles ($H_1$) comprising hydromagnesite particles with equiaxed, hierarchical-equiaxed superstructures derived from an aqueous $Mg(HCO_3)_2$ stock solution.

Hydromagnesite template precursor particles of the type generated by this procedure are identified herein as $H_1$ and may be seen in the representative SEM micrograph FIG. 15. TGA mass loss of these particles is 56.6%, which is in good agreement with the expected hydromagnesite mass loss of 56.9% (FIG. 75). The thin (<100 nm thick) hydromagnesite plates are arranged in a hierarchical-equiaxed superstructure. This template precursor morphology is of interest due to the combination of thin and equiaxed morphological features. In applications requiring high surface area, the hierarchical-equiaxed morphology may prevent the surfaces of the thin crystals from being occluded, whereas simple planar particles may tend to stack against one another and occlude one another's surfaces.

Example $H_2$: In another exemplary Precursor Stage procedure, an elongated, hierarchical hydromagnesite ($Mg_5(CO_3)_4(OH)_2 \cdot 4H_2O$) template precursor material may be derived from a stock solution of aqueous $Mg(HCO_3)_2$.

To demonstrate this derivation at a small scale, nesquehonite may first be precipitated from a representative aqueous $Mg(HCO_3)_2$ stock solution. This stock solution represents the stock solution that might be generated during the Separation Stage of a full implementation of the General Method. For this example, a representative stock solution and an aqueous mixture of precipitated nesquehonite may be obtained using the procedure described in Example $N_1$. Associated with this nesquehonite precipitation, $CO_2$ process gas may be emitted. In a full implementation of the General Method, the released $CO_2$ process gas may be conserved using conventional techniques.

Next, the nesquehonite mixture may be heated to 100° C. and maintained at that temperature until recrystallization into hydromagnesite is complete. In this exemplary procedure, the process water may be completely evaporated, separating it from the solid residue of elongated hydromagnesite particles. In a full implementation of the General Method, the separated process water may be conserved using conventional techniques.

Figure 16A:
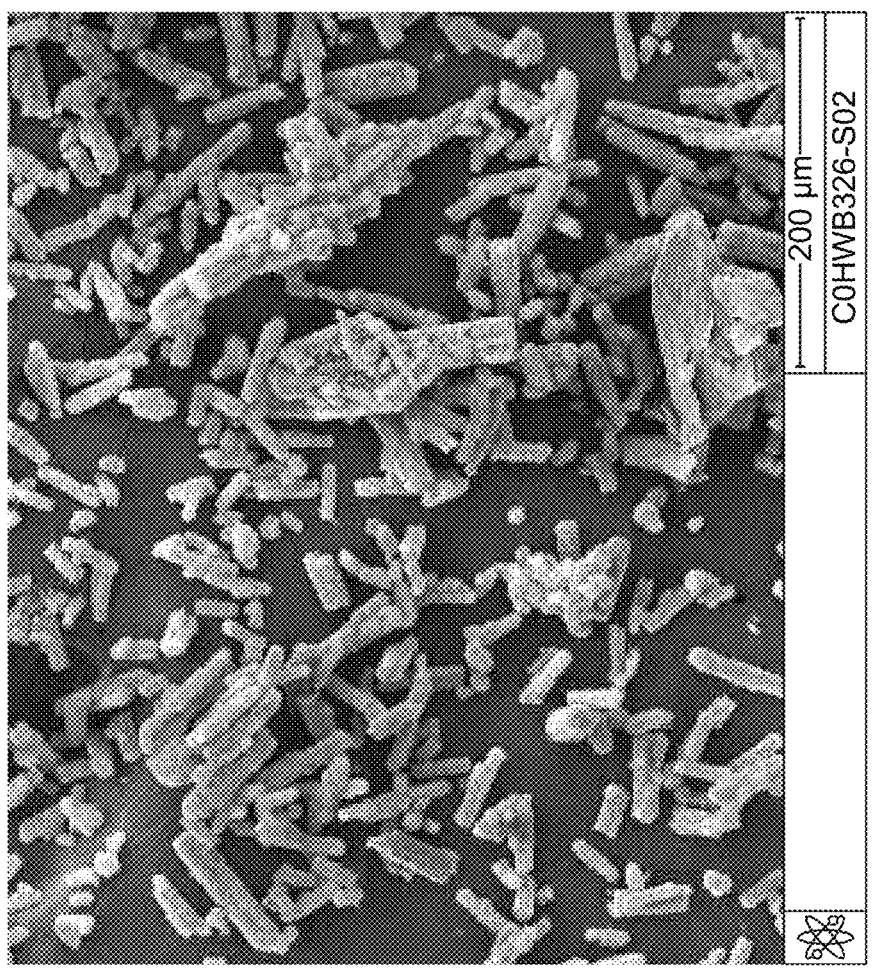
FIG. 16A is an SEM micrograph of template precursor particles ($H_2$) comprising hydromagnesite particles with elongated, hierarchical superstructures derived from an aqueous $Mg(HCO_3)_2$ stock solution.
Figure 16B:
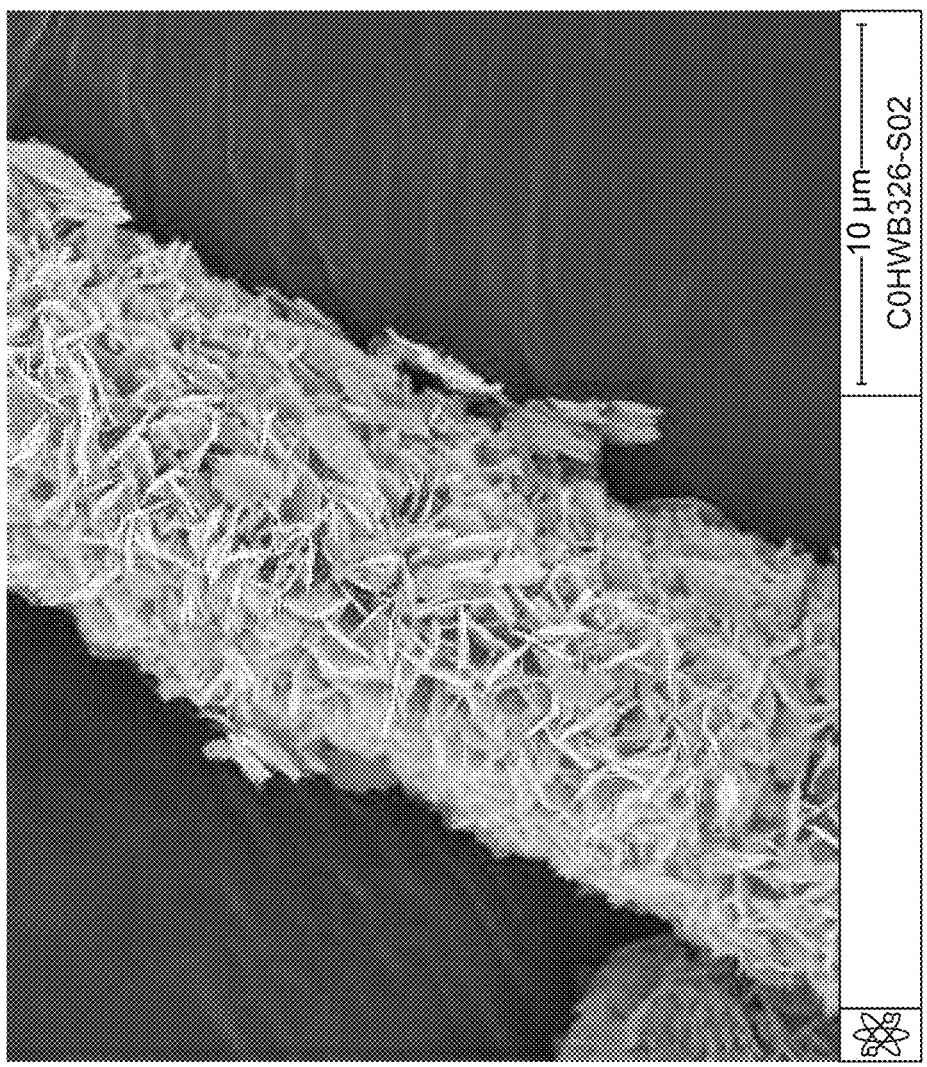
FIG. 16B is an SEM micrograph revealing the finer features of the template precursor particles in FIG. 16A.

Hydromagnesite template precursor particles of the type generated by this procedure are identified herein as $H_2$ and may be seen in the representative SEM micrographs in FIGS. 16A-16B. This template precursor material may combine the aforementioned virtues of elongated and thin morphologies.

Example $H_3$: In another exemplary Precursor Stage procedure, a plate-like hydromagnesite ($Mg_5(CO_3)_4(OH)_2 \cdot 4H_2O$) template precursor material may be derived from a stock solution of aqueous $Mg(HCO_3)_2$.

To demonstrate this derivation at a small scale, a hierarchical hydromagnesite may first be derived from a representative aqueous $Mg(HCO_3)_2$ stock solution. This stock solution represents the stock solution that might be generated during the Separation Stage of a full implementation of the General Method. For this example, a representative stock solution and precipitated hydromagnesite particles may be obtained using the procedure described in Example $H_2$. Associated with the precipitation, $CO_2$ process gas may be emitted. In a full implementation of the General Method, the released $CO_2$ process gas may be conserved using conventional techniques. Additionally, separated process water may be conserved in a full implementation of the General Method.

Next, the hierarchical hydromagnesite particles may be mechanically broken. This might be accomplished in a number of ways using known milling techniques. For the purpose of demonstration, the particles may be slurried in process water. The mixture may then be agitated using high-shear techniques to break the delicate, hierarchical hydromagnesite particles into their constituent, individualized plates. The plate-like hydromagnesite particles may then be filtered from the process water. In a full implementation of the General Method, the separated process water may be conserved for reuse.

Figure 17:
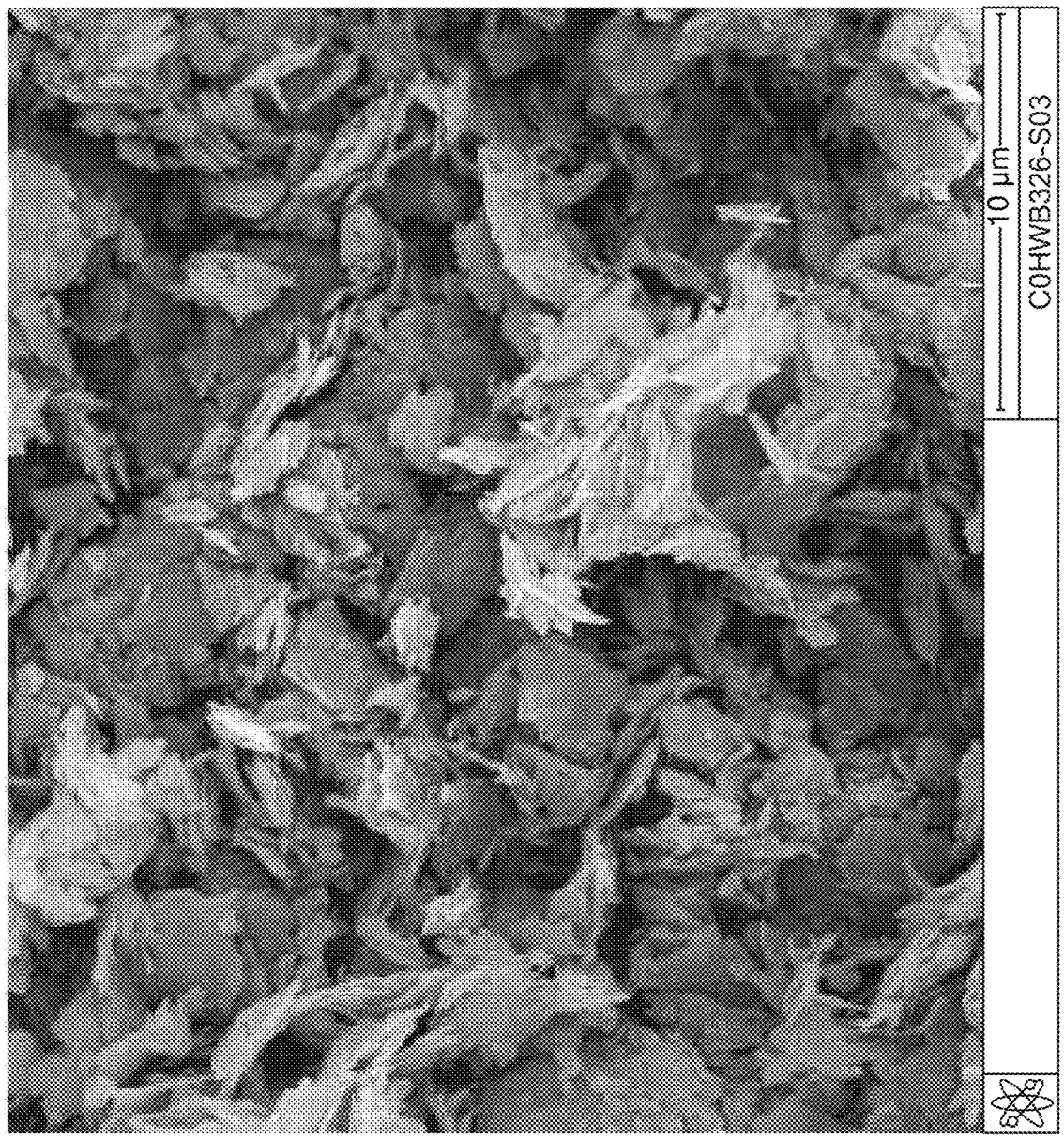
FIG. 17 is an SEM micrograph of template precursor particles ($H_3$) comprising hydromagnesite particles with thin, platelike superstructures derived from an aqueous $Mg(HCO_3)_2$ stock solution.

Hydromagnesite template precursor particles of the type generated by this procedure are identified herein as $H_3$ and may be seen in the representative SEM micrograph FIG. 17. TGA mass loss of these particles is 56.6%, which is in good agreement with the expected hydromagnesite mass loss of 56.9%, as seen in FIG. 75.

Example $L_1$: In another exemplary Precursor Stage procedure, an equiaxed lansfordite ($MgCO_3 \cdot 5H_2O$) template precursor material may be derived from a stock solution of aqueous $Mg(HCO_3)_2$.

To demonstrate this derivation at a small scale, a representative stock solution may first be prepared. This stock solution represents the stock solution that might be generated in the Separation Stage of a full implementation of the General Method. For this example, a representative aqueous $Mg(HCO_3)_2$ stock solution with a concentration of approximately 0.25 mol $kg^{-1}$ Mg (aq) may be prepared and chilled to 2° C.

The chilled stock solution may then be subjected to $N_2$ bubbling at a flow rate of 4 $scfh_{air}$. The resulting precipitation may cause $CO_2$ process gas to be emitted. In a full implementation of the General Method, $CO_2$ process gas released during precipitation may be conserved using conventional techniques.

After 67 minutes, $N_2$ bubbling may be discontinued. The crystals formed may be allowed to stir for an additional 50 minutes after discontinuation of $N_2$ bubbling, and the mixture may then be filtered to separate the solids from the mother liquor. The solids may be rinsed with 5° C. deionized water. In a full implementation of the General Method, the separated mother liquor may be conserved for reuse.

Figure 18:
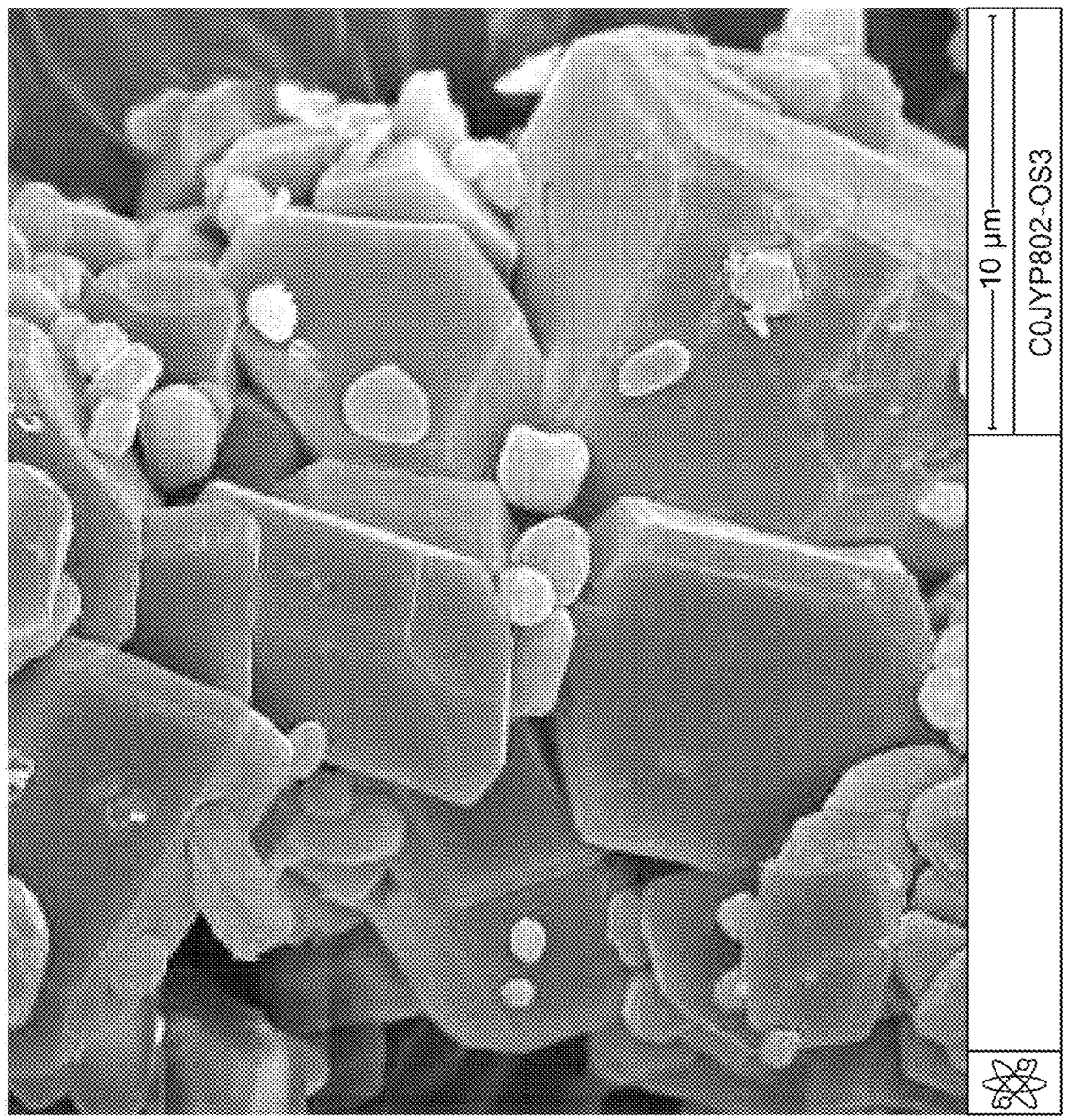
FIG. 18 is an SEM micrograph of template precursor particles ($L_1$) comprising lansfordite particles with equiaxed superstructures derived from an aqueous $Mg(HCO_3)_2$ stock solution.

Lansfordite template precursor particles of the type generated by this procedure are identified herein as $L_1$ and may be seen in the representative SEM micrograph FIG. 18. The template precursor particles have the prismatic, equiaxed morphology typical of lansfordite, and the TGA mass loss of these particles is 76.4%, which is in good agreement with the expected lansfordite mass loss of 76.9%. as seen in FIG. 75. The prismatic, equiaxed morphology may be desirable for applications in which perimorphic products must be integrated with liquids and viscosity effects must be minimized. Additionally, due to lansfordite's relatively high state of hydration, more template precursor volume is generated for a given mass of Mg than is obtainable with less hydrated $MgCO_3 \cdot xH_2O$, and more template pore volume may be obtained upon decomposition of the precursor material. This can be used to create perimorphic frameworks with more exocellular space.

Raman spectroscopy may be used to characterize the chemical composition of the template precursor materials. Applying this Raman spectroscopy method results in a match of peak positions consistent with lansfordite at 1083 $cm^{-1}$, as seen in FIG. 75.

Example $L_2$: In another exemplary Precursor Stage procedure, an equiaxed lansfordite ($MgCO_3 \cdot 5H_2O$) template precursor material may derived from a stock solution of aqueous $Mg(HCO_3)_2$.

To demonstrate this derivation at a small scale, a representative stock solution may first be prepared. This stock solution represents the stock solution that might be generated in the Separation Stage of a full implementation of the General Method. For this example, a representative stock solution may be obtained as follows. First, an aqueous mixture of precipitated nesquehonite may be obtained using the procedure described in Example $N_1$. The concentration of this mixture may be adjusted to 0.62 mol $kg^{-1}$ Mg. The mixture may then be added to a high-pressure baffled reactor outfitted with a gas inducing impeller. The system may be stirred at 700 RPM and cooled to 5° C. while injecting $CO_2$ process gas into the reactor's headspace up to a pressure of 850 psi, or until all solids have been dissolved, resulting in the representative, pressurized stock solution.

Upon depressurizing the stock solution to atmospheric pressure, the stirring rate may be reduced to 500 RPM and the solution may be maintained at 12° C. while air is flowed through the headspace. The resulting precipitation of lansfordite particles may cause $CO_2$ process gas to be emitted. In a full implementation of the General Method, $CO_2$ process gas released during precipitation may be conserved using conventional techniques.

After 228 minutes, the mixture of lansfordite particles may be discharged from the reactor and then filtered to separate the lansfordite solids from the mother liquor. In a full implementation of the General Method, the separated mother liquor may be conserved for reuse. For analytical purposes, the lansfordite solids may be rinsed with deionized water, re-suspended in ethanol, filtered again, and dried in a vacuum oven up to 29 inHg at room temperature.

Lansfordite template precursor particles of the type generated by this procedure are identified herein as $L_2$. Raman spectral analysis confirms that the product of this reaction matches that of lansfordite, as seen in FIG. 75.

Compared to other equiaxed $MgCO_3 \cdot xH_2O$-type precursors (e.g. magnesite), lansfordite may be significantly more industrially scalable and less costly. The prismatic, equiaxed morphology may be desirable for applications in which perimorphic products must be integrated with liquids and viscosity effects must be minimized. Additionally, due to lansfordite's relatively high state of hydration, more template precursor volume is generated for a given mass of Mg than is obtainable with less hydrated $MgCO_3 \cdot xH_2O$, and more template pore volume may be obtained upon decomposition of the precursor material. This can be used to create perimorphic frameworks with more exocellular space.

Example $L_3$: In another exemplary Precursor Stage procedure, an equiaxed, partially dehydrated template lansfordite ($MgCO_3 \cdot 5H_2O$) template precursor material may be derived from a stock solution of aqueous $Mg(HCO_3)_2$.

To demonstrate this derivation at small scale, an aqueous lansfordite mixture may first be derived from a representative aqueous $Mg(HCO_3)_2$ stock solution. This stock solution represents the stock solution that might be generated during the Separation Stage of a full implementation of the General Method. For this example, a representative stock solution and aqueous lansfordite mixture may be obtained using the procedure described in Example $L_2$. As described in Example $L_2$, the precipitation of lansfordite particles may cause $CO_2$ process gas to be emitted. In a full implementation of the General Method, $CO_2$ process gas released during precipitation may be conserved using conventional techniques.

The concentration of the lansfordite mixture may be adjusted to a 7 wt % concentration of solids. The mixture may then be spray-dried, causing a partial dehydration of the lansfordite material. To demonstrate this at small scale, a Sinoped LPG-5 spray dryer may be used for spray-drying. The lansfordite particles in the 7 wt % mixture may kept continuously suspended via stirring in a vessel. The mixture may be pumped from the vessel at a rate ranging between 116 mL/min and 162 mL/min into the spray dryer's BETE XAER250 air atomizing nozzle. Compressed air may also be delivered into the nozzle at a flow rate ranging between 1.2 $scfm_{air}$ at 20 psig and 3.6 $scfm_{air}$ at 59 psig. The inlet temperature of the spray dryer may be set to 300° C., producing an outlet temperature ranging between 111° C. and 123° C.

The dry, partially dehydrated lansfordite particles may be collected by a cyclonic particle separator. In a full implementation of the General Method, the process water vapor generated by spray-drying may be conserved using conventional techniques.

The partially dehydrated lansfordite template precursor particles of the type generated by this procedure are identified herein as $L_3$. Process liquids and gases may be recovered through typical industrial methods for reuse in Separation Stage.

The TGA mass loss of 67.1% for an $L_3$ template precursor material generated according to the procedure described above confirms that partial dehydration occurred (the theoretical mass loss for lansfordite is 76.9%, as shown in FIG. 75). This partial dehydration is due to the elevated temperatures experienced during the spray drying process.

Example $M_1$: In another exemplary Precursor Stage procedure, an equiaxed magnesite ($MgCO_3$) template precursor material may be derived from a stock solution of aqueous $Mg(HCO_3)_2$.

To demonstrate this derivation at a small scale, a representative stock solution may first be prepared. This stock solution represents the stock solution that might be generated in the Separation Stage of a full implementation of the General Method. For this example, a representative aqueous $Mg(HCO_3)_2$ stock solution with a concentration of 0.25 mol $kg^{-1}$ Mg (aq) may be prepared. This stock solution may then be slurried with additional MgO to provide more Mg ions. In a full implementation of the General Method, $MgCO_3 \cdot xH_2O$ precipitated from a stock solution might be utilized to provide more Mg ions. However, for the purpose of this demonstration, the additional MgO may comprise a commercial MgO product (Elastomag 170) that has been calcined at 1050° C. for 1 hour. With this additional loading of Mg ions, the total Mg present in the stock solution-mixture may be 1.5 mol $kg^{-1}$ Mg.

Next, this stock solution-mixture may be placed in a pressure vessel with magnetic stirring, a high-pressure gas inlet, and a purging needle valve. $CO_2$ may be flowed for 2 minutes to purge the vessel of air, after which it may be fully sealed and pressurized with $CO_2$ to 725 psi at 14.4° C. The vessel may be heated on a heating stir plate. Under magnetic stirring and heating, after 291 minutes, the vessel may reach 193.7° C. and 975 psi. Inside the vessel, magnesite is precipitated During this thermal treatment, and $CO_2$ process gas may be emitted into the vessel's headspace. The vessel may then be depressurized and allowed to cool over the course of 30 minutes, releasing steam and $CO_2$ continuously. In a full implementation of the General Method, the $CO_2$ process gas released during precipitation and subsequent depressurization may be conserved using conventional techniques.

The mixture of magnesite particles may then be discharged from the vessel and then filtered to separate the magnesite solids from the mother liquor. In a full implementation of the General Method, the separated mother liquor may be conserved for reuse in the Separation Stage. The magnesite may be dried at 100° C.

Figure 19:
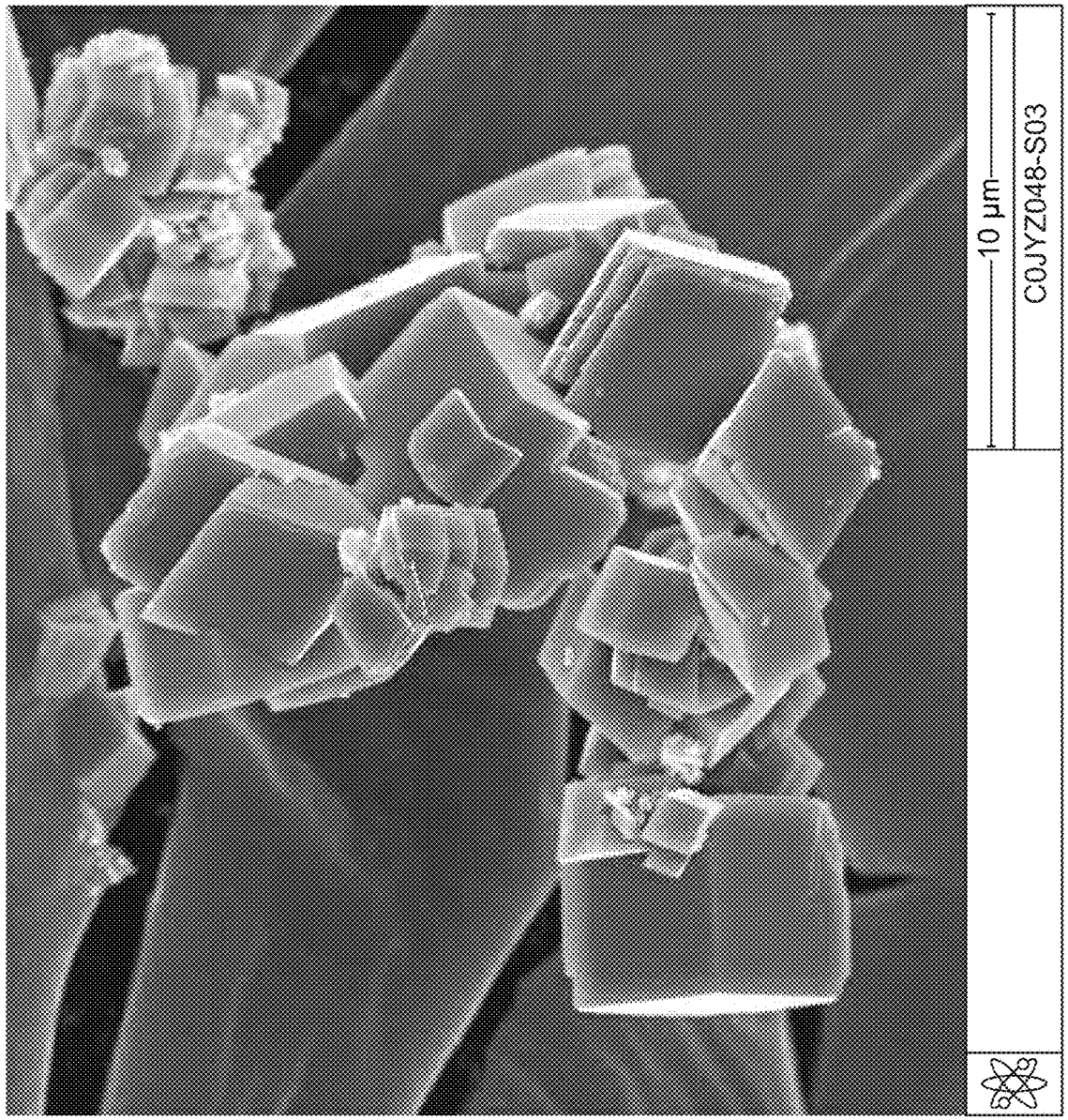
FIG. 19 is an SEM micrograph of template precursor particles ($M_1$) comprising magnesite particles with equiaxed superstructures.

The magnesite template precursor material of the type generated by this procedure are identified herein as $M_1$. The particles display an equiaxed rhombohedral morphology and are shown in the SEM micrograph in FIG. 19. Thermogravimetric analysis of the sample may demonstrate a magnesite composition due to the lack of any thermal decomposition prior to the decarboxylation stage occurring of 400° C. The TGA mass loss of these particles is 52.2% which matches the expected magnesite mass loss of 52.2% as seen in FIG. 75. Raman spectral analysis also confirms that the particles are magnesite, as seen in FIG. 75. This experiment demonstrates production of equiaxed magnesite template precursor particles utilizing a $Mg(HCO_3)_2$ stock solution enriched with an additional $Mg^{2+}$ and $HCO_3^-$ ions via MgO and $CO_2$ gas, respectively.

Example $M_2$: In another exemplary Precursor Stage procedure, an equiaxed magnesite ($MgCO_3$) template precursor material may be derived from a stock solution of aqueous $Mg(HCO_3)_2$.

To demonstrate this derivation at a small scale, nesquehonite may be generated from a stock solution of aqueous $Mg(HCO_3)_2$ using the procedure described in Example $N_1$. This precipitation may cause $CO_2$ process gas to be emitted. In a full implementation of the General Method, the $CO_2$ process gas released during precipitation may be conserved using conventional techniques. Likewise, the separated mother liquor may be conserved in a full implementation of the General Method.

In this exemplary procedure, the nesquehonite may then be combined with water to make a mixture with a concentration of 1.5 mol $kg^{-1}$ Mg. The mixture may be placed in a pressure vessel with magnetic stirring, a high-pressure gas inlet, and a purging needle valve. The headspace of the pressure vessel may contain ambient pressure air, with no additional gas input. The pressure vessel may then be sealed.

The mixture may be magnetically stirred in the vessel for 10 minutes. Then, the vessel may be heated to 175° C. over 68 minutes. The reaction temperature may fluctuate During this thermal treatment, reaching a maximum temperature of 180° C. and a maximum pressure of 1190 psi, at which condition any $CO_2$ liberated from nesquehonite in the reaction may be rendered supercritical. The pressure vessel may be then be allowed to cool for 199 minutes.

The resulting mixture of magnesite particles may be discharged from the vessel and then filtered to separate the magnesite solids from the mother liquor. In a full implementation of the General Method, the separated mother liquor may be conserved for reuse in the Separation Stage. The magnesite may be dried at 100° C.

Figure 20:
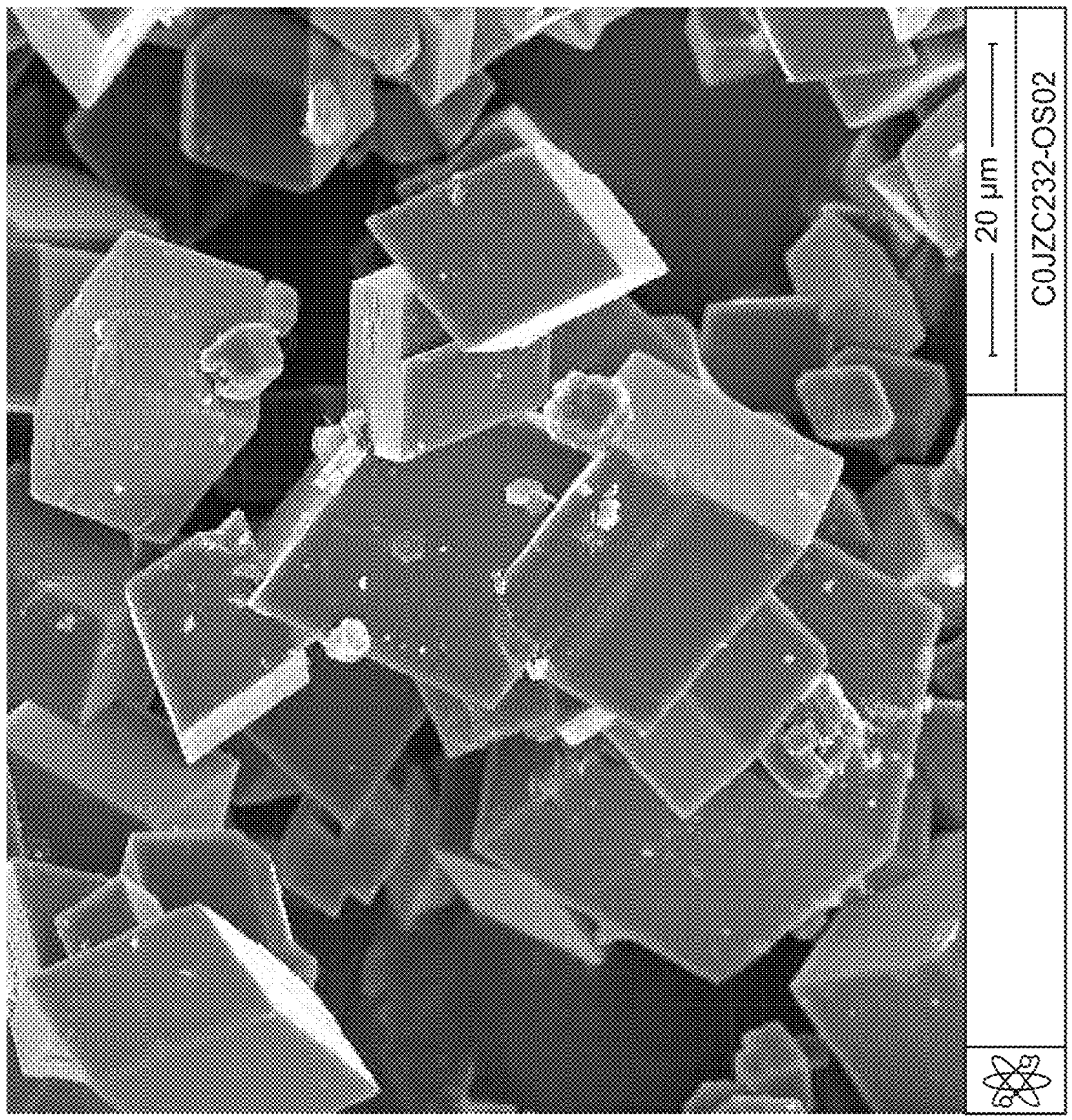
FIG. 20 is an SEM micrograph of template precursor particles ($M_2$) comprising magnesite particles with equiaxed superstructures.

The magnesite template precursor material of the type generated by this procedure are identified herein as $M_2$. The particles display an equiaxed rhombohedral morphology and are shown in the SEM micrograph in FIG. 20. Raman spectral analysis confirms that the product of this reaction matches that of magnesite, as shown in FIG. 75.

Example $A_1$: In another exemplary Precursor Stage procedure, a hollow non-crystalline $MgCO_3 \cdot xH_2O$ template precursor material may be derived from a stock solution of aqueous $Mg(HCO_3)_2$.

To demonstrate this derivation at a small scale, a representative stock solution may first be prepared. This stock solution represents the stock solution that might be generated in the Separation Stage of a full implementation of the General Method. For this example, a representative aqueous $Mg(HCO_3)_2$ stock solution with a concentration of 0.43 mol $kg^{-1}$ Mg (aq) may be prepared. This may be done by mixing a commercial $MgCO_3 \cdot xH_2O$ product ("Light Magnesium Carbonate" supplied by Akrochem Corporation) in water at a solids concentration equivalent to 0.43 mol $kg^{-1}$ Mg. This mixture may be carbonated using pressurized $CO_2$ gas in a circulated pressure vessel. The system may be pressurized by injecting $CO_2$ gas into the vessel to a total pressure of 555 psi. This may be maintained for 2 hours and 13 minutes at 34° C. or until all solids are dissolved. At this point, the vessel may be depressurized and stored under atmospheric pressure at 4° C.

The chilled stock solution may then be spray-dried. To demonstrate this, the stock solution may be pumped at a rate of 35 mL/min through a BETE XAER150 air atomizing nozzle of a Sinoped LPG-5 spray dryer. Compressed air may be delivered into the nozzle at a flow rate of 2.8 $scfm_{air}$ at 45 psig. The inlet temperature of the spray dryer may be set to 165° C., resulting in an outlet temperature of 110° C.

The particles resulting from spray-drying the stock solution may be collected by a cyclonic particle separator. In a full implementation of the General Method, both the process water vapor and the $CO_2$ process gas emitted by spray-drying may be conserved using conventional techniques.

Figure 21:
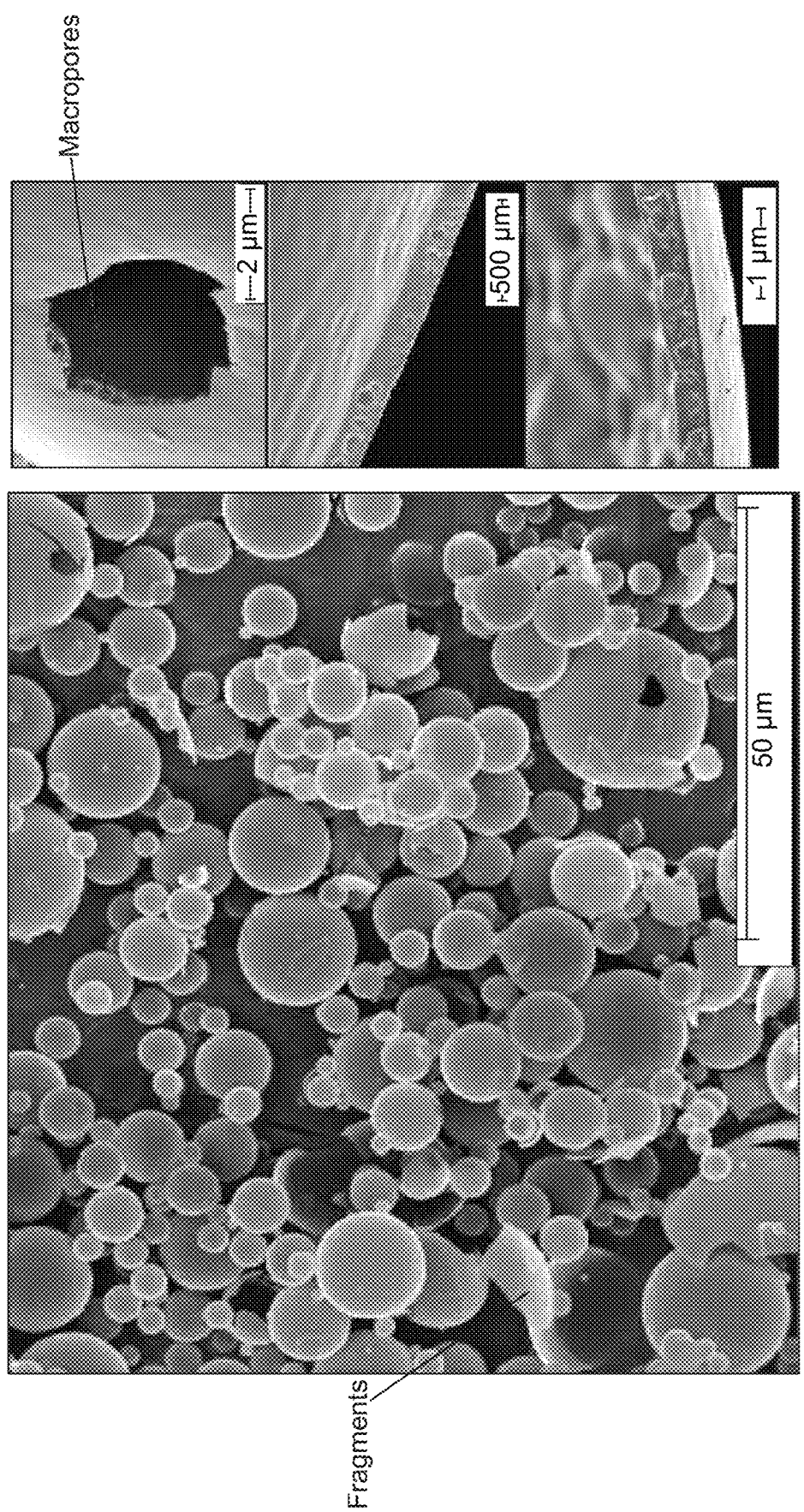
FIG. 21 includes SEM micrographs of template precursor particles ($A_1$) comprising non-crystalline magnesium carbonate particles with hollow, hierarchical-equiaxed superstructures derived from an aqueous $Mg(HCO_3)_2$ stock solution. Some particles comprise thin fragments of hollow, spherical shells.

The type of $MgCO_3 \cdot xH_2O$ template precursor material resulting from this process is identified herein as $A_1$. SEM image analysis of $A_1$ particles, as shown in the SEM micrographs in FIG. 21, reveals that the non-crystalline $MgCO_3 \cdot xH_2O$ particles produced by spray-drying comprise generally hollow, hierarchical-equiaxed particles with smooth outer surfaces. There are also fragments of shells. The shell fragments show there are macropores present within the shell.

Raman spectral analysis showed that the product of this reaction does have a Raman peak that may be associated with crystalline carbonate, located at 1106 $cm^{-1}$. However, it does not match with any of the typical $MgCO_3 \cdot xH_2O$ peaks (FIG. 75). Additionally, TGA analysis of the template precursor fails to match with the common crystalline forms of $MgCO_3 \cdot xH_2O$ with a mass loss of 66.3%, as seen in FIG. 75. Therefore, it is deemed non-crystalline.

Example $A_2$: In another exemplary Precursor Stage procedure, a hollow, hierarchical-equiaxed, non-crystalline $MgCO_3 \cdot xH_2O$ template precursor material may be derived from a stock solution of aqueous $Mg(HCO_3)_2$.

To demonstrate this derivation at a small scale, a representative stock solution may first be prepared. This stock solution represents the stock solution that might be generated in the Separation Stage of a full implementation of the General Method. For this example, a representative aqueous $Mg(HCO_3)_2$ stock solution with a concentration of 1.39 mol $kg^{-1}$ Mg (aq) may be prepared. This may be done by mixing a commercial $Mg(OH)_2$ product ("Versamag" supplied by Akrochem Corporation) in water at a solids concentration equivalent to 1.49 mol $kg^{-1}$ Mg. This mixture may be carbonated using pressurized $CO_2$ gas in a circulated pressure vessel. The system may be pressurized by injecting $CO_2$ gas into the vessel to a total pressure between 700-800 psig. This may be maintained for 2 hours at 10° C. or until substantially all (i.e. >90%) solids are dissolved. At this point, the contents may be depressurized and stored under atmospheric pressure between 4-10° C.

The stock solution may then be spray-dried. To demonstrate this, the stock solution may be pumped at a rate of 2.7 mL/min through a 0.7 mm Buchi B-290 two fluid air atomizing nozzle in a Buchi B-191 spray drying system. Compressed air may be delivered into the nozzle at a flow rate of 0.6 $scfm_{air}$ at 88 psig. The inlet temperature of the spray dryer may be set to 130° C., resulting in an outlet temperature between 85-89° C. The aspirator may be set to 18 sc luau.

The particles resulting from spray-drying the stock solution may be collected by a cyclonic particle separator. In a full implementation of the General Method, both the process water vapor and the $CO_2$ process gas emitted by spray-drying may be conserved using conventional techniques.

Figure 22A:
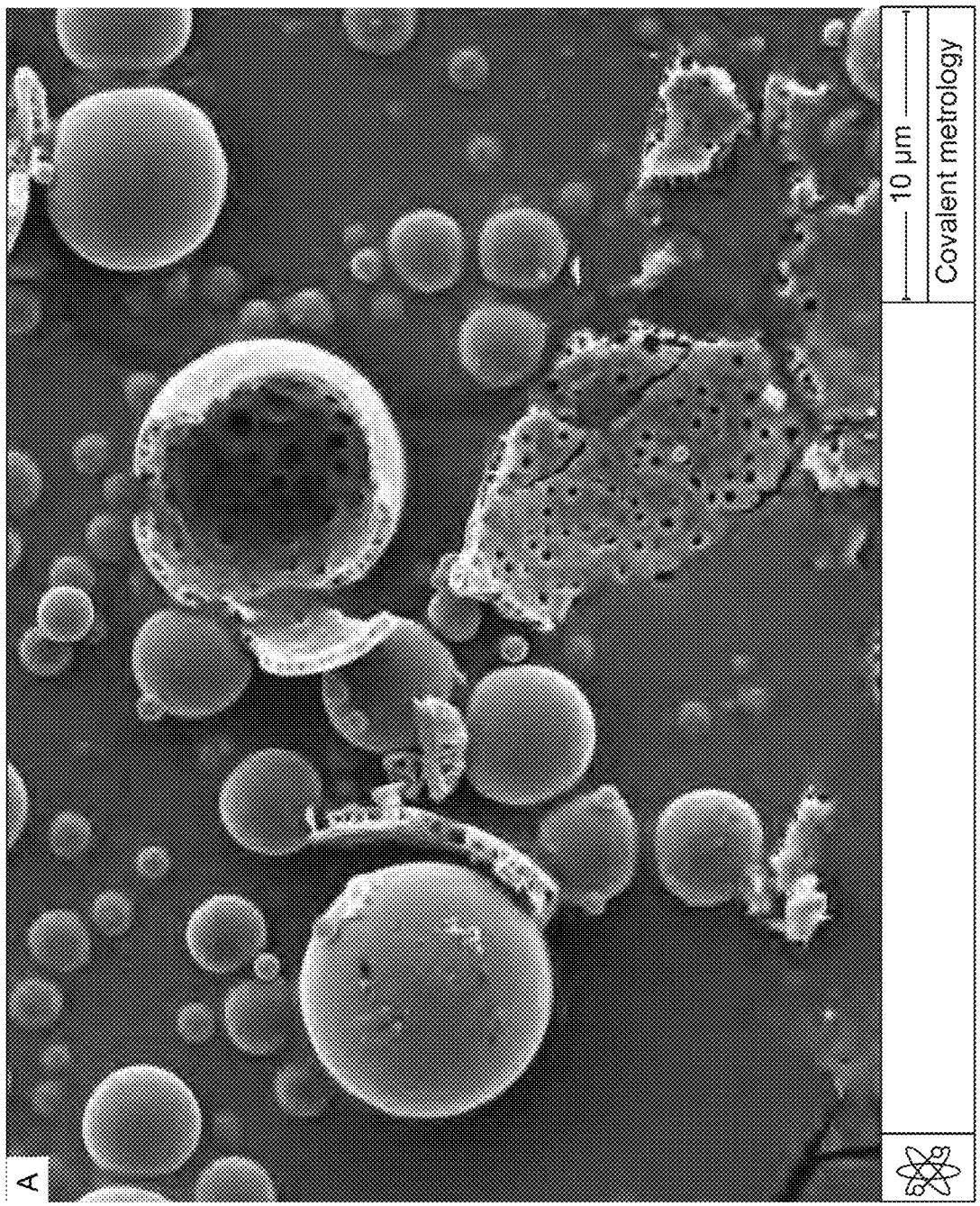
FIG. 22A is an SEM micrograph of $A_2$-type template precursor particles with a hollow, hierarchical-equiaxed superstructure.
Figure 22B:
FIG. 22B is a higher-magnification SEM micrograph of an $A_2$-type template precursor particle.

The type of $MgCO_3 \cdot xH_2O$ template precursor material resulting from this process is identified herein as $A_2$. SEM image analysis of $A_2$ particles, as shown in the SEM micrographs in FIGS. 22A-22B, reveals that the non-crystalline $MgCO_3 \cdot xH_2O$ particles produced by spray-drying comprise generally hollow, hierarchical-equiaxed particles with smooth outer surfaces. There are also fragments of shells. The shell fragments show that, in addition to the central cavity, the shells also have a closed-cell, macroporous structure. Compared to the shells of the $A_1$ particles, the shells of the $A_2$ particles are thicker due to their increased shell porosity. The spheres are also smaller, with 95% or more of the population possessing a diameter of less than 10 jun.

Raman spectral analysis showed that the $MgCO_3 \cdot xH_2O$ spheres have no distinct Raman peak that may be associated with crystalline carbonate. Additionally, TGA analysis of the template precursor fails to match with the common crystalline forms of $MgCO_3 \cdot xH_2O$ with a mass loss of 68.4%, as seen in FIG. Therefore, it is deemed non-crystalline.

Example $A_3$: In another exemplary Precursor Stage procedure, a hollow, hierarchical-equiaxed, non-crystalline $MgCO_3 \cdot xH_2O$ template precursor material may be derived from a stock solution of aqueous $Mg(HCO_3)_2$.

To demonstrate this derivation at a small scale, a representative stock solution may first be prepared. This stock solution represents the stock solution that might be generated in the Separation Stage of a full implementation of the General Method. For this example, a representative aqueous $Mg(HCO_3)_2$ stock solution with a concentration of 1.08 mol $kg^{-1}$ Mg (aq) may be prepared. This may be done by mixing a commercial $Mg(OH)_2$ product ("Versamag" supplied by Akrochem Corporation) in water at a solids concentration equivalent to 1.12 mol $kg^{-1}$ Mg. This mixture may be carbonated using pressurized $CO_2$ gas in a circulated pressure vessel. The system may be pressurized by injecting $CO_2$ gas into the vessel to a total pressure between 700-800 psig. This may be maintained for 2 hours at 10° C. or until substantially all solids (i.e. >90%) are dissolved. At this point, the contents may be depressurized and stored under atmospheric pressure between 4-10° C.

The stock solution may then be spray-dried. To demonstrate this, the stock solution may be pumped at a rate of 2.7 mL/min through a 0.7 mm Buchi B-290 two fluid air atomizing nozzle in a Buchi B-191 spray drying system. Compressed air may be delivered into the nozzle at a flow rate of 0.6 $scfm_{air}$ at 88 psig. The inlet temperature of the spray dryer may be set to 90° C., resulting in an outlet temperature between 56-58° C. The aspirator may be set to 18 $scfm_{air}$.

The particles resulting from spray-drying the stock solution may be collected by a cyclonic particle separator. In a full implementation of the General Method, both the process water vapor and the $CO_2$ process gas emitted by spray-drying may be conserved using conventional techniques.

Figure 22C:
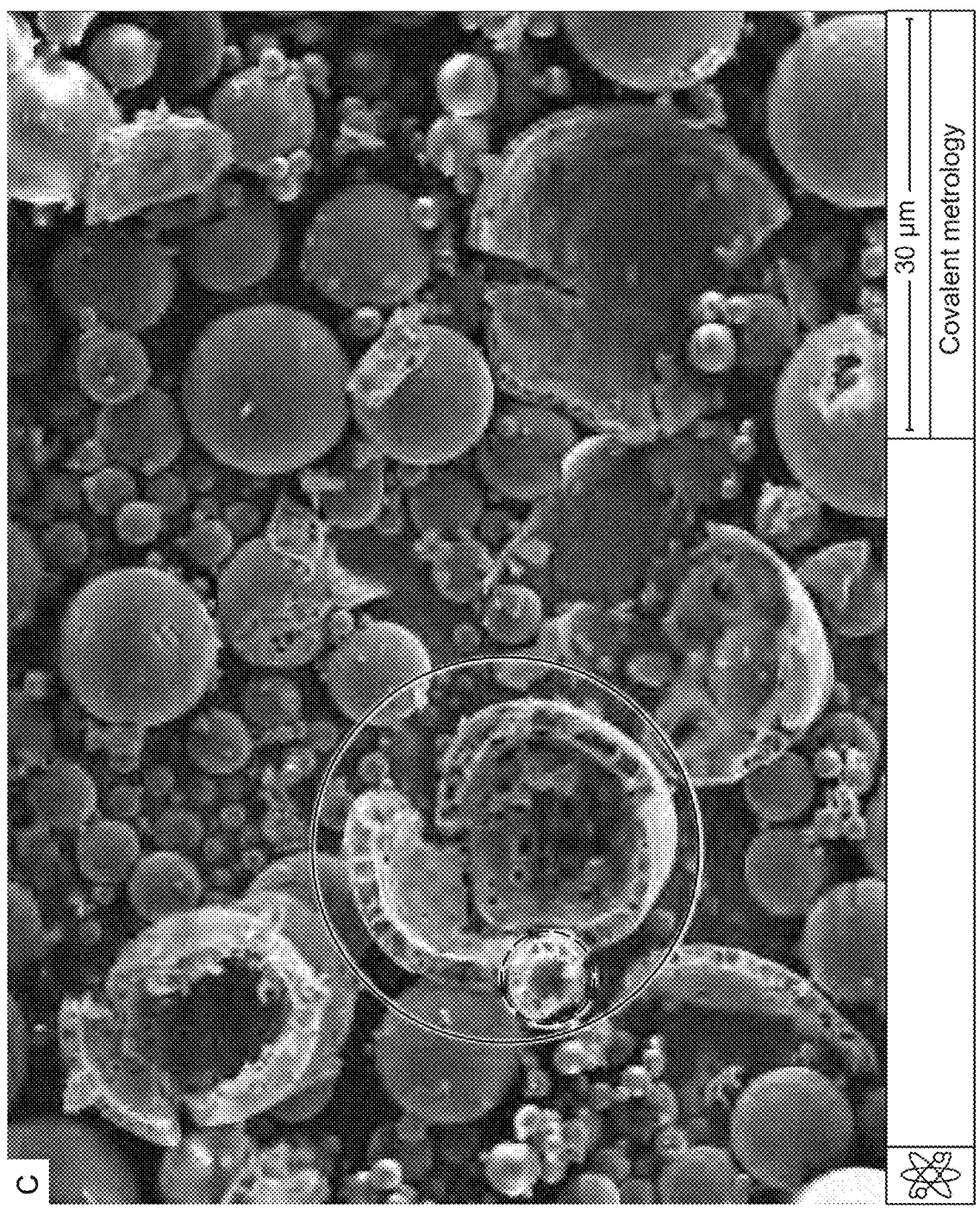
FIG. 22C is an SEM micrograph of $A_3$-type template precursor particles with a hollow, hierarchical-equiaxed superstructure.
Figure 22D:
FIG. 22D is a TEM micrograph of carbon perimorphic frameworks synthesized on templates derived from $A_2$-type template precursor particles.

The type of $MgCO_3 \cdot xH_2O$ template precursor material resulting from this process is identified herein as $A_3$. SEM image analysis of $A_3$ particles, as shown in the SEM micrographs in FIGS. 22C-22D, reveals that the non-crystalline $MgCO_3 \cdot xH_2O$ particles produced by spray-drying comprise generally hollow, hierarchical-equiaxed particles with smooth outer surfaces. There are also fragments of shells. The shell fragments show that, in addition to the central cavity, the shells also have a closed-cell, macroporous structure. Compared to the shells of the $A_1$ and $A_2$ particles, the $A_3$ are thicker due to their increased shell porosity. Their average aspect ratio, representing the ratio of the particle radius to the shell thickness, is also lower. In FIG. 22C, the particle circled with the solid line has an aspect ratio of approximately 5:1, whereas the particle circled with the dashed line has an aspect ratio of approximately 2:1.

Figure 22E:
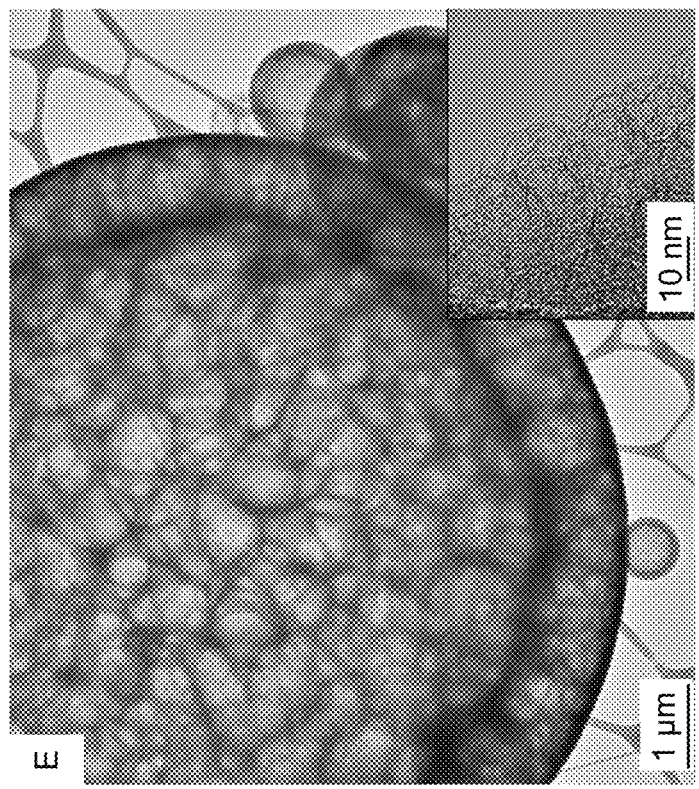
FIG. 22E is a TEM micrograph of carbon perimorphic frameworks synthesized on templates derived from $A_2$-type template precursor particles. The magnified inset of FIG. 22E shows the cellular substructure.

The macropores are located throughout the shell, which can be seen in the carbon perimorphic frameworks grown on them. FIG. 22E is a TEM image of carbon perimorphic frameworks grown on templates derived from $A_3$ particles. The mottled appearance of the shell, corresponding to its porosity, extends throughout the shell. The shell's macropores are sandwiched between two skins—an outer and an inner skin, which represent the inner and outer surfaces of the shells. These skins appear darker in TEM. The macroporous shell is part of the perimorphic superstructure; the cellular substructure is much finer, as shown in the inset of FIG. 22E, a TEM micrograph showing the mesoporous cellular substructure.

Raman spectral analysis showed that the $MgCO_3 \cdot xH_2O$ spheres have no distinct Raman peak that may be associated with crystalline carbonate. Additionally, TGA analysis of the template precursor fails to match with the common crystalline forms of $MgCO_3 \cdot xH_2O$ with a mass loss of 72.9%, as seen in FIG. 75. Therefore, it is deemed non-crystalline.

Example $C_1$: In another exemplary Precursor Stage procedure, a hollow, hierarchical-equiaxed magnesium citrate template precursor material may be derived from a stock solution of aqueous magnesium citrate.

To demonstrate this derivation at a small scale, a representative stock solution may first be prepared. This stock solution represents the stock solution that might be generated in the Separation Stage of a full implementation of the General Method. For this example, a representative aqueous magnesium citrate stock solution with a concentration of 0.52 mol $kg^{-1}$ Mg (aq) may be prepared by reacting citric acid (supplied by Sigma Aldrich) with a 0.52 mol kg' aqueous mixture of $Mg(OH)_2$ (Versamag, supplied by Akrochem).

The stock solution may then be spray-dried. To demonstrate this, the stock solution may be pumped at a rate of 3.75 mL/min through a Buchi B-290 two-fluid nozzle of a Buchi B-191 spray dryer. Compressed air may be delivered into the nozzle at a flow rate of 0.6 $scfm_{air}$ at 88 psig with the aspirator airflow set to 18 $scfm_{air}$. The inlet temperature may be set to 220° C., resulting in an outlet temperature of 110° C.

The particles resulting from spray-drying the stock solution may be collected by a cyclonic particle separator. In a full implementation of the General Method, the process water vapor emitted by spray-drying may be conserved using conventional techniques.

Figure 23:
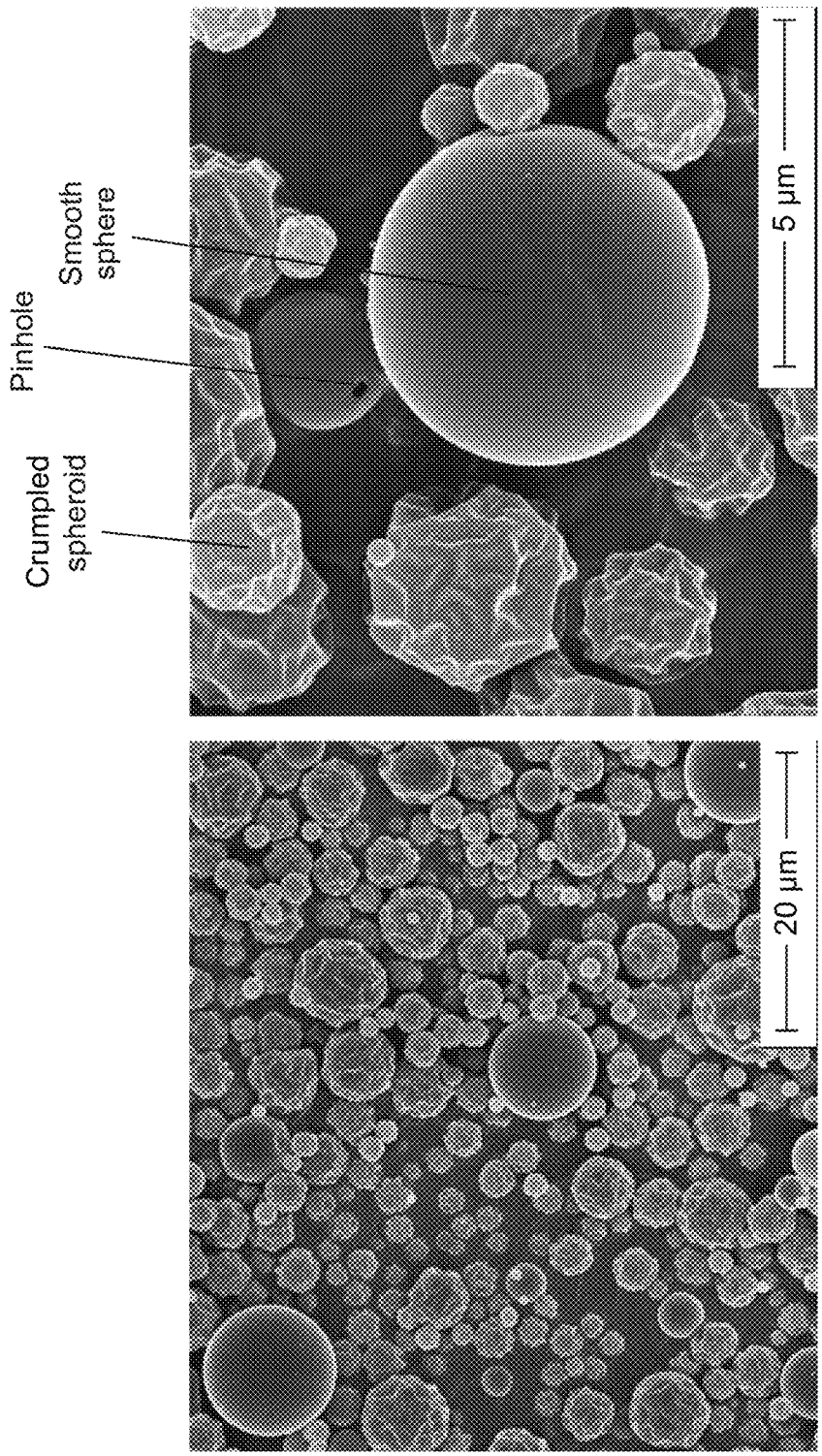
FIG. 23 includes SEM micrographs of template precursor particles ($C_1$) comprising magnesium citrate particles with hollow, hierarchical-equiaxed superstructures derived from a stock solution of aqueous magnesium citrate.

The type of magnesium citrate template precursor material resulting from this process is identified herein as $C_1$. SEM analysis of $C_1$ particles, as shown in the SEM micrographs in FIG. 23, reveals that the magnesium citrate particles produced by spray-drying comprise generally hollow, hierarchical-equiaxed particles. A majority comprise a solid shell and a hollow interior, with a crumpled, spherical superstructure, as seen in FIG. 23. Some particles comprise smooth, un-crumpled spherical superstructures; these particles may possess thicker, more rigid shells than the crumpled particles. The spray-dried magnesium citrate precursor particles are rarely fragmented or broken, although pinholes can be found, as indicated in FIG. 23.

Raman spectral analysis confirms that the product of this reaction matches that of magnesium citrate, as shown in FIG. 75.

Example $E_1$: In another exemplary Precursor Stage procedure, an elongated template precursor material of epsomite (magnesium sulfate heptahydrate, $MgSO_4 \cdot 7H_2O$) may be derived from an aqueous stock solution of magnesium sulfate.

To demonstrate this derivation at a small scale, a representative stock solution may first be prepared. This stock solution represents the stock solution that might be generated in the Separation Stage of a full implementation of the General Method. For this example, a representative aqueous magnesium sulfate stock solution with a concentration of 4.06 mol $kg^{-1}$ Mg (aq) may be prepared by dissolving epsomite in water at room temperature. This may be done in a glass beaker magnetically stirred at 700 RPM.

Once dissolved, 410.86 g of acetone may be added dropwise by a separatory funnel, which may result in immediate crystal formation in the solution. While this represents an antisolvent precipitation, which is generally undesirable, solventless precipitation of epsomite could easily be accomplished by chilling or spray-drying the stock solution. Moreso than demonstrating an engineered precursor morphology or demonstrating scalable procedure, the purpose of the Example $E_1$ procedure was moreso just to precipitate epsomite, so that the template materials and perimorphic materials derived from an epsomite precursor compound might be demonstrated and analyzed in subsequent sections of the current disclosure. In a full implementation of the General Method, the mother liquor separated after a solventless precipitation may be conserved for reuse in the Separation Stage.

After 22 minutes, the precipitation of the epsomite may be complete. The resulting mixture may be collected and filtered. The particles may be dried.

Figure 24:
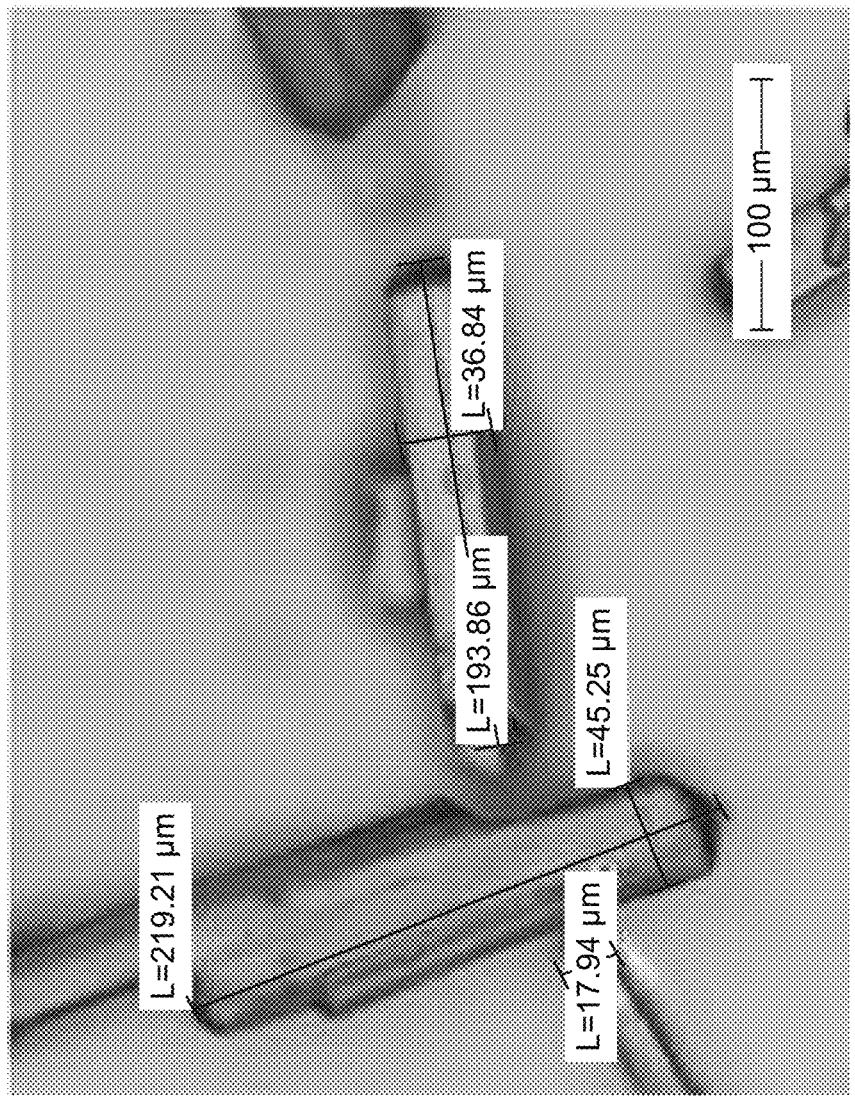
FIG. 24 is an optical micrograph of template precursor particles ($E_1$) comprising epsomite (magnesium sulfate heptahydrate) particles with elongated superstructures derived from a stock solution of aqueous magnesium sulfate.

The type of epsomite template precursor material resulting from this process is identified herein as $E_1$. The particles may be observed via optical microscope as elongated rods with hexagonal cross sections, as shown in FIG. 24.

Raman spectral analysis confirms that the product of this reaction matches that of epsomite, as seen in FIG. 75.

Example $H_4$: In another exemplary Precursor Stage procedure, a Li-doped hydromagnesite ($Mg_5(CO_3)_4$ $(OH)_2 \cdot 4H_2O$) template precursor material may be derived from an aqueous stock solution of $Mg(HCO_3)_2$ that also contains a small concentration of aqueous $Li_2CO_3$.

To demonstrate this derivation at a small scale, a representative stock solution may first be prepared. This stock solution represents the stock solution that might be generated in the Separation Stage of a full implementation of the General Method. For this example, a representative aqueous $Mg(HCO_3)_2$ stock solution may be prepared, with the additional step of adding lithium carbonate ($Li_2CO_3$). This may be done as follows. First, an MgO powder (Akrochem Elastomag 170 calcined at 1050° C. for 1 hour) may be slurried into water at a solids concentration of 0.23 mol $kg^{-1}$ Mg (s). This may be done in a glass beaker with magnetic stirring. To this mixture, $Li_2CO_3$ (Sigma Aldrich) may be added at a solids concentration of $2.71 \cdot 10^{-3}$ mol $kg^{-1}$ Li (s). The mixture may be carbonated with a sparge tube bubbling $CO_2$ gas to generate aqueous $H_2CO_3$. The $CO_2$ flow may be discontinued after the MgO and $Li_2CO_3$ are completely dissolved. The $Mg(HCO_3)_2$ stock solution may then be filtered to remove any residual undissolved impurities.

Next, the stock solution may be heated to 100° C. in an uncovered glass beaker with magnetic stirring. This condition may be maintained for 2 hours, during which hydromagnesite particles may be precipitated. After 2 hours, the resulting mixture may be filtered, and the solid hydromagnesite may be dried in a forced air circulation at 100° C.

Figure 25A:
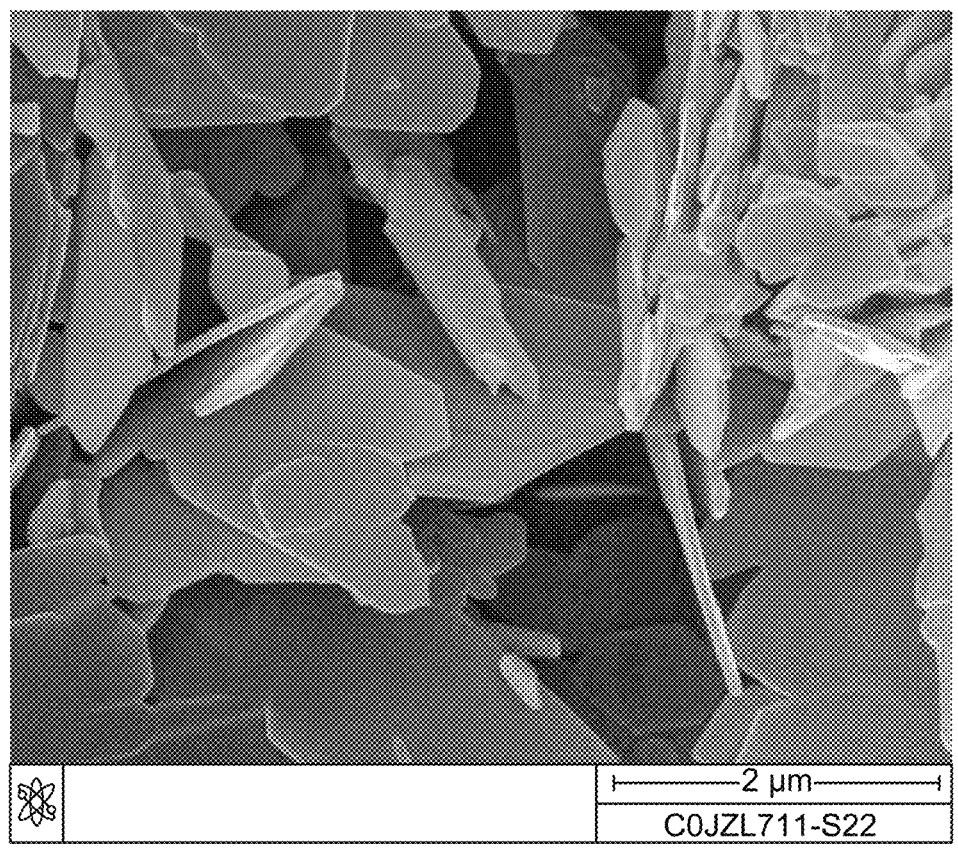
FIG. 25A is an includes SEM micrograph of template precursor particles ($H_4$) comprising hydromagnesite particles derived from an aqueous $Mg(HCO_3)_2$ stock solution with dissolved lithium carbonate present at a concentration of $2.71 \cdot 10^{-3}$ mol kg$^{-1}$ Li.
Figure 25B:
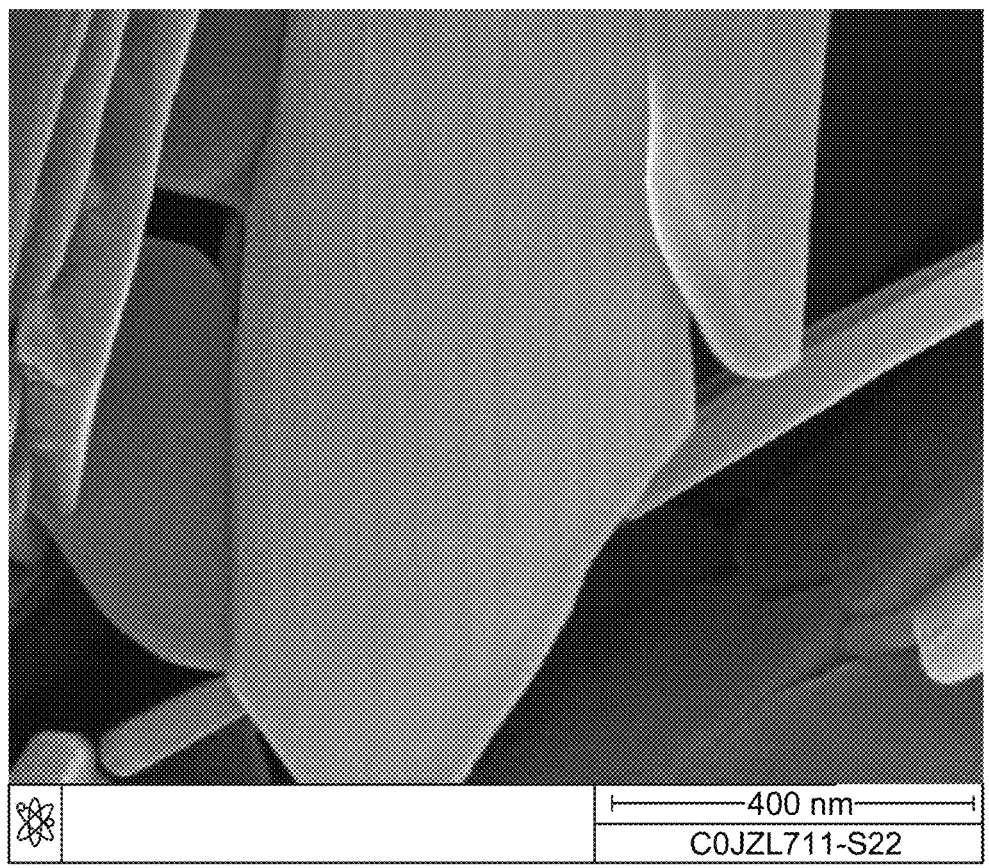
FIG. 25B is an SEM micrograph of the $H_4$-type template precursor particles at higher magnification.

The type of Li-doped hydromagnesite template precursor material resulting from this process is identified herein as $H_4$. The particles are shown in the SEM micrographs of FIGS. 25A-25B. Their plates are thin (<100 nm along their minor axis) and flat, with smooth surfaces.

Example $H_5$: In an exemplary Precursor Stage procedure, a Li-doped hydromagnesite ($Mg_5(CO3)_4(OH)_2 \cdot 4H_2O$) template precursor material may be derived from an aqueous stock solution of $Mg(HCO_3)_2$ that also contains a moderate concentration of $Li_2CO_3$.

To demonstrate this derivation at a small scale, a representative stock solution may first be prepared. This stock solution represents the stock solution that might be generated in the Separation Stage of a full implementation of the General Method. For this example, a representative aqueous Mg(HCO$_3$)$_2$ stock solution may be prepared, with the additional step of adding lithium carbonate (Li$_2$CO$_3$). This may be done as follows.

First, an MgO powder (Akrochem Elastomag 170 calcined at 1050° C. for 1 hour) may be slurried into water at a solids concentration of 0.23 mol kg$^{-1}$ Mg (s). This may be done in a glass beaker with magnetic stirring. To this mixture, Li$_2$CO$_3$ (Sigma Aldrich) may be added at a solids concentration of 2.74·10$^{-2}$ mol kg$^{-1}$ Li (s). The mixture may be carbonated with a sparge tube bubbling CO$_2$ gas to generate aqueous H$_2$CO$_3$. The CO$_2$ flow may be discontinued after the MgO and Li$_2$CO$_3$ are completely dissolved. The Mg(HCO$_3$)$_2$ stock solution may then be filtered to remove any residual undissolved impurities.

Next, the stock solution may be heated to 100° C. in an uncovered glass beaker with magnetic stirring. This condition may be maintained for 1 hour, during which hydromagnesite particles may be precipitated. After 1 hour, the resulting mixture may be filtered, and the solid hydromagnesite may be dried in a forced air circulation at 100° C.

Figure 26A:
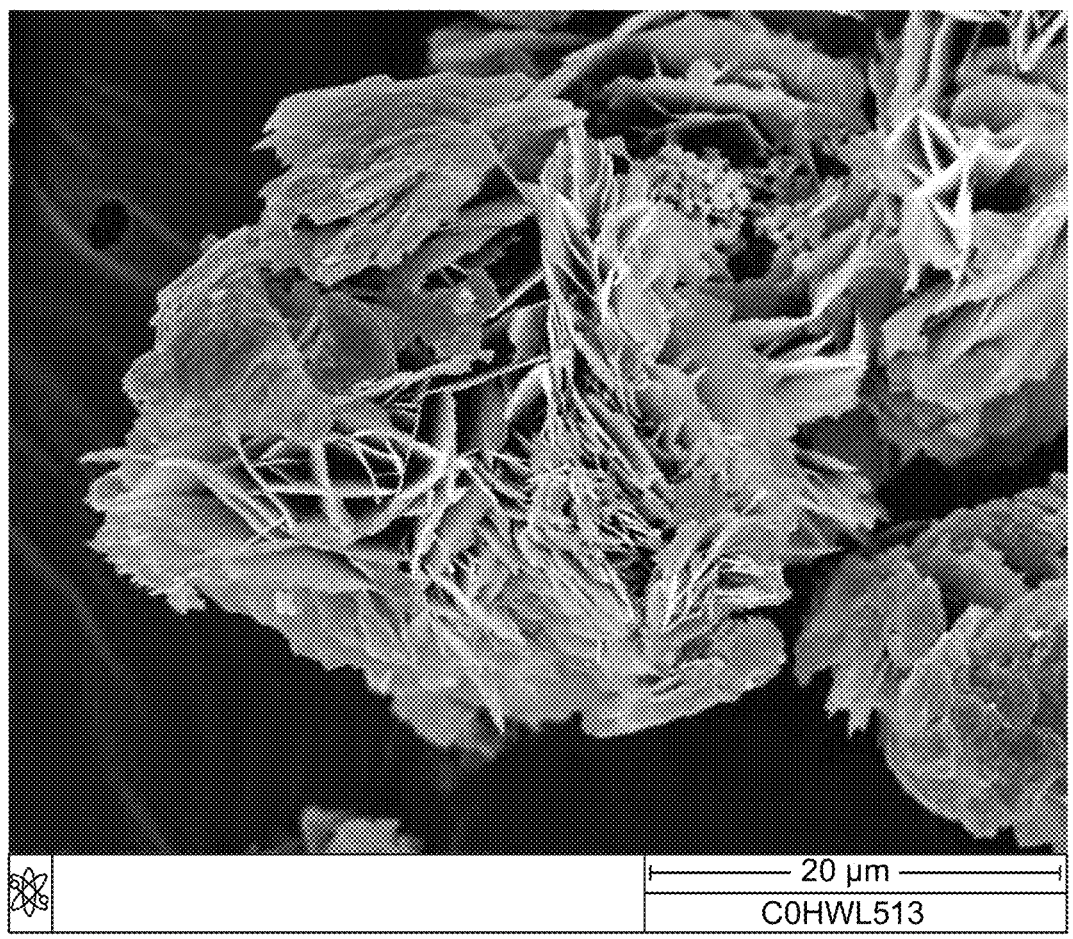
FIG. 26A is an SEM micrograph of template precursor particles ($H_5$) comprising hydromagnesite particles with hierarchical-equiaxed superstructures derived from an aqueous $Mg(HCO_3)_2$ stock solution with dissolved lithium carbonate present at a concentration of $2.74 \cdot 10^{-2}$ mol kg$^{-1}$ Li.
Figure 26B:
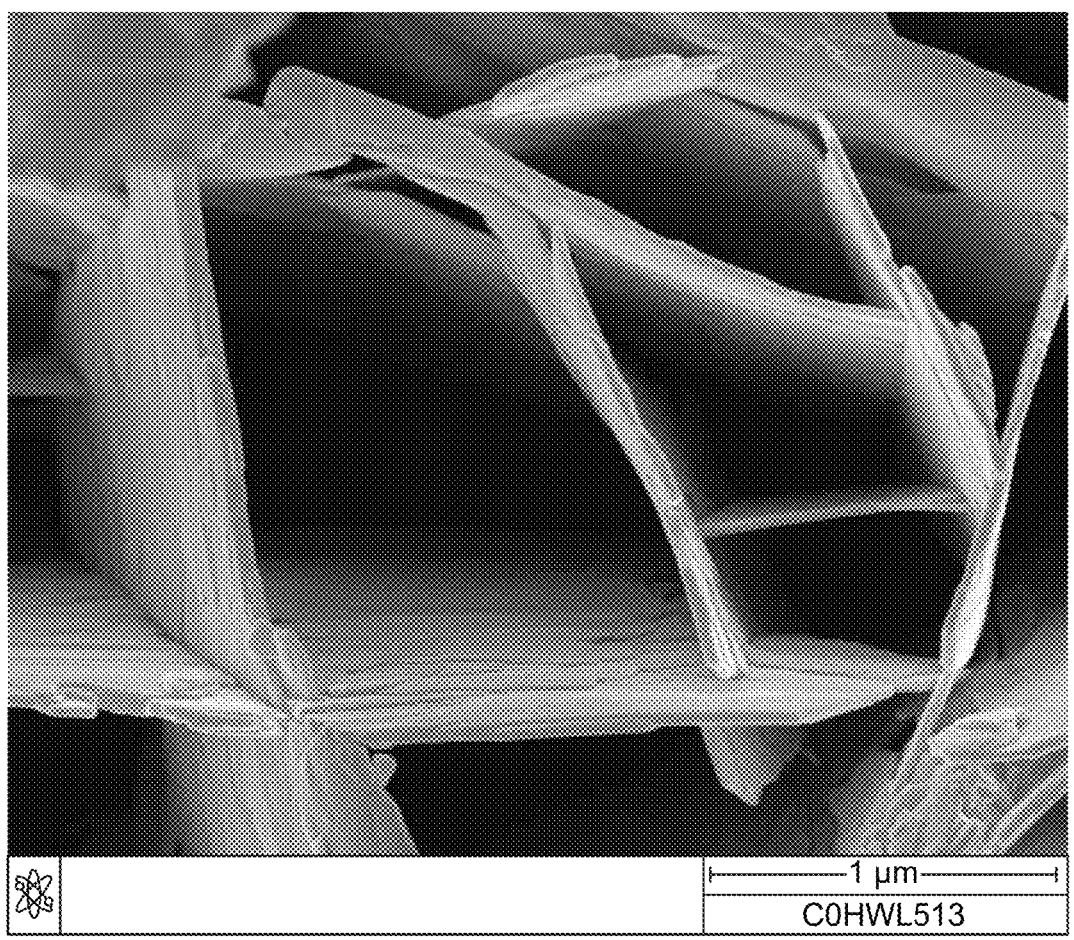
FIG. 26B is an SEM micrograph of the $H_5$-type template precursor particles at higher magnification.

The type of Li-doped hydromagnesite template precursor material resulting from this process is identified herein as H$_5$. The particles are shown in the SEM micrographs of FIGS. 26A-26B. Their plates are thin (<120 nm along their minor axis) and the surfaces are rougher than the surfaces of the plates shown in FIGS. 25A-25B. This roughness may indicate an increased Li dopant level resulting from the higher concentration of Li$_2$CO$_3$ in the aqueous stock solution.

Example M$_3$: In another exemplary Precursor Stage procedure, an equiaxed magnesite (MgCO$_3$) template precursor material may be derived from a stock solution of aqueous Mg(HCO$_3$)$_2$.

To demonstrate this derivation at a small scale, a representative stock solution may first be prepared. This stock solution represents the stock solution that might be generated in the Separation Stage of a full implementation of the General Method. For this example, the stock solution may be generated in a high-pressure reactor. First, a commercial hydromagnesite product (Akrochem Light Magnesium Carbonate) may be slurried in water at a solids concentration of 0.74 mol kg$^{-1}$ Mg (s). This mixture may be placed in a circulated pressure vessel. The sealed vessel may then be heated to 145° C., at which temperature ~800 psi of gaseous CO$_2$ may be introduced into the system. This reaction may continue to recirculate at 145° C. for a duration of 139 minutes, reaching a maximum pressure of 900 psi. During this thermal treatment, the hydromagnesite may be dissolved, forming aqueous Mg(HCO$_3$)$_2$, and magnesite may be precipitated from the Mg(HCO$_3$)$_2$. At this point, the vessel may be depressurized, releasing CO$_2$ process gas. In a full implementation of the General Method, the CO$_2$ process gas released during precipitation and subsequent depressurization may be conserved using conventional techniques.

The resulting mixture of magnesite particles may be discharged from the vessel and then filtered to separate the magnesite solids from the mother liquor. In a full implementation of the General Method, the separated mother liquor may be conserved for reuse in the Separation Stage. The magnesite may be dried at 100° C.

Figure 27A:
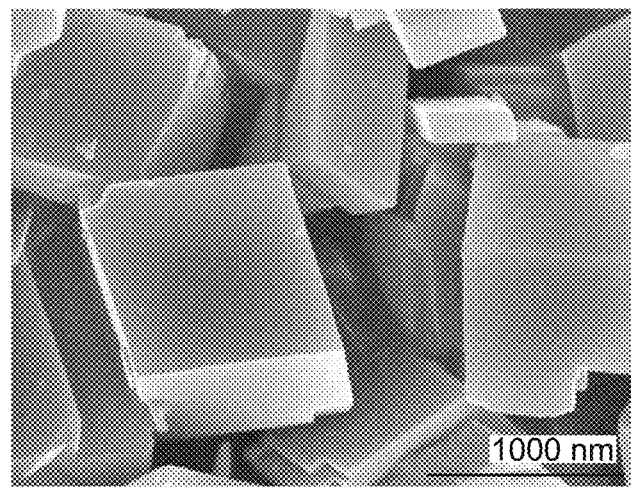
FIGS. 27A-27C include SEM micrographs of template precursor particles comprising magnesite particles with equiaxed superstructures derived from an aqueous $Mg(HCO_3)_2$ stock solution.

The type of magnesite template precursor material resulting from this process is identified herein as M$_3$. The equiaxed magnesite particles may be seen in the SEM micrograph of FIG. 27A. The structures are indicative of magnesite based on a TGA mass loss of 51.7% which closely matches the theoretical expected 52.2% in FIG. 75.

Example M$_4$: In another exemplary Precursor Stage procedure, an equiaxed magnesite (MgCO$_3$) template precursor material may be derived from a stock solution of aqueous, Na-rich Mg(HCO$_3$)$_2$.

To demonstrate this derivation at a small scale, a representative stock solution may first be prepared. This stock solution represents the stock solution that might be generated in the Separation Stage of a full implementation of the General Method. For this example, the stock solution may be generated in a high-pressure reactor. First, a commercial hydromagnesite product (Akrochem Light Magnesium Carbonate) may be slurried in water at a solids concentration of 0.74 mol kg$^{-1}$ Mg. To this mixture, a commercial NaHCO$_3$ product (Arm & Hammer) may be added at a concentration of 2.17·10$^{-3}$ mol kg$^{-1}$ Na. This mixture may be placed in a circulated pressure vessel. The sealed vessel may then be heated to 145° C. upon which ~800 psi of gaseous CO$_2$ may be introduced into the system. This reaction may continue to recirculate at 145° C. for a duration of 135 minutes, reaching a maximum pressure of 840 psi. During this thermal treatment, the hydromagnesite may be dissolved, forming aqueous Mg(HCO$_3$)$_2$, and magnesite may be precipitated from the aqueous Mg(HCO$_3$)$_2$. At this point, the vessel may be depressurized, releasing CO$_2$ process gas. In a full implementation of the General Method, the CO$_2$ process gas released during precipitation and subsequent depressurization may be conserved using conventional techniques.

The resulting mixture of magnesite particles may be discharged from the vessel and then filtered to separate the magnesite solids from the mother liquor. In a full implementation of the General Method, the separated mother liquor may be conserved for reuse in the Separation Stage. The magnesite may be dried at 100° C.

Figure 27B:
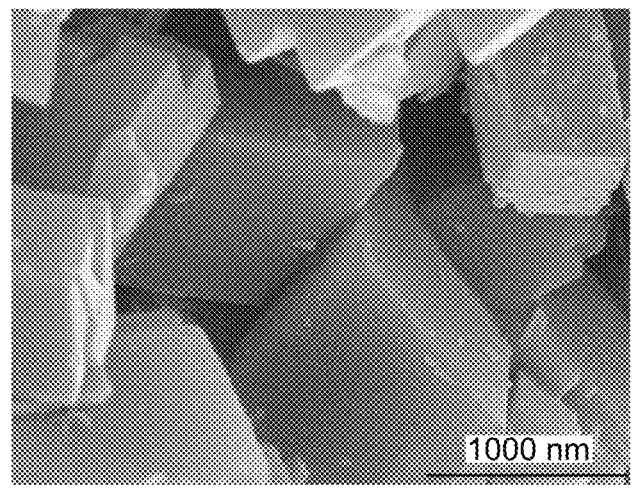

The type of magnesite template precursor material resulting from this process is identified herein as M$_4$. The equiaxed magnesite particles may be seen in the SEM micrograph of FIG. 27B. The structures are indicative of magnesite based on a TGA mass loss of 51.6% which closely matches the theoretical expected 52.2% in FIG. 75.

Example M$_5$: In another exemplary Precursor Stage procedure, an equiaxed magnesite (MgCO$_3$) template precursor material may be derived from a stock solution of aqueous, Na-rich Mg(HCO$_3$)$_2$.

To demonstrate this derivation at a small scale, a representative stock solution may first be prepared. This stock solution represents the stock solution that might be generated in the Separation Stage of a full implementation of the General Method. For this example, the stock solution may be generated in a high-pressure reactor. First, a commercial hydromagnesite product (Akrochem Light Magnesium Carbonate) may be slurried in water at a solids concentration of 0.74 mol kg$^{-1}$ Mg. To this mixture, a commercial NaHCO$_3$ product (Arm & Hammer) may be added at a concentration of 0.19 mol kg$^{-1}$ Na. This mixture may be placed in a circulated pressure vessel. The sealed vessel may then be heated to 145° C. upon which ~800 psi of gaseous CO$_2$ may be introduced into the system. This reaction may continue to recirculate at 145° C. for a duration of 137 minutes, reaching a maximum pressure of 850 psi. During this thermal treatment, the hydromagnesite may be dissolved, forming aqueous Mg(HCO$_3$)$_2$, and magnesite may be precipitated from the aqueous Mg(HCO$_3$)$_2$. At this point, the vessel may be depressurized, releasing CO$_2$ process gas. In a full implementation of the General Method, the CO$_2$ process gas released during precipitation and subsequent depressurization may be conserved using conventional techniques.

The resulting mixture of magnesite particles may be discharged from the vessel and then filtered to separate the magnesite solids from the mother liquor. In a full implementation of the General Method, the separated mother liquor may be conserved for reuse in the Separation Stage. The magnesite may be dried at 100° C.

Figure 27C:
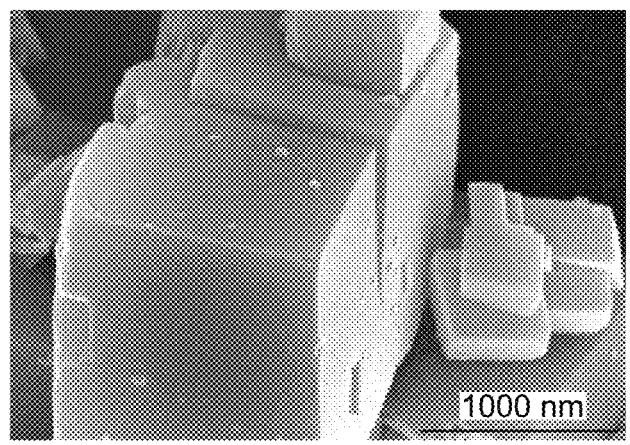

The type of magnesite template precursor material resulting from this process is identified herein as $M_5$. The equiaxed magnesite particles may be seen in the SEM micrograph of FIG. 27C. to be rhombohedral crystals of magnesite. The structures are indicative of magnesite based on a TGA mass loss of 51.9% which closely matches the theoretical expected 52.2% in FIG. 75.

Comparing $M_3$, $M_4$, and $M_5$, there are no appreciable morphological differences that can be readily identified based on SEM analysis.

Example $N_2$: In another exemplary Precursor Stage procedure, an elongated nesquehonite ($MgCO_3 \cdot 3H_2O$) template precursor material may be derived from an aqueous stock solution of $Mg(HCO_3)_2$.

To demonstrate this derivation at small scale, lansfordite may first be generated from a stock solution of aqueous $Mg(HCO_3)_2$ using the procedure described in Example $L_2$. This precipitation may cause $CO_2$ process gas to be emitted. In a full implementation of the General Method, the $CO_2$ process gas released during precipitation may be conserved using conventional techniques. Likewise, the separated mother liquor may be conserved in a full implementation of the General Method.

Next, water may be heated to 35° C. in a glass beaker. Once the water has reached temperature, the lansfordite may be added to produce a mixture with a concentration of 0.74 mol kg$^{-1}$ Mg. The mixture may be magnetically stirred at 600 RPM and maintained at 35° C. for 100 minutes. During this thermal treatment, the lansfordite may be dissolved and nesquehonite may be precipitated. The mixture may then be filtered to separate the mother liquor from the lansfordite. In a full implementation of the General Method, the separated mother liquor may be conserved.

The type of nesquehonite template precursor material resulting from this process is identified herein as $N_2$. Optical micrographs are shown in FIG. 28. The nesquehonite particles are mostly individualized, resulting in a fine powder.

Example $N_3$: In another exemplary Precursor Stage procedure, an elongated nesquehonite ($MgCO_3 \cdot 3H_2O$) template precursor material may be derived from an aqueous stock solution of $Mg(HCO_3)_2$.

To demonstrate this derivation at small scale, lansfordite may first be generated from a stock solution of aqueous $Mg(HCO_3)_2$ using the procedure described in Example $L_2$. This precipitation may cause $CO_2$ process gas to be emitted. In a full implementation of the General Method, the $CO_2$ process gas released during precipitation may be conserved using conventional techniques. Likewise, the separated mother liquor may be conserved in a full implementation of the General Method.

Next, a 10.84 mM aqueous solution of SDS (TCI Chemical) may be heated to 35° C. in a glass beaker. Once the water has reached temperature, the lansfordite may be added to produce a mixture with a concentration of 0.74 mol kg$^{-1}$ Mg. The mixture may be magnetically stirred at 600 RPM and maintained at 35° C. for 100 minutes. During this thermal treatment, the lansfordite may be dissolved and nesquehonite may be precipitated. The mixture may then be filtered to separate the mother liquor from the lansfordite. In a full implementation of the General Method, the separated mother liquor may be conserved.

Figure 30A:
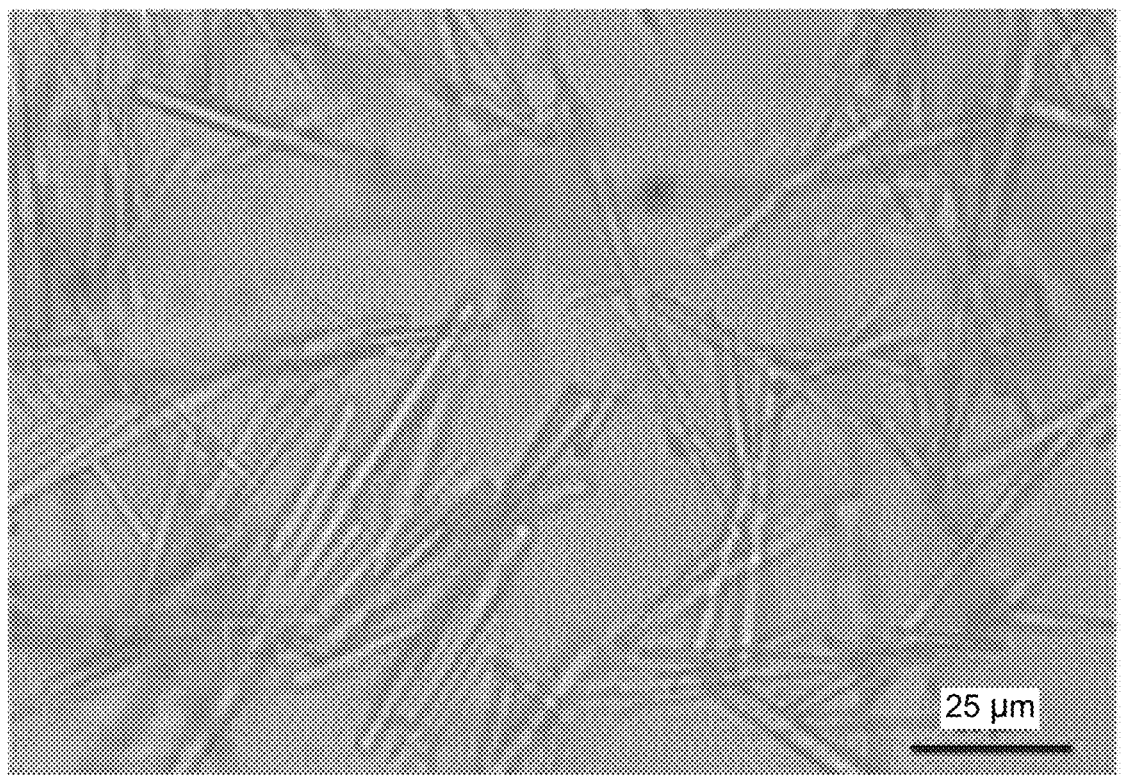
FIGS. 30A-30B are optical micrographs of template precursor particles comprising nesquehonite particles precipitated from lansfordite.
Figure 30B:
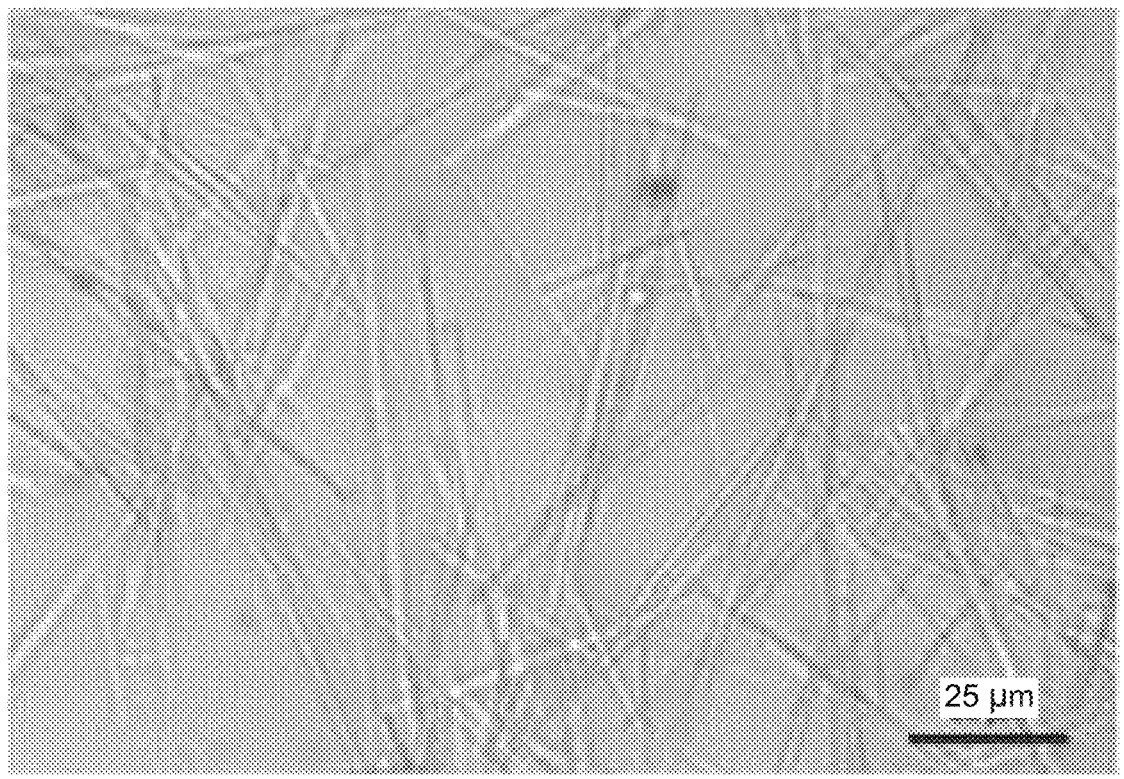

The type of nesquehonite template precursor material resulting from this process is identified herein as $N_3$. Optical micrographs are shown in FIG. 29. Comparison of the optical micrographs of $N_2$ and $N_3$ in FIG. 30A and FIG. 30B, respectively, reveals that the $N_3$ particles, on average, are longer and have smaller diameters. This demonstrates that the presence of a surfactant during precipitation may be used to control the dimensions of template precursor particles.

Example $Li_1$: In another exemplary Precursor Stage procedure, a hollow, hierarchical-equiaxed $Li_2CO_3$ template precursor material may be derived from a stock solution of aqueous $Li_2CO_3$.

To demonstrate this derivation at a small scale, a representative stock solution may first be prepared. This stock solution represents the stock solution that might be generated in the Separation Stage of a full implementation of the General Method. For this example, a representative aqueous $Li_2CO_3$ stock solution may be prepared as follows. First, a commercial $Li_2CO_3$ product (supplied by FMC) may be slurried in water at a concentration of 0.54 mol kg$^{-1}$ Li. This mixture may be carbonated in an overhead stirred reactor fitted with a gas dispersing blade and a sparge tube. $CO_2$ gas may be flowed into the mixture through the sparge tube at a rate of 9 sfch$_{air}$ for 175 minutes or until the solids are completely dissolved. At this point, the solution may be diluted with water to adjust the concentration to 0.27 mol kg$^{-1}$ Li (aq).

This representative stock solution may then be spray-dried. To demonstrate this, the stock solution may be pumped at a rate of 7 mL/min through a Buchi B-290 two-fluid nozzle of a Buchi B-191 spray dryer. Compressed air may be delivered into the nozzle at a flow rate of 0.6 scfm$_{air}$ at 88 psig with the aspirator airflow set to 18 scfm$_{air}$. The inlet temperature may be set to 170° C., resulting in an outlet temperature of 100° C.

The particles resulting from spray-drying the stock solution may be collected by a cyclonic particle separator. In a full implementation of the General Method, the $CO_2$ process gas and process water vapor emitted by spray-drying may be conserved using conventional techniques.

Figure 31A:
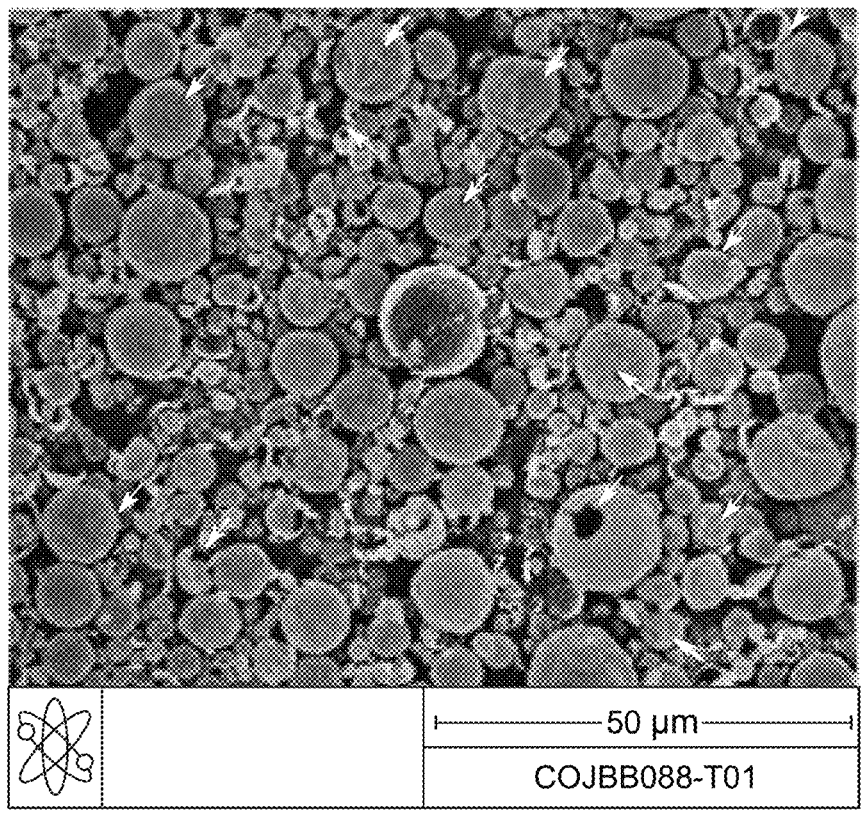
FIG. 31A is an SEM micrograph of template precursor particles ($Li_1$) comprising lithium carbonate particles with hollow, hierarchical-equiaxed superstructures derived from a stock solution of aqueous $Li_2CO_3$. The arrows indicate the varied features such as pin-holes, breaches, and crumpled spheres that may be observed.
Figure 31B:
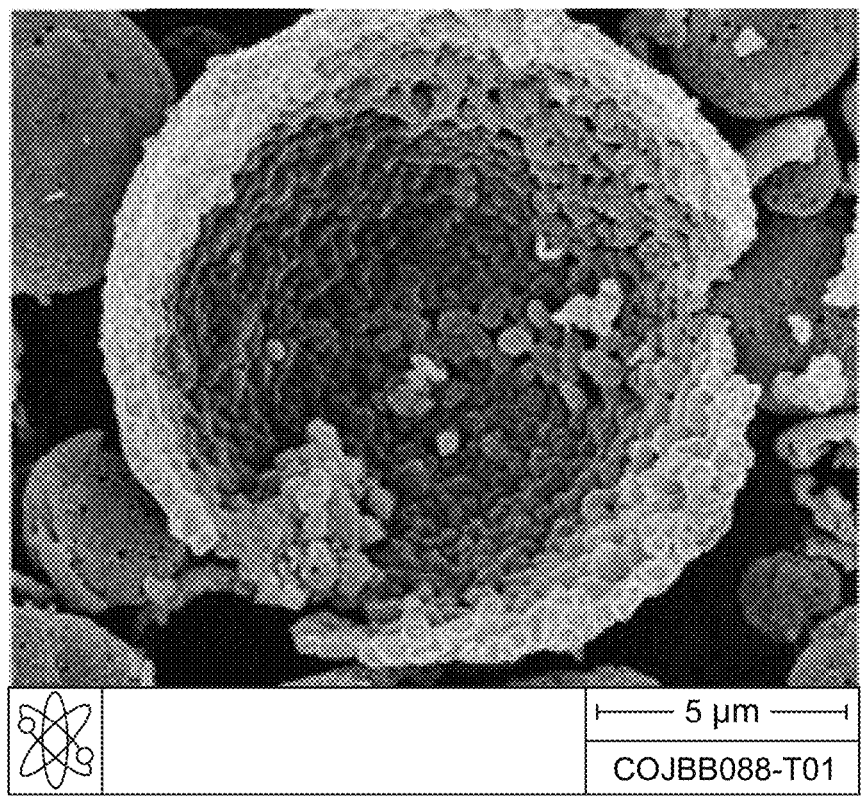
FIG. 31B is an SEM micrograph of the $Li_1$-type particles at higher magnification.

The type of lithium carbonate template precursor material resulting from this process is identified herein as $Li_1$. The particles are hollow, hierarchical-equiaxed structures, as seen in the SEM micrographs of FIGS. 31A-31B. The hollow structures can be identified in varying stages of survival. The shells exhibit pinholes between the $Li_2CO_3$ subunits, indicated by arrows in FIG. 31A. In some shells, fragmentation and bigger holes or breaches can be observed (indicated by arrows in FIG. 31A). Crumpled shells are present in the sample (indicated by arrows in FIG. 31A). In FIG. 31B, the particles' substructure of loosely packed subunits can be discerned. These are mostly between 200 and 700 nm in size, with larger particles apparently comprising larger subunits. Raman peaks around 1091 cm$^{-1}$, 195 cm$^{-1}$ and 158 cm$^{-1}$ confirm the structures are $Li_2CO_3$.

V. Template Stage—Examples

This Section details the generation of exemplary template materials at small scales using exemplary procedures. As such, these procedures comprise partial implementations of the General Method. It should be therefore understood that these procedures must be coupled with other procedures in a full implementation of the General Method. Additionally, it should be understood that these procedures are merely demonstrative of analogous, larger-scale procedures that would be used for industrial-scale manufacturing.

A number of exemplary procedures for making template materials are described in this section. In some exemplary procedures, template precursor materials may be treated to form template materials in a separate and distinct Template Stage procedure, and the resulting template materials may then be utilized in a separate and distinct Replication Stage procedure. In other instances, the Template Stage and the Replication Stage procedures may both be performed in the same reactor. Some of these exemplary Template Stage procedures utilize template precursor materials previously named and described in Section V. Additionally, new template precursor materials have been utilized.

Example $N_1T_1$: In an exemplary Template Stage procedure, a nesquehonite template precursor material may be thermally treated to form a porous MgO template material.

To demonstrate this, $N_1$-type nesquehonite particles may first be generated using the procedure described in Example $N_1$. This material represents the template precursor material that might be generated in the Precursor Stage of a full implementation of the General Method.

Next, the template precursor material may be thermally treated. This may be performed in a TGA instrument under an inert gas flow of Ar as described in Scheme E in Section III. The sample of $N_1$-type nesquehonite particles may be heated under Ar gas from room temperature to a final temperature of 1,000° C. at a rate of 10° C./min. During this thermal treatment, $CO_2$ gas may be released. In a full implementation of the General Method, the $CO_2$ process gas released during the decomposition of the template precursor material may be conserved using conventional techniques. Upon reaching 1,000° C., the sample may be cooled back down to room temperature.

The type of porous MgO template material resulting from this process is identified herein as $N_1T_1$. The template particles retain the precursor particles' elongated superstructure, as shown in the SEM micrographs of FIG. 32. The particles range from 20 µm to 100+ µm in length. Unbroken rods may exhibit an average length to diameter ratio of approximately 15:1. The ends of the particles have a crumbly appearance, due to the porous substructure of nanocrystalline MgO subunits.

Example $H_1T_1$: In another exemplary Template Stage procedure, a hydromagnesite template precursor material may be thermally treated to form a porous MgO template material.

To demonstrate this, $H_1$-type hydromagnesite particles may first be generated using the procedure described in Example $H_1$. This material represents the template precursor material that might be generated in the Precursor Stage of a full implementation of the General Method.

Next, the template precursor material may be thermally treated. This may be performed in a TGA instrument under an inert gas flow of Ar as described in Scheme E in Section III. The sample of $H_1$-type hydromagnesite particles may be heated under Ar gas from room temperature to a final temperature of 1,000° C. at a rate of 10° C./min. During this thermal treatment, $CO_2$ gas may be released. In a full implementation of the General Method, the $CO_2$ process gas released during the decomposition of the template precursor material may be conserved using conventional techniques. Upon reaching 1,000° C., the sample may be allowed to cool to room temperature.

Figure 33:
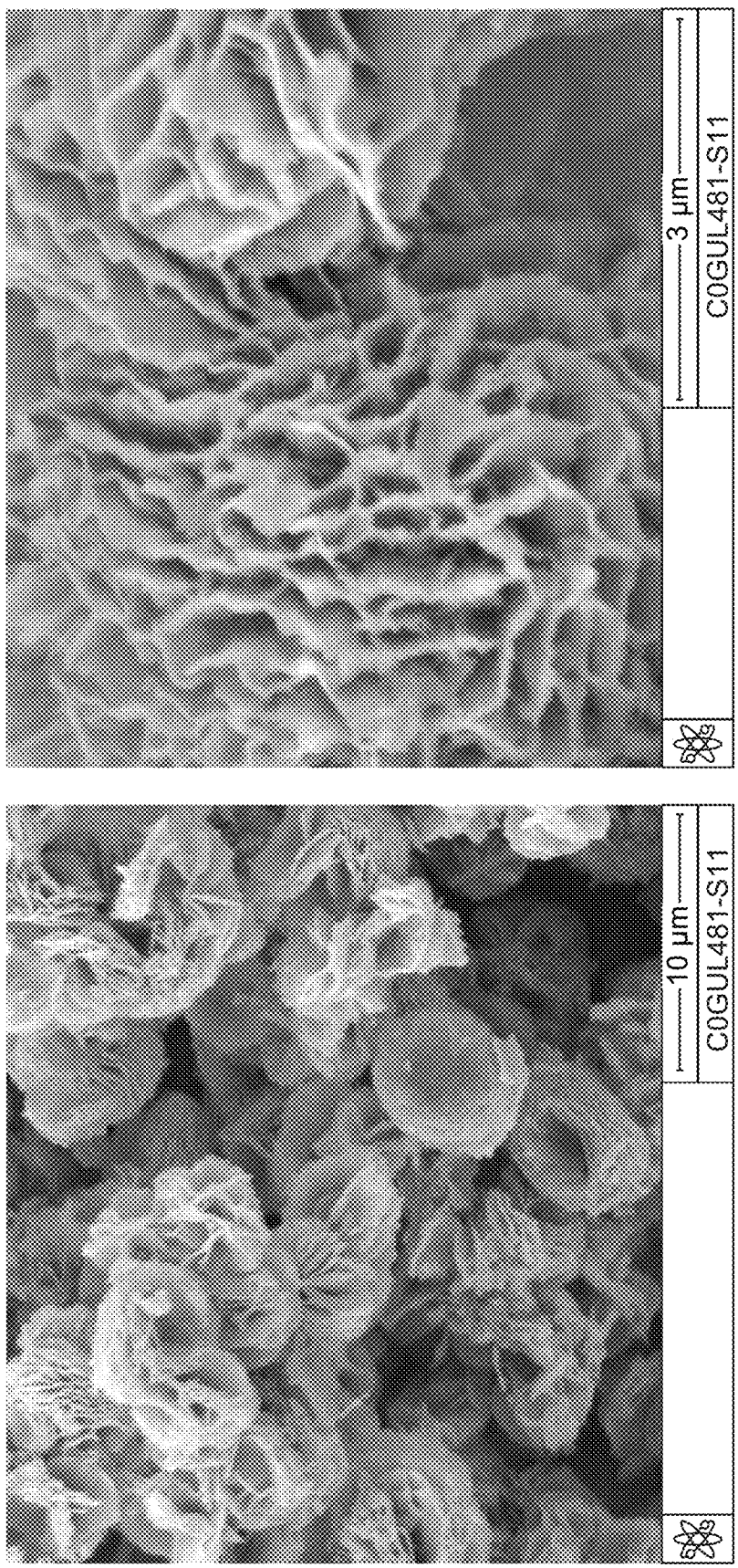
FIG. 33 includes SEM micrographs of porous MgO template particles ($H_1T_1$) made from $H_1$ template precursor particles. The template particles have inherited the precursors' hierarchical-equiaxed superstructure.

The type of porous MgO template material resulting from this process is identified herein as $H_1T_1$. The template particles retain the precursor particles' hierarchical-equiaxed, rosette superstructure, as shown in the SEM micrographs of FIG. 33. The individual plates generally range from 1 µm to 3 µm in diameter, with an average size between these values. The particles generally range from 4 µm to 10 µm in diameter, with an average size between these values. The average plate thickness is less than 100 nm and corresponds structurally to a single layer of the laterally networked nanocrystalline subunits. Plates exhibits high uniformity in thickness. The crumbly appearance at the edges of the plates reflects the porous substructure of nanocrystalline MgO subunits.

Example $H_2T_1$: In another exemplary Template Stage procedure, a hydromagnesite template precursor material may be thermally treated to form a porous MgO template material.

To demonstrate this, $H_2$-type hydromagnesite particles may first be generated using the procedure described in Example $H_2$. This material represents the template precursor material that might be generated in the Precursor Stage of a full implementation of the General Method.

Next, the template precursor material may be thermally treated. This may be performed according to Scheme B in a tube furnace as detailed in Section III. The sample of $H_2$-type hydromagnesite particles may be placed in a ceramic boat and introduced into a tube furnace at room temperature. The furnace may then be heated under Ar flow of 2000 sccm to 1050° C. at a heating rate of 20° C./min. During this thermal treatment, $CO_2$ gas may be released. In a full implementation of the General Method, the $CO_2$ process gas released during the decomposition of the template precursor material may be conserved using conventional techniques. The sample may then be maintained at 1050° C. for two hours, after which the furnace may be allowed to cool to room temperature.

The type of porous MgO template material resulting from this process is identified herein as $H_2T_1$. The template particles retain the precursor particles' elongated, rosette superstructure, as shown in the SEM micrographs of FIG. 34. The particles range from 10 µm to 100 µm in length, with some having a length to diameter ratio of over 5:1. The plates range from 0.5 µm to 1.5 µm in diameter. Compared to the $H_1T_1$ plates, the $H_2T_1$ plates have a coarser substructure, comprising more discretized subunits and larger pores between them. The subunits comprise cuboidal or polyhedral nanocrystals ranging from ~40 nm to ~100 nm in size, with an average size between these values. The coarsening of the substructure may be attributed to the more intensive thermal treatment used to prepare the $H_2T_1$ template material.

Figure 34:
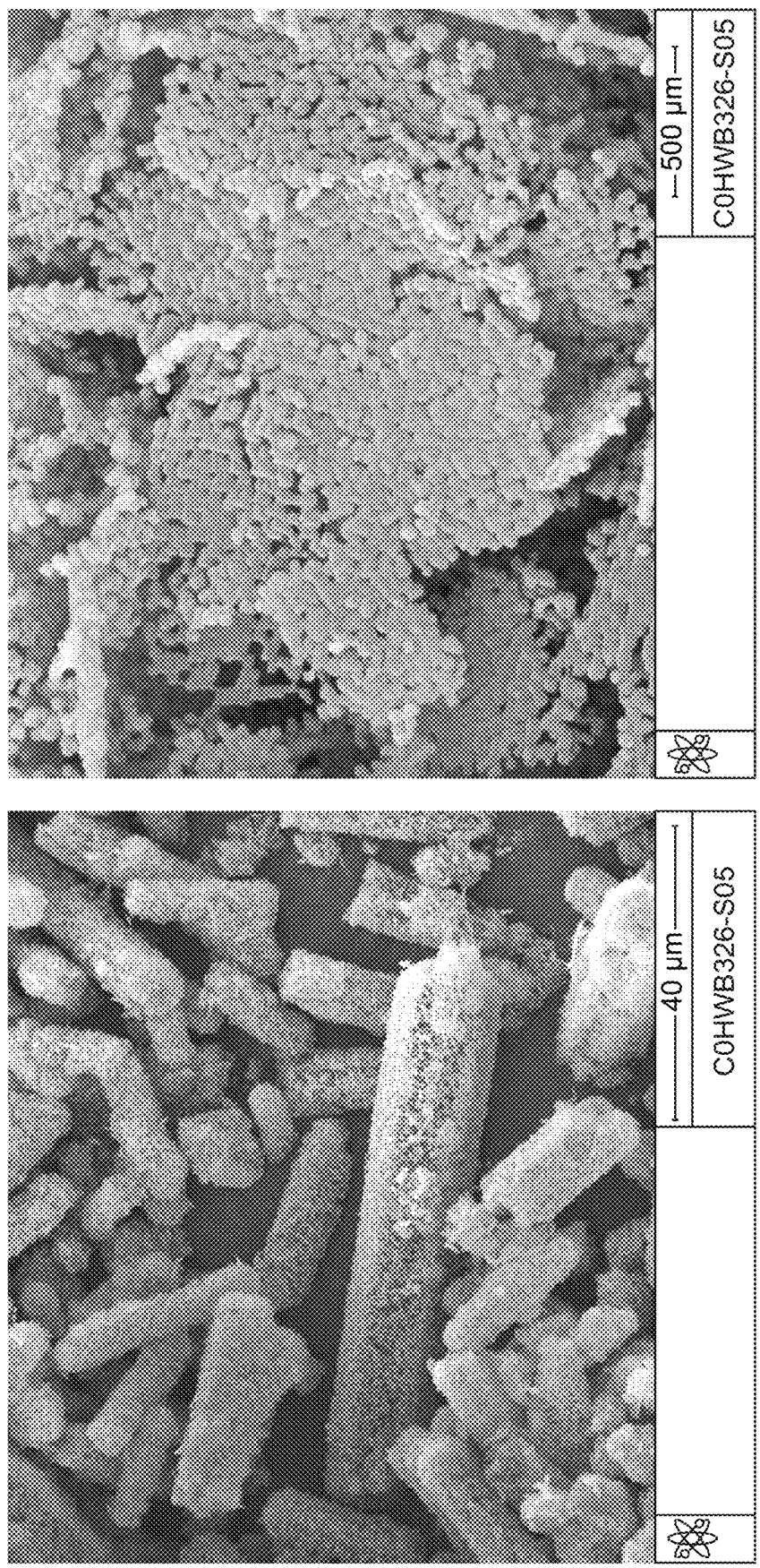
FIG. 34 includes SEM micrographs of porous MgO template particles ($H_2T_1$) made from $H_2$ template precursor particles. The template particles have inherited the precursors' hierarchical-equiaxed superstructure.

Some of the subunits observed in FIG. 34 are conjoined laterally to their adjacent neighbors without any visible interstitial pores. These junctions may comprise grain boundaries. Other subunits are more discretized, and while still conjoined to the overall network, they are separated from their neighbors by pores. Since the plates are generally only one subunit in thickness, the interstitial pores between subunits penetrate through the thickness of the plate. These penetrating holes are an important and desirable structural feature in thin template structures because they create more crosslinking in the perimorphic framework formed via the template.

During the thermal treatment in Example $H_2T_1$, the porous MgO template material derived from decomposition of the template precursor may undergo grain growth and sintering due to atomic diffusion. The distance over which diffusion may occur may be a function of the temperature. Hence, modulating the temperature and duration of the Template Stage treatment may be useful for fine engineering of a template's substructure (and accordingly of a perimorphic framework's substructure).

During coarsening, the porous substructure of the template materials may also be densified. This may affect the fractional composition of positive and negative template space. Taken to an extreme, densification of the porous substructure may continue until the negative space—i.e. the template's pore structure—is eliminated. As particles sinter to one another, higher-order porosity may be obtained via the pores between these formerly discrete particles. This technique has been utilized by workers to create template structures comprising macroscopic, porous networks of sintered metal oxide particles. Macroscopic, monolithic template structures like this can be formed in Template Stage and recycled using the General Method.

Example $H_1T_2$: In another exemplary Template Stage procedure, a hydromagnesite template precursor material may be thermally treated to form an MgO template material.

To demonstrate this, $H_1$-type hydromagnesite particles may first be generated using the procedure described in Example $H_1$. This material represents the template precursor material that might be generated in the Precursor Stage of a full implementation of the General Method.

Next, the template precursor material may be thermally treated. This may be performed in a TGA according to Scheme E as detailed in Section III. The sample of $H_1$-type hydromagnesite particles may be heated under Ar gas from room temperature to a final temperature of 1200° C. at a heating rate of during which $CO_2$ gas may be released. In a full implementation of the General Method, the $CO_2$ process gas released during the decomposition of the template precursor material may be conserved using conventional techniques. The sample may be held at 1200° C. for 10 minutes, then allowed to cool.

The type of MgO template material resulting from this process is identified herein as $H_1T_2$. The template particles resulting from this procedure are shown in the SEM micrographs of FIG. 35. The thermal treatment has transformed not only the subunits, but additionally the template superstructure, which no longer appears hierarchical. The progressive coalescence of the nanoscopic subunits and pores at the substructural level may therefore ultimately transform a template's superstructure, and individual particles may be sintered together to form larger (up to macroscopic) template structures.

Example $N_1T_2$: In another exemplary Template Stage procedure, a nesquehonite template precursor material may be thermally treated to form an MgO template material.

To demonstrate this, $N_1$-type nesquehonite particles may first be generated using the procedure described in Example $N_1$. This material represents the template precursor material that might be generated in the Precursor Stage of a full implementation of the General Method.

Next, the template precursor material may be thermally treated. This may be performed in a TGA according to Scheme E under an Ar flow from room temperature to a final temperature of 1200° C. at a heating rate of 10° C./min. During this thermal treatment, $CO_2$ gas may be released. In a full implementation of the General Method, the $CO_2$ process gas released during the decomposition of the template precursor material may be conserved using conventional techniques. The sample may be held at 1200° C. for 10 minutes, then allowed to cool.

The type of MgO template material resulting from this process is identified herein as $N_1T_2$. The template particles have lost the porous substructure evolved during thermal decomposition due to progressive sintering at high temperature.

Example $N_1T_3$: In another exemplary Template Stage procedure, a nesquehonite template precursor material may be thermally treated to form a porous MgO template material.

To demonstrate this, $N_1$-type nesquehonite particles may first be generated using the procedure described in Example $N_1$. This material represents the template precursor material that might be generated in the Precursor Stage of a full implementation of the General Method.

Next, the template precursor material may be thermally treated. This may be performed in a tube furnace according to Scheme B, as detailed in Section III. The sample may be heated from room temperature to 460° C. under Ar gas flow of 1271 sccm. At this point, acetylene ($C_2H_2$) gas may be introduced into the system to begin depositing carbon the templating surface. During this Replication Stage procedure, the template, which may not have completed its thermal decomposition, may continue decomposing in the high temperature environment and $CO_2$ gas may be released. In a full implementation of the General Method, the $CO_2$ process gas released during the decomposition of the template precursor material may be conserved using conventional techniques. This condition may be maintained for 3 hours. Acetylene flow may be terminated and the furnace may then be allowed to cool to room temperature under sustained Ar flow.

The type of porous MgO template material resulting from this process is identified herein as $N_1T_3$.

Example $M_1T_1$: In another exemplary Template Stage procedure, a magnesite template precursor material may be thermally treated to form a porous MgO template material.

To demonstrate this, $M_1$-type magnesite particles may first be generated using the procedure described in Example $M_1$. This material represents the template precursor material that might be generated in the Precursor Stage of a full implementation of the General Method.

Next, the template precursor material may be thermally treated. This may be performed in a TGA according to Scheme E as detailed in Section III. The sample may be heated from room temperature to 1050° C. at a rate of 50° C./min under Ar flow. During this thermal treatment, $CO_2$ gas may be released. In a full implementation of the General Method, the $CO_2$ process gas released during the decomposition of the template precursor material may be conserved using conventional techniques. The sample may be held at 1050° C. for 1 minute, then allowed to cool.

Figure 36:
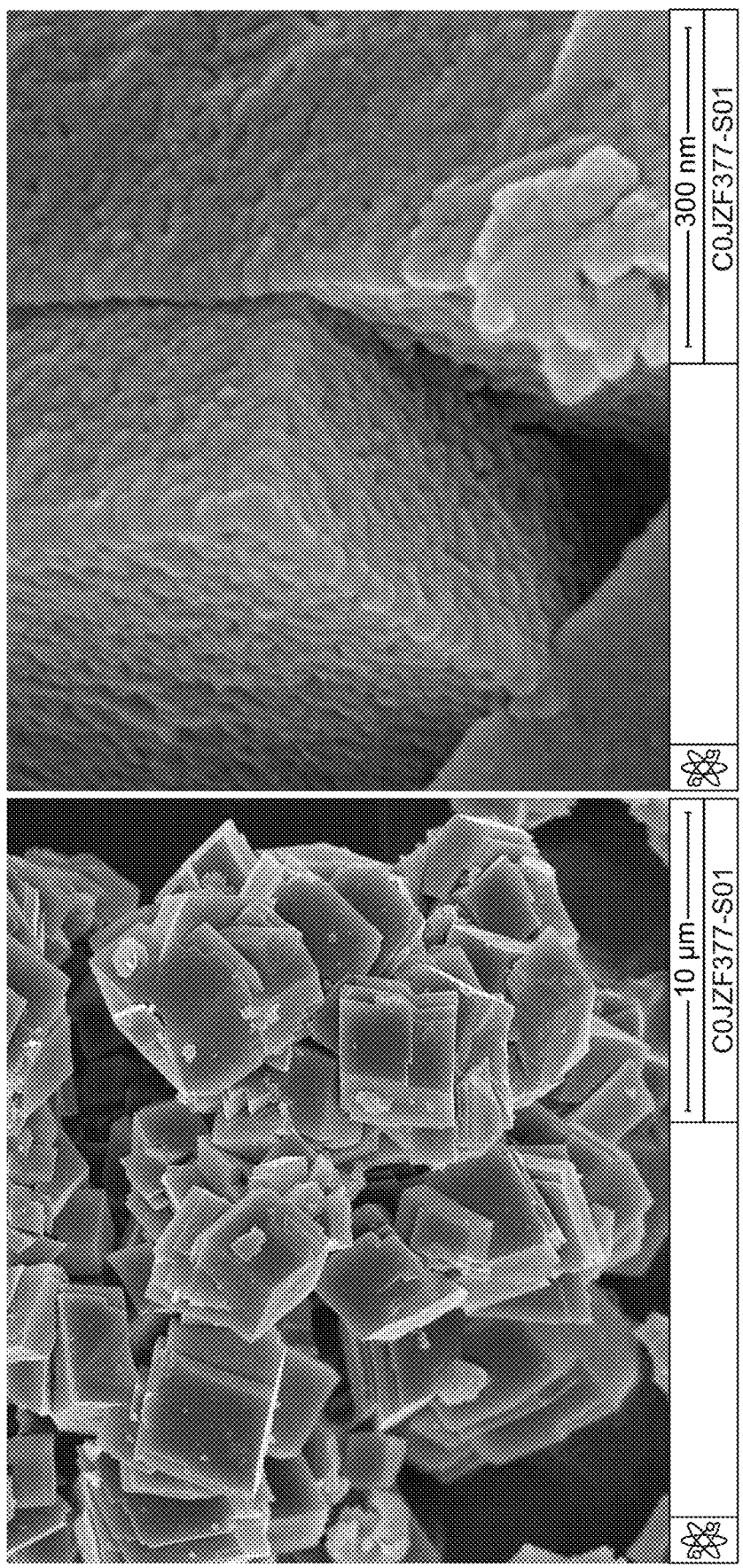
FIG. 36 includes SEM micrographs of porous MgO template particles ($M_1T_1$) made from $M_1$ template precursor particles. The template particles have inherited the precursors' equiaxed superstructure.

The type of porous MgO template material resulting from this process is identified herein as $M_1T_1$. The template particles retain the precursor particles' equiaxed superstructure, as shown in the SEM micrographs of FIG. 36. The template particles range from 5 µm to 20 µm in diameter. The surfaces appear substantially smooth and continuous at lower magnifications. At higher magnifications, the surfaces appear rougher due to the porous substructure. Clear resolution of the precise, nanoscopic substructure is difficult due to the ~5 nm iridium particles used to coat the surface for imaging, however the regular, bumpy appearance indicates the underlying MgO subunits.

Example $M_1T_2$ In another exemplary Template Stage procedure, a magnesite template precursor material may be thermally treated to form a porous MgO template material.

To demonstrate this, $M_1$-type magnesite particles may first be generated using the procedure described in Example $M_1$. This material represents the template precursor material that might be generated in the Precursor Stage of a full implementation of the General Method.

Next, the template precursor material may be thermally treated. This may be performed in a tube furnace according to Scheme B, as detailed in Section III. The sample may be heated from room temperature to a final temperature of 1050° C. at a heating rate of 20° C./min and under an Ar flow of 2360 sccm. During this thermal treatment, $CO_2$ gas may be released. In a full implementation of the General Method, the $CO_2$ process gas released during the decomposition of the template precursor material may be conserved using conventional techniques. The sample may then be held at 1050° C. for 4 hours, then allowed to cool.

Figure 37:
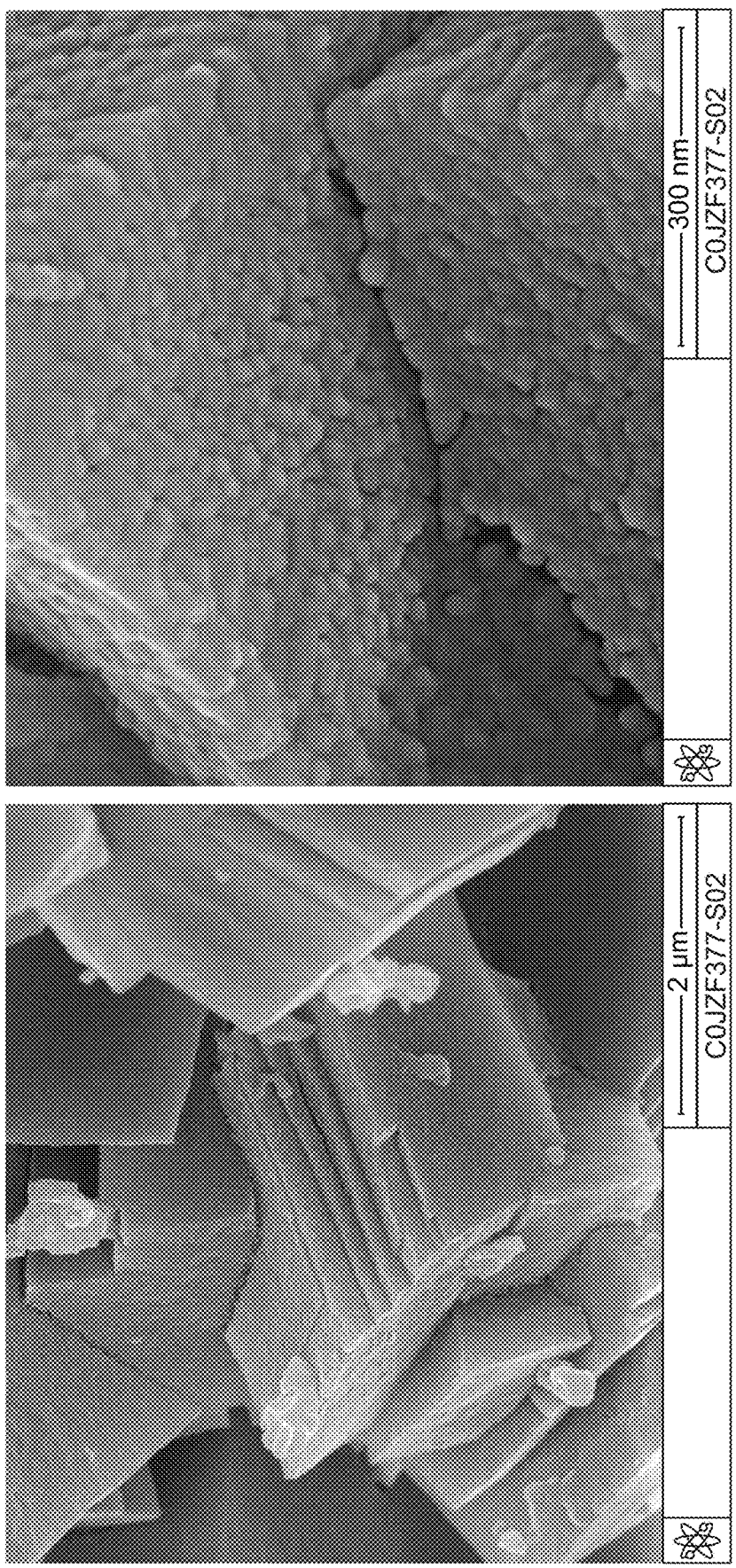
FIG. 37 includes SEM micrographs of porous MgO template particles ($M_1T_2$) made from $M_1$ template precursor particles. The template particles have inherited the precursors' equiaxed superstructure.

The type of MgO template material resulting from this process is identified herein as $M_1T_2$. The template particles retain the precursor particles' equiaxed superstructure, as shown in the SEM micrographs of FIG. 37. The template particles range from 5 µm to 20 µm in diameter. The surfaces appear substantially smooth and continuous at low magnification. At higher magnifications, the surface appears rougher due to the porous substructure. Clear resolution of the precise, nanoscopic substructure is difficult due to the ~5 nm iridium particles used to coat the surface required for imaging, however the regular, bumpy appearance indicates the underlying MgO subunits.

Example $M_1T_3$: In another exemplary Template Stage procedure, a magnesite template precursor material may be thermally treated to form a porous MgO template material.

To demonstrate this, $M_1$-type magnesite particles may first be generated using the procedure described in Example $M_1$. This material represents the template precursor material that might be generated in the Precursor Stage of a full implementation of the General Method.

Next, the template precursor material may be thermally treated. This may be performed in a TGA according to Scheme E, as detailed in Section III. The sample may be heated from room temperature to a final temperature of 1200° C. at a rate of 50° C./min under flowing Ar. During this thermal treatment, $CO_2$ gas may be released. In a full implementation of the General Method, the $CO_2$ process gas released during the decomposition of the template precursor material may be conserved using conventional techniques. The sample may then be held at 1200° C. for 1 minute, then allowed to cool.

Figure 38:
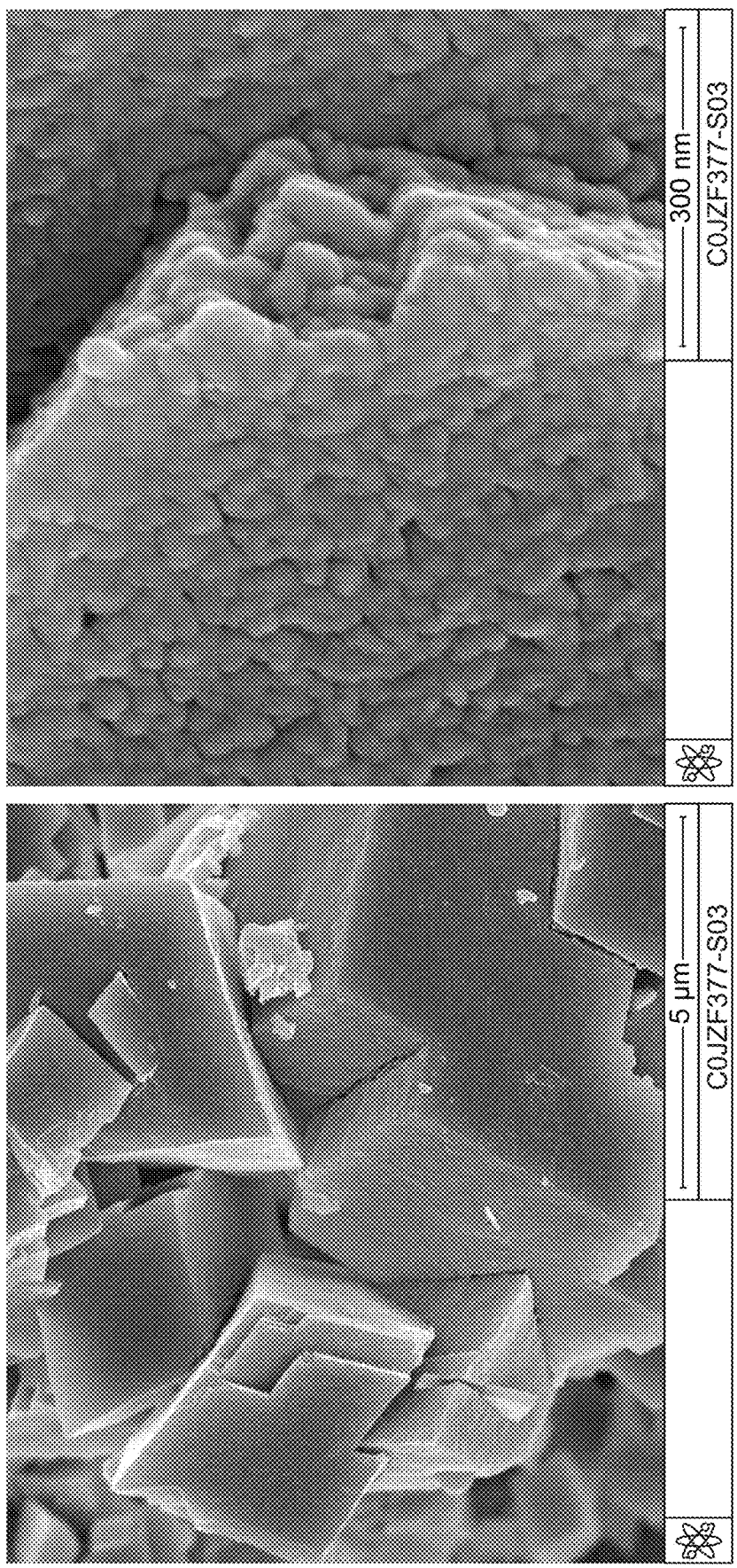
FIG. 38 includes SEM micrographs of porous MgO template particles ($M_1T_3$) made from $M_1$ template precursor particles. The template particles have inherited the precursors' equiaxed superstructure.

The type of MgO template material resulting from this process is identified herein as $M_1T_3$. The template particles retain the precursor particles' equiaxed superstructure, as shown in the SEM micrographs of FIG. 38. The template particles in the template sample range from 5 µm to 20 µm in diameter. The surfaces appear substantially smooth and continuous at low magnification. At higher magnification, the surface appears rougher due to the porous substructure. Clear resolution of the precise, nanoscopic substructure is difficult due to the ~5 nm iridium particles used to coat the surface; however its regular, bumpy appearance indicates the underlying MgO subunits. Although the substructure cannot easily be distinguished from a comparable sample treated at only 1050° C. (described in Example $M_1T_1$ and shown in FIG. 37), it appears that the subunits may be starting to coalesce via sintering.

Example $M_1T_4$: In another exemplary Template Stage procedure, a magnesite template precursor material may be thermally treated to form a porous MgO template material.

To demonstrate this, $M_1$-type magnesite particles may first be generated using the procedure described in Example $M_1$. This material represents the template precursor material that might be generated in the Precursor Stage of a full implementation of the General Method.

Next, the template precursor material may be thermally treated. This may be performed in a tube furnace according to Scheme B, as detailed in Section III. The sample may be heated from room temperature to a final temperature of 1200° C. at a heating rate of 20° C./min under an Ar flow of 2000 sccm. During this thermal treatment, $CO_2$ gas may be released. In a full implementation of the General Method, the $CO_2$ process gas released during the decomposition of the template precursor material may be conserved using conventional techniques. The sample may then be held at 1200° C. for 4 hours, then allowed to cool.

Figure 39:
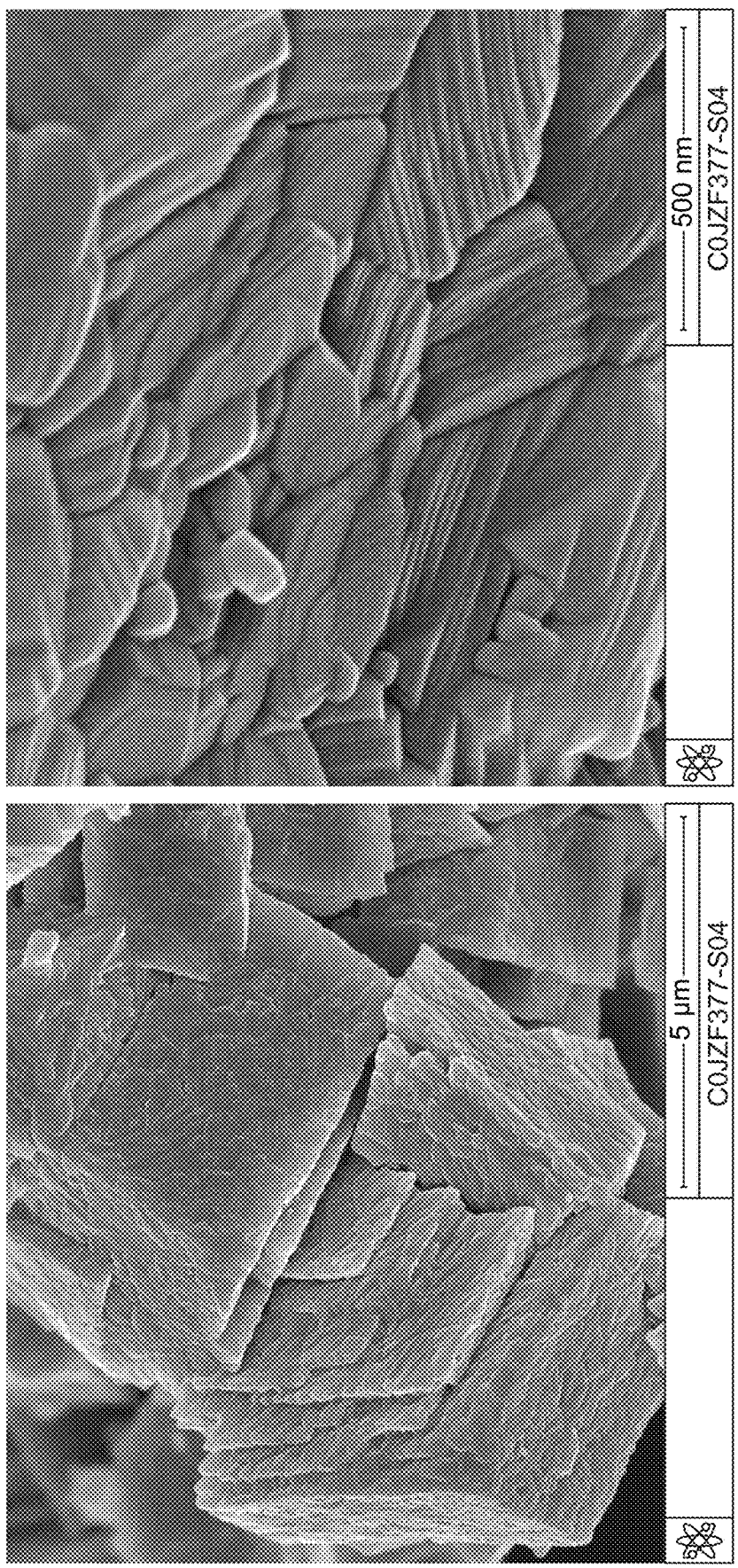
FIG. 39 includes SEM micrographs of porous MgO template particles ($M_1T_1$) made from $M_1$ template precursor particles. The template particles have inherited the precursors' equiaxed superstructure.

The type of MgO template material resulting from this process is identified herein as $M_1T_4$. The template particles retain the precursor particles' equiaxed superstructure, as shown in the SEM micrographs of FIG. 39. The template particles range from 5 µm to 20 µm in diameter. Compared to a comparable sample treated at 1050° C. (as described in Example $M_1T_1$ and shown in FIG. 37) or to a comparable sample treated at 1200° C. for only 1 minute (as described in Example $M_1T_2$ and shown in FIG. 38), the sample's particles appear to have rougher surfaces at low magnification. At higher magnification, the grains can be seen to have grown substantially during the 1200° C. isotherm. The pores evolved during thermal decomposition also appear to have been eliminated, similar to other exemplary template samples treated at 1200° C. for extended periods (e.g. $H_1T_2$ and $N_1T_2$).

Example $E_1T_1$: In another exemplary Template Stage procedure, an epsomite template precursor material may be thermally treated to form a dehydrated, basic $MgSO_4$ template material.

To demonstrate this, epsomite particles may first be generated. The epsomite particles used in this exemplary procedure are generated as described in Example $E_1$. This material represents the template precursor material that might be generated in the Precursor Stage of a full implementation of the General Method.

Next, the template precursor material may be thermally treated. This may be performed in a forced air circulation oven. The sample may be heated from room temperature to a final temperature of 215° C. During this thermal treatment, the hydrous epsomite particles may be dehydrated. The sample may be held at 215° C. for 2 hours, then allowed to cool.

Figure 40A:
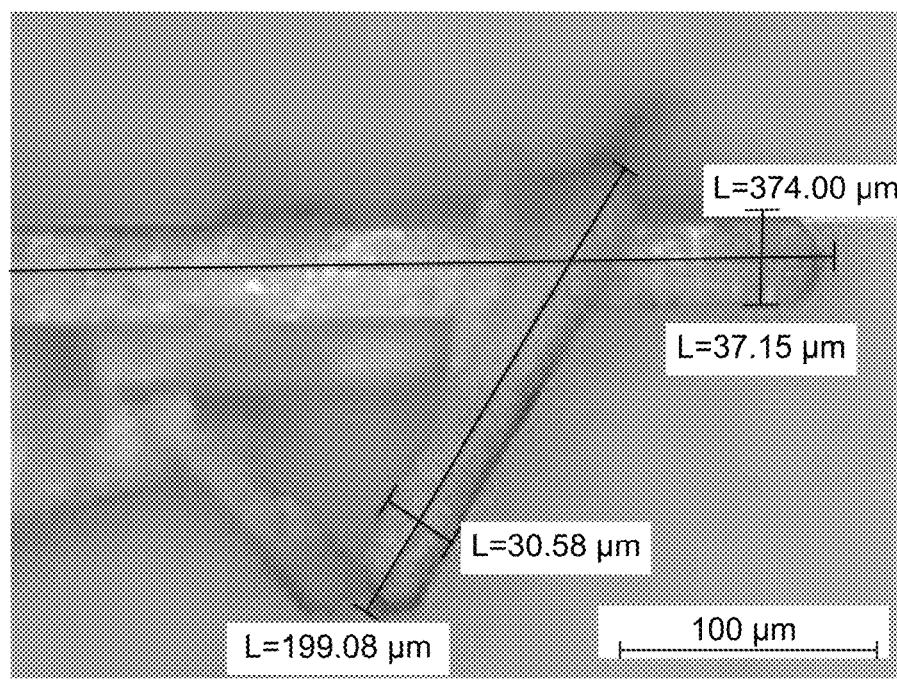
FIG. 40A is an optical micrograph of porous $MgSO_4$ template particles ($E_1T_1$) made from $E_1$ template precursor particles. The template particles have inherited the precursors' elongated superstructure.

The resulting porous, dehydrated $MgSO_4$ sample is shown in FIG. 40A, which is an optical micrograph. The smooth facets observable in $E_1$ crystals (cf. FIG. 24) have been replaced by rougher surfaces in FIG. 40A due to the evacuation of crystalline $H_2O$.

If the dehydrated $MgSO_4$ material is used in a high-temperature Replication Stage procedure, the $MgSO_4$ may initially experience further thermal effects and sintering, and this may be considered as a part of the thermal treatment used to generate the template material. Such a procedure may be performed according to Scheme B in a tube furnace, as detailed in Section III. This portion of the thermal treatment may comprise heating a sample of the dehydrated $MgSO_4$ material from room temperature to 580° C. under Ar gas flowing at 1102 sccm. During this thermal treatment, the $MgSO_4$ may continue coarsening, and a portion may decompose to MgO.

The type of $MgSO_4$ template material resulting from this process is identified herein as $E_1T_1$. Next, propylene ($C_3H_6$) gas may be introduced into the furnace, commencing surface replication. To the extent that the $MgSO_4$ template material is still coarsening, the Template Stage and Replication Stage may overlap. At some point, the pyrolytic formation of the carbon perimorphic material over the $E_1T_1$ template material may stabilize the latter, preventing further coarsening and representing the true completion of the Template Stage. CVD may be continued for 2 hours, then the furnace may then be allowed to cool under sustained Ar flow.

Figure 40B:
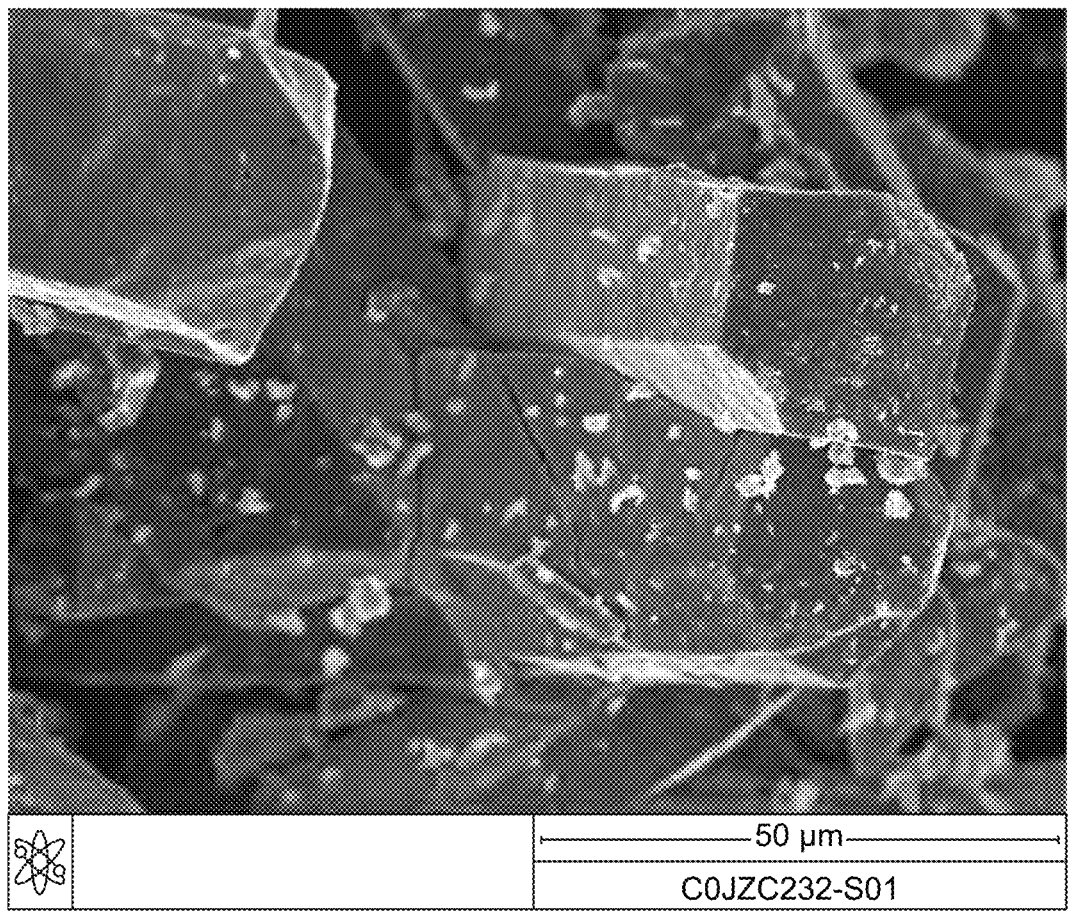
FIG. 40B is an SEM micrograph of the $E_1T_1P_{16}$-type PC particles formed from the $E_1T_1$-type template particles.
Figure 40C:
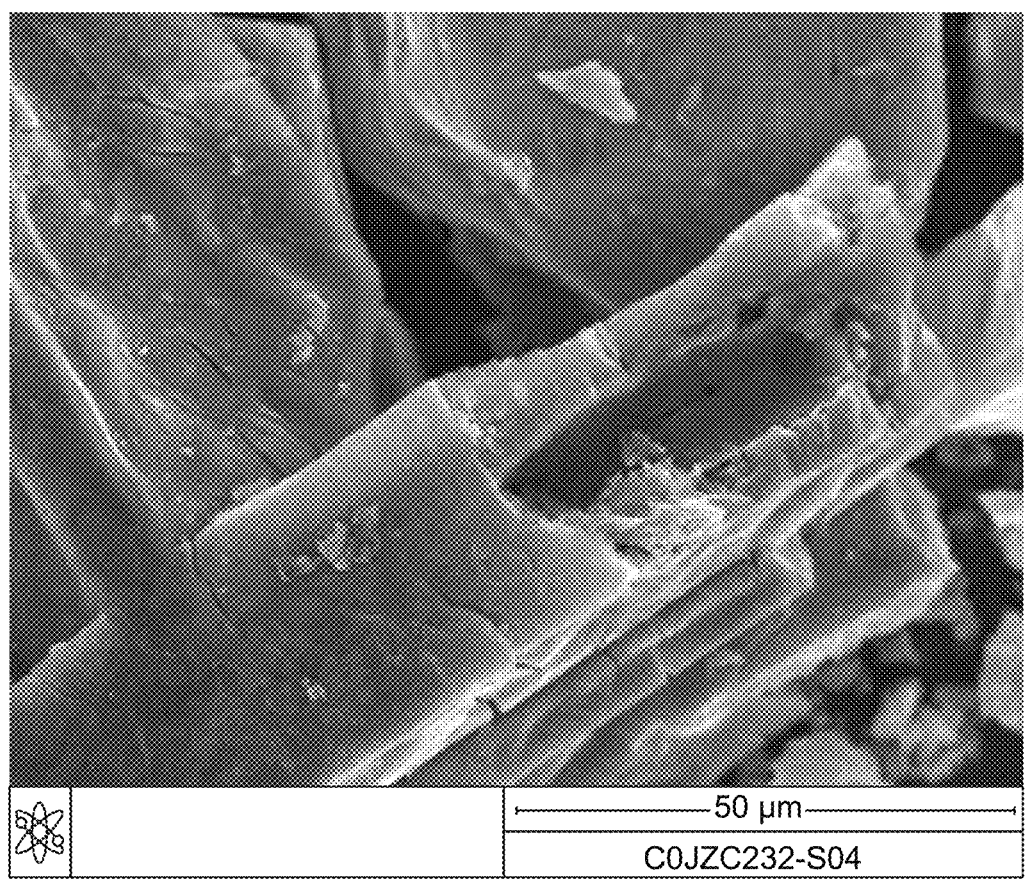
FIG. 40C is an SEM micrograph of the $P_{16}$-type perimorphic frameworks formed from the $E_1T_2P_{16}$-type PC particles.
Figure 40D:
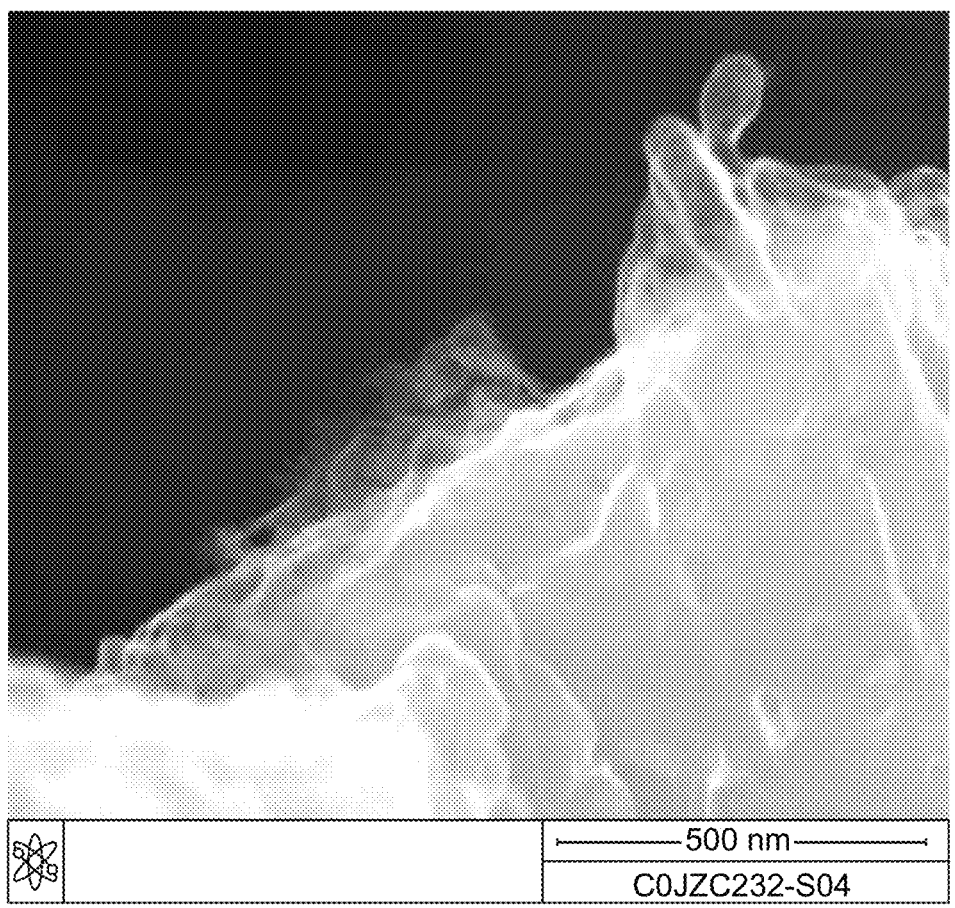
FIG. 40D is an SEM micrograph of a $P_{16}$-type perimorphic framework at higher magnification and shows the cellular substructure of the perimorphic framework.

After the furnace has cooled to room temperature, the PC material ($E_1T_1P_{16}$) is collected. This PC material is shown in the SEM micrograph of FIG. 40B. From it, we can discern that the $E_1T_1$-type template particles retained the epsomite precursor particles' superstructure, although cracking can be observed. FIG. 40C and FIG. 40D are SEM micrographs of the $P_{16}$-type carbon perimorphic frameworks formed on the $E_1T_1$-type template particles. In FIG. 40D the cellular substructure is indicative of the template's porous substructure.

Example $H_4T_1$: In another exemplary Template Stage procedure, a Li-doped hydromagnesite precursor material may be thermally treated to form a porous MgO template material.

To demonstrate this, $H_4$-type hydromagnesite particles may first be generated using the procedure described in Example $H_4$. This material represents the template precursor material that might be generated in the Precursor Stage of a full implementation of the General Method.

Next, the template precursor material may be thermally treated. This may be performed in a tube furnace according to Scheme B under an Ar flow of 2000 sccm, as detailed in Section III. The sample may be heated from room temperature to a temperature of 1050° C. at a heating rate of 20° C./min. During this thermal treatment, $CO_2$ gas may be released. In a full implementation of the General Method, the $CO_2$ process gas released during the decomposition of the template precursor material may be conserved using conventional techniques. The sample may be held at 1050° C. for 20 minutes, after which the furnace may be allowed to cool.

The type of porous MgO template material resulting from this process is identified herein as $H_4T_1$. The template particles retain the precursor particles' plate-like superstructure, as shown in the SEM micrograph of FIG. 41B. The individual plates range from approximately submicron to several microns in diameter, with an average size of around 1 μm. The average plate thickness ranges from approximately 80 nm to 100 nm and corresponds structurally to a single layer of laterally networked subunits that average between 80 nm and 100 nm in diameter. The plates exhibit high uniformity in thickness from particle to particle. The subunits are discretized with numerous pores separating the individual nanocrystals.

Figure 41A:
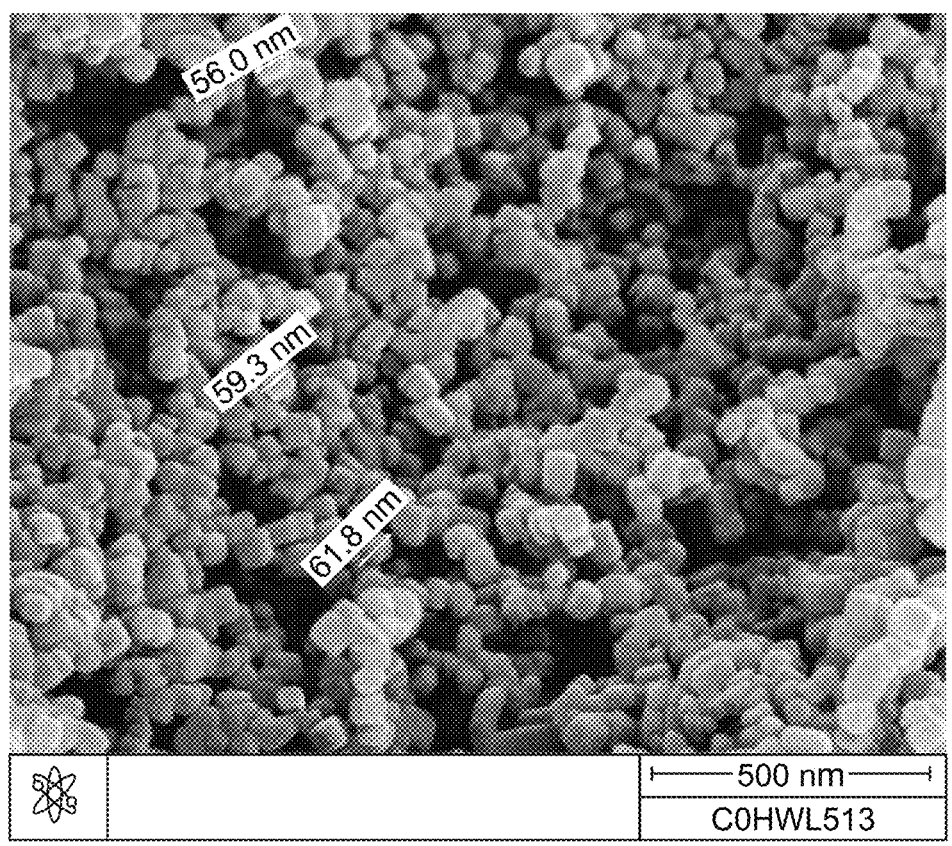
FIG. 41A is an SEM micrograph of porous MgO template particles made from undoped hydromagnesite particles. The conjoined subunits average 50 nm to 60 nm.
Figure 41B:
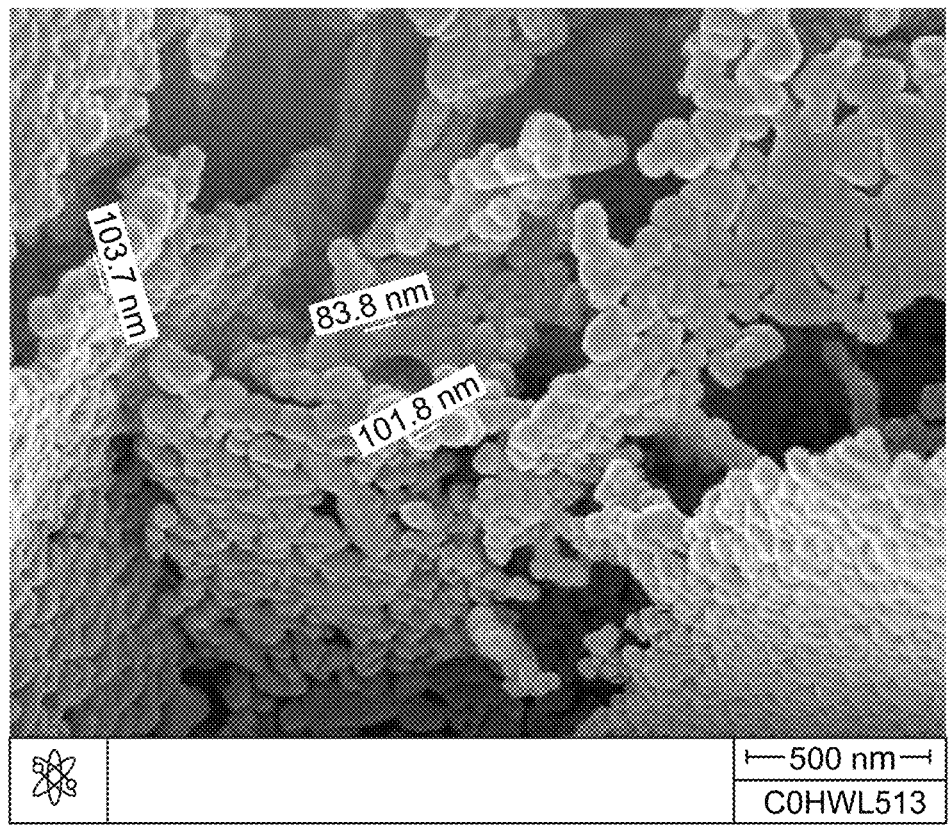
FIG. 41B is an SEM micrograph of the porous MgO template particles ($H_4T_1$) made from Li-doped hydromagnesite particles. The conjoined subunits average 80 to 100 nm, with some subunits as large as 200 nm. The template particles have inherited the precursors' thin, plate-like morphology.

At 80 nm to 100 nm in diameter, the subunits of the template particles in $H_4T_1$ are considerably larger than the 50 nm to 60 nm subunits shown in the SEM micrograph of FIG. 41A. These were derived from undoped hydromagnesite particles subjected to the same Template Stage procedure. As an approximation, a 90 nm subunit is 1.5× larger diametrically and over 3× larger volumetrically than a 60 nm subunit.

Example $H_5T_1$: In another exemplary Template Stage procedure, a Li-doped hydromagnesite precursor material may be thermally treated to form a porous MgO template material.

To demonstrate this, $H_5$-type hydromagnesite particles may first be generated using the procedure described in Example $H_5$. This material represents the template precursor material that might be generated in the Precursor Stage of a full implementation of the General Method.

Next, the template precursor material may be thermally treated. This may be performed in a tube furnace according to Scheme B under an Ar flow of 2000 sccm, as detailed in Section III. The sample may be heated from room temperature to a temperature of 1050° C. at a heating rate of 20° C./min. During this thermal treatment, $CO_2$ gas may be released. In a full implementation of the General Method, the $CO_2$ process gas released during the decomposition of the template precursor material may be conserved using conventional techniques. The sample may be held at 1050° C. for 20 minutes, after which the furnace may be allowed to cool.

Figure 41C:
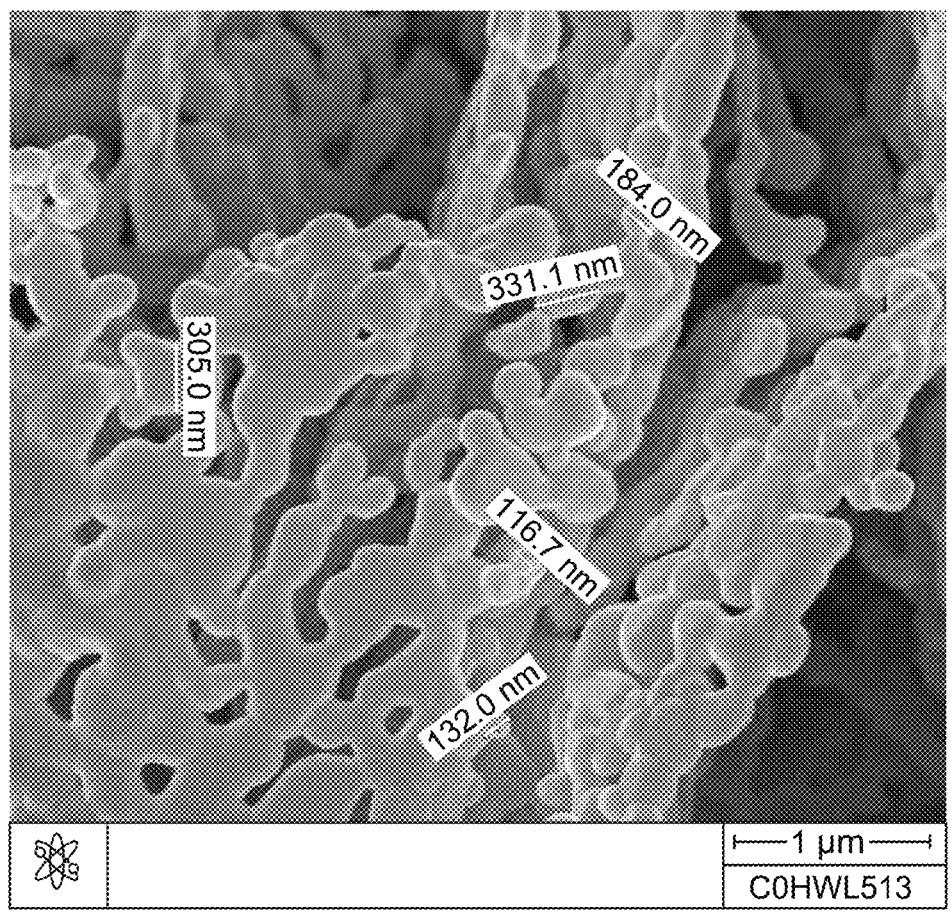
FIG. 41C is an SEM micrograph of porous MgO template particles ($H_5T_1$) made from Li-doped hydromagnesite particles. The conjoined subunits average 100 nm to 300 nm. The template particles have inherited the precursors' thin, plate-like morphology.

The type of porous MgO template material resulting from this process is identified herein as $H_5T_1$. The template particles retain the precursor particles' plate-like superstructure, but with much larger interstitial gaps between the subunits, as shown in the SEM micrograph of FIG. 41C. The plate particles range from 2 μm to 8 μm laterally and from 100 nm to 300 nm in thickness. Like other Li-doped and pure hydromagnesite-derived MgO templates, the plates are generally a single subunit in thickness.

Compared to ILL-type template particles (cf. FIG. 41B) created via the same thermal treatment, $H_5T_1$-type template particles exhibit much larger subunits, which range between 150 nm and 500 nm in lateral diameter. The subunits may be 1 to 2 OOM larger volumetrically than the subunits of an undoped, ex-hydromagnesite MgO template (cf. FIG. 41A). Additionally, the subunits are not as cuboidal as the undoped subunits and show increased elongation along the plane of the plate. This shows that increasing the dopant concentration may increase coarsening effects during thermal treatments and also change the geometry of the subunits. Given these results, doping with a variety of heteroatoms may be expected to be useful for template engineering.

Example $H_6T_1$: In another exemplary Template Stage procedure, a hydromagnesite template precursor material may be thermally treated to form a porous MgO template material.

To demonstrate this, a commercial hydromagnesite product ("Light Magnesium Carbonate" supplied by Akrochem Corporation) comprised predominately of plate-like particles may be employed.

This commercial product was selected as it may provide similar chemical and morphological properties to that of a hydromagnesite template precursor; for this reason, this precursor material is described herein as $H_6$. It represents the template precursor material that might be generated in the Precursor Stage of a full implementation of the General Method.

Next, the template precursor material may be thermally treated. This may be performed in a muffle furnace according to Scheme D, as detailed in Section III. The sample may be placed in a ceramic boat within the muffle furnace. The sample may be heated from room temperature to 750° C. at a heating rate of 5° C./min. During this thermal treatment, $CO_2$ gas may be released. In a full implementation of the General Method, the $CO_2$ process gas released during the decomposition of the template precursor material may be conserved using conventional techniques. The sample may then be held at 750° C. for 1 hour, then allowed to cool to room temperature.

The type of porous MgO template material resulting from this process is identified herein as $H_6T_1$. The template particles retain the precursor particles' plate-like superstructure, as shown in the SEM micrographs of FIG. 42. The individual plates range from approximately 0.5 μm to 2 μm along their major and intermediate axes, with an average diameter between these values. The average plate thickness is less than 100 nm and corresponds structurally to a single layer of laterally networked subunits. Plates exhibits high uniformity in thickness across particles.

Examples $M_3T_1$, $M_4T_1$, $M_5T_1$: In another set of exemplary Template Stage procedures, magnesite template precursor materials may be thermally treated to form porous MgO template materials.

To demonstrate this, $M_3$-type magnesite particles may first be generated using the procedure described in Example $M_3$, $M_4$, and $M_5$. This material represents the template precursor material that might be generated in the Precursor Stage of a full implementation of the General Method.

Next, the template precursor material may be thermally treated. This may be performed in a muffle furnace according to Scheme D, as detailed in Section III. The sample ($M_3$, $M_4$ or $M_5$) may be placed in a ceramic boat within the muffle furnace. The sample may be heated from room temperature to 580° C. at a heating rate of 5° C./min. The sample may then be maintained at to 580° C. for 1 hour. During this thermal treatment, $CO_2$ gas may be released. In a full implementation of the General Method, the $CO_2$ process gas released during the decomposition of the template precursor material may be conserved using conventional techniques. Next, the sample may be heated from 580° C. to 1050° C. at a heating rate of with the sample maintained at this temperature for 3 hours. Then, it may be allowed to cool to room temperature.

The types of porous MgO template material resulting from this process are identified herein as $M_3T_1$, $M_4T_1$, and $M_5T_1$ (corresponding to variants based on $M_3$, $M_4$, and $M_5$ template precursor materials). The $M_3T_1$, $M_4T_1$, and $M_5T_1$ template materials may be compared to demonstrate the use of dopants to increase coarsening effects during a thermal treatment. It is instructive to look at carbon perimorphic frameworks formed on these templates, since the frameworks in their native morphology are replicas of the templating surfaces (and negative replicas of the templating bulk). Additionally, carbon frameworks are also partially electron-transparent, allowing visualization of the templates' internal substructure.

The PC materials made using the $M_3T_1$, $M_4T_1$, and $M_5T_1$ template materials are identified herein as $M_3T_1P_2$, $M_4T_1P_{19}$ and $M_5T_1P_{20}$, respectively (these exemplary Replication Stage procedures are described in Section VI). The endomorphic MgO in these PC materials may then be extracted with an aqueous $H_2CO_3$ extractant solution, leaving behind the carbon perimorphic products $P_1$, $P_{19}$ and $P_{20}$. These perimorphic materials may be examined in order to determine the templates' substructure.

Figure 43A:
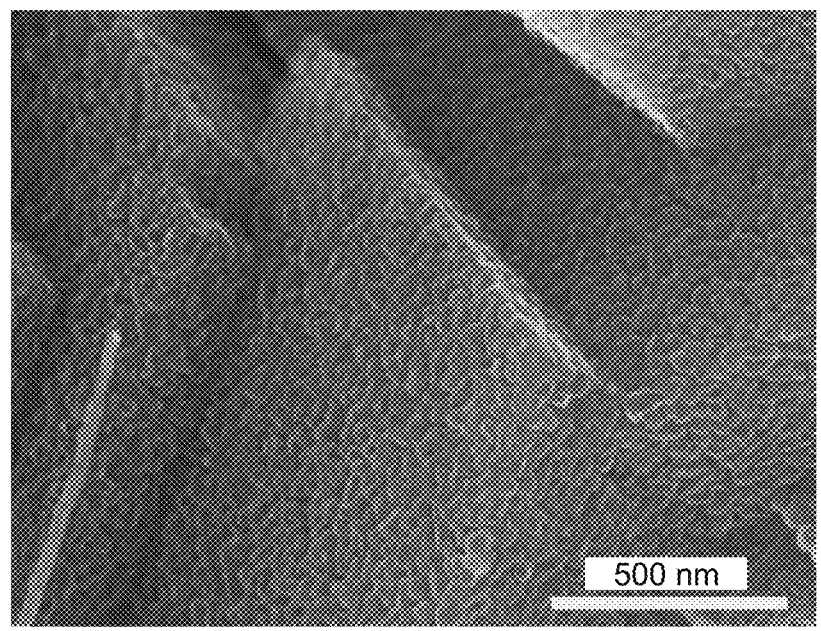
FIG. 43A is an SEM micrograph of perimorphic frameworks of type $P_1$, which are made from $M_3T_1P_1$ PC particles.
Figure 43B:
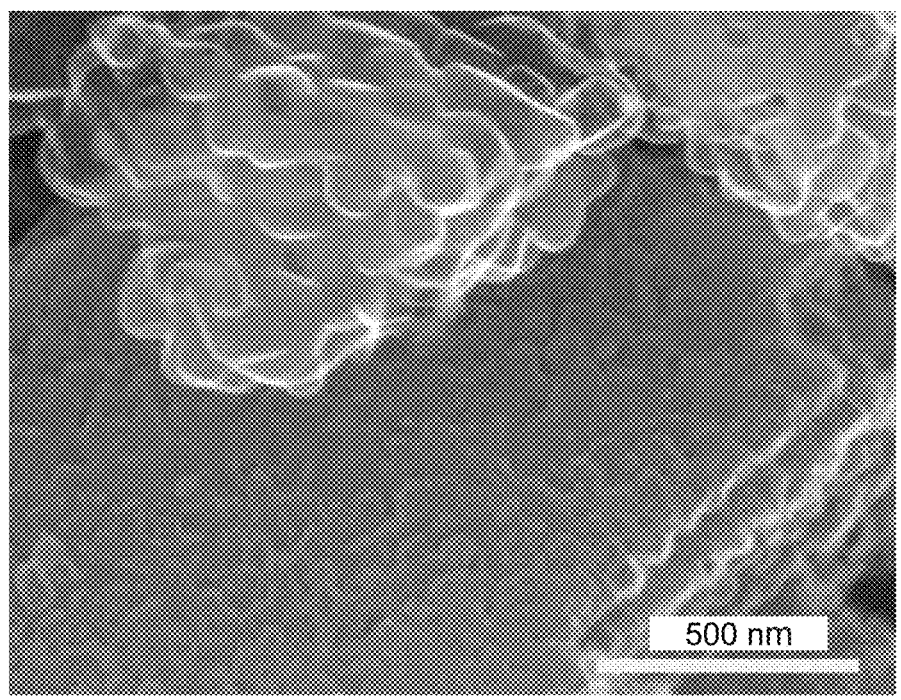
FIG. 43B is an SEM micrograph of perimorphic frameworks of type $P_{19}$, which are made from $M_4T_1P_{19}$ PC particles.
Figure 43C:
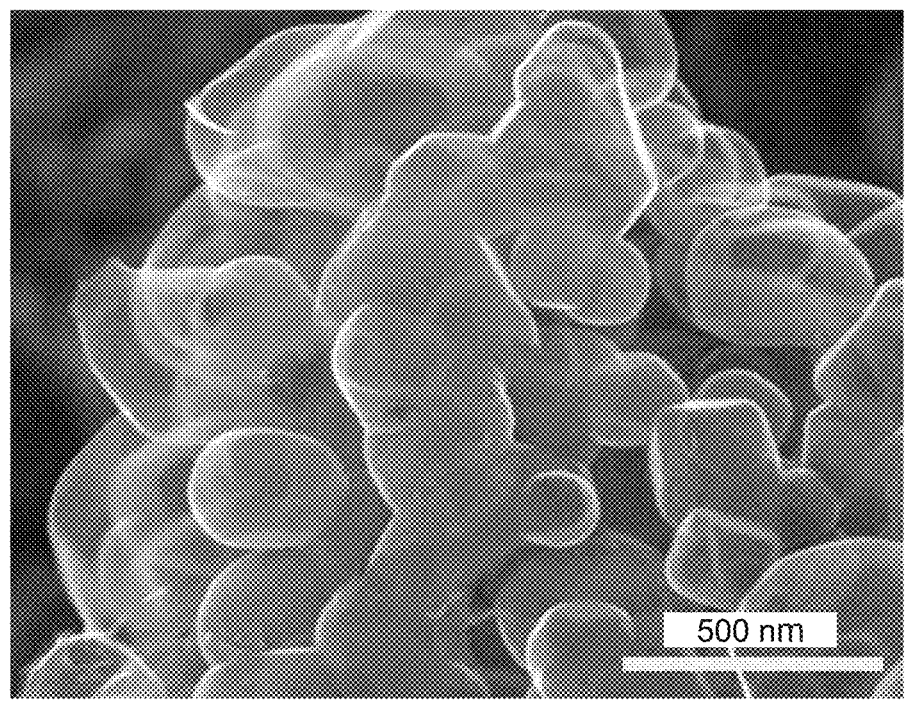
FIG. 43C is an SEM micrograph of perimorphic frameworks of type $P_{20}$, which are made from $M_5T_1P_{20}$ PC particles.

The $P_1$, $P_{19}$ and $P_{20}$ perimorphic materials are shown in the SEM micrographs of FIG. 43A, FIG. 43B, and FIG. 43C, respectively. The cellular subunits of the carbon perimorphic frameworks ($P_{20}$) that were made on the most heavily Na-doped template material ($M_5T_1$) may be 1 to 2 OOM larger volumetrically than the cellular subunits of the frameworks ($P_1$) that were made on the undoped template material ($M_3T_1$). As a result, the frameworks made on the doped template materials are dramatically less compact than the frameworks made on the undoped template.

Figure 44A:
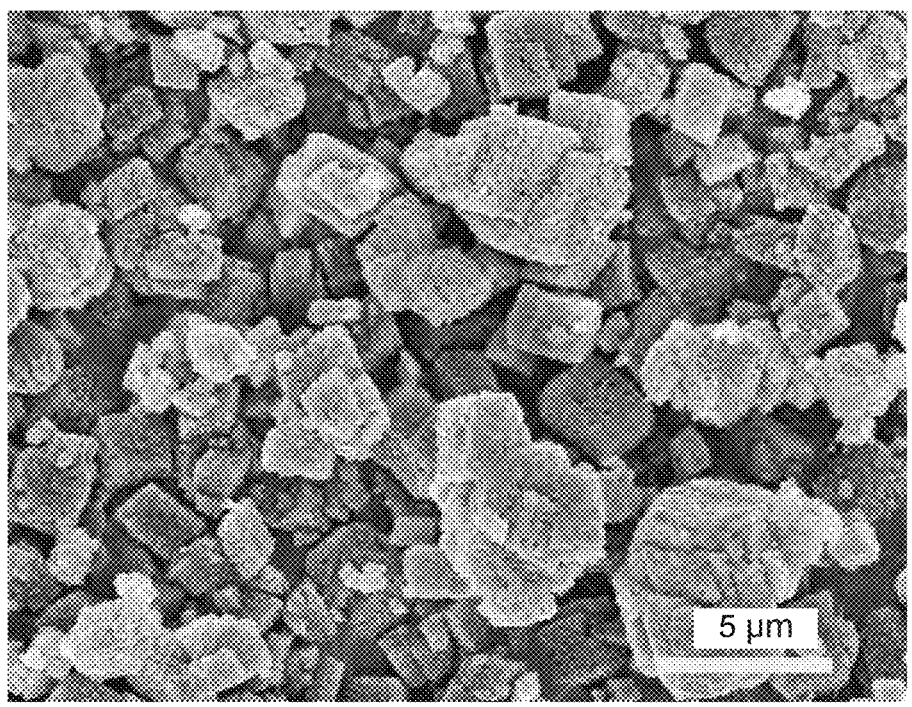
FIG. 44A is an SEM micrograph of porous MgO template particles ($M_1T_4$) made from $M_1$ template precursor particles. The template particles have inherited the precursors' equiaxed superstructure.
Figure 44B:
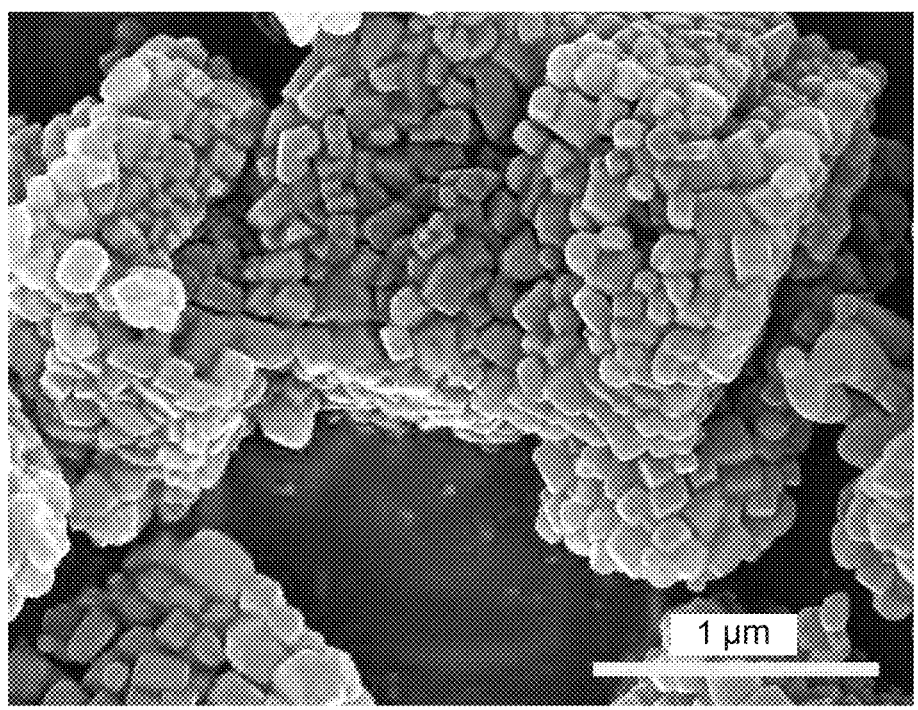
FIG. 44B and FIG. 44C are each SEM micrographs of the $M_1T_4$-type template particles at higher magnifications.
Figure 44C:
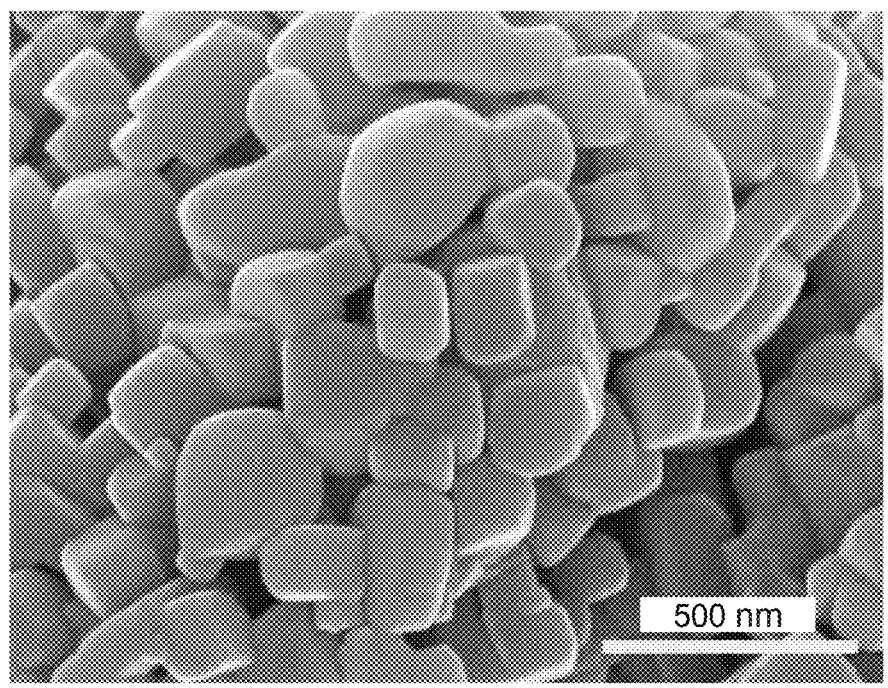

The PC materials ($M_5T_1P_{20}$) made from $M_5T_1$ are shown in FIGS. 44A-44C. The particles retain the precursor particles' equiaxed superstructure, with particles generally measuring approximately 1 μm to 5 μm. The substructure of the particles are very coarse, comprising subunits ranging from 100 nm to 400 nm.

The table in FIG. 76 summarizes the $N_2$ gas adsorption analysis of the template materials $M_3T_1$, $M_4T_1$ and $M_5T_1$. After the 1050° C. thermal treatments applied to $M_3T_1$, $M_4T_1$ and $M_5T_1$, the Na-doped template materials' BET surface area is reduced by 31% ($M_4T_1$) and 57% ($M_5T_1$) compared to the undoped template material ($M_3T_1$). Also, the Na-doped samples have 13% ($M_4T_1$) and 30% ($M_5T_1$) lower porosity than the undoped template material ($M_3T_1$) after the 1050° C. thermal treatment. As the level of dopant in the template material increases, coarsening and densification increase.

Similar to the observations made for Li-doped magnesite template precursors, this shows that Na-doping may aid in coarsening the template and reducing the compactness of the perimorphic frameworks. Other dopants may have similar effects.

Examples $M_3T_2$, $M_4T_2$, and $M_5T_2$: In another set of exemplary Template Stage procedures, magnesite template precursor materials may be thermally treated to form porous MgO template materials.

To demonstrate this, $M_3$-type, $M_4$-type, and $M_5$-type magnesite particles may first be generated using the procedure described in Examples $M_3$, $M_4$, and $M_5$. This material represents the template precursor material that might be generated in the Precursor Stage of a full implementation of the General Method.

Next, the template precursor material may be thermally treated. This may be performed in a muffle furnace according to Scheme D, as detailed in Section III. The sample ($M_3$, $M_4$ or $M_5$) may be placed in a ceramic boat within the muffle furnace. The sample may be heated from room temperature to 580° C. at a heating rate of 5° C./min. The sample may then be maintained at to 580° C. for 1 hour. During this thermal treatment, $CO_2$ gas may be released. In a full implementation of the General Method, the $CO_2$ process gas released during the decomposition of the template precursor material may be conserved using conventional techniques. Next, the sample may be heated from 580° C. to 900° C. at a heating rate of with the sample maintained at this temperature for 1 hour. Then, it may be allowed to cool to room temperature.

The types of porous MgO template material resulting from this process are identified herein as $M_3T_2$, $M_4T_2$, and $M_5T_2$ (corresponding to variants based on $M_3$, $M_4$, and $M_5$ template precursor materials).

The table in FIG. 76 summarizes the $N_2$ gas adsorption analysis of the template materials $M_3T_2$, $M_4T_2$ and $M_5T_2$. After the 900° C. thermal treatment, the Na-doped template materials' surface area is reduced by 8% ($M_4T_2$) and 78% ($M_5T_2$) compared to the undoped template material ($M_3T_1$). Their reduced surface area is consistent with the relatively coarser substructures of the Na-doped template materials vs. the undoped template materials.

Results for BJH are limited to a pore size range of 1.70 nm and 300 nm for this $N_2$ gas adsorption method. Using the calculated BJH cumulative pore volume it may be possible to determine the porosity of the template particles. The porosity may be defined as the ratio of specific pore volume to the specific template volume and can be thought of as the percentage of total space occupied by pores with respect to the total particle. The BJH desorption cumulative pore volume ($V_{PORE}$) may be used as a measure of the specific pore volume of the template particles. The specific MgO volume ($V_{MgO}$) may be the specific volume of the MgO component of the porous MgO template—i.e. the reciprocal of the theoretical density of MgO. The specific template volume ($V_{TEM}$) may be the sum of specific pore volume and specific MgO volume. Using the formula shown below, the porosity of the template particles may be determined:

$$\text{Porosity (\%)} = \frac{V_{PORE}}{V_{TEM}} = \frac{V_{PORE}}{(V_{PORE} + V_{MgO})}$$

$$\text{Template Space (\%)} = 1 - \text{Porosity (\%)}$$

After the 900° C. thermal treatment, the doped samples have 1.5% ($M_4T_2$) and 58% ($M_5T_2$) lower porosity than the undoped template material ($M_3T_2$). This demonstrates, as in previous exemplary procedures, that the level of dopant in the template material can be used to influence coarsening and densification effects. Taken in tandem with the results of Li-doping that have been described, this demonstrates the ability to tune a perimorphic framework's compactness, the size and morphology of its cellular subunits, and its ratio of endocellular vs. exocellular space.

Example $M_3T_3$: In another exemplary Template Stage procedure, magnesite template precursor materials may be thermally treated to form porous MgO template materials.

To demonstrate this, $M_3$-type magnesite particles may first be generated using the procedure described in Example $M_3$. This material represents the template precursor material that might be generated in the Precursor Stage of a full implementation of the General Method.

Next, the template precursor material may be thermally treated. This may be performed in a muffle furnace according to Scheme D, as detailed in Section III. The template precursor sample may be placed in a ceramic boat within the muffle furnace. The sample may be heated from room temperature to 580° C. at a heating rate of 5° C./min. The sample may then be maintained at 580° C. for 13.5 hr. During this thermal treatment, $CO_2$ gas may be released. In a full implementation of the General Method, the $CO_2$ process gas released during the decomposition of the template precursor material may be conserved using conventional techniques. Next, the sample may be heated from 580° C. to 1050° C. at a heating rate of with the sample maintained at this temperature for 1 hr. Then, it may be allowed to cool to room temperature.

The type of porous MgO template material resulting from this process are identified herein as $M_3T_3$.

Example $N_2T_1$: In another exemplary Template Stage procedure, a nesquehonite template precursor material may be thermally treated to form a porous MgO template material.

To demonstrate this, $N_2$-type nesquehonite particles may first be generated using the procedure described in Example $N_2$. This material represents the template precursor material that might be generated in the Precursor Stage of a full implementation of the General Method.

Next, the template precursor material may be thermally treated using steam as a coarsening aid. This may be performed in a rotary tube furnace according to Scheme A, as detailed in Section III. The quartz tube may be rotated at 1 rpm. Under dry Ar flow, an $N_2$ sample may be heated from room temperature to 450° C. at a heating rate of 5° C./min in the furnace. Once the furnace reaches 450° C., Ar flow through a bubbler may be started at a flow rate of 2360 sccm. The chamber of the bubbler may be maintained at slight positive pressure of 0.23 psig and an external temperature of 100° C. may be maintained to saturate the bubbler headspace with water vapor. The furnace may be maintained at 450° C. for 1 hour, after which it may then be heated at a heating rate of 5° C./min to 500° C. After 1 hour at 500° C., the furnace may be heated at a heating rate of 5° C./min to the final temperature of 1000° C. and held at 1000° C. for 1 hour. During this thermal treatment, $CO_2$ gas may be released. In a full implementation of the General Method, the $CO_2$ process gas released during the decomposition of the template precursor material may be conserved using conventional techniques. At this point, dry Ar flow may be resumed and the sample may be cooled to room temperature under flowing, dry Ar.

The type of porous MgO template material resulting from this process is identified herein as $N_2T_1$. The template particles retain the precursor particles' elongated superstructure. This can be observed in SEM micrographs of an exemplary PC material ($N_2T_1P_{21}$) made via surface replication on the $N_2T_1$ template particles. The $N_2T_1P_{21}$ PC material, comprising a thin, electron-transparent carbon perimorphic phase and an $N_2T_1$ endomorphic phase, is shown in the SEM micrographs of FIG. 45. Provided the carbon perimorphic walls are sufficiently thin, imaging the PC material is a good way to understand the template substructure and superstructure, since the PC material comprises the endomorphic template particles coated with a conformal, conductive layer.

Figure 32:
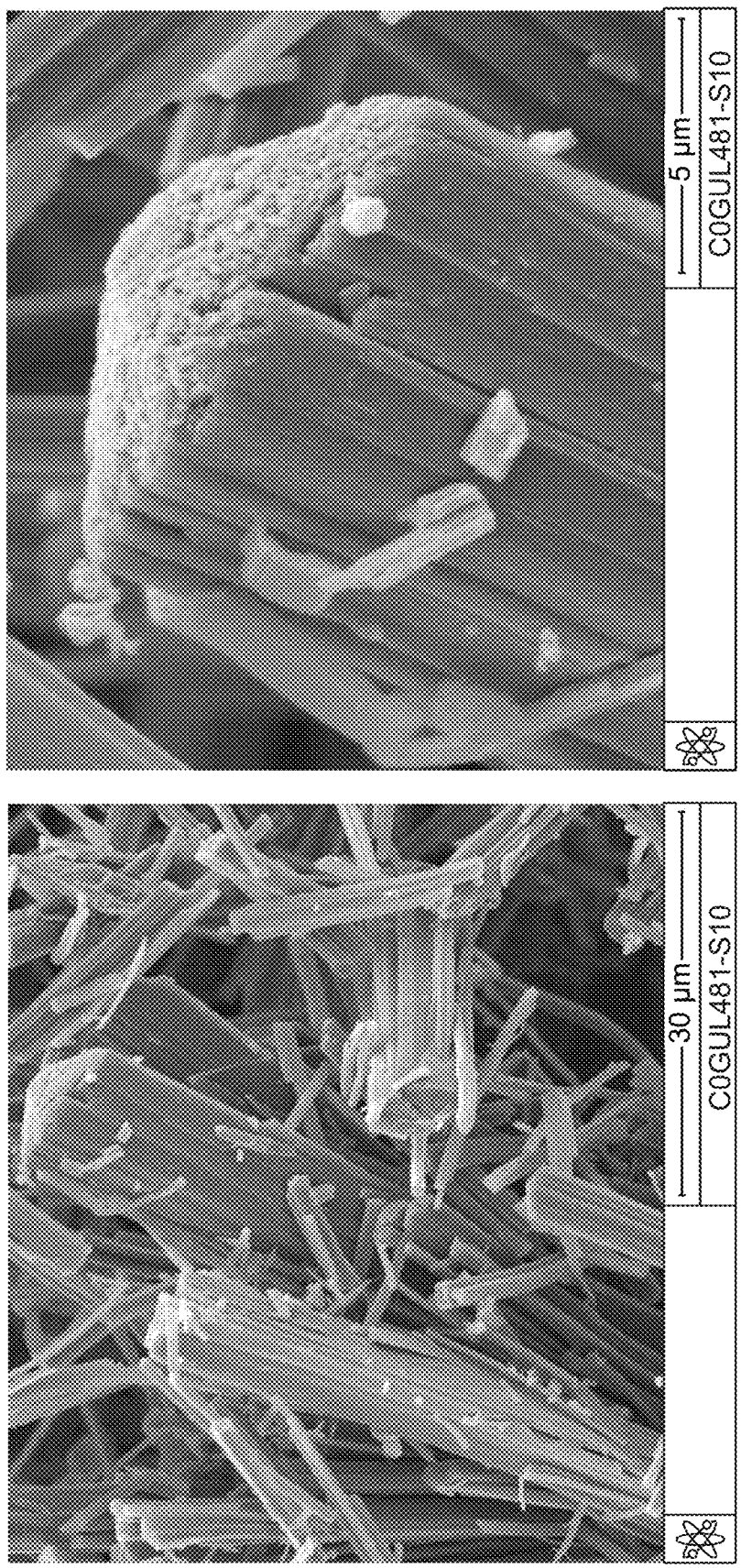
FIG. 32 includes SEM micrographs of porous MgO template particles ($N_1T_1$) made from $N_1$ template precursor particles. The template particles have inherited the precursors' elongated superstructure.
Figure 45:
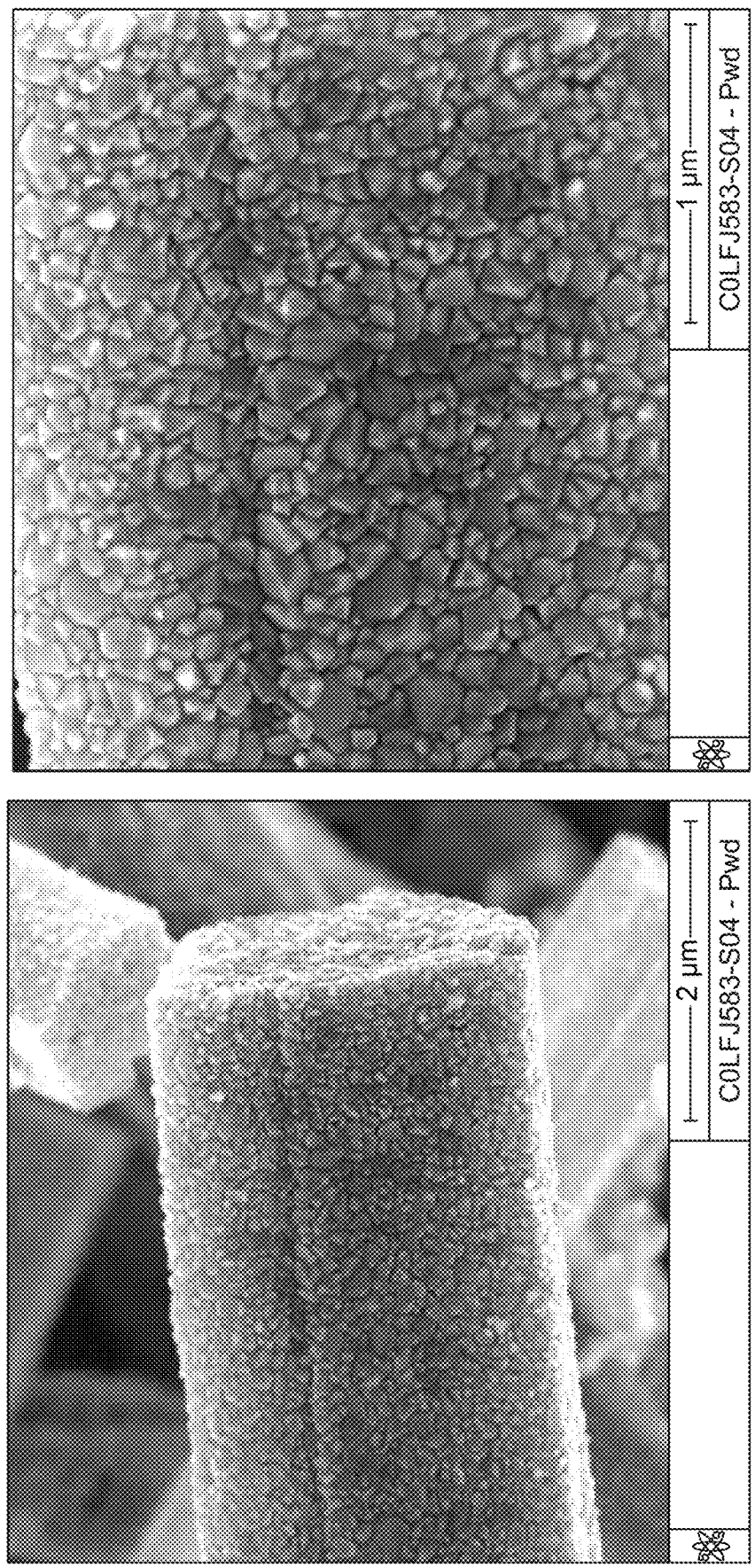
FIG. 45 includes SEM micrographs of PC particles ($N_2T_1P_{21}$). The template particles ($N_2T_1$) were made by treating $N_2$ template material with heat and water vapor.

In FIG. 45, it is evident that the $N_2T_1$ template materials are coarser than a the $N_1T_1$ template materials (cf. FIG. 32). The subunits range in size from 50 and 400 nm. This demonstrates the use of water vapor during a heat treatment to increase coarsening during the Template Stage. Of particular note, the template's porosity appears to be substantially decreased, and the small slit-like morphology of the pores between the subunits is notable.

Example $N_2T_2$: In another exemplary Template Stage procedure, a nesquehonite template precursor material may be thermally treated to form a porous MgO template material.

To demonstrate this, $N_2$-type nesquehonite particles may first be generated using the procedure described in Example $N_2$. This material represents the template precursor material that might be generated in the Precursor Stage of a full implementation of the General Method.

Next, the template precursor material may be thermally treated. This may be performed in a rotary tube furnace according to Scheme A, as detailed in Section III. The quartz tube may be rotated at 1 rpm. Under dry Ar flow, an $N_2$-type sample may be heated from room temperature to 450° C. at a heating rate of 5° C./min in the furnace. Once the furnace reaches 450° C., dry Ar flow through a bubbler may be started at a flow rate of 2360 sccm. The furnace may be maintained at 450° C. for 1 hour, after which it may then be heated at a heating rate of 5° C./min to 500° C. After 1 hour at 500° C., the furnace may be heated at a heating rate of 5° C./min to the final temperature of 1000° C. and held at 1000° C. for 1 hour. During this thermal treatment, $CO_2$ gas may be released. In a full implementation of the General Method, the $CO_2$ process gas released during the decomposition of the template precursor material may be conserved using conventional techniques. At this point, dry Ar flow may be resumed and the sample may be cooled to room temperature under flowing, dry Ar.

The type of porous MgO template material resulting from this process is identified herein as $N_2T_2$. $N_2$ gas adsorption may be performed on these templates, applying methods described previously. As seen in the table in FIG. 77, compared to the $N_2T_2$ template material generated via a dry treatment of $N_2$-type precursor material at 1000° C., the $N_2T_1$ template material generated via a steam-assisted treatment of $N_2$-type precursor material at 1000° C. resulted in a 59% reduction in surface area. This shows that coarsening may be increased by utilizing water vapor.

Examples $N_2T_3$, $N_2T_4$, $N_2T_5$, and $N_2T_6$: In another set of exemplary Template Stage procedures, nesquehonite template precursor materials may be thermally treated to form porous MgO template materials.

To demonstrate this, $N_2$-type nesquehonite particles may first be generated using the procedure described in Example $N_2$. This material represents the template precursor material that might be generated in the Precursor Stage of a full implementation of the General Method.

Next, the template precursor material may be thermally treated in several ways summarized in the table in FIG. 78. Each of these thermal treatments may be performed in a tube furnace according to Scheme B, as detailed in Section III. Briefly, all procedures involve initiating a desired flow of carrier gas and treating the template precursor samples under a desired thermal conditions. Each thermal treatment may involve either a single isothermal segment or multiple isothermal segments. During this thermal treatment, $CO_2$ gas may be released. In a full implementation of the General Method, the $CO_2$ process gas released during the decomposition of the template precursor material may be conserved using conventional techniques. The template precursor material, carrier gas, furnace scheme, heating rate, temperature setting, and isotherm duration of each segment are specified in the table in FIG. 78. After all of the segments pertaining to a thermal treatment have elapsed, the furnace may be allowed to cool to room temperature under sustained flow of the carrier gas.

The type of porous MgO template materials resulting from the processes are identified herein as $N_2T_3$, $N_2T_4$, $N_2T_5$, and $N_2T_6$. These variants were performed to test how thermal treatment parameters affect the resulting template morphology.

Figure 46A:
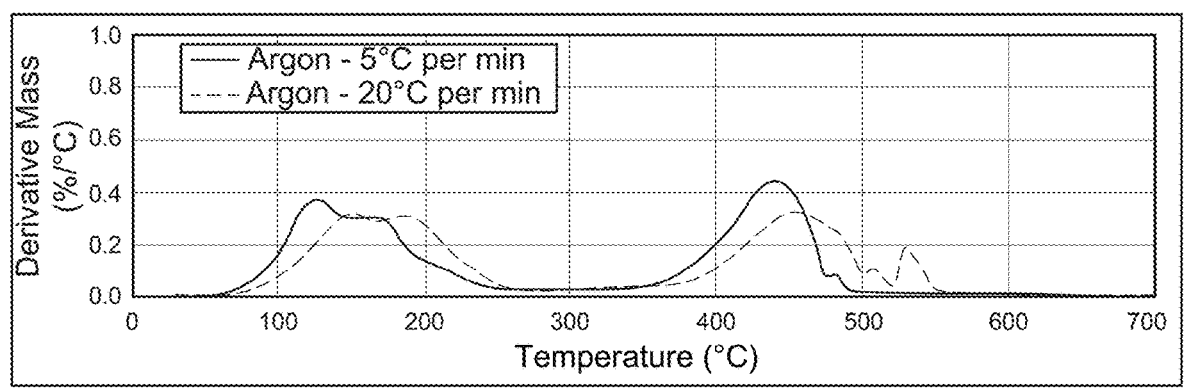
FIG. 46A shows the TGA rate of mass loss (%/° C.) for the $N_2$ template precursor material. The rate of mass loss is shown for a sample heating rate of 5° C. per minute and a sample heating rate of 20° C. per minute under 100 sccm flowing Ar.
Figure 46B:
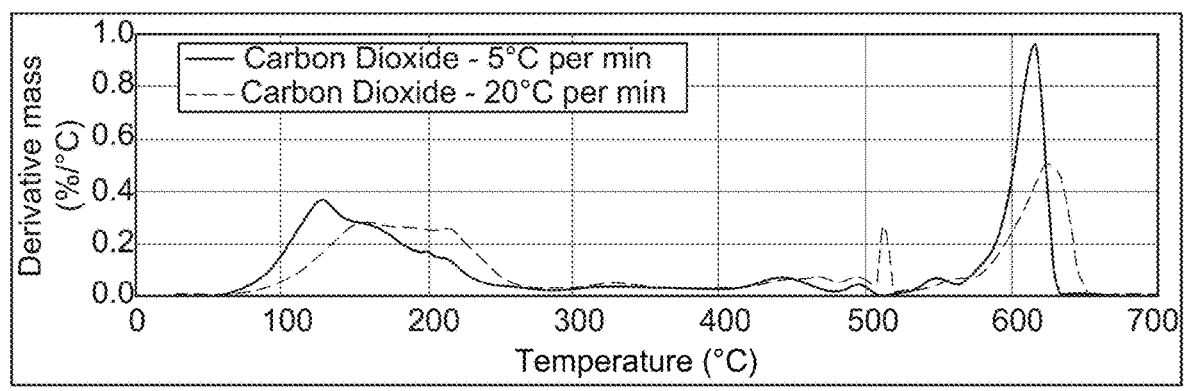
FIG. 46B shows the TGA rate of mass loss for the $N_2$-type template precursor material at a sample heating rate of 5° C. per minute and a sample heating rate of 20° C. per minute under 100 sccm flowing $CO_2$.

During thermal treatment of hydrated $MgCO_3 \cdot xH_2O$ template precursor materials, $H_2O$ and $CO_2$ are the two primary gases released. The thermogravimetric mass loss profiles for $N_2$-type template precursor material in Ar is shown in FIG. 46A. This chart shows the derivative of mass loss (%/° C.) for an $N_2$-type template precursor material at heating rates of 5° C./min and 20° C./min. Dehydration may be substantially complete by 300-350° C. Decarboxylation may be substantially complete by 500-550° C., producing MgO. With the faster 20° C./min heating rate, the mass loss profile is shifted to higher temperatures. FIG. 46B shows the thermogravimetric mass loss profiles for $N_2$-type template precursor material in $CO_2$. Compared to the mass loss in Ar, the mass loss $CO_2$ is delayed until higher temperatures and occurs more suddenly, as shown by the height of the derivative curve.

Figure 47A:
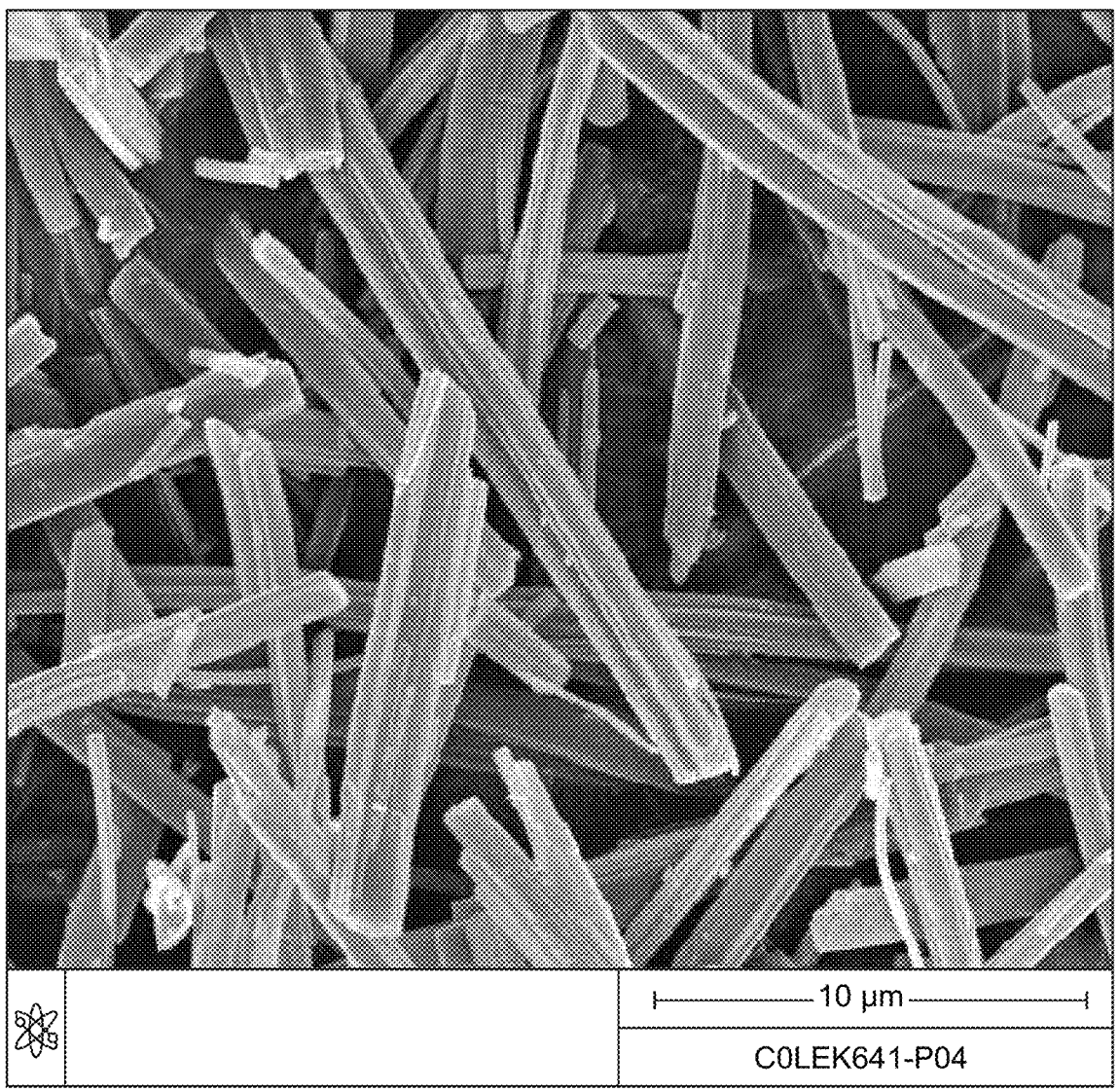
FIG. 47A is an SEM micrograph of porous MgO template particles ($N_2T_4$) made from $N_2$ template precursor particles. The $N_2$ template precursor material was heated under flowing Ar at a rate of 5° C. per minute.
Figure 47B:
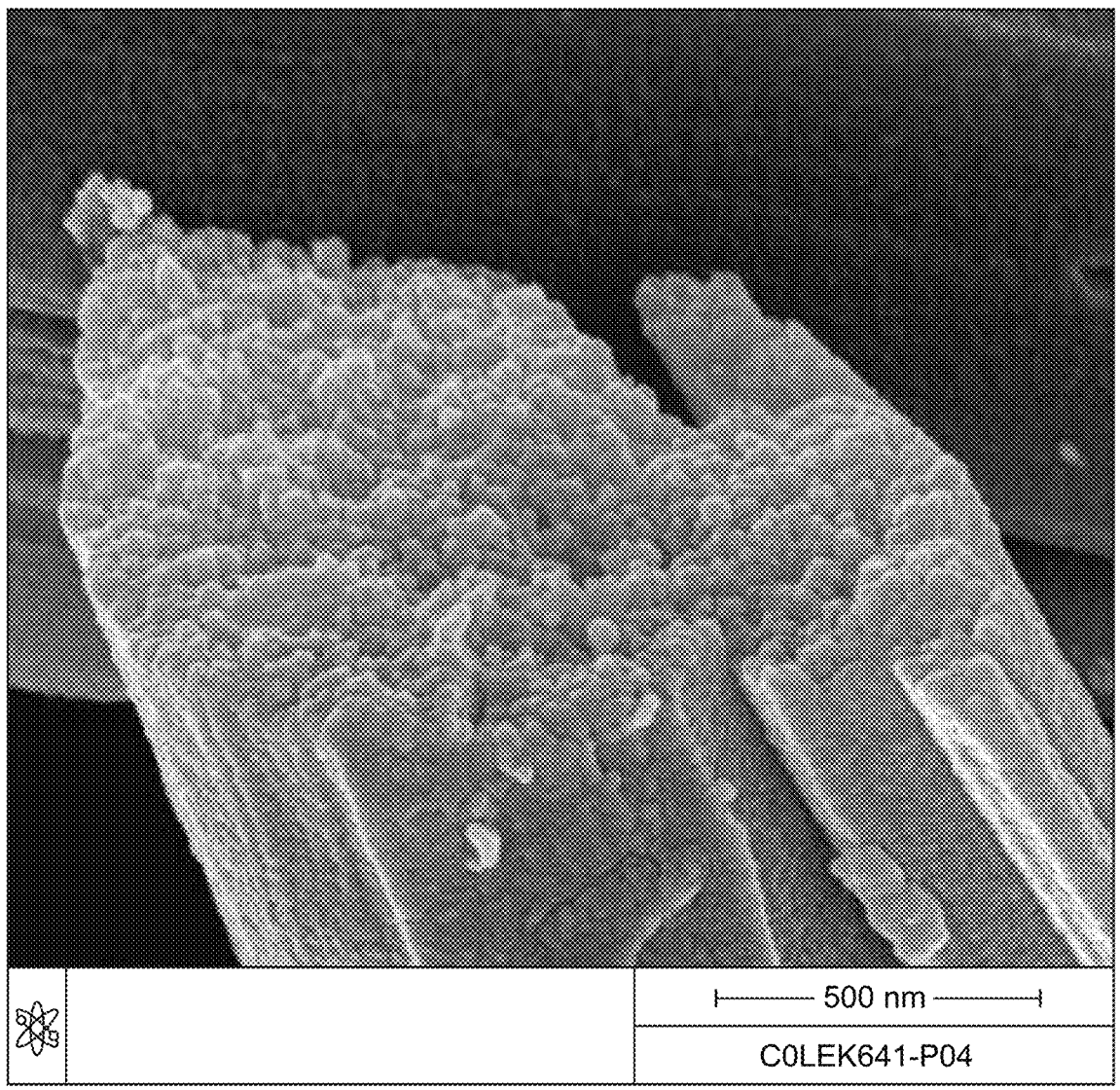
FIG. 47B is an SEM micrograph of an $N_2T_4$-type template particle at higher magnification.

The $N_2T_3$-type template material is shown in the SEM micrographs of FIGS. 47A-47B. This template material, generated under Ar flow at a heating rate of 5° C./min from room temperature to 640° C., retains the elongated superstructure of the $N_2$-type precursor particles. The porous substructure comprises uniform, repeating subunits, and no macropores are apparent.

Figure 48A:
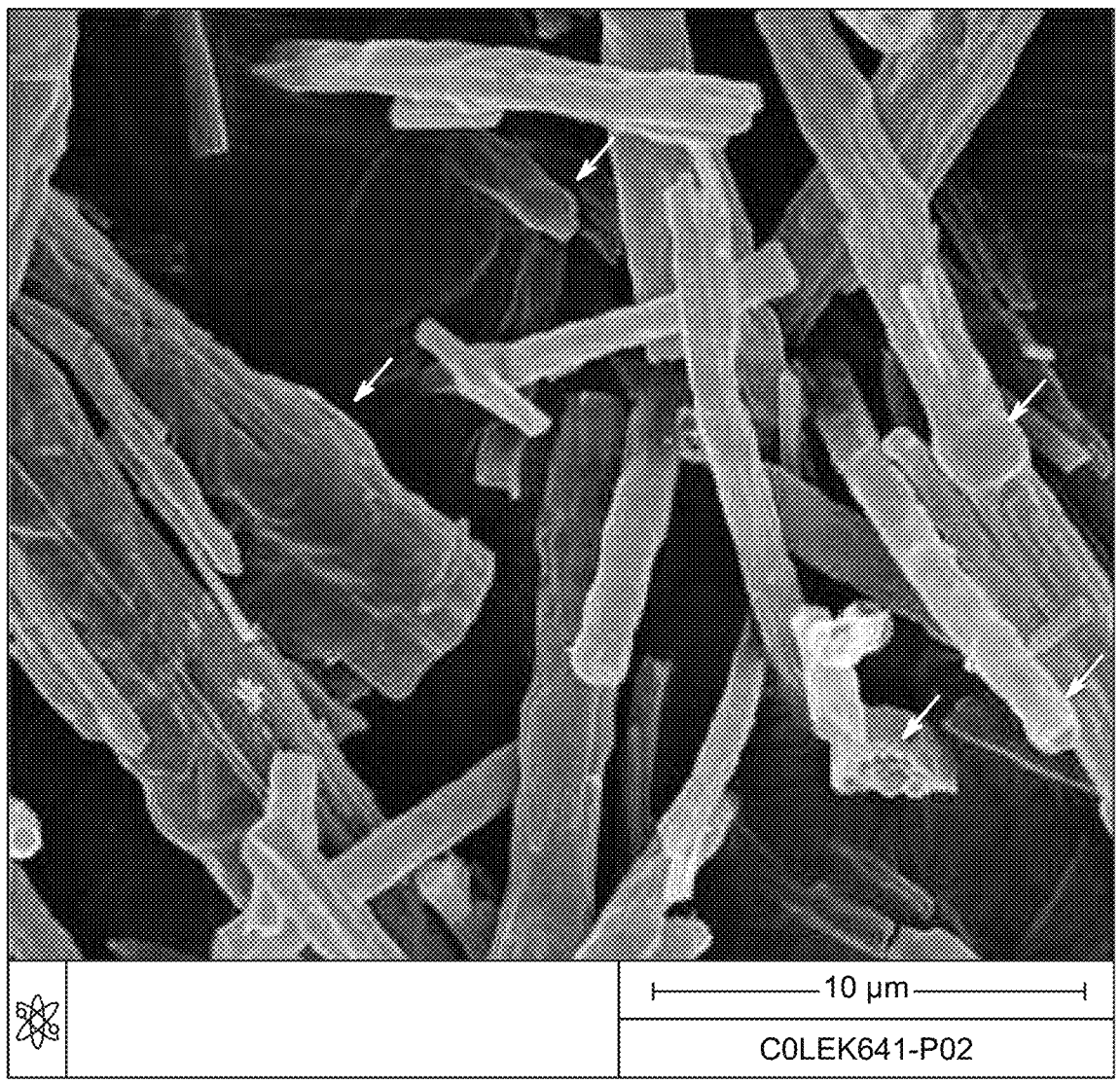
FIG. 48A is an SEM micrograph of porous MgO template particles ($N_2T_5$) made from $N_2$ template precursor particles. The $N_2$ template precursor material was heated under flowing Ar at a rate of 20° C./min. The arrows indicate swollen regions of the elongated superstructure typical of these template particles. The swollen regions are associated with internal macropores created during the heat treatment.
Figure 48B:
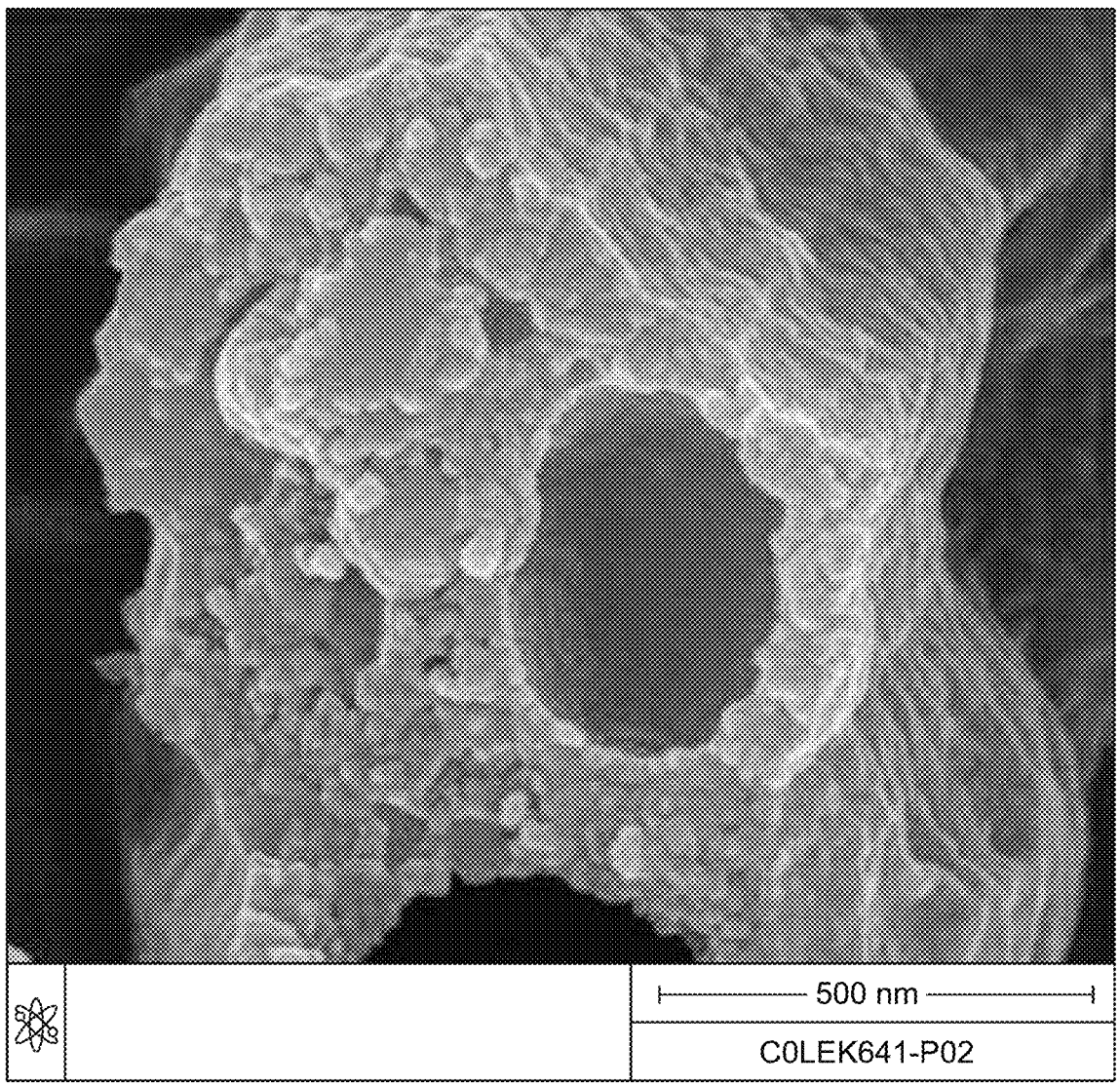
FIG. 48B is an SEM micrograph showing an internal macropore within a $N_2T_5$-type porous MgO template particle.

The $N_2T_4$-type template material is shown in the SEM micrographs of FIGS. 48A-48B. This template material, generated under Ar flow at a heating rate of 20° C./min from room temperature to 640° C., retains the elongated superstructure of the $N_2$-type precursor particles. The porous substructure comprises macropores in addition to the mesopores between the subunits. These macropores are internal and only visible as bulbous protrusions except at places where the template particles are broken, which allows the interior to be seen. These protrusions result in an undulating surface, as marked with arrows in FIG. 48A. These cavities are formed via expansion of volatilized $CO_2$ gas produced during thermal decomposition. This gas acts as a blowant, creating macropores (FIG. 48B) and plastically deforming the surrounding phase of non-crystalline $MgCO_3 \cdot xH_2O$.

Figure 49A:
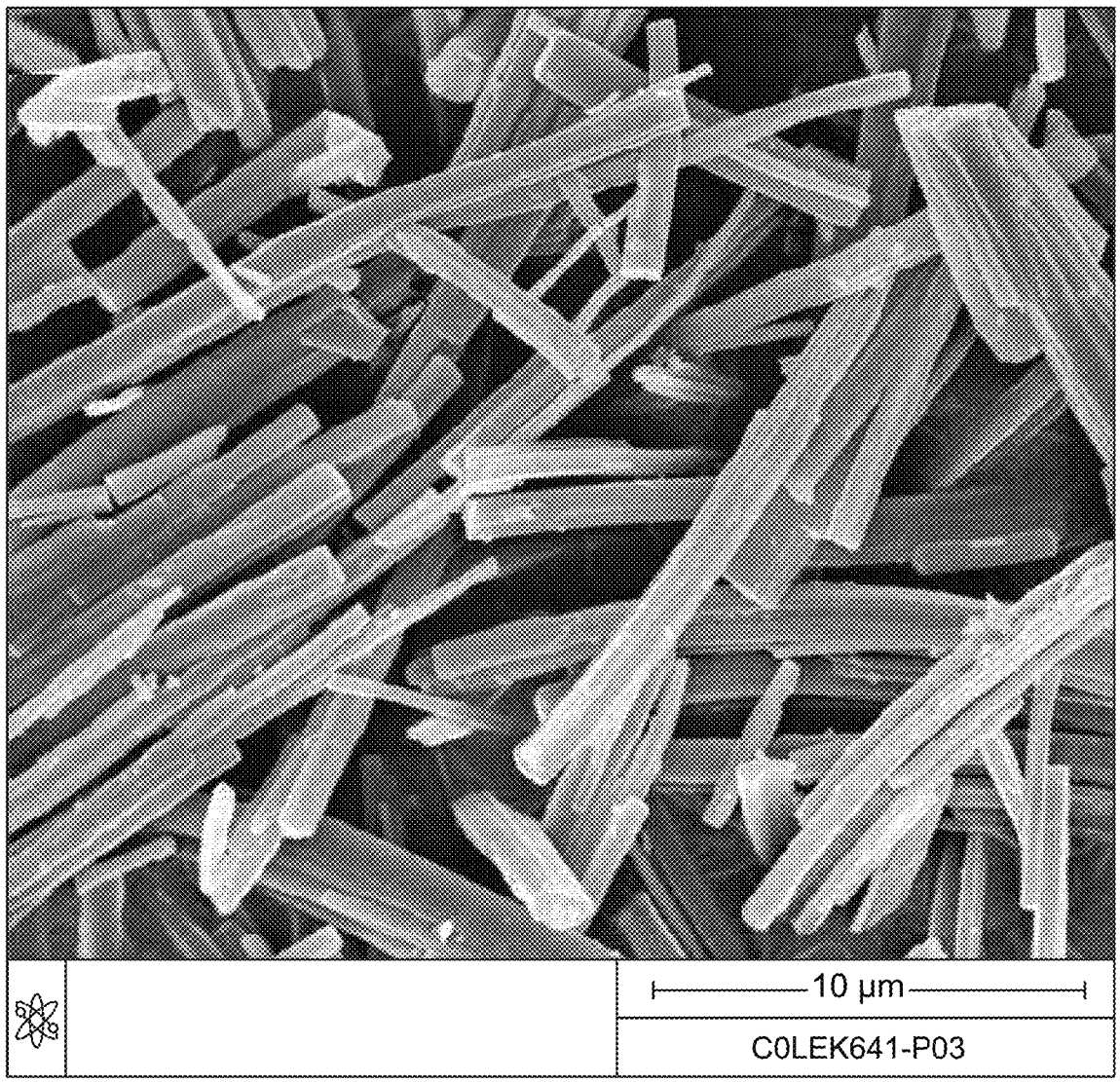
FIG. 49A is an SEM micrograph of porous MgO template particles ($N_2T_6$) made from $N_2$ template precursor particles. The $N_2$ template precursor material was heated under flowing $CO_2$ at a heating rate of 20° C./minute to a temperature of 350° C., then further heated at a heating rate of 5° C. per minute.
Figure 49B:
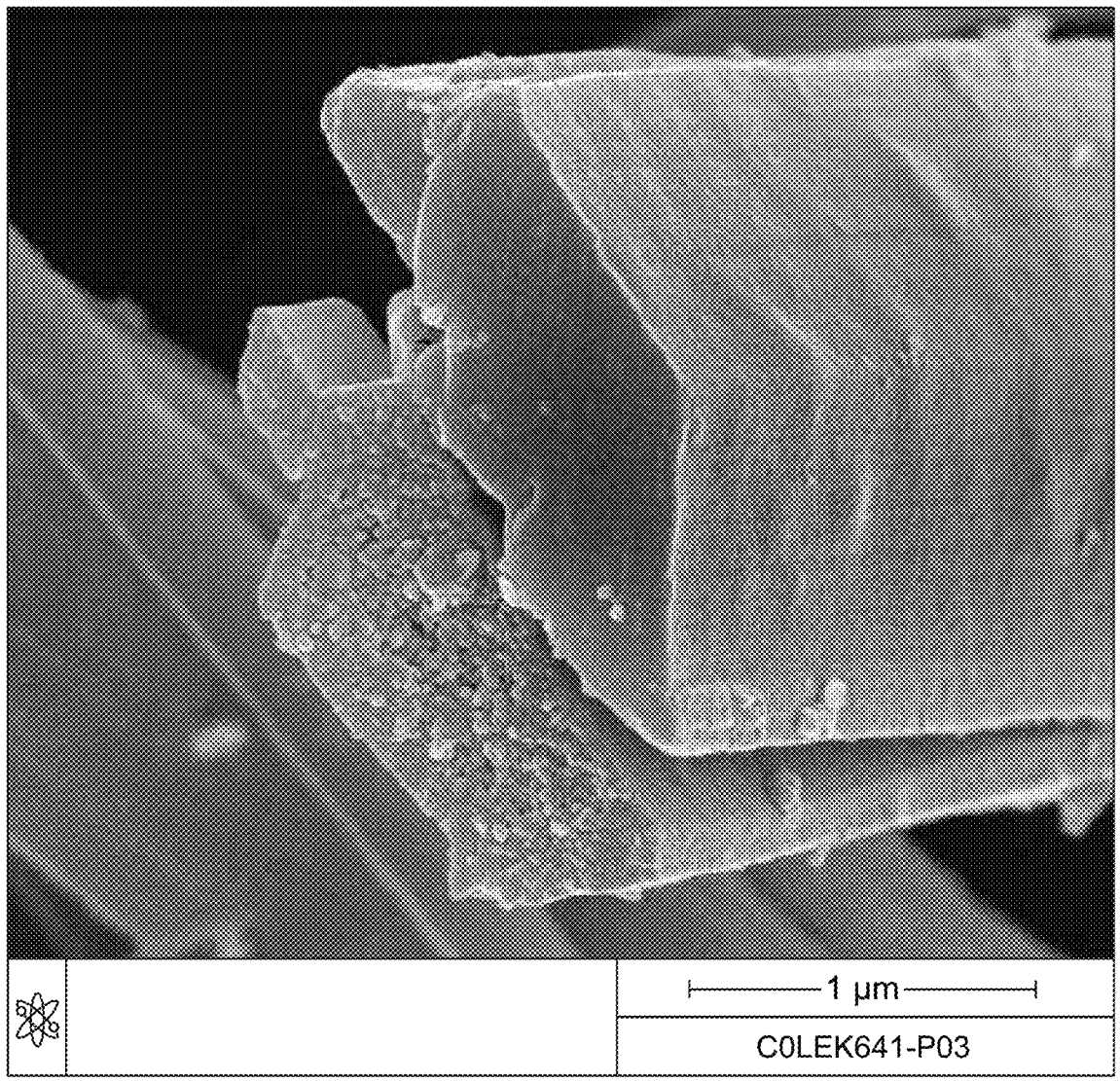
FIG. 49B is an SEM micrograph of the $N_2T_6$-type template particles at higher magnification.

The $N_2T_5$-type template material is shown in the SEM micrographs of FIGS. 49A-49B. This template material, generated under Ar flow at a heating rate of 20° C./min from room temperature to 350° C., followed by a heating rate of 5° C./min from 350° C. to 640° C., does not form internal macropores and the associated bulbous protrusions. Instead, the prismatic superstructure of the elongated nesquehonite precursor particles is retained by the template particles. The substructure comprises regular repeating subunits and mesopores. The absence of macropores indicates that the increased heating rate during decarboxylation exacerbates the build-up of $CO_2$ trapped in the particles' bulk.

The template particles' internal macropores are inherited by the PC particles produced in the Replication Stage and the perimorphic frameworks produced in the Separation Stage. These internal macropores can be clearly observed in Cui's mesoporous graphene fibers. Elimination of these macropores in the template material results in their absence in the perimorphic material, as shown in the SEM micrographs of FIGS. 69A69B. The presence of these uncontrolled macropores may be undesirable in many applications; therefore the $N_2T_3$-type and $N_2T_5$-type template materials without these internal macropores represent a preferred variant of the nesquehonite-derived class of porous MgO template materials.

Figure 50A:
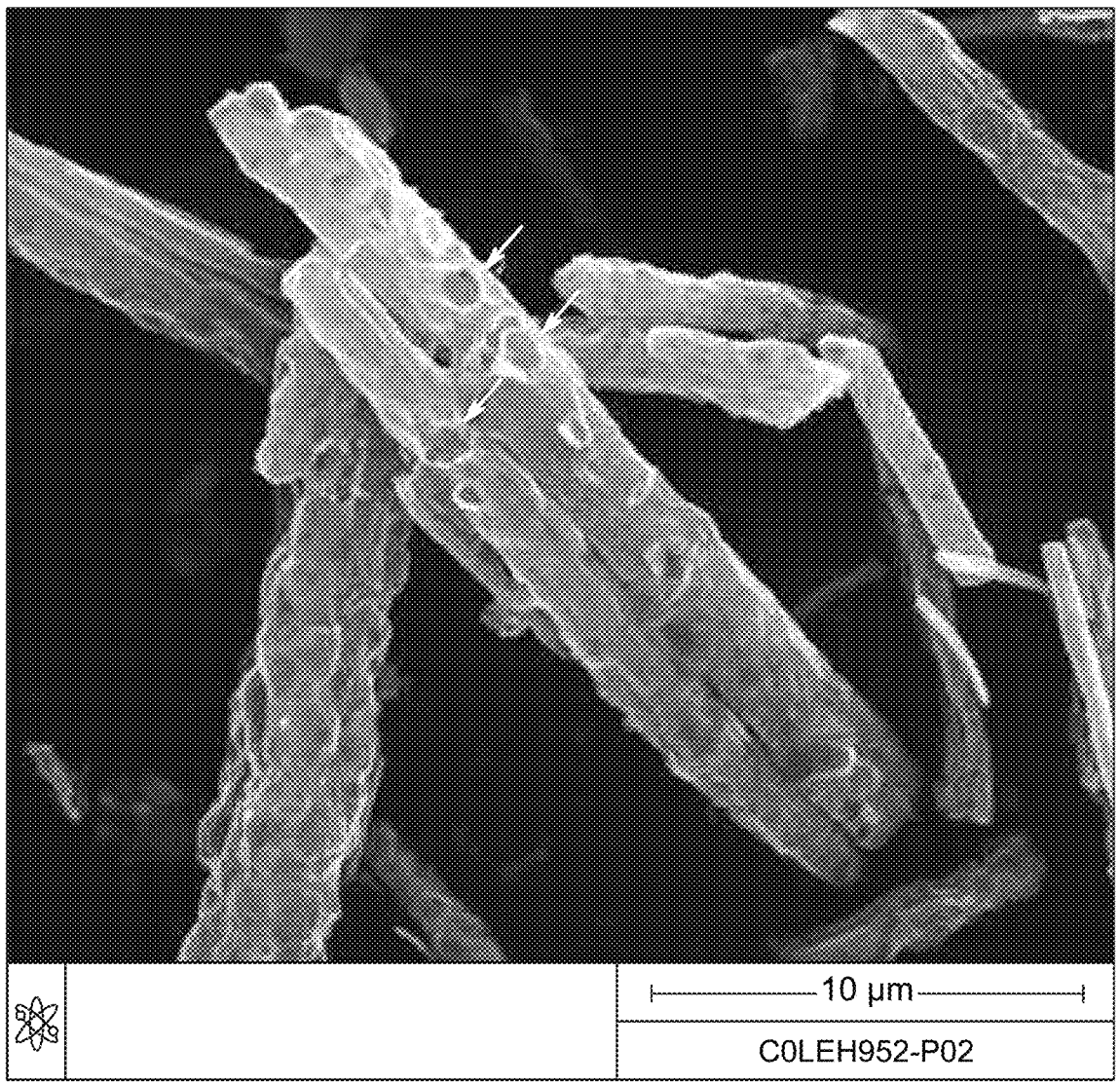
FIG. 50A is an SEM micrograph of porous MgO template particles ($N_2T_7$) made from $N_2$ template precursor particles. Arrows indicate failures associated with the formation and swelling of internal macropores in the template particles.
Figure 50B:
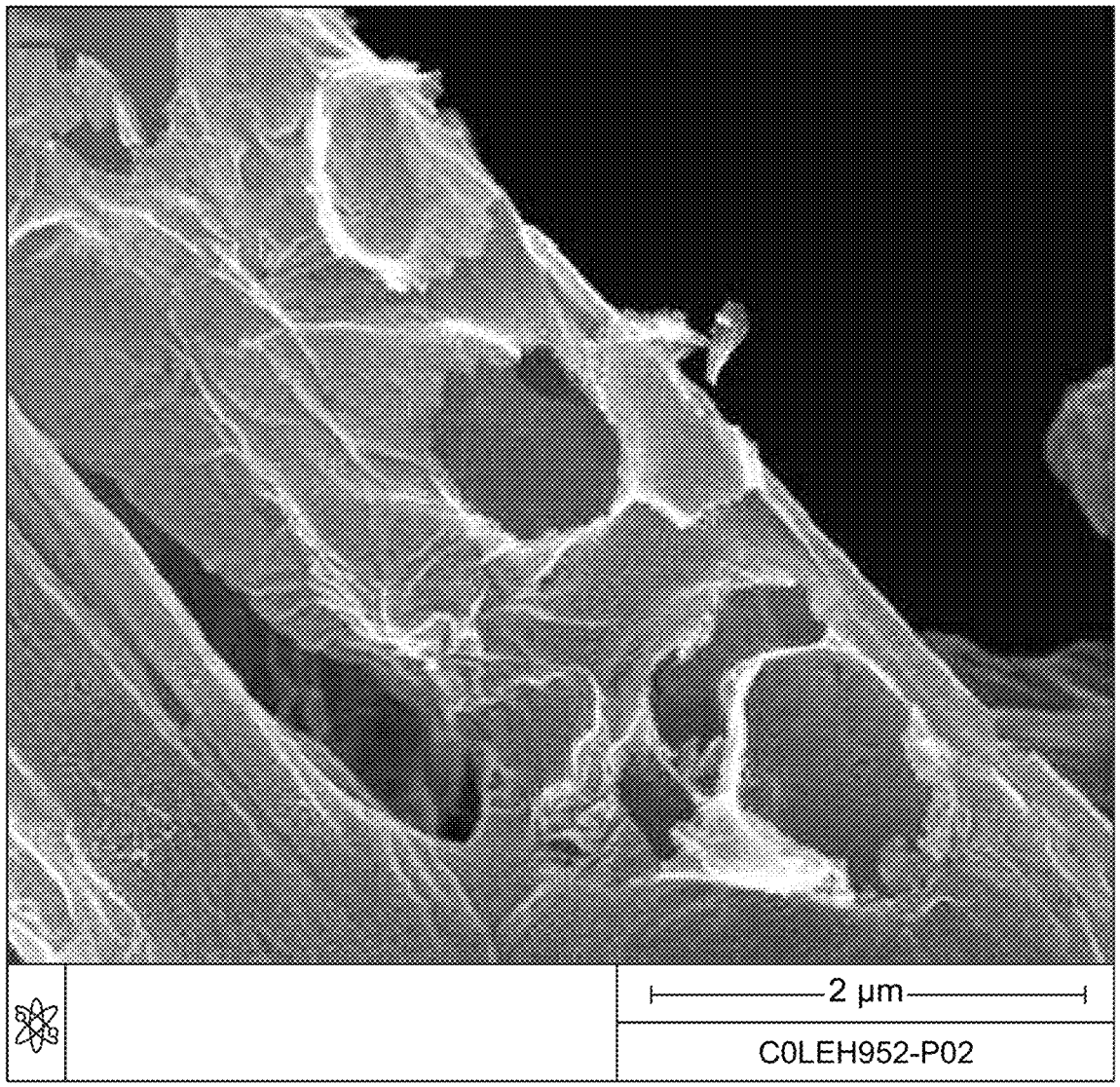
FIG. 50B is an SEM micrograph of the $N_2T_7$-type particles at higher magnification.

A PC material ($N_2T_6P_{22}$) made on $N_2T_6$-type template material is shown in the SEM micrographs of FIGS. 50A-50B. Provided the carbon perimorphic walls are sufficiently thin, imaging the PC material provides a good representation of the template morphology, since the PC material comprises the endomorphic template particles coated with a conformal, conductive layer. Based on this, it can be concluded that the $N_2T_6$-type template particles, generated under $CO_2$ flow at a heating rate of 5° C./min from room temperature to 640° C., were catastrophically ruptured during the Template Stage. These ruptures are indicated by the arrows in FIG. 50A. This example highlights the role that heating rates and gas environments may have during Template Stage processes.

Example $L_2T_1$: In another exemplary Template Stage procedure, a lansfordite template precursor material may be thermally treated to form a porous MgO template material.

To demonstrate this, $L_2$-type lansfordite particles may first be generated using the procedure described in Example $L_2$. This material represents the template precursor material that might be generated in the Precursor Stage of a full implementation of the General Method.

Next, the template precursor material may be thermally treated. This may be performed in a tube furnace according to Scheme B, as described in Section III. An $L_2$-type sample may be placed in the tube furnace. Under an Ar flow of 1220 sccm, the furnace may be heated from room temperature to 640° C. at a heating rate of 20° C./min and maintained at 640° C. for 2 hours. During this thermal treatment, $CO_2$ gas may be released. In a full implementation of the General Method, the $CO_2$ process gas released during the decomposition of the template precursor material may be conserved using conventional techniques. The furnace may then be allowed to cool to room temperature under sustained Ar flow.

The type of porous MgO template material resulting from this process is identified herein as $L_2T_1$. The morphology of $L_2T_1$-type template particles can be discerned from the native morphology of carbon perimorphic frameworks synthesized on them. Such frameworks are shown in the SEM micrographs of FIG. 51. The carbon frameworks reveal that the lansfordite template precursor material underwent recrystallization during the Template Stage procedure, forming both hydromagnesite and nesquehonite phases prior to formation of the $L_2T_1$ template material. The recrystallization of the precursor during may be due to the large quantity of water released in the early stages of the thermal treatment.

Example $L_3T_1$: In another exemplary Template Stage procedure, a partially dehydrated lansfordite template precursor material may be thermally treated to form a porous MgO template material.

To demonstrate this, $L_3$-type partially dehydrated lansfordite particles may first be generated using the procedure described in Example $L_3$. This material represents the template precursor material that might be generated in the Precursor Stage of a full implementation of the General Method.

Next, the template precursor material may be thermally treated. This may be performed in a tube furnace according to Scheme B, as described in Section III. The $L_3$-type template precursor material may be placed in the tube furnace. While under an Ar flow of 1220 sccm, the furnace may be heated from room temperature to 640° C. at 20° C./min and maintained at 640° C. for 2 hours. During this thermal treatment, $CO_2$ gas may be released. In a full implementation of the General Method, the $CO_2$ process gas released during the decomposition of the template precursor material may be conserved using conventional techniques. After this thermal treatment, the furnace may be allowed to cool to room temperature under sustained Ar flow. The furnace may then be allowed to cool to room temperature under sustained Ar flow.

Figure 52:
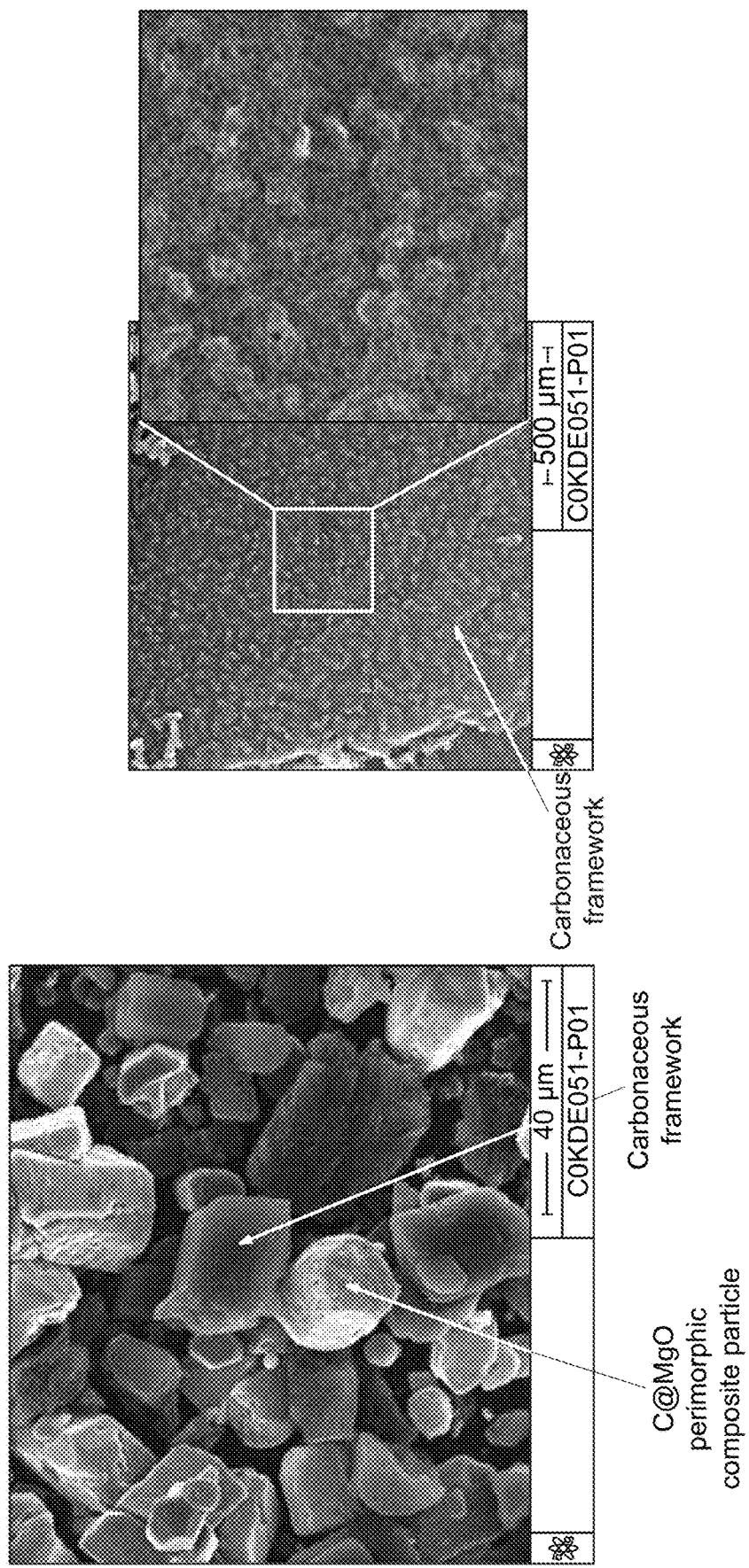
FIG. 52 includes SEM micrographs of PC structures and carbon perimorphic frameworks made on porous MgO template particles ($L_3T_1$).

The type of porous MgO template material resulting from this process is identified herein as $L_3T_1$. The morphology of the $L_3T_1$-type template particles can be discerned from the native morphology of carbon perimorphic frameworks synthesized on them. In FIG. 52, an SEM micrograph of a mixture of C@MgO PC particles and carbon perimorphic frameworks made from $L_3T_1$-type template particles is shown. These particles show no signs of recrystallization into hydromagnesite or nesquehonite, from which we can infer that the $L_3$ template precursor material did not undergo sufficiently extensive recrystallization during the thermal treatment detailed above. This demonstrates that the superstructure of lansfordite and other highly hydrated template precursor materials may be better preserved if, like the $L_3$ template precursor material, they can be partially or completely dehydrated using rapid techniques such as flash-drying or spray-drying.

Example $L_3T_2$: In another exemplary Template Stage procedure, a partially dehydrated lansfordite template precursor material may be thermally treated to form a porous MgO template material.

To demonstrate this, $L_3$-type partially dehydrated lansfordite particles may first be generated using the procedure described in Example $L_3$. This material represents the template precursor material that might be generated in the Precursor Stage of a full implementation of the General Method.

Next, the template precursor material may be thermally treated. This may be performed in a tube furnace according to Scheme B, as described in Section III, with a few modifications. While under a $CO_2$ flow of 815 sccm, the furnace may be heated to 540° C. and maintained at that temperature. An $L_3$-type sample may be staged inside the quartz tube but outside of the heating zone prior to the thermal treatment. Then, the template precursor material may be rapidly introduced into the preheated zone by a pushing mechanism and maintained at 540° C. for 30 minutes. During this thermal treatment, $CO_2$ gas may be released. In a full implementation of the General Method, the $CO_2$ process gas released during the decomposition of the template precursor material may be conserved using conventional techniques. Finally, the treated template may be removed from the heat zone and allowed to cool to room temperature under sustained $CO_2$ flow.

Figure 53A:
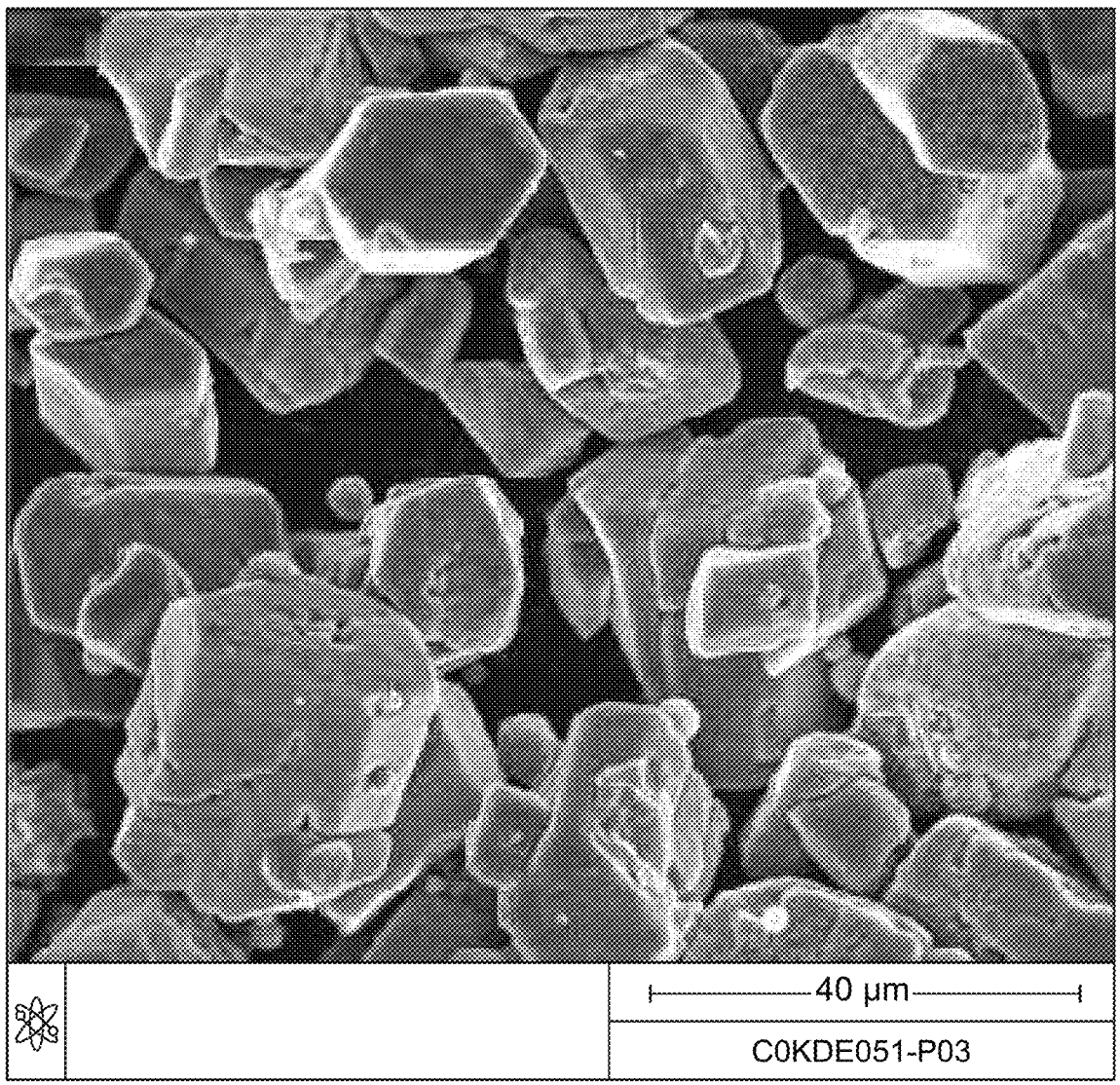
FIG. 53A is an SEM micrograph of PC particles derived from $L_3T_1$ template particles.
Figure 53B:
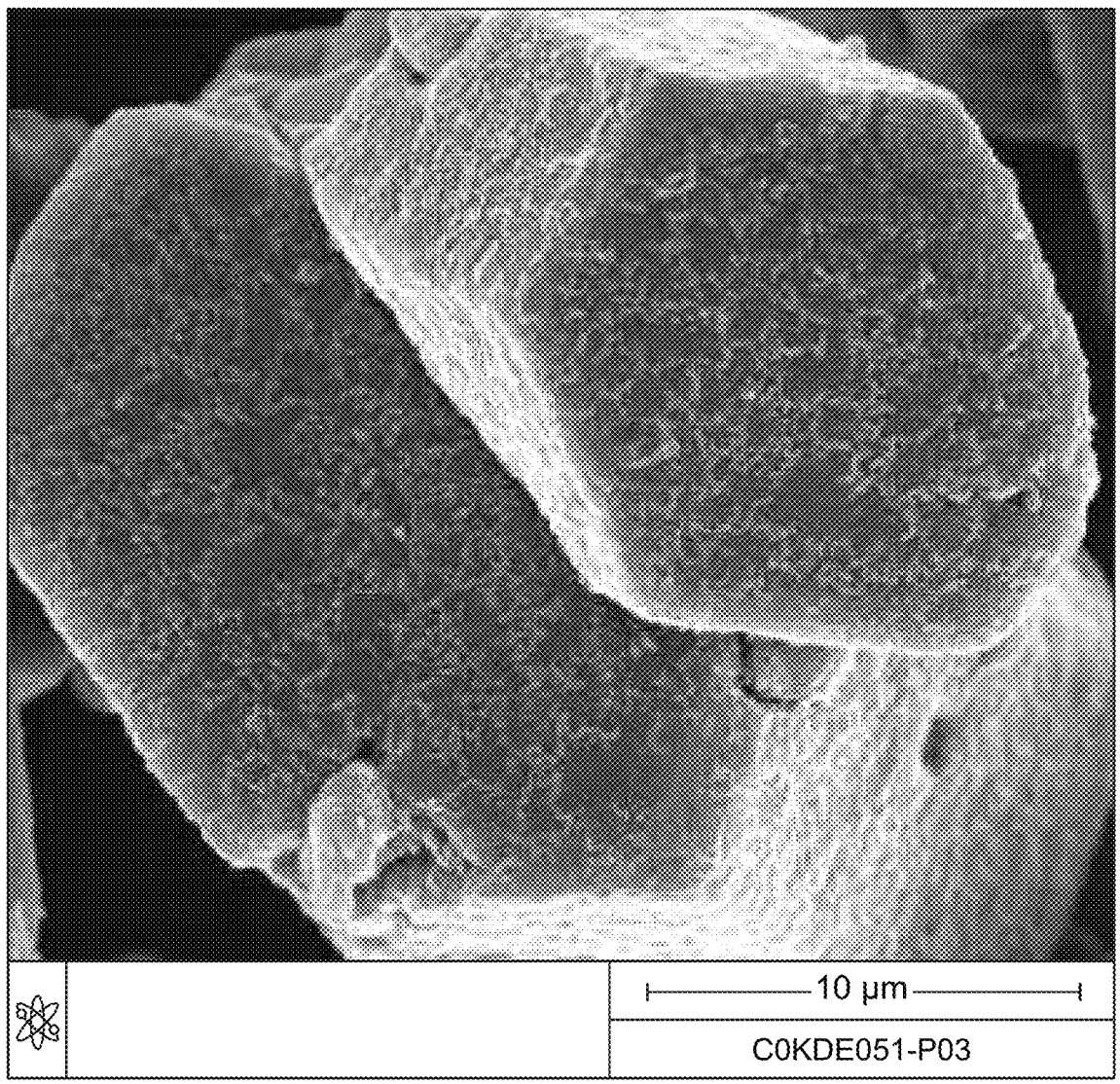
FIG. 53B is an SEM micrograph of this superstructure at higher magnification.
Figure 53C:
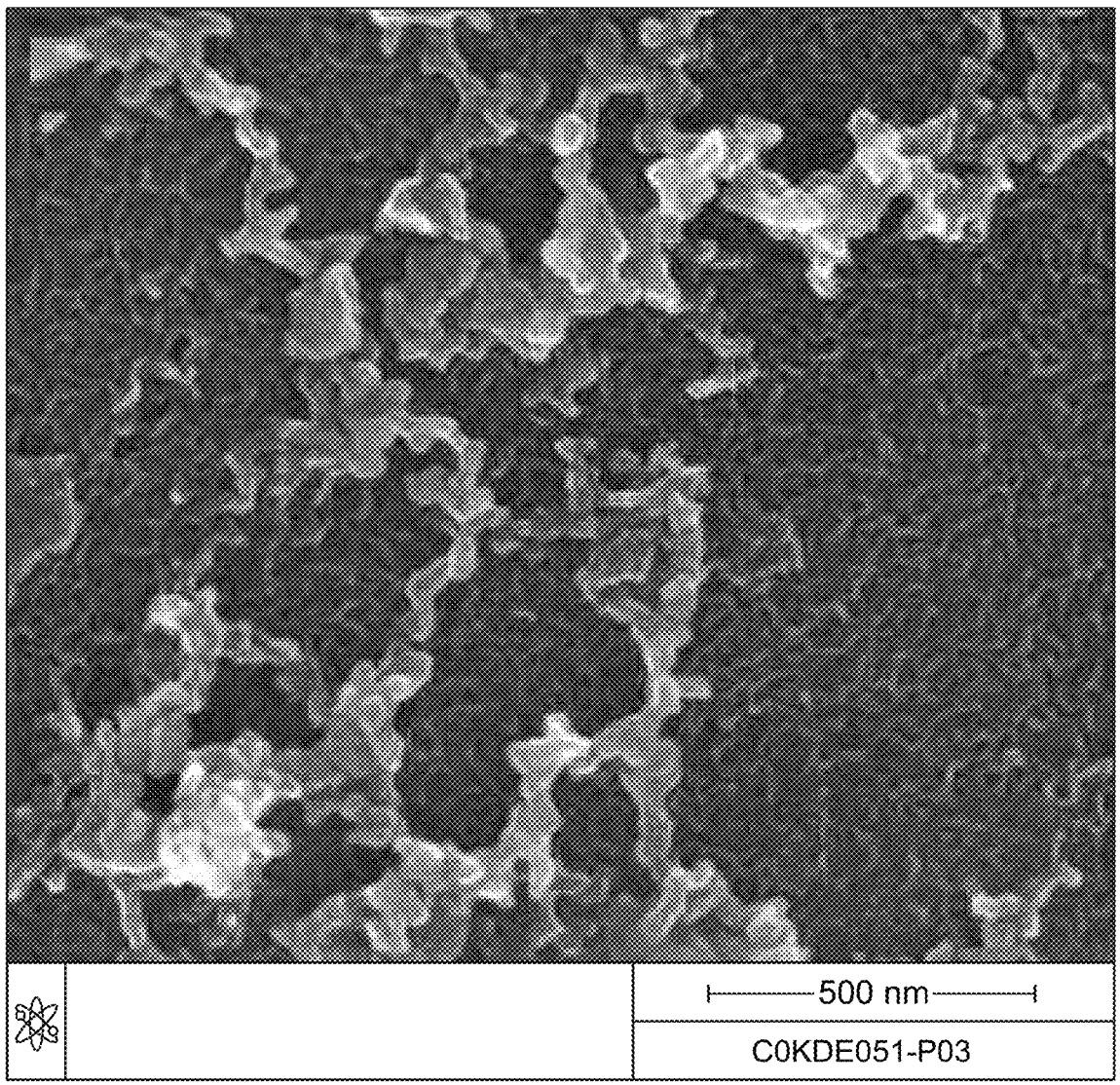
FIG. 53C is an SEM micrograph of the magnified surface of a particle like those shown in FIGS. 53A-53B.

The type of porous MgO template material resulting from this process is identified herein as $L_3T_2$. A C@MgO PC material made by forming a thin carbon perimorph on the $L_3T_2$-type template material is shown in the SEM micrographs of FIGS. 53A-53C. Provided the carbon perimorphic walls are sufficiently thin, imaging the PC material provides a good representation of the template morphology, since the PC material comprises the endomorphic template particles coated with a conformal, conductive layer. Based on this, it can be concluded that the $L_3T_2$-type template particles did not undergo sufficiently extensive recrystallization during the thermal treatment to degrade their superstructure.

Example $A_1T_1$: In another exemplary Template Stage procedure, a spray-dried $MgCO_3 \cdot xH_2O$ template precursor material comprising hollow, spherical particles may be thermally treated to form a porous MgO template material.

To demonstrate this, $A_1$-type spray-dried $MgCO_3 \cdot xH_2O$ particles may first be generated using the procedure described in Example $A_1$. This material represents the template precursor material that might be generated in the Precursor Stage of a full implementation of the General Method.

Next, the template precursor material may be thermally treated. This may be performed in a tube furnace according to Scheme A with a tube rotation speed of 1 RPM, as detailed in Section III. The sample may be placed in the tube furnace. While under an Ar flow of 1271 sccm, the furnace may be heated from room temperature to 100° C. at a heating rate of 20° C./min and maintained at 100° C. for 1 hour. The furnace may then be heated to 500° C. at a heating rate of 20° C./min and maintained at 500° C. for 1 hour. Finally, the furnace may be heated to 640° C. at a heating rate of 20° C./min and maintained at 640° C. for 3 hours. During this thermal treatment, $CO_2$ gas may be released. In a full implementation of the General Method, the $CO_2$ process gas released during the decomposition of the template precursor material may be conserved using conventional techniques. The furnace may then be allowed to cool to room temperature under sustained Ar flow.

The type of porous MgO template material resulting from this process is identified herein as $A_1T_1$. The template particles retain the precursor particles' hollow, hierarchical-equiaxed superstructure, with some particles comprising fragments of the shells, as shown in the SEM micrographs of FIG. 54. At higher magnifications, the porous MgO substructure comprising conjoined subunits can be discerned. This porous substructure is clear in the magnified inset of FIG. 54.

Example $A_3T_1$: In another exemplary Template Stage procedure, a spray-dried $MgCO_3 \cdot xH_2O$ template precursor material comprising hollow, spherical particles may be thermally treated to form a porous MgO template material.

To demonstrate this, $A_3$-type spray-dried $MgCO_3 \cdot xH_2O$ particles may first be generated using the procedure described in Example $A_3$. This material represents the template precursor material that might be generated in the Precursor Stage of a full implementation of the General Method.

Next, the template precursor material may be thermally treated. This may be performed in a tube furnace according to Scheme A, as detailed in Section III. The sample may be placed in a ceramic boat in the tube furnace. While under an $N_2$ flow of 2408 sccm, the furnace may be heated from room temperature to 200° C. at a heating rate of 20° C./min and maintained at 200° C. for 1 minute. The furnace may then be heated to 500° C. at a heating rate of 5° C./min and maintained at 500° C. for 1 minute. Finally, the furnace may be heated to 900° C. at a heating rate of 20° C./min and maintained at 900° C. for 15 minutes. During this thermal treatment, $CO_2$ gas may be released. In a full implementation of the General Method, the $CO_2$ process gas released during the decomposition of the template precursor material may be conserved using conventional techniques. The furnace may then be allowed to cool to room temperature under sustained $N_2$ flow.

Figure 55A:
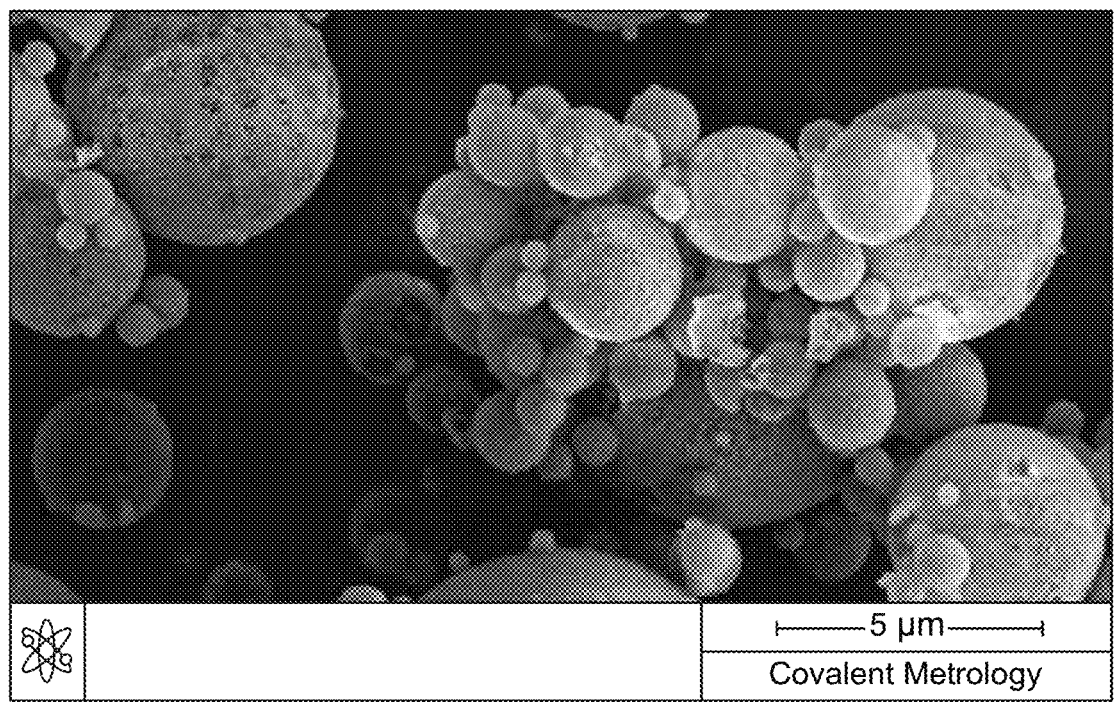
FIG. 55A is an SEM micrograph of porous MgO template particles ($A_3T_1$) made from $A_3$ template particles.
Figure 55B:
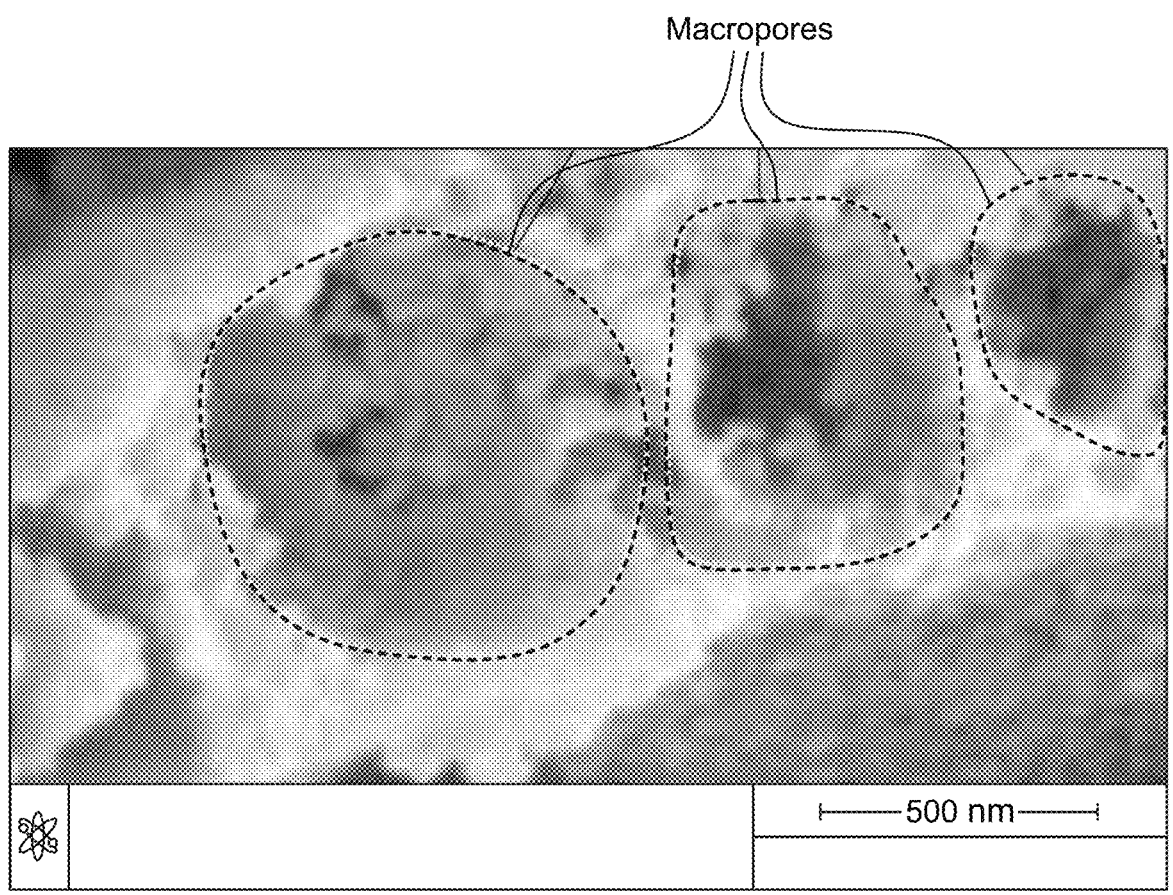
FIG. 55B is an SEM micrograph of an exemplary shell of the porous MgO template particles ($A_3T_1$) made from $A_3$-type template particles. The shell contains macropores, which are an inherited feature also present in the $A_3$ template precursor's superstructure. Several macropores are circled with a dashed line. Additionally, the shell contains mesopores created by decomposition of the $A_3$ template precursor.

The type of porous MgO template material resulting from this process is identified herein as $A_3T_1$. The template particles retain the precursor particles' hollow, hierarchical-equiaxed superstructure, as shown in FIG. 55A, as well as their macroporous shell structure, as shown in FIG. 55B. At higher SEM magnifications, the porous MgO substructure comprising the conjoined subunits can be discerned.

Example $C_1T_1$: In another exemplary Template Stage procedure, a spray-dried template precursor material comprising hollow, hierarchical-equiaxed particles may be thermally treated to form a porous MgO template material.

To demonstrate this, $C_1$-type spray-dried particles may first be generated using the procedure described in Example $A_1$. This material represents the template precursor material that might be generated in the Precursor Stage of a full implementation of the General Method.

Next, the template precursor material may be thermally treated. This may be performed in a muffle furnace according to Scheme D, as detailed in Section III. The $C_1$-type template precursor material may be placed in a ceramic boat within the muffle furnace. The sample may then be heated from room temperature to 650° C. at a heating rate of 5° C./min. The sample may be maintained at 650° C. for 3 hours. During this thermal treatment, $CO_2$ gas may be released. In a full implementation of the General Method, the $CO_2$ process gas released during the decomposition of the template precursor material may be conserved using conventional techniques. Then, the furnace may then be allowed to cool to room temperature.

The type of porous MgO template material resulting from this process is identified herein as $C_1T_1$.

Example $Ca_1T_1$: In another exemplary Template Stage procedure, a precipitated $CaCO_3$ template precursor material (Albafil), herein described as Ca1, may be thermally treated to form a porous MgO template material.

The precipitated $Ca_1$-type particles represent the template precursor material that might be generated in the Precursor Stage of a full implementation of the General Method.

Next, the template precursor material may be thermally treated. This may be performed in a tube furnace according to Scheme C, as detailed in Section III. The $Ca_1$-type sample may be placed in a ceramic boat within the tube furnace. The furnace may be heated to 1050° C. under flowing Ar at 1102 sccm. During this thermal treatment, $CO_2$ gas may be released. In a full implementation of the General Method, the $CO_2$ process gas released during the decomposition of the template precursor material may be conserved using conventional techniques. When the furnace reaches 1050° C., methane ($CH_4$) gas may be introduced into the system to begin forming a carbon perimorph on the templating surfaces. While this surface replication step may be thought of as part of the Replication Stage, the template material may continue coarsening concurrently until stabilized by the carbon perimorph. The system may be maintained at 1050° C. for 15 minutes under flowing $CH_4$ and Ar, then $CH_4$ flow may be discontinued and the furnace may be allowed to cool to room temperature under sustained Ar flow.

The type of calcium oxide (CaO) template material resulting from this process is identified herein as $Ca_1T_1$, and the PC material made using the $Ca_1T_1$ template material is identified herein as $Ca_1T_1P_{17}$. It is instructive to look at the $P_{17}$-type carbon perimorphic material after extraction of the endomorphic $Ca_1T_1$ template material, since the frameworks in their native morphology are replicas of the templating surfaces (and negative replicas of the templating bulk). Additionally, carbon frameworks are also partially electron-transparent, allowing visualization of the templates' internal substructure.

Figure 56:
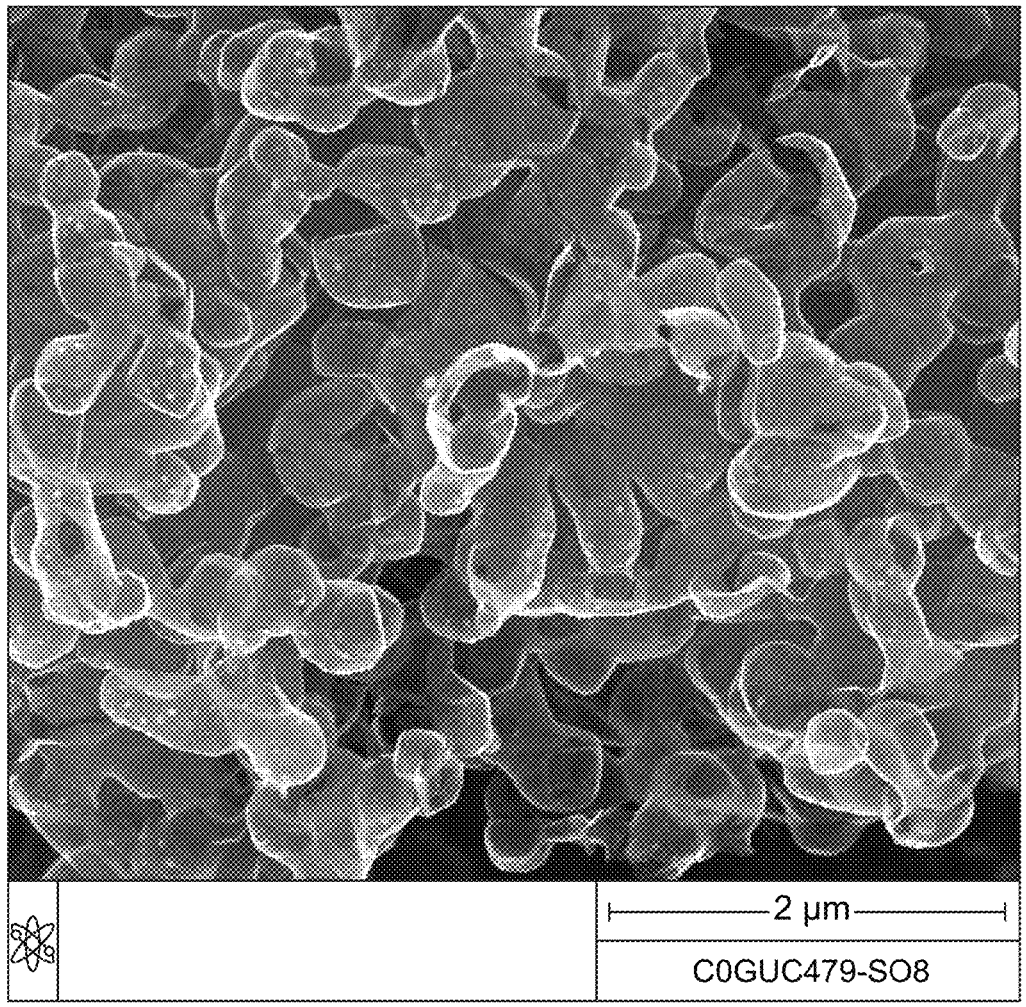
FIG. 56 is an SEM micrograph of carbon perimorphic frameworks ($P_{17}$) produced from endomorphic extraction of the $Ca_1T_1P_{17}$ PC material. The frameworks mostly retain their native morphology and mirror the templating surfaces of the template material $Ca_1T_1$.

FIG. 56 is an SEM micrograph of the $P_{17}$-type carbon perimorphic material after extraction of the endomorphic $Ca_1T_1$ template material. The thermal decomposition at 1050° C. may have caused individual $CaCO_3$ or CaO particles to sinter together, resulting in the formation of a template with a cluster-like morphology. The $P_{17}$-type carbon perimorphic frameworks, which aside from some breakage appear to be substantially in their native morphology, retain this cluster-like geometry.

Example $Li_1T_1$: In another exemplary Template Stage procedure, spray dried lithium carbonate template precursor material comprising hollow, hierarchical-equiaxed particles may be thermally treated to form a porous $Li_2CO_3$ template material.

To demonstrate this, $Li_1$-type spray-dried particles may first be generated using the procedure described in Example $Li_1$. This material represents the template precursor material that might be generated in the Precursor Stage of a full implementation of the General Method.

Next, the template precursor material may be thermally treated. This may be performed in a tube furnace according to Scheme C, as detailed in Section III. The $Li_1$-type sample may be placed in a ceramic boat within the tube furnace. The furnace may be heated to 580° C. under flowing Ar at 1271 sccm. At this point, $C_3H_6$ gas may be introduced into the system to begin forming a carbon perimorph on the templating surfaces. While this surface replication step may be thought of as part of the Replication Stage, the template material may continue coarsening concurrently until stabilized by the carbon perimorph. The system may be maintained at 580° C. for 870 minutes under flowing $C_3H_6$ and Ar, then $C_3H_6$ flow may be discontinued and the furnace may be allowed to cool to room temperature under sustained Ar flow.

The type of $Li_2CO_3$ template material resulting from this process is identified herein as $Li_1T_1$, and the PC material made using the $Li_1T_1$ template material is identified herein as $Li_1T_1P_{18}$. It is instructive to look at the $P_{18}$-type carbon perimorphic material after extraction of the endomorphic $Li_1T_1$ template material, since the frameworks in their native morphology are replicas of the templating surfaces (and negative replicas of the templating bulk). Additionally, carbon frameworks are also partially electron-transparent, allowing visualization of the templates' internal substructure.

Figure 57:
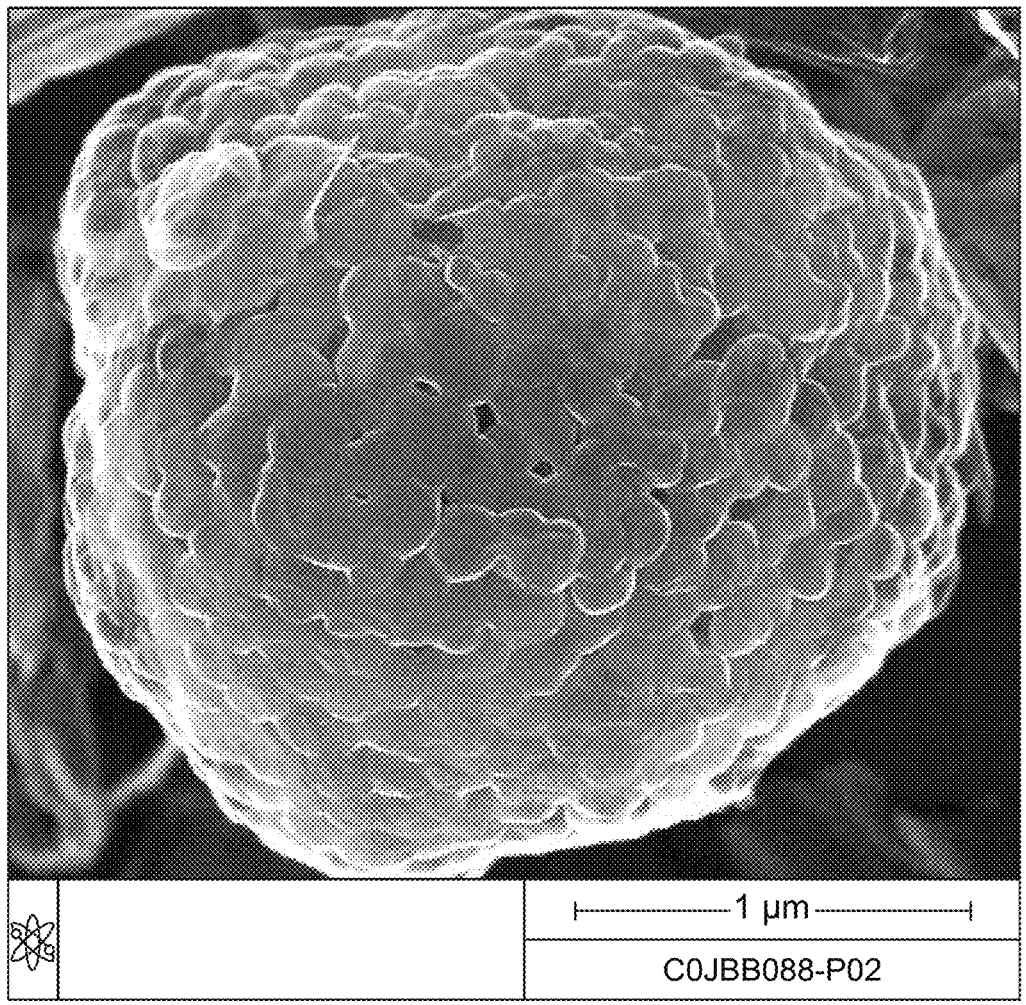
FIG. 57 is an SEM micrograph of a carbon perimorphic framework ($P_{18}$), produced from endomorphic extraction of the $Li_1T_1P_{18}$ PC material. The framework has retained its native morphology and mirrors the templating surface of the displaced template particle.

FIG. 57 is the SEM micrograph of a $P_{18}$-type carbon perimorphic framework generated on a $Li_1T_1$ template particle. The porous carbon framework has substantially retained its native morphology. In addition to the intact cellular subunits, exocellular pores can be discerned, indicating that the $Li_1T_1$ template particles, like the $Li_1$ precursor particles shown in FIGS. 31A-31B, comprised porous shells. Typical liquid-phase precipitations of crystalline $Li_2CO_3$ may produce nonporous, anhydrous crystals. However, the spray-drying procedure facilitates the creation of a porous template precursor, and these pores can be retained by the template.

VI. Replication Stage—Examples

In order to demonstrate the general applicability of the Replication Stage to a variety of template materials, a number of exemplary Replication Stage procedures are presented below. For purposes of demonstration, each exemplary procedure comprises CVD growth of carbon perimorphs on selected template particles. However, it should be noted that other procedures, and perimorphs of alternative compositions, will be obvious to those knowledgeable in the art.

In some exemplary Replication Stage procedures, template materials may been formed from template precursor materials in a separate and distinct Template Stage that occurred in a different reactor. In other instances, the Template Stage procedure and the Replication Stage procedure may both be performed in the same reactor.

Some of the exemplary Replication Stage procedures presented in this section utilize previously named and described template materials. Additionally, new template materials are described in some of the exemplary Template Stage procedures, and for this reason, we describe the synthesis of these new templates in this section. The table in FIGS. 79A-79B is a summary of all of the template materials utilized in the following exemplary Replication Stage procedures. The table includes the basic parameters utilized to make the template materials, including the template precursor material, the furnace scheme utilized for the Template Stage treatment, and the temperatures, times, heating rates, carrier gases and gas flow rates pertaining to the Template Stage treatments. Some of the treatments comprised multiple segments, as shown in the table. There is a special scenario where the heating rate is described as "Max" in the table, indicating that the furnace did not heat at a fixed rate, but rather heated at the furnace's maximum power setting. Typically, the heating rate for such cases was around 40° C./min. There is another special scenario where the heating rate is described as "Flash" in the table, indicating that the template precursor material was introduced into the preheated furnace, such that it was heated extremely rapidly.

The table in FIGS. 80A-80C is a summary of the CVD parameters used in the exemplary Replication Stage procedures. The table lists the templates that may be used to demonstrate various Replication Stage procedures. The table also lists the furnace schemes, as described previously in Section III, that may be used for each Replication Stage procedure. Each Replication Stage procedure summarized in the table may consist of one or more segments. Each segment has a target temperature associated with that segment. The target temperature is denoted by $T_n$ in the table, where 'n' represents the segment number. Each segment also has a target hold time at the target temperature $T_n$. The hold time is denoted by $t_n$ in the table, where 'n' again represents the segment number. Each segment also has a target heating time to reach $T_n$. The heating time is denoted by $R_n$ in the table, where 'n' again represents the segment number. There is a special scenario where $R_n$ is described as 'max' in the table. This indicates that the furnace did not ramp at a fixed rate, but rather heated at a fixed maximum power setting. Typically, the heating rate for such cases was around 40° C./min.

In some procedures, the Replication Stage immediately follows the Template Stage. In this scenario the $R_n$ is described as 'N/A' in the table in FIGS. 80A-80C. This indicates that the heating rate is not applicable since the Replication Stage is initiated immediately after the Template Stage and continues from the same temperature used in the Template Stage procedure.

The table in FIGS. 80A-80C lists the hydrocarbon gas ("HC Type") and flow rate ("HC Flow") used in the Replication Stage. The table also lists the carrier gas type and flow rate used in the CVD Replication Stage which is denoted by 'CR Type' and 'CR Flow' respectively for each segment.

VII. Separation Stage—Examples

The Separation Stage comprises endomorphic extraction and perimorphic separation. In some variants, this may occur in an integrated, one-pot technique. In other variants, the Separation Stage may occur in two or more separate and distinct stages. For example, endomorphic extraction may involve mixing the PC material in the conserved process liquid and dissolving the endomorphic material inside the perimorphic material. Then, the perimorphic material may be separated from the stock solution. The stock solution may then be precipitated at atmospheric pressure. The precipitate may then be slurried into the process water at a higher solids concentration. By modulating temperature or pressure, the solids in this concentrated mixture may then be re-dissolved at higher concentrations to create a concentrated stock solution that may be utilized in Precursor Stage.

Example VIIa: In an exemplary endomorphic extraction procedure, MgO endomorphs may be extracted from carbon perimorphs may be obtained by dissolving the MgO in an extractant solution comprising aqueous $H_2CO_3$.

First, about 12.5 grams of a C@MgO PC powder comprising approximately 94.75% MgO endomorph and 5.25% carbon perimorph (grown via CVD) by weight may be slurried into 2.5 L of deionized water in a 3 L round-bottom flask. This water represents a conserved process water that would be derived from the Precursor Stage in a full implementation of the General Method. A gas line fitted with a 0.5 μm diffusion stone (to decrease $CO_2$ bubble size and increase reaction efficiency) may be fed into the bottom of the flask, and the water may be stirred with a magnetic stir plate. $CO_2$ gas may be continuously bubbled into the tank over 141 minutes at a flow rate of 4 $scfh_{air}$. This $CO_2$ represents a conserved process gas that would be derived from the Precursor Stage or Template Stage in a full implementation of the General Method. Dissolution of the $CO_2$ and reaction with the process water generates an aqueous $H_2CO_3$ extractant solution. The reaction of the aqueous $H_2CO_3$ extractant solution with the endomorphic MgO results in endomorphic extraction and the generation of a new aqueous $Mg(HCO_3)_2$ stock solution outside of the carbon perimorphic frameworks.

Perimorphic separation of the carbon perimorphic frameworks from the aqueous $Mg(HCO_3)_2$ stock solution may be obtained by filtering the mixture. The carbon perimorphic frameworks may be rinsed and dried, and an ash test may be performed. The carbon perimorphic frameworks may contain approximately 9.49% MgO, representing a 99.5% removal efficiency of the MgO template material. The remainder of unextracted MgO may be hermetically encapsulated within certain carbon frameworks. Higher extraction efficiencies may be gained with higher-energy agitation techniques, which may facilitate the breaching of sealed perimorphic walls.

In a full implementation of the General Method, the separated aqueous $Mg(HCO_3)_2$ stock solution may then be conserved to be utilized in the Precursor Stage.

Example VIIb: In another exemplary endomorphic extraction procedure, MgO endomorphs may be extracted from carbon perimorphs via a shuttling technique.

First, 500 mL of water may be magnetically stirred in a 1 L glass beaker at 700 RPM. This water represents a conserved process water that would be derived from the Precursor Stage in a full implementation of the General Method. Next, $CO_2$ process gas may be continuously bubbled at 3-5 $scfh_{air}$ through the process water from a dip tube, forming an aqueous $H_2CO_3$ extractant solution. This $CO_2$ represents a conserved process gas that would be derived from the Precursor Stage or Template Stage in a full implementation of the General Method. Approximately 10 g of a C@MgO PC material (yield 3.5%) comprising elongated particles may gradually be introduced into the extractant solution. Upon complete integration of the C@MgO PC material into the solution, the mixture may appear black and possess a pH of 9. The beaker may be covered to maintain a $CO_2$-rich atmosphere.

After 24 hours of reaction, the conductivity of the mixture may be 19.7 mS/cm measured at 19.6° C., have a pH of 8, and the mixture may appear gray. This mixture comprises the perimorphic product and a new aqueous $Mg(HCO_3)_2$ stock solution that might be used in the Precursor Stage in a full implementation of the General Method. The solids may then be separated from the stock solution using conventional techniques.

Figure 58A:
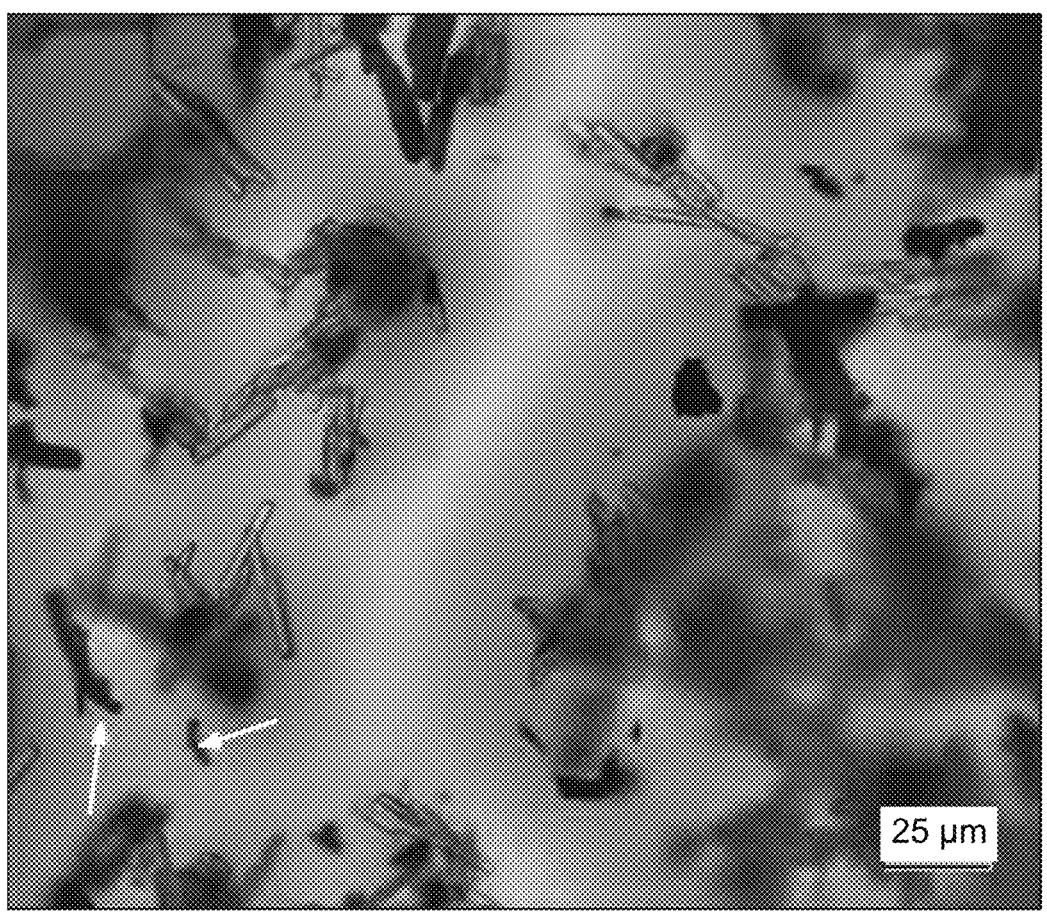
FIG. 58A is an optical micrograph includes of a mixture created by endomorphic extraction via a shuttling technique. The micrograph in FIG. 58A reveals two distinct phases: nesquehonite particles and carbon perimorphic frameworks. The frameworks are sometimes deformed, as indicated by the arrows in FIG. 58A.
Figure 58B:
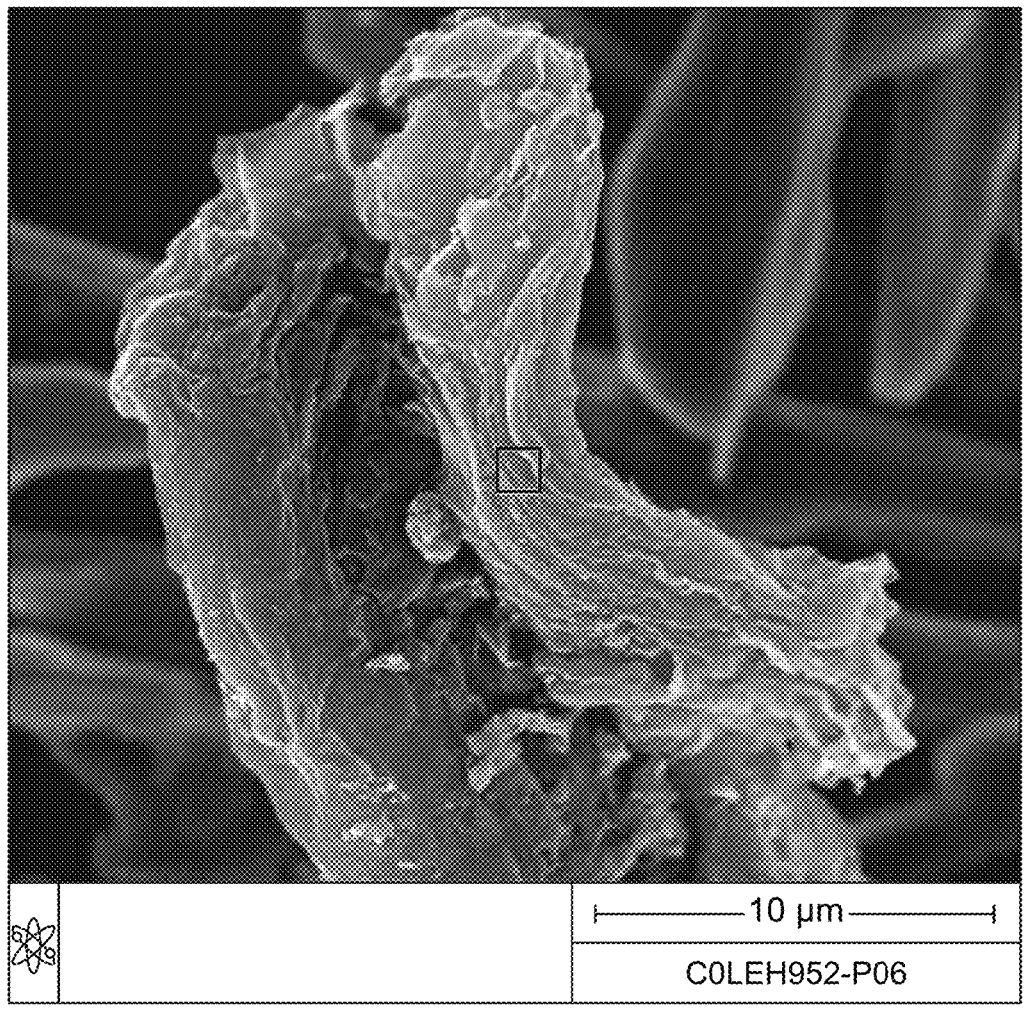
FIG. 58B is an optical micrograph of one of the carbon perimorphic frameworks.
Figure 58C:
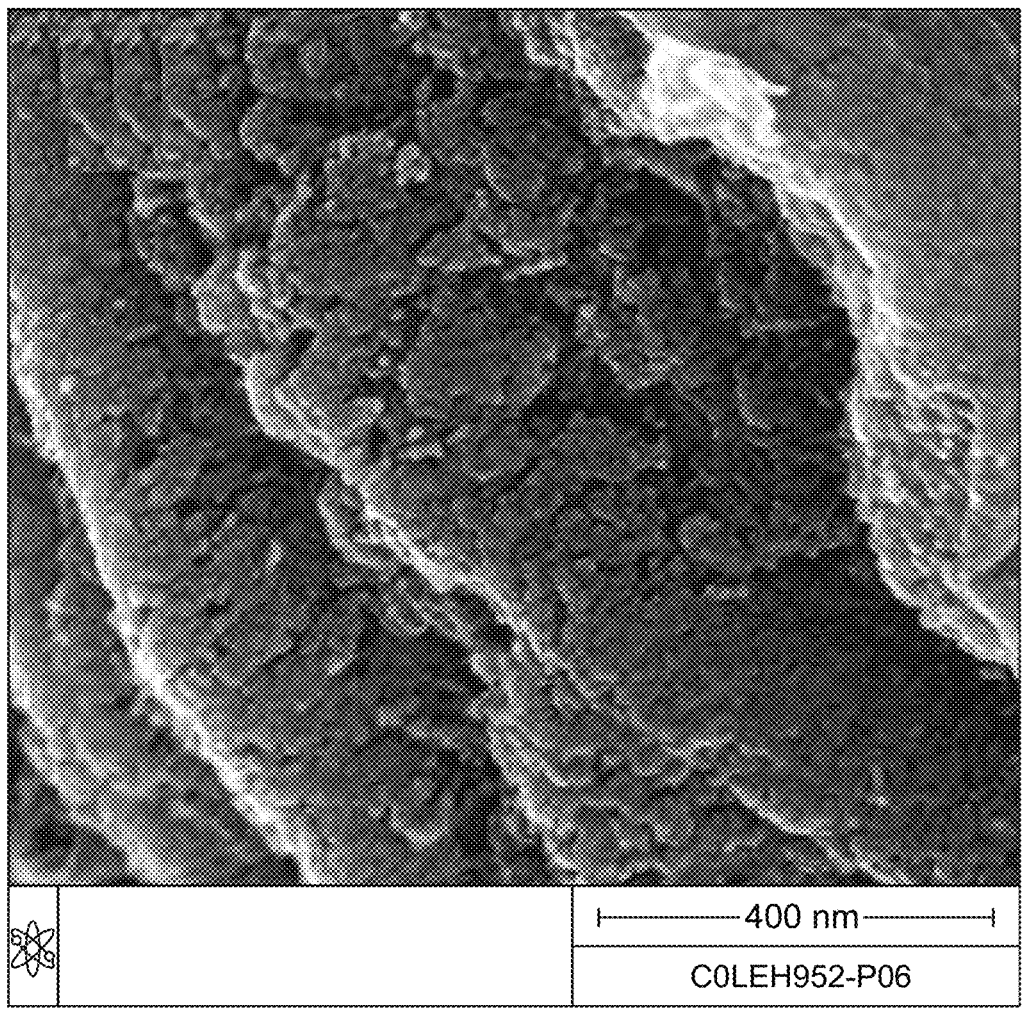
FIG. 58C is a magnified optical micrograph of the region in the square of FIG. 58B.

The solids from this mixture may be seen in the optical micrograph FIG. 58A and the SEM micrographs of FIG. 58B and FIG. 58C. Two distinct phases are present in the sample. The first phase comprises precipitated nesquehonite particles, which appear as transparent, elongated crystals in FIG. 58A. The second phase comprises the perimorphic product, comprising carbon perimorphic frameworks, which appear as black particles in FIG. 58A. Some of the frameworks appear curved, indicating their flexibility upon extraction of the rigid endomorph. The extractant solution of aqueous $H_2CO_3$ reacted with the endomorphic MgO, forming solvated $Mg_{2+}$ and $HCO_3^-$ ions, which were exfiltrated from the carbon perimorphs. Upon exfiltration from the carbon perimorphs, a portion of these ions precipitate as nesquehonite. The dissolution and precipitation mechanisms are concurrent.

In FIG. 58B, a carbon perimorphic framework is shown. The framework has been deformed into a non-native morphology, showing both its flexibility and the extraction of the rigid, endomorphic MgO. FIG. 58C is a magnification of the boxed region of FIG. 58B and shows an endomorphic solid is clearly present, but it is not the original MgO endomorph. Instead, it is endomorphic $MgCO_3 \cdot xH_2O$ that has precipitated from the residual aqueous $Mg(HCO_3)_2$ stock solution inside the un-rinsed framework during drying of the high-porosity perimorphic framework. In other words, prior to drying, the framework was substantially devoid of endomorphic solids. The residual stock solution could be displaced using liquid-liquid separation techniques, in which case this shuttling technique would result in displacing 10 g of MgO from the frameworks using only 500 mL of water. This is approximately double the maximum concentration of MgO that can be dissolved into an aqueous $H_2CO_3$ extractant solution at atmospheric pressure.

The mechanism for this may be the preferential adsorption and nucleation of $CO_2$ nanobubbles in the hydrophobic carbon framework, increasing the internal $CO_2$ pressure within the framework and therefore the solubility of $Mg(HCO_3)_2$ within the framework. This creates a concentration gradient that drives the solvated ions into the surrounding process water, where they precipitate due to the lower external $CO_2$ pressure. Hence, shuttling reduces the volume of process water needed for endomorphic extraction, as well as the required vessel size.

Example VIIc: Endomorphic extraction of certain metal oxide or metal carbonate compounds may be facilitated by rendering the $CO_2$ supercritical. In an exemplary procedure, 3.007 g of MgO (Elastomag 170 calcined at 1050° C. for 1 hour) may be slurried with 100.00 g DI water, resulting in a solution conductivity of 340 µS/cm at 12.4° C. This translates to a mixture concentration of 30 g/L MgO. The mixture may be poured into a 1 L pressure vessel with magnetic stirring and a heating mantle. Approximately 600 g of dry ice (solid $CO_2$) may be added to the reactor, and the reactor then sealed. After 101 minutes of heating, the minimum conditions for supercritical $CO_2$ conditions may be surpassed at 31.4° C. and 1,125 psi. After a total 144 minutes, the reactor conditions may reach 36.2° C. and 1200 psi. The reactor may then be actively chilled with a cooling coil for 74 minutes, after which its conditions may reach 18.3° C. and 675 psi. The pressure in the reactor may then be slowly released, and after 6 minutes the reactor may have equilibrated to atmospheric pressure with a temperature probe reading of −5.0° C., due to the pressure release. Approximately 23 minutes after the pressure release, a sample may be taken from the solution, which may have a conductivity of 30.2 mS/cm at 4.5° C. The solution may be clear, with no signs of particles or precipitation. This higher concentration solution may then be utilized for crystallization of the template precursor material.

Figure 59A:
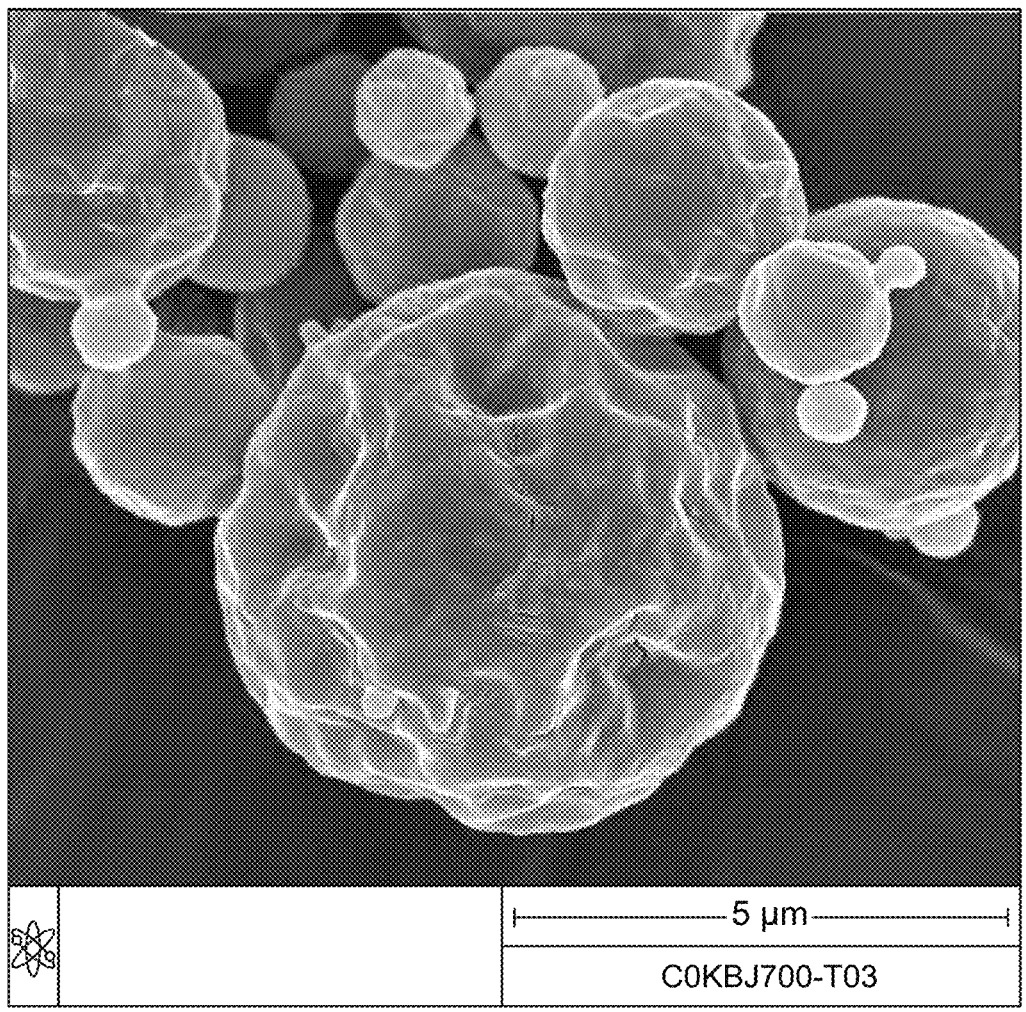
FIG. 59A is an SEM micrograph of spray-dried $MgSO_4$ template precursors.
Figure 59B:
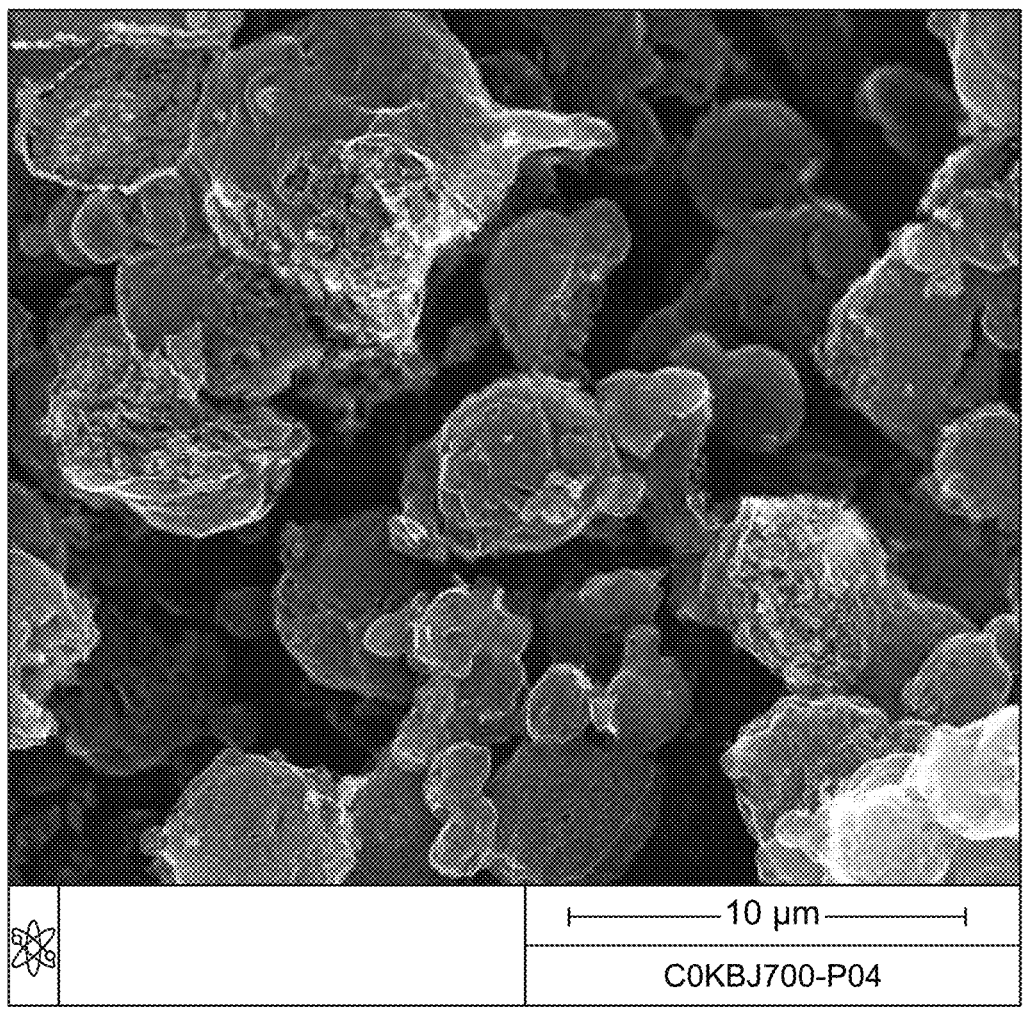
FIG. 59B is an SEM micrograph of carbon perimorphic frameworks derived from these precursor particles.
Figure 59C:
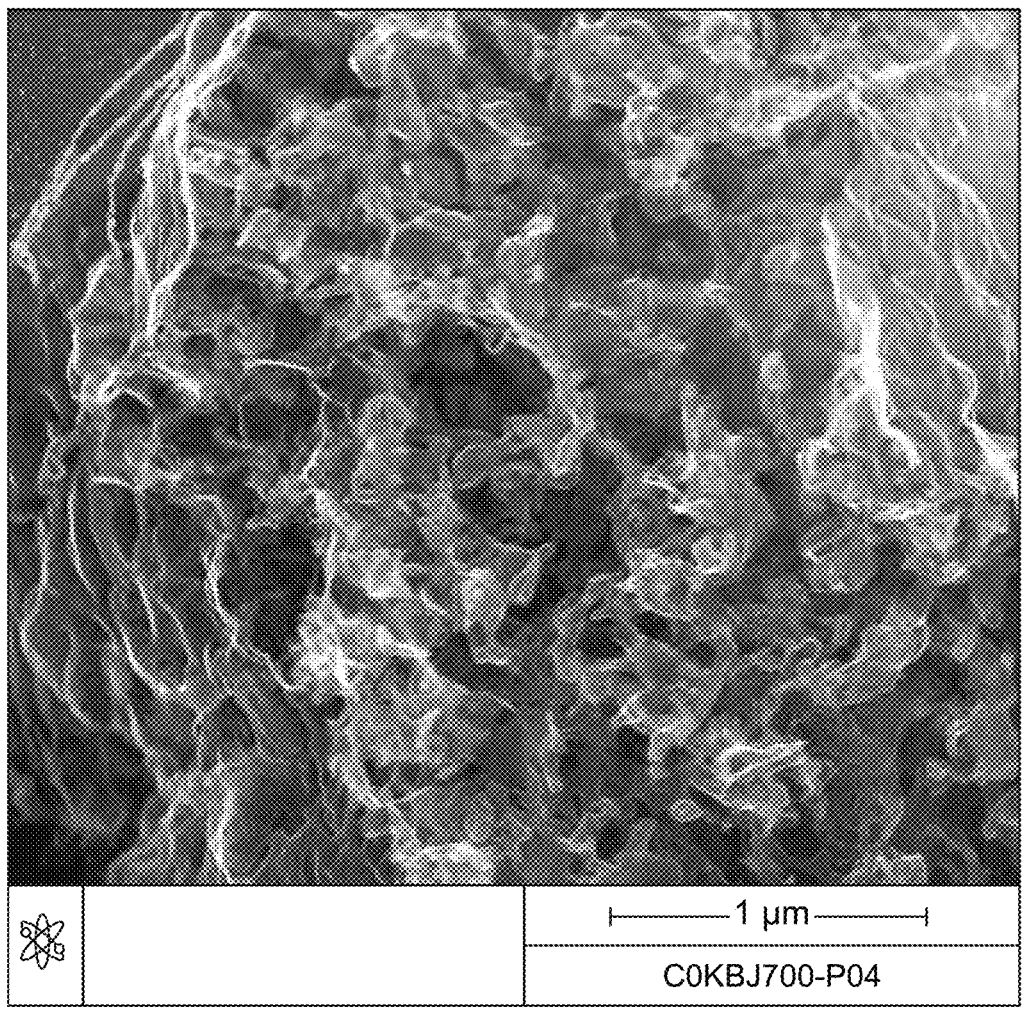
FIG. 59C is an SEM micrograph of the cellular substructure of the frameworks, which indicates the formation of a porous template from the $MgSO_4$ precursors during the Template Stage.

Example VIId: In another exemplary Separation Stage procedure, endomorphic extraction of a water-soluble endomorphic template material may be obtained via simple dissolution in water. This may be demonstrated by mixing a C@MgSO_4 PC material, as shown in the SEM micrograph of FIG. 59A, in process water. In a full implementation of the General Method, this process water may comprise the conserved process water from the Precursor Stage. The $MgSO_4$ endomorphic mass may be dissolved in the process water at room temperature. Endomorphic extraction may be confirmed via SEM image analysis, as shown in FIGS. 59B-C. The new aqueous stock solution of solvated $Mg^{2+}$ and $SO_4^{2-}$ ions may then be utilized for crystallization of hydrous $MgSO_4$ template precursor material in a full implementation of the General Method. The resulting solution may be basic, indicating a minor level of decomposition of the $MgSO_4$ to MgO during the Template Stage or Replication Stage. The basic stock solution may be neutralized with a small amount of sulfuric acid ($H_2SO_4$). The perimorphic product may then be separated via filtration or some other separation technique. In a full implementation of the General Method, the stock solution may be conserved for reuse in the Precursor Stage.

Perimorphic Separations

Figure 60:
FIG. 60 is a photograph of the result of a liquid-liquid separation, wherein hexane was blended into an aqueous mixture of carbon perimorphic frameworks and nesquehonite. The carbon perimorphic frameworks migrate into the black hexane phase at the top of the scintillation vial, while the nesquehonite remains in the aqueous phase at the bottom, which appears mostly white (albeit with some carbon particles mixed in and adhered to the sides of the scintillation vial).

Perimorphic products may be separated using a number of conventional techniques. In one technique, a liquid-liquid separation may be utilized. This may be demonstrated by taking the mixture produced by the shuttling process described above and blending it with an immiscible solvent, like hexane. The carbon perimorphic frameworks migrate into the solvent phase, while the nesquehonite remains in the aqueous phase. This results in phase separation and two distinct slurries, as shown in FIG. 60, which is a photograph taken after blending hexane into the mixture produced by the shuttling process described above. The black mixture comprises solvent and carbon perimorphic frameworks. The mixture below comprises water and nesquehonite, and appears to comprise mostly white nesquehonite particles (albeit with some carbon particles mixed in and adhered to the sides of the scintillation vial).

Figure 61:
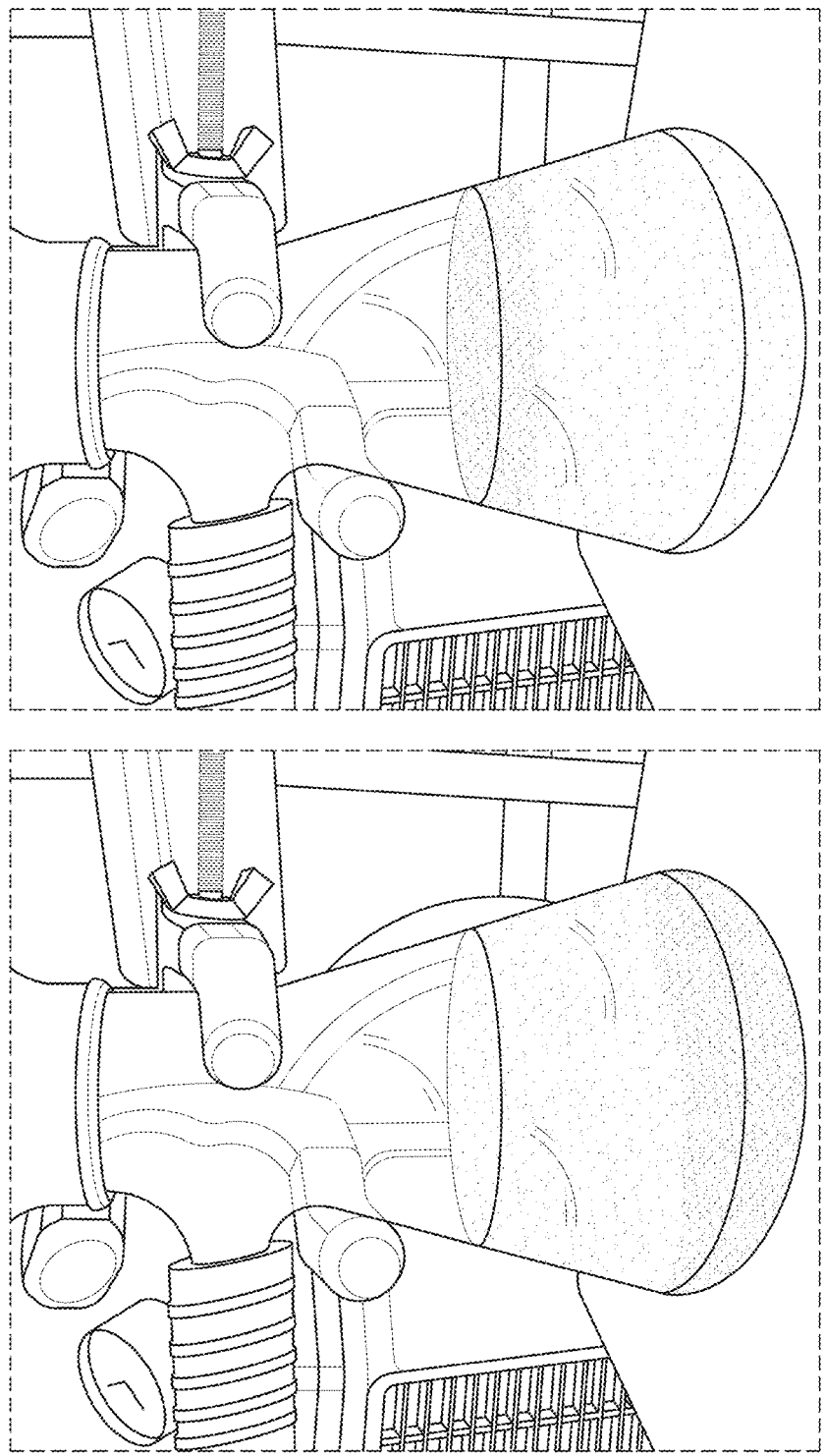
FIG. 61 illustrates an initial mixture of carbon perimorphic frameworks and their subsequent flotation when the flask is placed under partial vacuum.

Separation of the carbon perimorphic frameworks may also be obtained simply using flotation. In some carbon perimorphic frameworks, air bubbles may remain trapped in the exocellular pores during the liquid-phase endomorphic extraction. This may render the frameworks buoyant or quasi-buoyant upon endomorphic extraction. Furthermore, subjecting a mixture of these bubble-infused frameworks to a partial vacuum increases their buoyancy, as internal bubbles expand and extrude water from the porous framework. The progressive flotation and separation of carbon perimorphic frameworks under partial vacuum is illustrated in FIG. 61. This flotation under partial vacuum was obtained without the use of bubbling or solvents utilized in typical froth flotation procedures.

A number of variants and improvements of these separation techniques may be readily envisioned. Flotation may be improved with the use of a solvent, as would be typical in a conventional froth flotation process. Frameworks made on template materials with greater particle porosity may retain more air and be more buoyant. Hollow spheres, in particular, may contain more trapped air and be more buoyant.

Concentrating Stock Solutions

In some cases, it may be desirable to create a concentrated stock solution after separating the perimorphic product. A mixture of precipitated particles, such as the nesquehonite precipitated in the shuttling procedure described above, may be re-dissolved under conditions that allow higher solution concentrations. For example, an aqueous mixture of precipitated $MgCO_3 \cdot xH_2O$ particles may be subjected to higher $CO_2$ pressure in order to make a concentrated stock solution, as illustrated in FIG. 14. This concentrated stock solution may be utilized in the Precursor Stage.

Example VIIe: In one exemplary procedure, endomorphic MgO may be dissolved at higher concentrations under pressure. To demonstrate this, 15 g of MgO (Elastomag 170) template may be slurried with 750 g of deionized water, which may represent a conserved process water retained from the Precursor Stage. The water may be chilled to 5° C. The solids concentration of the mixture may be 20 g/L MgO, or approximately double the maximum concentration of MgO that can be dissolved into an aqueous $H_2CO_3$ extractant solution at atmospheric pressure. The mixture may have a solution pH of approximately and a resulting solution conductivity of 146 µS/cm. The mixture may be poured into a 1 L pressure vessel with magnetic stirring, a high-pressure gas inlet, and a purging needle valve. The reactor may be sealed and purged through a purging needle valve by opening the high-pressure gas inlet, allowing pressurized $CO_2$ gas, representing conserved $CO_2$ process gas recaptured in the Precursor Stage and Template Stage, to flow into the vessel for 2 minutes to displace any air. The purge valve may then be closed, and the reactor pressurized with $CO_2$ to 125 psi. After 65 minutes, the conductivity may be approximately 15.6 mS/cm measured at 16.3° C. and a pH of 8.5. This conductivity represents an $Mg(HCO_3)_2$ solution concentration equivalent to 10 g/L of dissolved MgO, which at atmospheric pressure may require an order of magnitude longer reaction time to achieve. At the 290 minute mark, the conductivity may be approximately 27.8 mS/cm measured at 19.5° C. and a pH of 7.5. The conductivity value and pH measurements at 290 minutes may signify $Mg(HCO_3)_2$ solubilities greater than the approximately 10 g/L MgO possible at atmospheric pressure.

Increased $CO_2$ pressure may likewise be used to create concentrated stock solutions from $MgCO_3 \cdot xH_2O$ solutes, such as those produced via shuttling procedures. These concentrated stock solutions may be produced via multistep Separation Stage procedures, in which stock solutions are used to precipitate solids that are re-dissolved under conditions allowing higher solubility. Alternatively, endomorphic extractions utilizing aqueous $H_2CO_3$ extractant solutions might be performed under increased $CO_2$ pressure, such that higher concentrations are obtained without precipitation and re-dissolution under increased $CO_2$ pressure.

VIII. Perimorphic Framework Examples

In the Preferred Method, carbon perimorphic frameworks are synthesized using MgO templates derived from $MgCO_3 \cdot xH_2O$ precursors. While coarsening may reduce the fine structuring of these MgO templates, a typical MgO template comprises a porous substructure of conjoined nanocrystals. This creates a labyrinthine framework with endocellular and exocellular labyrinths. This labyrinthine structure is not specific to carbon frameworks formed on these templates—any framework will have the same native morphology. However, carbon frameworks with thin, conformal perimorphic walls can be utilized to study these architectures due to their ability to create fine, electron-translucent replicas of the template.

Figure 62A:
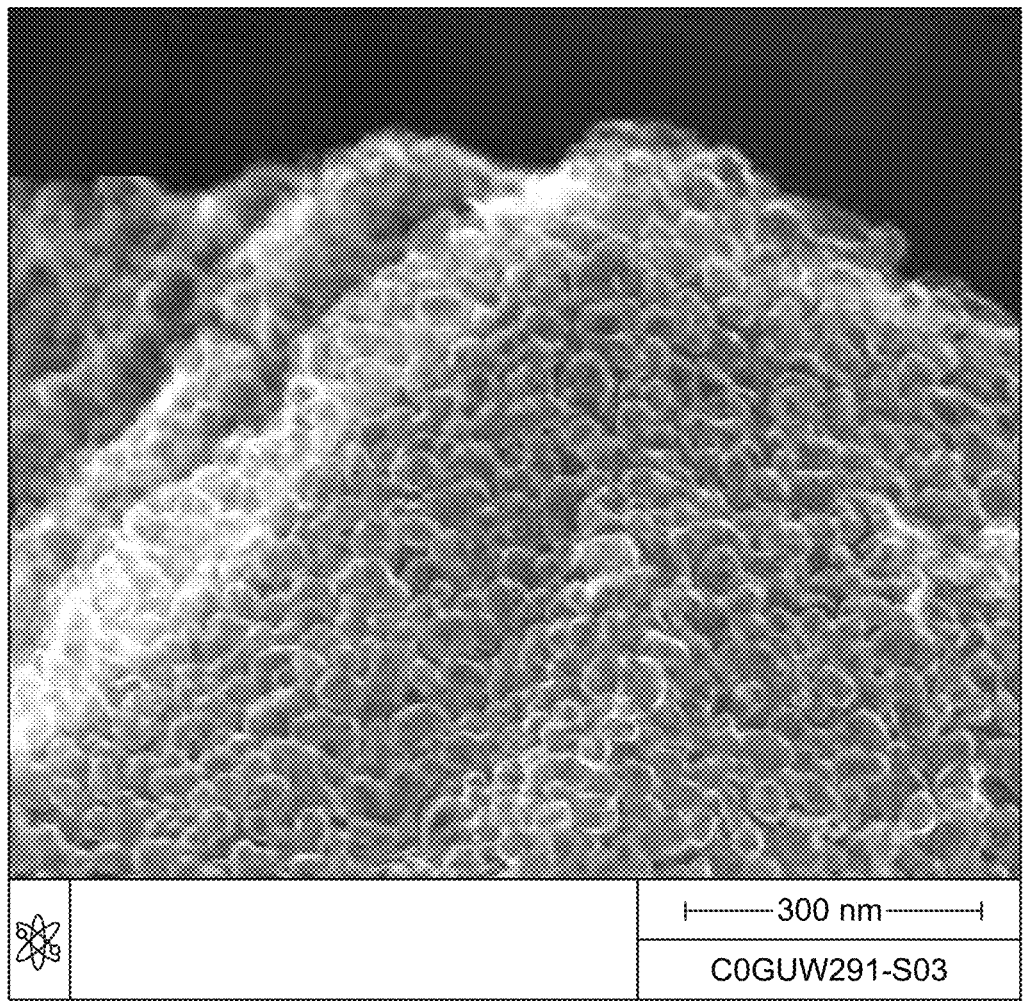
FIG. 62A is an SEM micrograph at 250,000× magnification of a carbon perimorphic framework generated from surface replication on an ex-nesquehonite template particle followed by endomorphic extraction. The substructure comprises mesoporous cellular subunits that possess a consistent, equiaxed morphology and size throughout the superstructure.
Figure 62B:
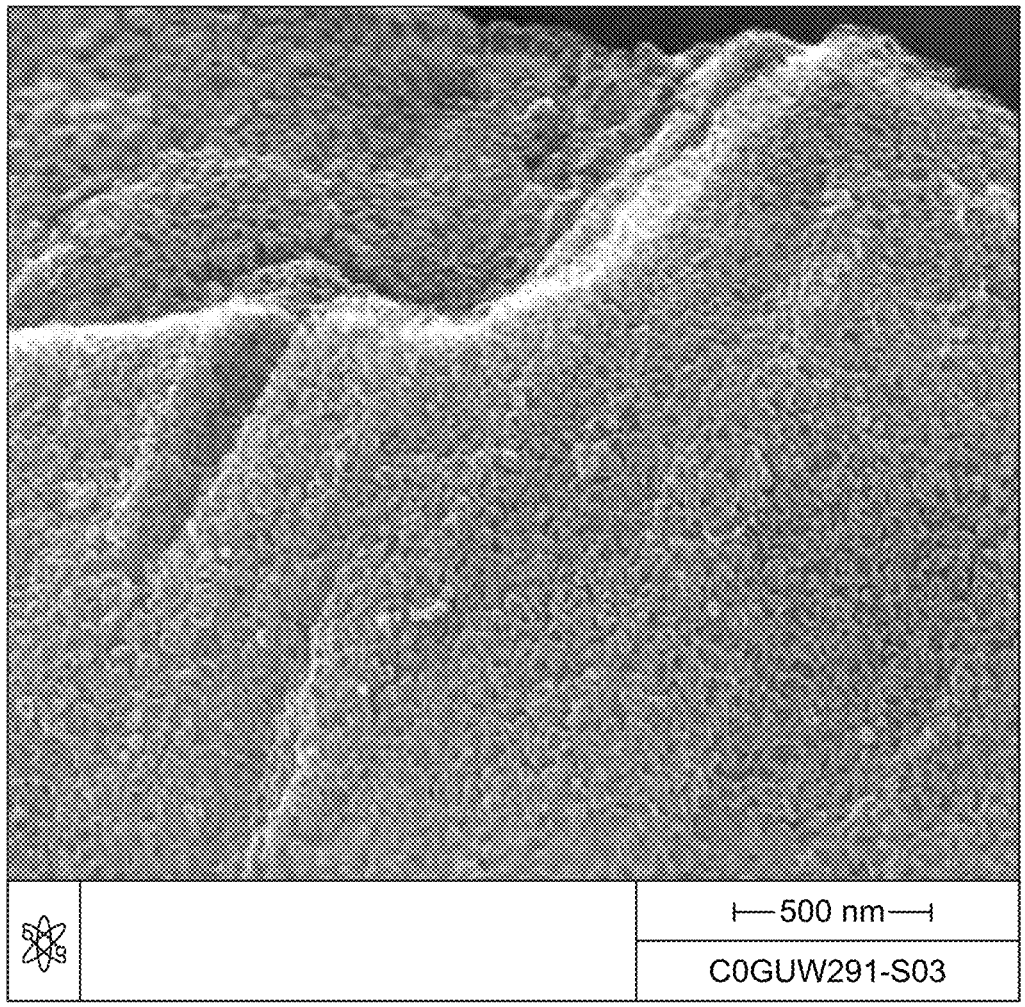
FIG. 62B is an SEM micrograph at 100,000× magnification showing the same particle as FIG. 62A.
Figure 62C:
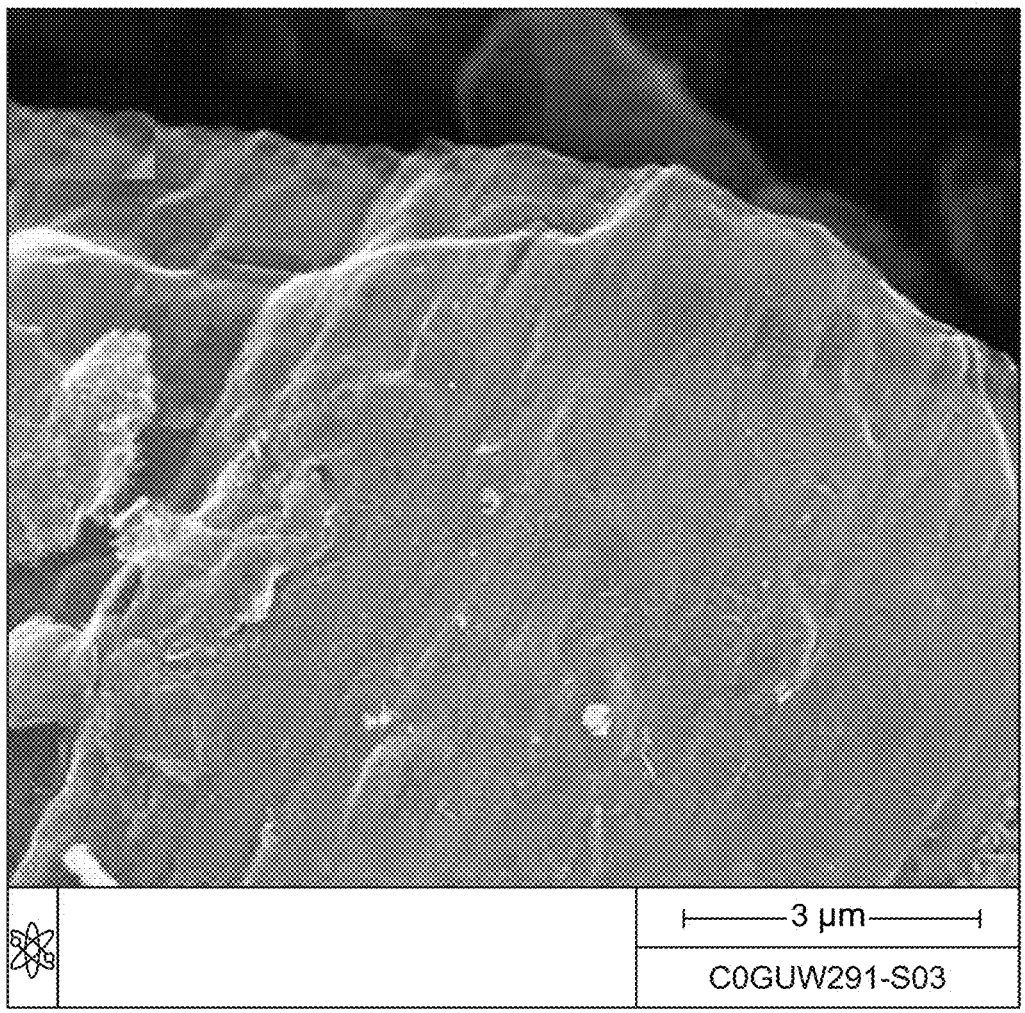
FIG. 62C is an SEM micrograph at 25,000× magnification showing the same particle as FIGS. 62A-62B.

As an example, FIG. 62A is an SEM micrograph taken at high magnification showing a labyrinthine carbon framework that has retained its native morphology. The nanocellular subunits are quasi-discretized, but conjoined to one another. The cells, like the discretized MgO subunits upon which they were synthesized, are monodisperse, possessing a consistent, equiaxed morphology and size throughout the superstructure. This consistency, as well as the regularity of their packing, can be best observed at different scales of magnification. FIGS. 62A-62C includes SEM micrographs of the same carbon framework imaged at 25,000× (FIG. 62A), 100,000× (FIG. 62B) and 250,000× (FIG. 62C) magnifications. The highly regular cell morphology and compactness is observable throughout the framework. The labyrinthine framework in FIG. 62A-62C was constructed on an ex-nesquehonite MgO template.

Figure 63A:
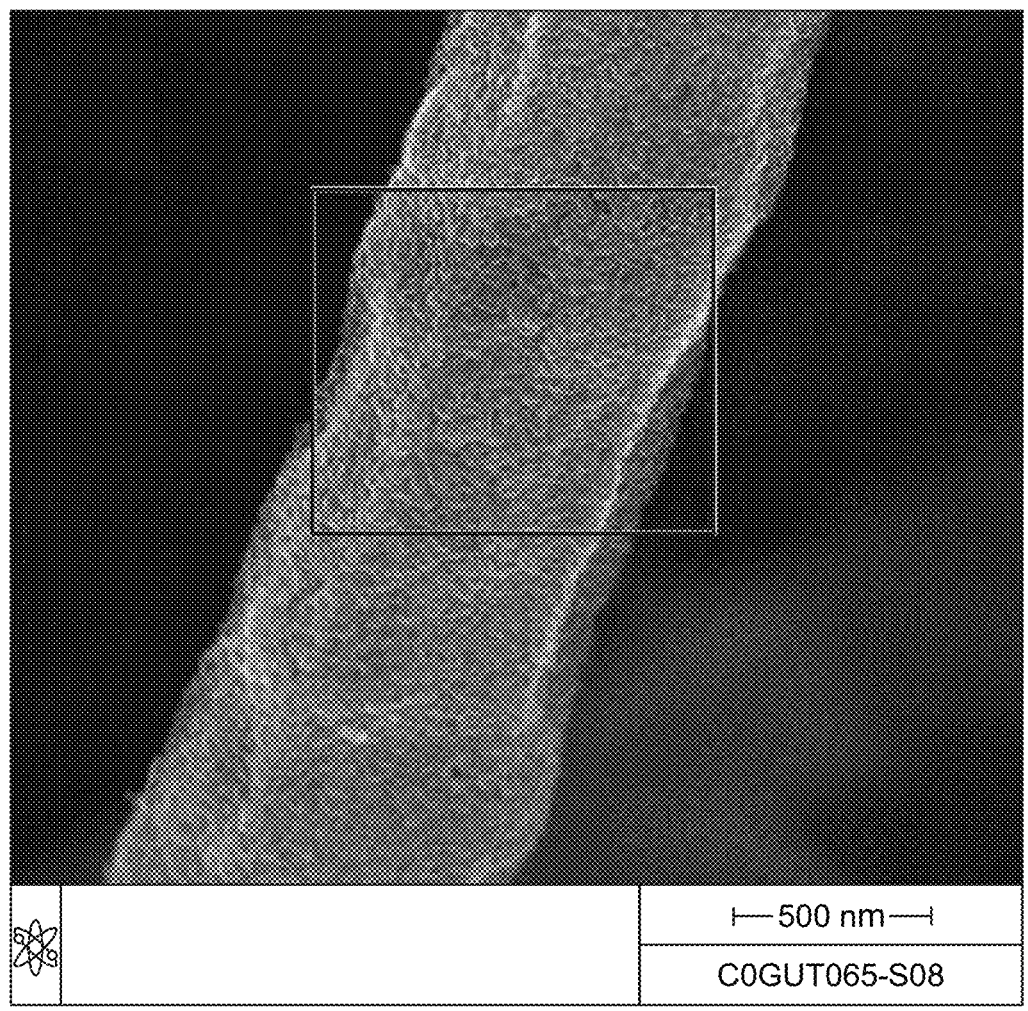
FIG. 63A is an SEM micrograph of a carbon perimorphic framework generated from an ex-nesquehonite, porous MgO template particle. This type of framework comprises a fibroidal, elongated superstructure.
Figure 63B:
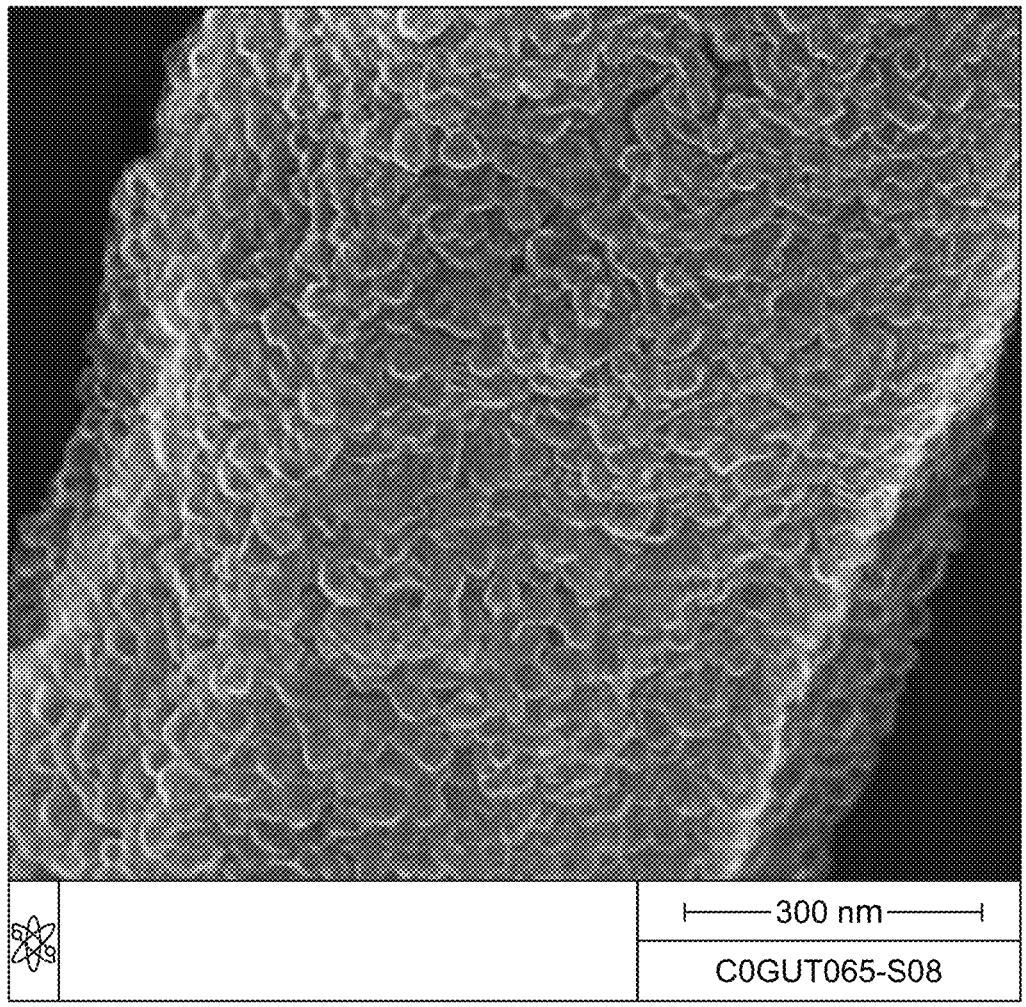
FIG. 63B is a magnification of the boxed region of FIG. 63A that shows the framework's cellular substructure, which comprises conjoined, mesoporous and macroporous subunits.
Figure 63C:
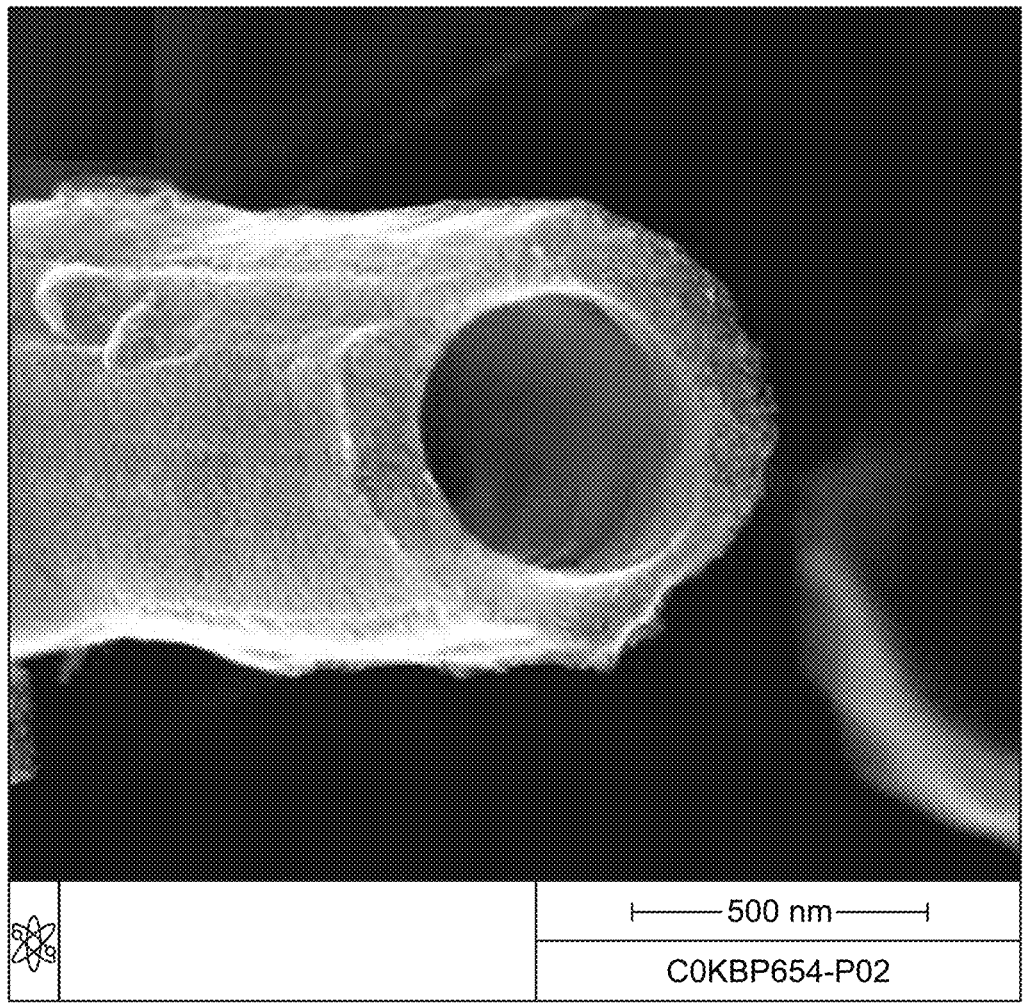
FIG. 63C is an SEM micrograph showing another example of a carbon perimorphic framework generated from an ex-nesquehonite, porous MgO template particle. The framework has an elongated and tubular superstructure.
Figure 64A:
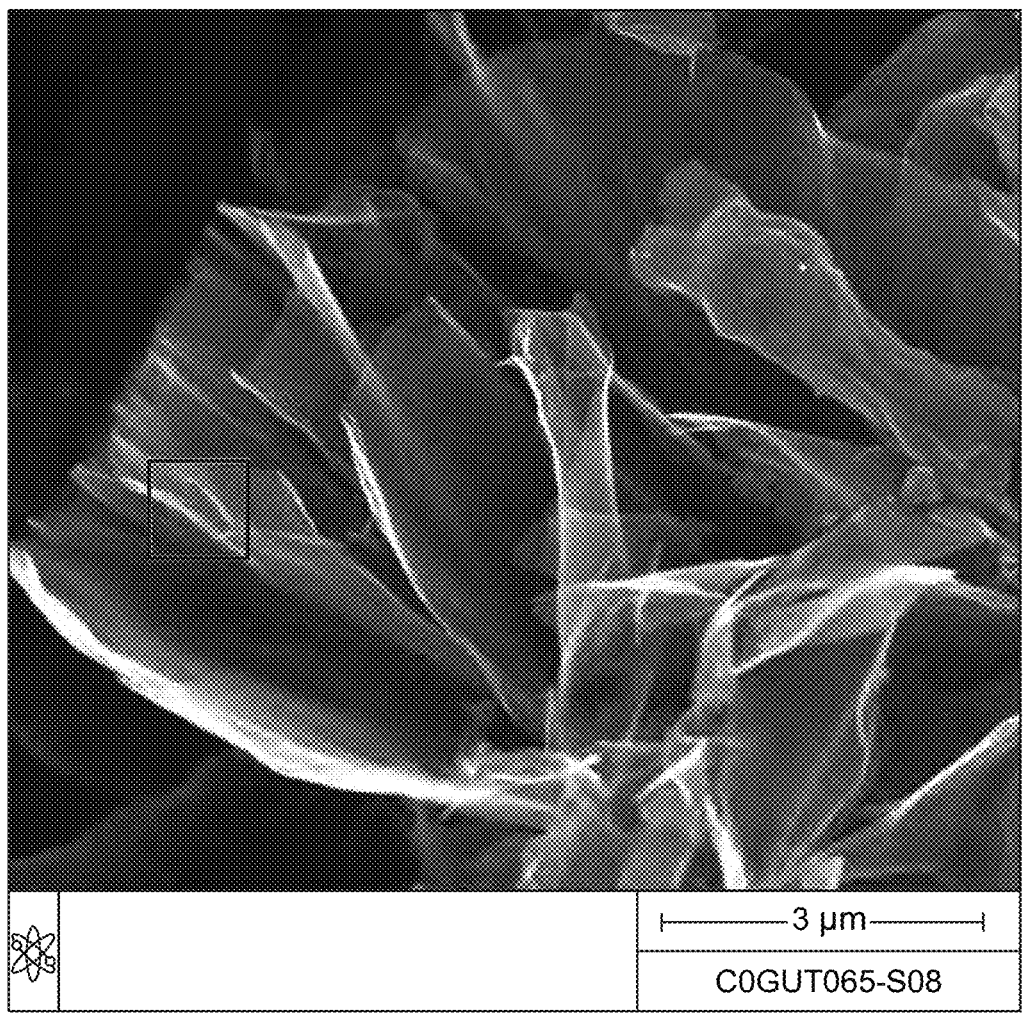
FIG. 64A is an SEM micrograph of carbon perimorphic frameworks generated from ex-hydromagnesite, porous MgO template particles. The frameworks comprise both thin and hierarchical-equiaxed superstructures.
Figure 64B:
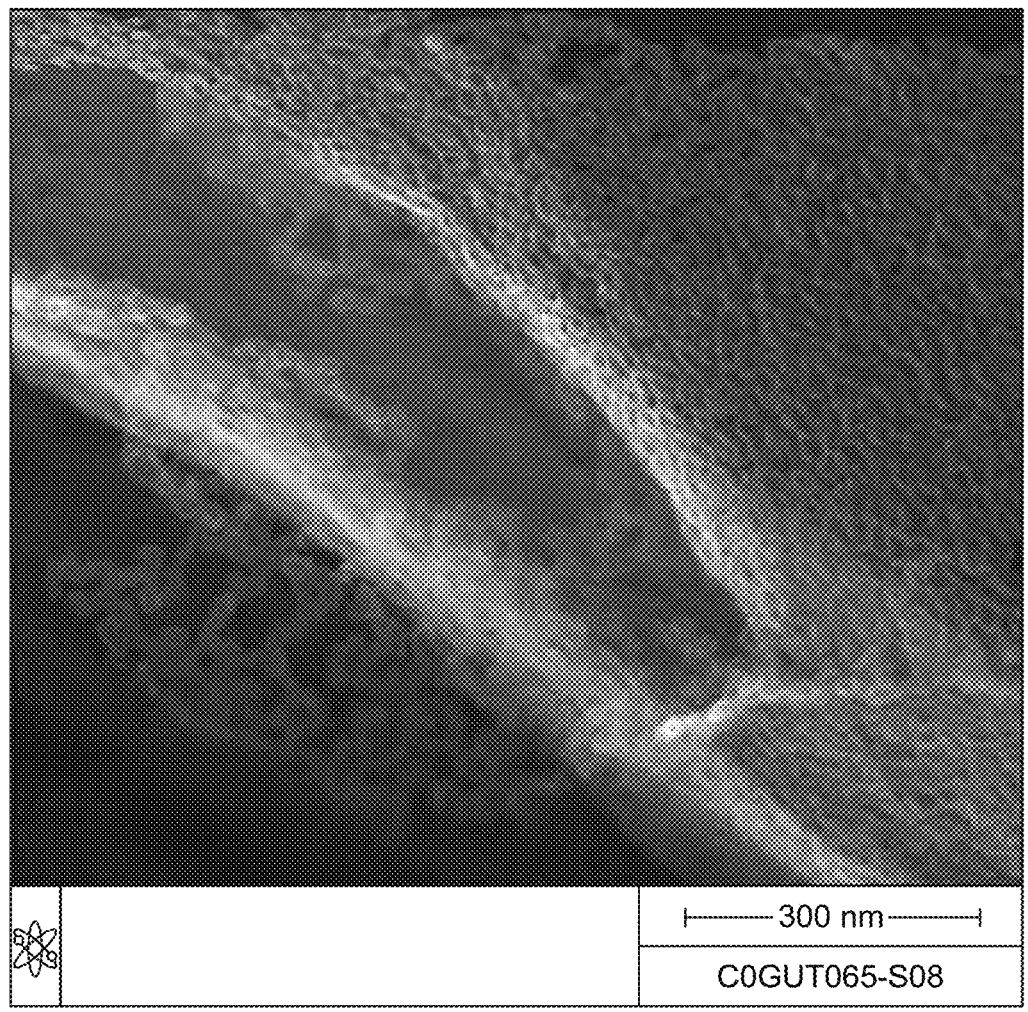
FIG. 64B is an SEM micrograph showing the cellular substructure of the boxed region of FIG. 64A.
Figure 64C:
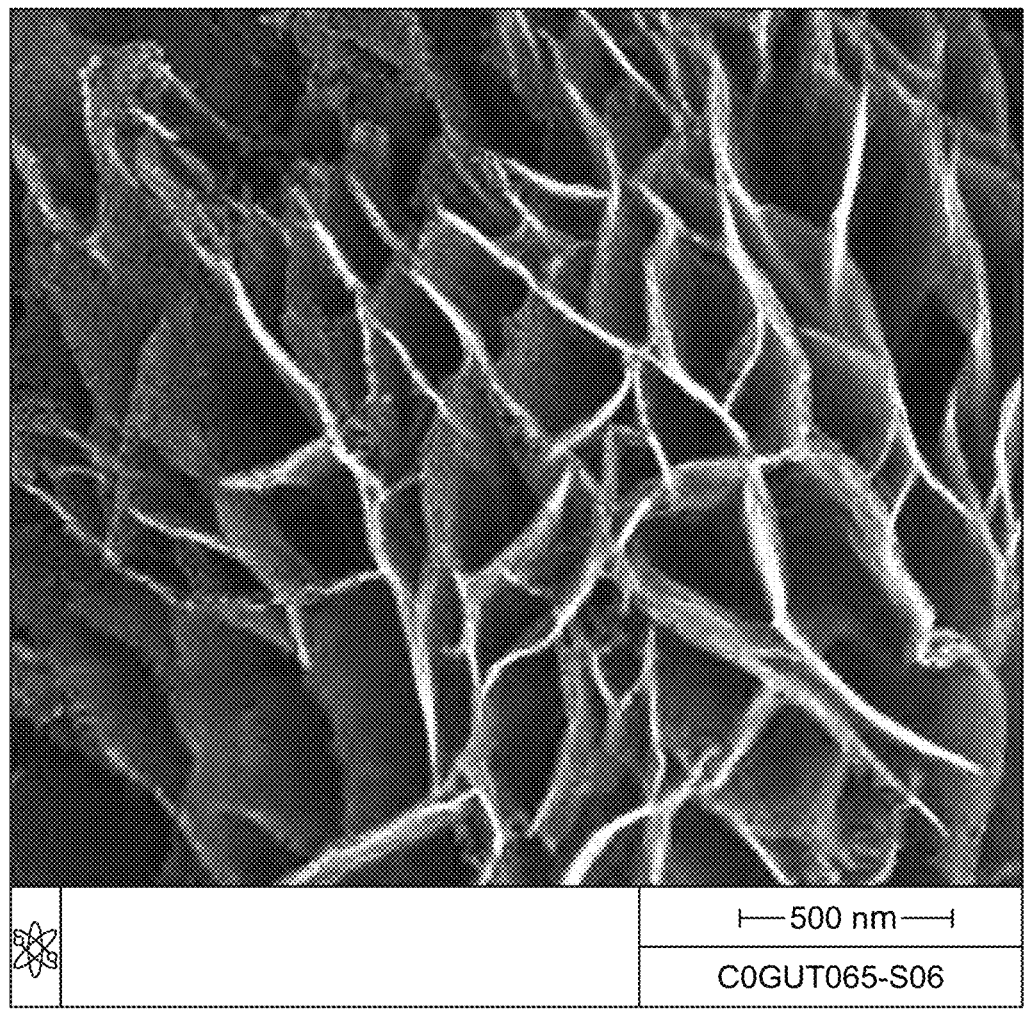
FIG. 64C is an SEM micrograph showing a labyrinthine framework generated on a hierarchical-equiaxed hydromagnesite template.

While the subunits are uniformly equiaxed, the superstructures of frameworks derived from porous MgO templates have diverse geometries to the variety of precursors from which MgO templates can be derived. For example, frameworks generated on MgO templates made from nesquehonite template precursor impart elongated, fibroidal superstructures, as shown by the labyrinthine framework in FIGS. 63A-63C. Frameworks generated on templates made from hydromagnesite or dypingite template precursors impart thin (FIGS. 64A-64B, where FIG. 64B represents a magnification of the region indicated by the boxed region in FIG. 64A) or hierarchical (FIG. 64C) superstructures. The labyrinthine framework shown in FIG. 64C was generated on a hierarchical-equiaxed hydromagnesite template.

Figure 65:
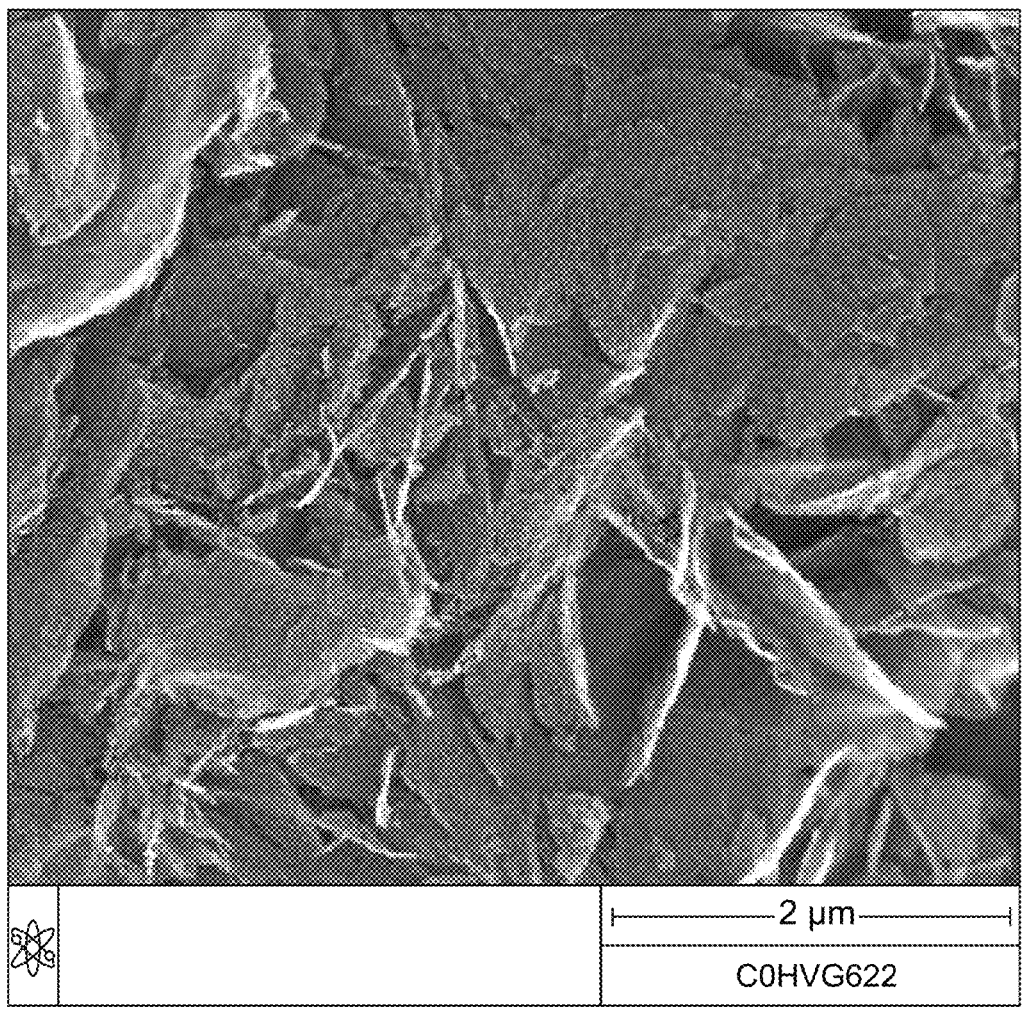
FIG. 65 is an SEM micrograph of perimorphic carbon frameworks generated from ex-hydromagnesite template particles. Mechanical agitation during endomorphic extraction has created individualized, thin particles that stack with one another.
Figure 66:
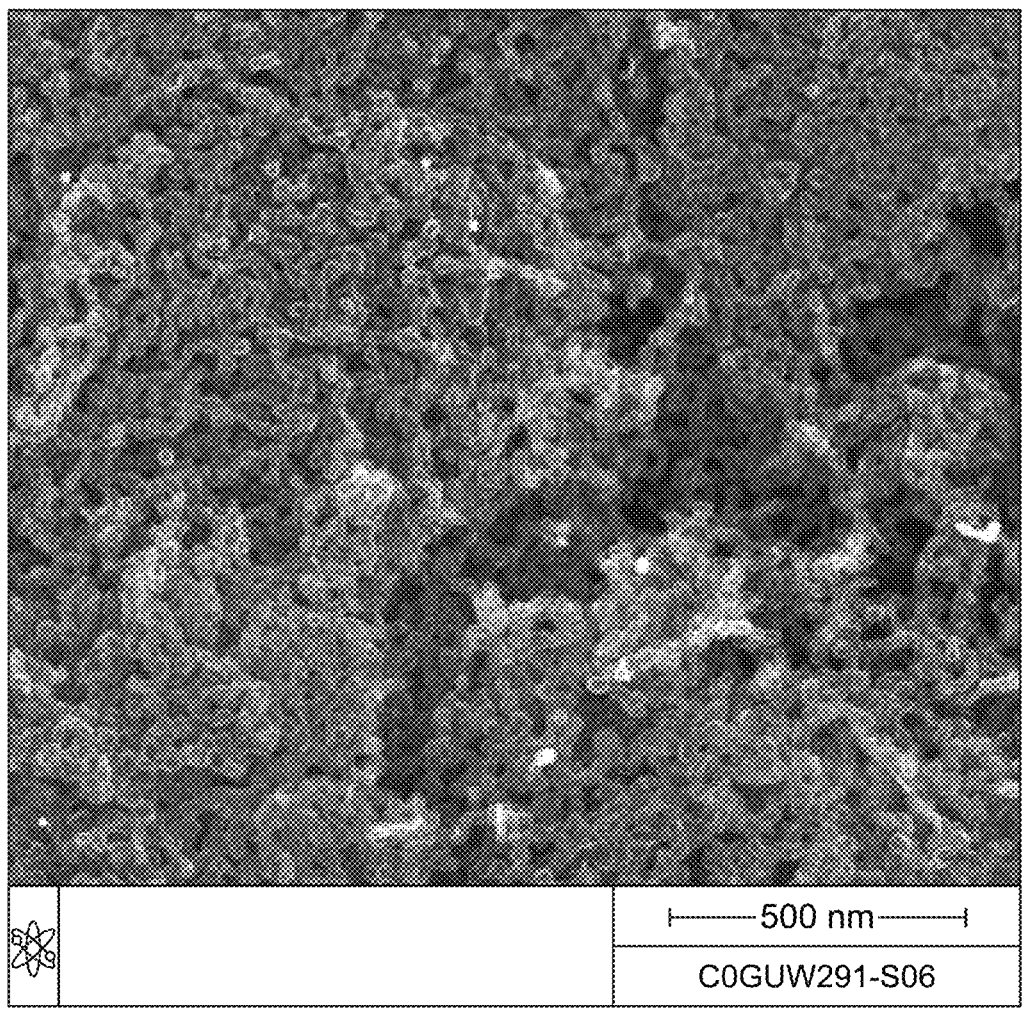
FIG. 66 is an SEM micrograph of carbon perimorphic frameworks generated from ex-hydromagnesite template particles. A prolonged thermal treatment in the Template Stage and mechanical agitation during endomorphic extraction have created smaller clusters of subunits with no clear higher-order organization.

In addition to these diverse architectures, fragmentation and deformation of the frameworks may result from mechanical agitation, such as the multilayer stack of thin pseudomorphs shown in FIG. 65. Stacks of these thin, mesoporous porous, unlike stacks of monolayers materials (e.g. graphene), should possess high specific porosity, retain much of their surface area, and be comparatively easier to exfoliate due to the limited contact area between their surfaces. Agitation may also be used to create small clusters of subunits. FIG. 66 is an SEM image showing a carbon framework that has been broken up via agitation, forming smaller multicellular clusters.

Figure 67:
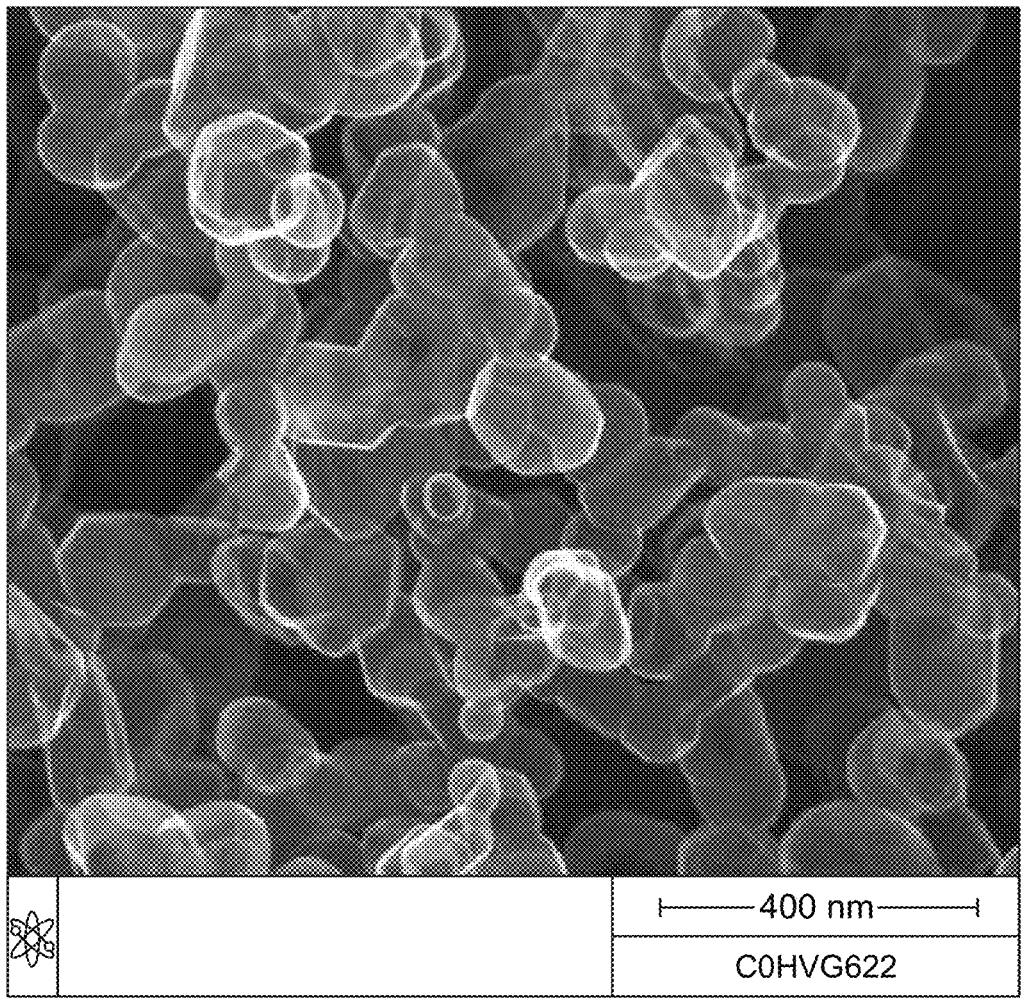
FIG. 67 is an SEM micrograph of carbon perimorphic frameworks generated from ex-hydromagnesite, sintered MgO template particles. The frameworks comprise quasi-polyhedral cellular subunits larger than 100 nm in diameter.

If the template precursor, or some decomposition product of a template precursor, is coarsened during the Template Stage, the resulting perimorphic frameworks become less compact. In one experiment, MgO templates were sintered for 2 hours at 1,000° C. prior to a Replication Stage. The resulting MgO templates were quasi-polyhedral and generally larger than 100 nm in diameter. FIG. 67 is an SEM image of the less compact frameworks formed on these coarsened templates. Coarsening via sintering and coalescence of particles may degrade the inherited superstructures, creating particles of irregular geometry in place of particles with regular, pseudomorphic geometries.

While these less compact, less regular frameworks are not as ordered as more compact frameworks with more regular geometries, they may still be assembled into multicellular clusters with attractive functional properties like those described in U.S. Patent Application 62/448,129. One benefit of less compact frameworks with flexible perimorphic walls is their increased pseudoelasticity—i.e. a collapsed framework that is natively coarse, despite being densified by its collapse, may retain the ability to expand back to its native dimensions without covalent failure.

Figure 68:
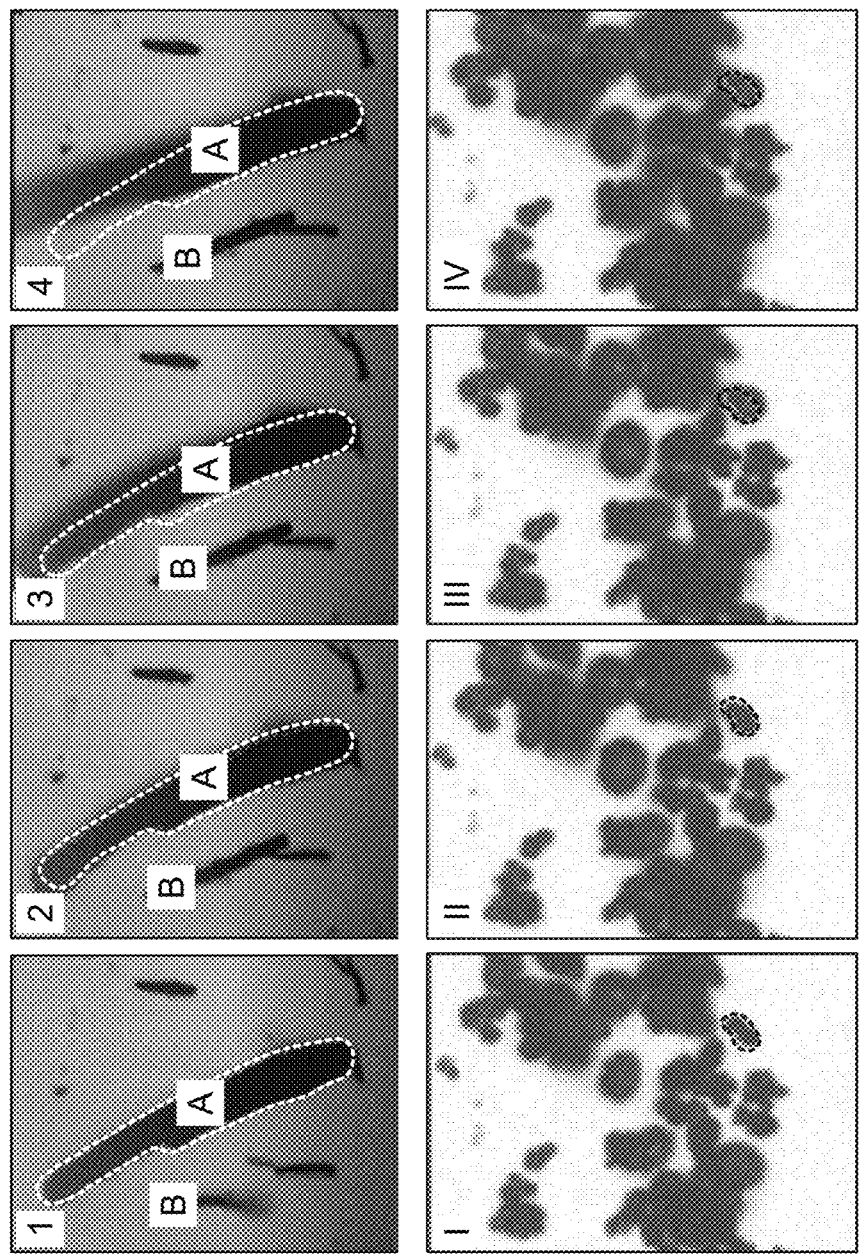
FIG. 68 includes optical micrographs of carbon perimorphic frameworks springing back to their native architecture from a non-native, shrunken state created by evaporative drying.

Elasticity is shown in the sequences of optical images in FIG. 68. In the first sequence (1-4), elongated carbon perimorphic frameworks are shown drying on a glass slide. These frameworks first shrink and deform, as the surface tension of the receding residual water inside them deforms the flexible perimorphic walls, then re-expand to their native geometry as the deformed walls locally spring back to their native morphology. This elastic response ultimately restores the native superstructural geometry. In the first sequence, two frameworks (labeled A and B) progress from their most shrunken, non-native state back to their native, expanded state. The outline of framework A is traced in Frame 1, and this outline is applied to Frames 2-4 for comparison. Ultimately, both Framework A and Framework B are restored to their straight, native superstructure. In the second sequence (I-IV), hollow-spherical carbon perimorphic frameworks are shown drying on a glass slide. These frameworks progress from their most shrunken, non-native state back to their native, expanded state. The outline of a representative framework is traced in Frame I, and this outline is applied to Frames II-IV for comparison.

Figure 69A:
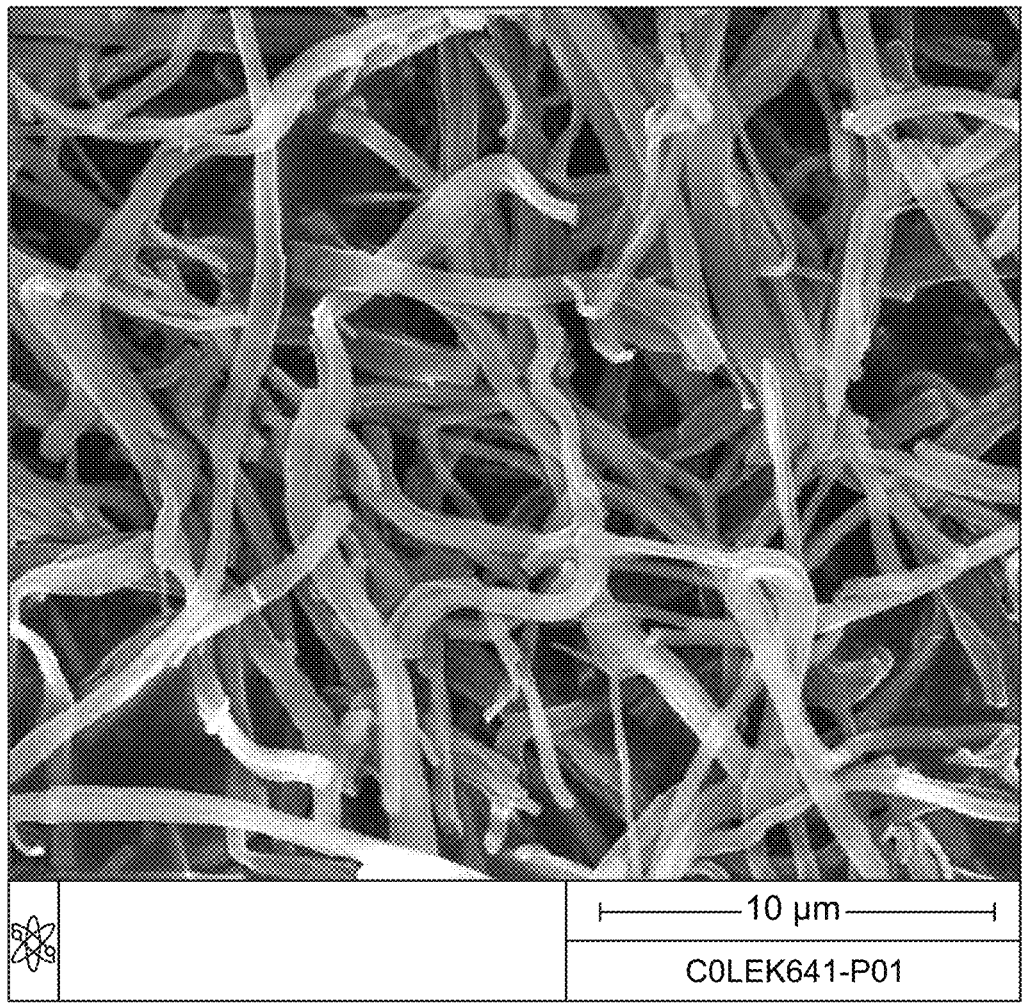
FIG. 69A is an SEM micrograph includes of carbon perimorphic frameworks generated from elongated template particles ($N_2T_4$). These carbon frameworks comprise flexible, porous carbon fibers.
Figure 69B:
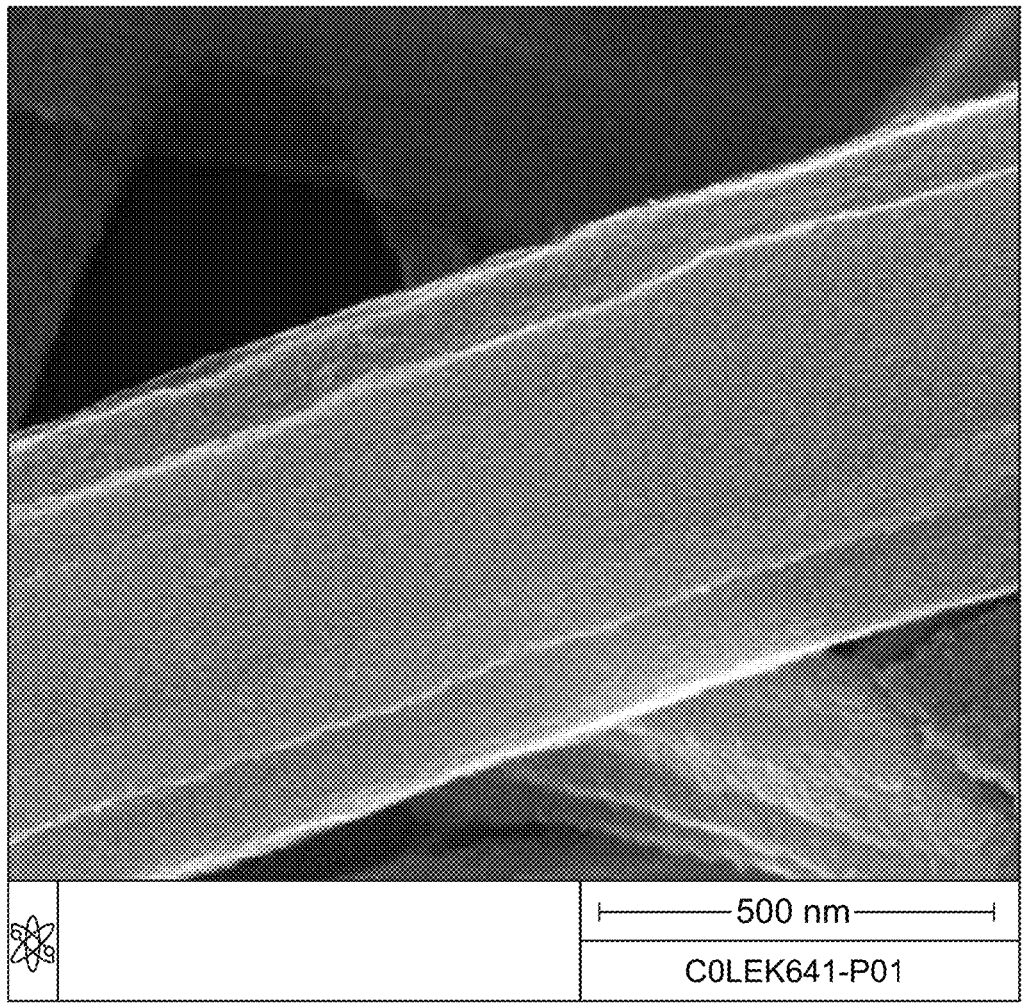
FIG. 69B is an SEM micrograph of the cellular substructure of the carbon perimorphic frameworks shown in FIG. 69A. The cellular substructure is indistinct due to deformation of the thin perimorphic wall.

FIGS. 69A-69B are SEM micrograph micrographs of carbon perimorphic frameworks grown on elongated templates ($N_2T_4$) described in Section V. The frameworks are flexible (FIG. 69A) but survive high-shear agitation relatively undamaged. The surfaces of the porous carbon particles look uniform and indistinct due to the fine, collapsed cellular substructure (FIG. 69B).

FIG. 70 includes SEM micrographs of carbon perimorphic frameworks grown on elongated templates ($N_2T_8$) described in Section V. Templates $N_2T_4$ and $N_2T_8$ were generated from the same sample template precursor material ($N_2$) but via different treatments during the Template Stage. The carbon frameworks in FIG. 70 are still flexible, but after high-shear agitation they appear damaged and gouged compared to the frameworks shown in FIGS. 69A-69B.

Figure 71:
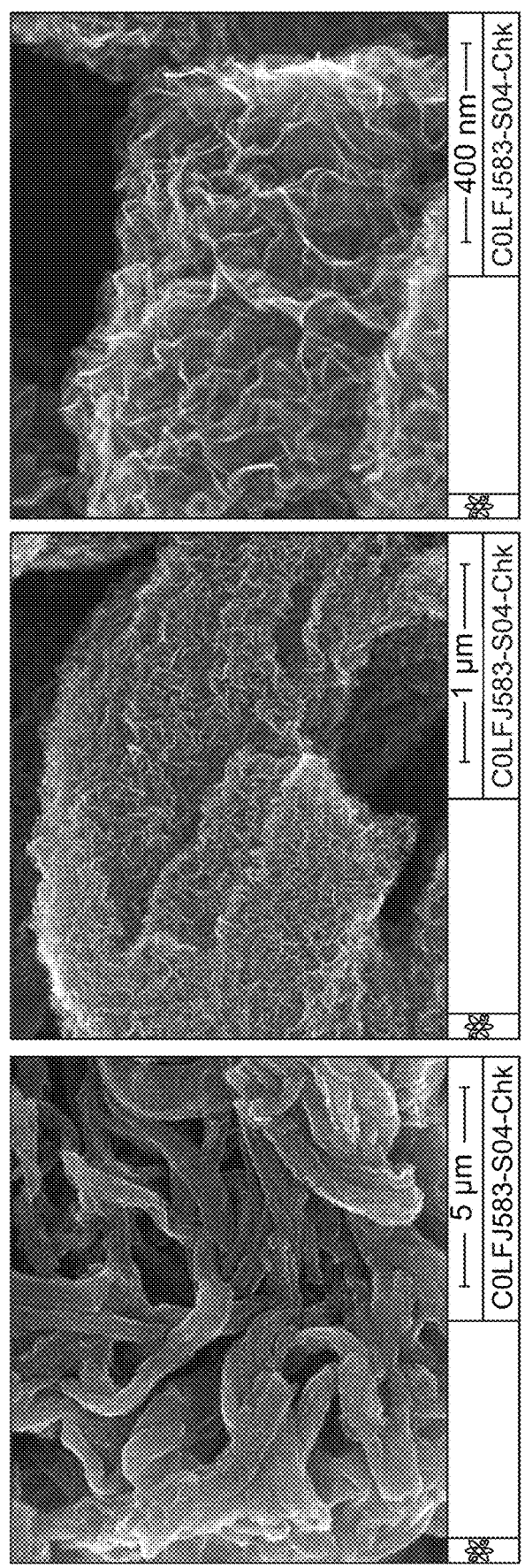
FIG. 71 includes SEM micrographs of carbon perimorphic frameworks ($P_{21}$) produced from endomorphic extraction of the $N_2T_1P_{21}$ PC particles. The frameworks are crumpled and cohered to one another via van der Waals interactions between the perimorphic walls. The $N_2T_1$ template particles were made by treating $N_2$ template material with heat and water vapor.

FIG. 71 includes SEM micrograph of carbon perimorphic frameworks grown on elongated templates ($N_2T_1$) described in Section V. These frameworks represent the perimorphic product generated from endomorphic extraction and perimorphic separation of the $N_2T_1P_{21}$ PC material.

Figure 72A:
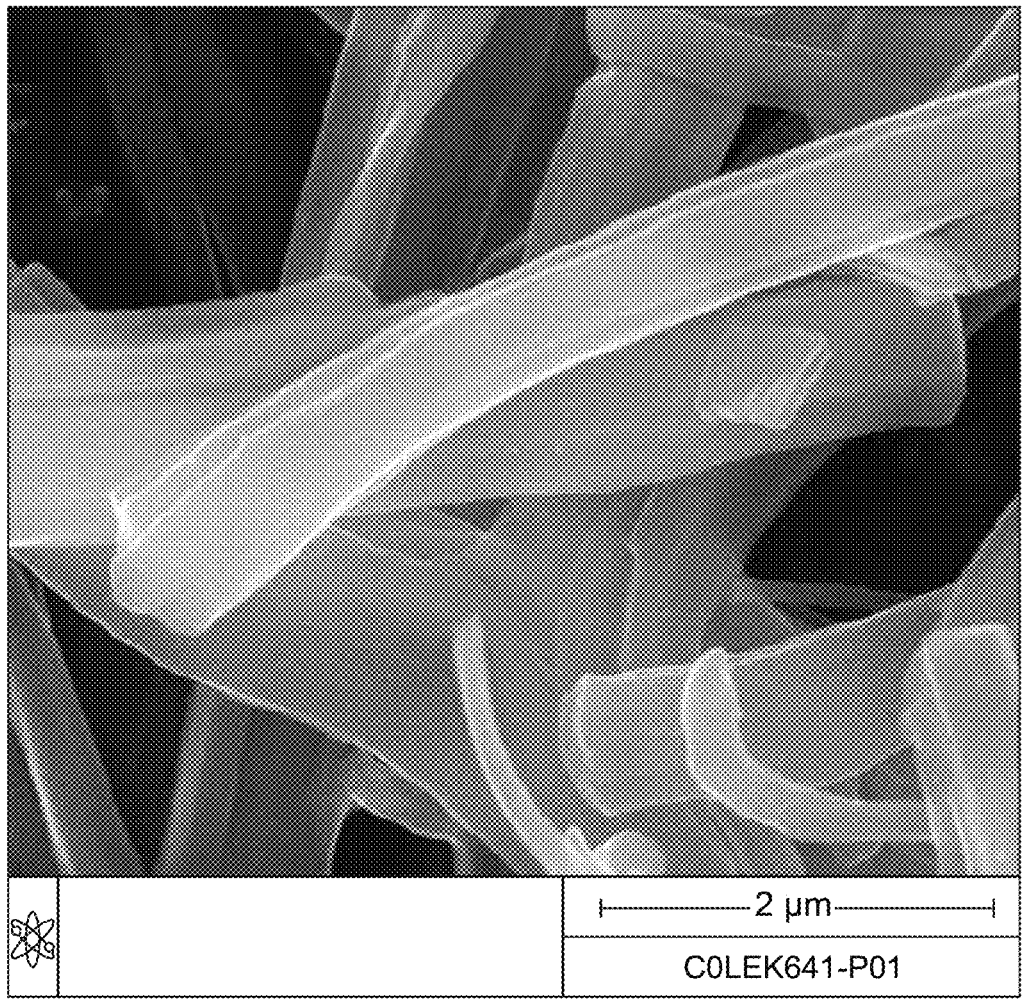
FIG. 72A is an SEM micrograph of carbon perimorphic frameworks produced on porous MgO template particles ($N_2T_4$).

FIG. 72A is an SEM micrograph showing the more compact carbon perimorphic frameworks synthesized on $N_2T_4$-type templates (vs. the less compact cellular substructure of frameworks synthesized on $N_2T_1$-type templates. By changing the treatment procedure in the Template Stage, frameworks of different compactness can be derived from a common template precursor material.

Figure 72B:
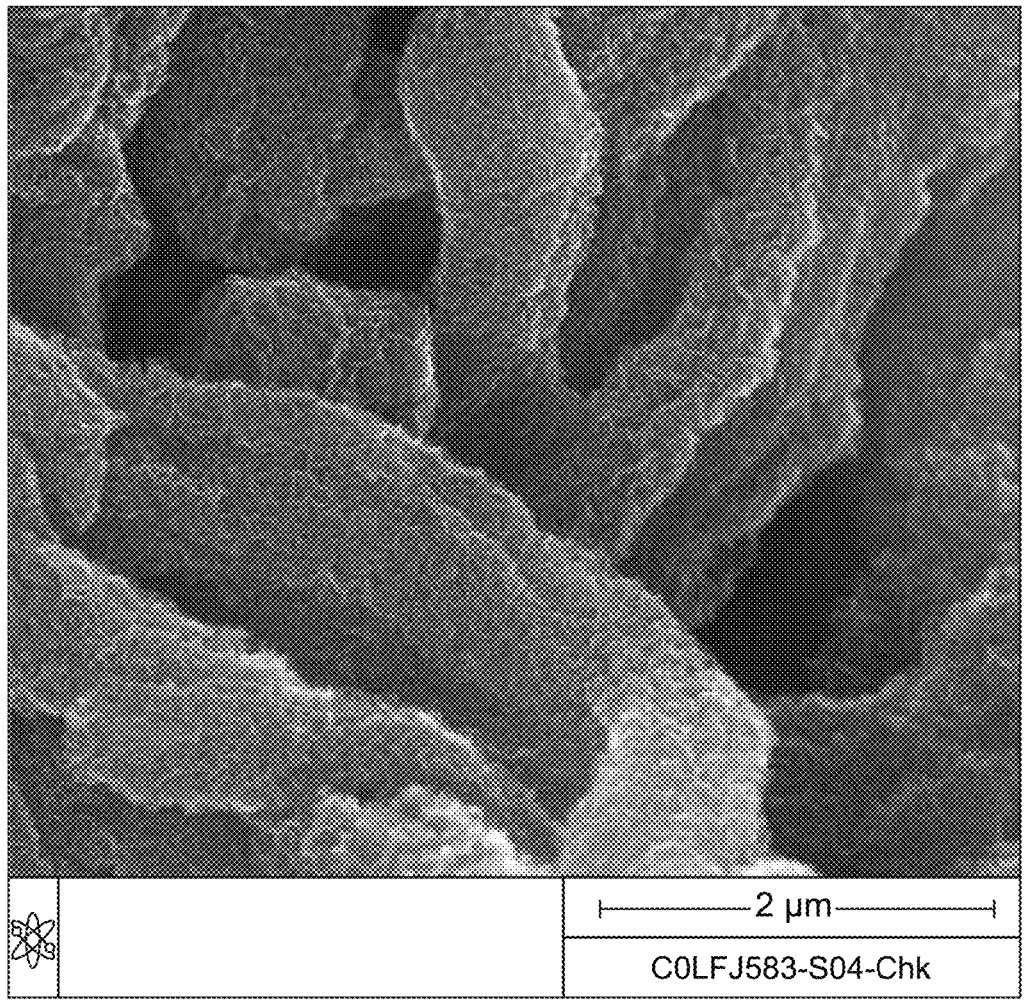
FIG. 72B is an SEM micrograph showing carbon perimorphic frameworks produced on porous MgO template particles ($N_2T_1$). The $N_2T_1$ template particles were generated after treatment with heat and water vapor, increasing the size of the subunits relative to the $N_2T_4$ subunits. This difference in the templates can be observed after endomorphic extraction based on the smoother appearance of the frameworks in FIG. 72A vs. the crumpled appearance of the frameworks in FIG. 72B.
Figure 73A:
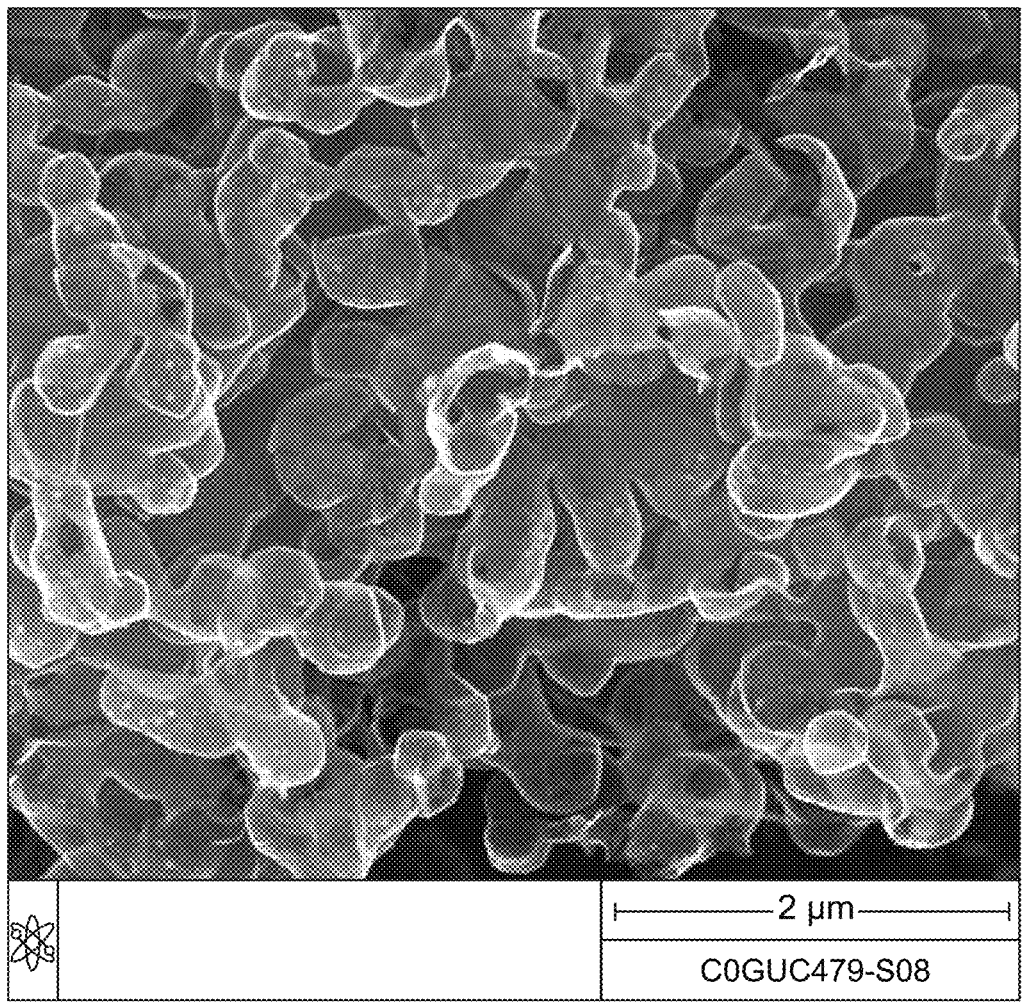
FIG. 73A is an SEM micrograph carbon perimorphic frameworks derived from precipitated calcium carbonate ($CaCO_3$) template precursor particles.
Figure 73B:
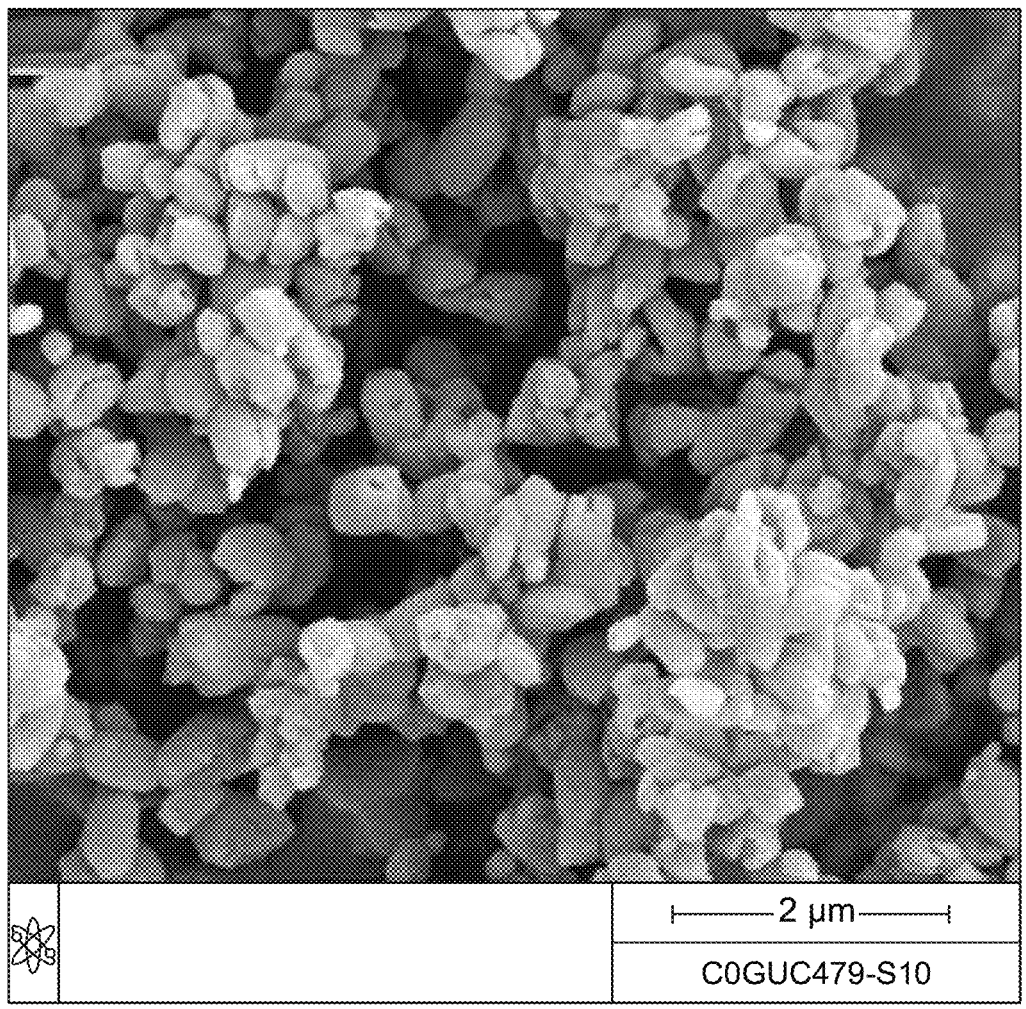
FIG. 73B is an SEM micrograph of the precipitated calcium carbonate ($CaCO_3$) template precursor particles from which the carbon frameworks in FIG. 73A are derived.

FIG. 72B is an SEM micrograph showing the less compact carbon perimorphic frameworks synthesized on $N_2T_1$-type templates (vs. the more compact cellular substructure of frameworks synthesized on $N_2T_4$-type templates). By changing the treatment procedure in the Template Stage, frameworks of different compactness can be derived from a common template precursor material. FIG. 73A is an SEM micrograph of carbon perimorphic frameworks ($P_{17}$) derived from a PC material ($Ca_1T_1P_{17}$) made on calcium oxide (CaO) template material ($Ca_1T_1$). The Replication Stage is discussed in Section V. While some breakage could be observed, the frameworks have largely retained their native morphology after endomorphic extraction and separation. FIG. 73B is an SEM micrograph of the template precursor material ($Ca_1$), a precipitated calcium carbonate ($CaCO_3$) commercial product (Albafil), that was used to make the $CaT_1$ template material. The average size of the precursor particles is 0.7 microns. These precursor particles were heated to 1050° C., decomposing them to CaO and sintering the individual particles.

Raman spectroscopy is commonly used to characterize carbons and is a critical tool used to characterize the lattice structure of the exemplary carbon perimorphic materials in this disclosure. The details regarding the equipment and techniques used for Raman analysis are detailed in Section III.

Three main spectral features are typically associated with $sp^2$-bonded carbon: the "G band" (typically at or around 1585 $cm^{-1}$), the "2D band" (typically between 2500 and 2800 $cm^{-1}$), and the "D band" (typically between 1200 and 1400 $cm^{-1}$). The G band is associated with $sp^2$-hybridized carbon. The D band is associated with radial breathing mode phonons in polycyclic $sp^2$-hybridized carbon and is activated by defects. Therefore, the D band is associated with disorder and the peak intensity ratio of the D and G bands provides a measure of disorder. Another feature associated with disorder is an interband region located between the D and G bands. The presence of broad peaks within this interband range increases the height of the trough between the D and G bands, and this height may therefore be used as a measure of disorder, where higher troughs are associated with greater disorder. For this reason, the present disclosure utilizes the height of this trough to characterize disorder. The trough height is defined herein as the local minimum intensity value occurring between the wavenumber associated with the D peak and the wavenumber associated with the G peak. The intensity value at this wavenumber is then compared to the G peak intensity to characterize disorder.

In order to avoid resorting to subjective profile-fitting judgments, the present disclosure analyzes the unfitted Raman spectra of the carbon perimorphic materials presented herein. All references to peak positions and peak intensities therefore relate to unfitted peak positions and are derived without profile fitting. Additionally, all peak positions and peak intensities reported are measured under 532 nm excitation. The intensities of the G, 2D, D, and trough are designated herein as $I_G$, $I_{2D}$, $I_D$, and $I_{Tr}$, respectively.

The table in FIGS. 81A-81B summarizes the Raman metrics of the carbon frameworks generated in this disclosure. The table details the sample names of the template precursor, template and PC materials from which the frameworks are generated. The CVD growth temperatures, hydrocarbons used, and procedure times during the Replication Stage are detailed. The yield obtained from TGA analysis of the PC is also detailed in the table. The Raman laser power used to take spectral measurements is also listed in the table. The Raman metrics presented in the table include the $I_D/I_G$ and $I_{Tr}/I_G$ peak ratios along with the G peak position, D peak position and spread between the G and D peak positions. These Raman metrics, taken together, convey information about the level of order and disorder in the samples.

The $I_D/I_G$ peak intensity ratios for the carbon perimorphs in the PC materials range between 0.78-1.27, indicating that these samples comprise disordered carbons. This disorder is corroborated by the generally high $I_{Tr}/I_G$ peak intensity ratios, which range between 0.17-0.64 as shown in the table in FIGS. 81A-81B. It is also confirmed by the non-planarity of the graphenic lattices, which can be discerned in high-resolution TEM micrographs, such as the magnified inset of FIG. 5B.

For crystalline $sp^2$-hybridized carbons like graphite, the G band is expected to be centered around ~1580 $cm^{-1}$. It has also been shown that the G band can be red-shifted for carbons under compressive strain and blue-shifted under tensile strain. For $sp^2$ carbons, the D band, if present, should be centered around 1350 $cm^{-1}$ (for 532 nm laser). Red-shifting of the D band position, as seen in some of the samples, is indicative of sp a defect states present within the disordered $sp^2$ carbons.

For the samples described herein, the G band peak positions range between 1581-1609 $cm^{-1}$, and the D band peak positions range between 1324-1358 $cm^{-1}$, as shown in the table in FIGS. 81A-81B. The spread of the G band peak position and D band peak position may lie between 239-279 $cm^{-1}$, with bigger spreads indicating more strain and disorder. Some of the samples have been annealed, and annealing may be desired to reduce this disorder.

The invention claimed is:

1. A method for producing carbon perimorphic frameworks by:
   I. From a first aqueous stock solution, deriving template precursor particles and an aqueous mother liquor, the deriving comprising a solventless precipitation, where the first aqueous stock solution and aqueous mother liquor each contain aqueous ion species comprising oxyanions and metal cations, the metal cations comprising at least one of a Group I metal and a Group II metal; and
   II. Decomposing the template precursor particles to evolve template particles, the template particles comprising at least one of a metal carbonate and a metal oxide; and
   III. On a templating surface of each of the template particles, at a temperature of at least 350° C., synthesizing a perimorphic wall comprising at least one graphenic carbon layer, to form a perimorphic composite particle, the perimorphic walls together characterized by a 532-nm Raman spectrum having an unfitted D peak position between 1300 $cm^{-1}$ and 1332 $cm^{-1}$; and
   IV. Exposing the perimorphic composite particles to an aqueous acid to:
      extract the template particles from the perimorphic walls; and
      generate a second aqueous stock solution, the second aqueous stock solution comprising the aqueous mother liquor and containing the aqueous ion species; and
      form carbon perimorphic frameworks, each carbon perimorphic framework comprising a perimorphic wall and an endocellular space.

2. A method for producing carbon perimorphic frameworks by:
   I. From a first aqueous stock solution, deriving template precursor particles and an aqueous distillate, the deriving comprising at least one of spray drying and spray pyrolysis, where the first aqueous stock solution contains aqueous ion species comprising oxyanions and metal cations, the metal cations comprising at least one of a Group I metal and a Group II metal; and
   II. Decomposing the template precursor particles to evolve template particles, the template particles comprising at least one of a metal carbonate and a metal oxide; and
   III. On a templating surface of each of the template particles, at a temperature of at least 350° C., synthesizing a perimorphic wall comprising at least one graphenic carbon layer to form a perimorphic composite particle, the perimorphic walls together characterized by a 532-nm Raman spectrum having an unfitted D peak position between 1300 $cm^{-1}$ and 1332 $cm^{-1}$; and
   IV. IV Exposing the perimorphic composite particles to an aqueous acid to:
      extract the template particles from the perimorphic walls; and
      generate a second aqueous stock solution, the second aqueous stock solution comprising the aqueous distillate and containing the aqueous ion species; and
      form carbon perimorphic frameworks, each carbon perimorphic framework comprising a perimorphic wall and an endocellular space.

3. A method for producing carbon perimorphic frameworks by:
   I. From a first aqueous stock solution, deriving template precursor particles and process water, the deriving comprising a solventless precipitation, where the first aqueous stock solution contains aqueous ion species comprising oxyanions and metal cations, the metal cations comprising at least one of a Group I metal and a Group II metal; and
   II. Decomposing the template precursor particles to evolve template particles and a process gas, each template particle comprising at least one of a metal carbonate and a metal oxide; and
   III. On a templating surface of each of the template particles, at a temperature of at least 350° C., synthesizing a perimorphic wall comprising at least one graphenic carbon layer, to form a perimorphic composite particle; and IV. Exposing the perimorphic composite particles to an aqueous extractant solution formed from portions of the process water and process gas to:
   extract the template particles from the perimorphic walls; and
   generate a second aqueous stock solution, the second aqueous stock solution containing the aqueous ion species; and
   form carbon perimorphic frameworks, each carbon perimorphic framework comprising a perimorphic wall and an endocellular space.

4. A method for producing carbon perimorphic frameworks by:

I. From a first aqueous stock solution, deriving template precursor particles, the deriving comprising a solventless precipitation, where the first aqueous stock solution contains aqueous ion species comprising oxyanions and metal cations, the metal cations comprising at least one of a Group I metal and a Group II metal; and II. Heating the template precursor particles to a temperature of at least 350° C. to form template particles, each template particle comprising at least one of a metal carbonate and a metal oxide; and III. On a templating surface of each of the template particles, at a temperature of at least 350° C., synthesizing a perimorphic wall comprising at least one graphenic carbon layer, to form a perimorphic composite particle; and IV. Exposing the perimorphic composite particles to an aqueous acid to:
   extract the template particles from the perimorphic walls; and
   generate a second aqueous stock solution, the second aqueous stock solution containing the aqueous ion species; and
   form carbon perimorphic frameworks, each carbon perimorphic framework comprising a perimorphic wall and containing an endocellular space filled with the second aqueous stock solution; and V. Removing the carbon perimorphic frameworks from the second aqueous stock solution by migrating them into an immiscible solvent.

5. The method of claim 1, wherein the carbonaceous perimorphic walls are characterized by a 532-nm Raman spectrum having an unfitted D peak position between 1332 cm$^{-1}$ and 1345 cm$^{-1}$.

6. The method of claim 1, wherein the template particles are porous and comprise a BET specific surface area of at most 20 m$^2$g$^{-1}$.

7. The method of claim 1, wherein the template particles are porous and comprise a BET specific surface area of at least 20 m$^2$g$^{-1}$.

8. The method of claim 1, wherein the aqueous acid comprises a weak acid.

9. The method of claim 8, wherein the aqueous acid comprises an acid derived from a gas evolved during the decomposing of the template precursor particles.

10. The method of claim 1, wherein the first and second aqueous stock solutions comprise an organic salt.

11. The method of claim 1, wherein the first and second aqueous stock solutions and the mother liquor comprise a co-solvent present at substantially the same concentration.

12. The method of claim 1, wherein the first and second aqueous stock solutions comprise dissolved magnesium cations at a molal concentration of at least 0.25 mol kg$^{-1}$.

13. The method of claim 1, wherein the first and second aqueous stock solutions comprise dissolved magnesium cations at a molal concentration of at least 0.50 mol kg$^{-1}$.

14. The method of claim 1, wherein the deriving of the template precursor particles from the first aqueous stock solution comprises:
   precipitating a salt from the first aqueous stock solution via the solventless precipitation; and
   forming the template precursor particles from the salt via a recrystallization.

15. The method of claim 1, wherein the deriving of the template precursor particles comprises precipitating an anhydrous salt.

16. The method of claim 1, wherein the synthesizing of the perimorphic wall on the templating surface of each of the templating particles comprises a template-directed chemical vapor deposition.

17. The method of claim 16, wherein the synthesizing of the perimorphic wall occurs at a temperature between 350° C. and 950° C.

18. The method of claim 16, wherein the synthesizing of the perimorphic wall occurs at a temperature between 350° C. and 700° C.

19. The method of claim 1, further comprising:
   V. Removing the carbon perimorphic frameworks from the second aqueous stock solution by migrating them into an immiscible solvent.

20. The method of claim 1, wherein the decomposing of the template precursor particles comprises oxidizing an organic decomposition product of the template precursor particles.

* * * * *